(12) United States Patent
Ishii et al.

(10) Patent No.: US 7,159,175 B2
(45) Date of Patent: Jan. 2, 2007

(54) CUT-LIST CREATION SYSTEM, CENTER SERVER, ADVERTISEMENT CREATION TERMINALS, COMPUTER PROGRAMS, STORAGE MEDIA AND CUT-LIST CREATION METHOD OF CENTER SERVER

(75) Inventors: Makoto Ishii, Tokyo (JP); Toshiki Ito, Tokyo (JP); Naoko Kumagai, Tokyo (JP)

(73) Assignee: Sony Corporation, Tokyo (JP)

( * ) Notice: Subject to any disclaimer, the term of this patent is extended or adjusted under 35 U.S.C. 154(b) by 770 days.

(21) Appl. No.: 10/377,229

(22) Filed: Feb. 28, 2003

(65) Prior Publication Data

US 2003/0220838 A1    Nov. 27, 2003

(30) Foreign Application Priority Data

Mar. 1, 2002    (JP)    ............................. 2002-056489

(51) Int. Cl.
  *G11B 27/00*    (2006.01)
  *G06F 17/60*    (2006.01)

(52) U.S. Cl. ..................... 715/716; 715/721; 715/719; 705/14

(58) Field of Classification Search ................ 715/716, 715/719–726, 47; 725/25, 41, 44, 42, 47; 705/14

See application file for complete search history.

(56) References Cited

U.S. PATENT DOCUMENTS

| 5,819,092 A * | 10/1998 | Ferguson et al. ........... 717/113 |
| 2002/0013831 A1* | 1/2002 | Astala et al. ............... 709/220 |
| 2002/0046097 A1* | 4/2002 | Yoshimine et al. .......... 705/14 |
| 2005/0039111 A1* | 2/2005 | Abe et al. ................ 715/500.1 |

* cited by examiner

*Primary Examiner*—Tadesse Hailu
(74) *Attorney, Agent, or Firm*—Frommer Lawrence & Haug LLP; William S. Frommer; Thomas F. Presson

(57) ABSTRACT

The present invention provides a cut-list creation system allowing a cut list to be made and edited automatically through a network at a request made by the user. The cut-list creation system comprises advertisement design terminals, a center server and a network for connecting the terminals to the server. The center server comprises a storage unit for storing video contents created by using an advertisement design terminal and a cut-list creation apparatus for creating template data of a video-content-scene list. The template data is created by extracting selected scenes from a video content stored in the storage unit in a division process carried out on the video content along the time axis. The division process is carried out by an advertisement design terminal by making accesses to the video content.

26 Claims, 78 Drawing Sheets

FIG. 5

| MAIL TYPE 2292 | JOB NUMBER 2293 | MANAGEMENT NUMBER 2294 | PROJECT NAME 2295 | --- |
|---|---|---|---|---|
| END | 3 | E0003 | --- | --- |
| --- | --- | --- | --- | --- |

INFO 229-1

| JOB NUMBER | AGENT ID | | |
|---|---|---|---|
| 2 | -- | -- | ← INFO 230-1 |
| 3 | -- | -- | ← INFO 230-2 |
| -- | -- | -- | |

| JOB NUMBER 2311 | MANAGEMENT NUMBER 2312 | PROJECT NAME 2313 | REQUESTER 2314 | OTHER 2315 | |
|---|---|---|---|---|---|
| 1 | E0001 | --- | --- | CHANGE | INFO 231-1 |
| 2 | E0002 | --- | --- | --- | INFO 231-2 |
| 3 | E0003 | --- | --- | CANCEL | INFO 231-3 |
| --- | --- | --- | --- | --- | |

| RIGHT NAME | DESCRIPTION |
|---|---|
| READ RIGHT | DISPLAY THE DIRECTORY |
| WRITE RIGHT | CHANGE THE DIRECTORY NAME AND ADD A FILE TO THE DIRECTORY |
| FILE-WRITE RIGHT | CHANGE A FILE IN THE DIRECTORY |
| COMMENT-CHANGE RIGHT | CHANGE A COMMENT OF A FILE IN THE DIRECTORY |
| ACCESS-RIGHT CHANGE RIGHT | CHANGE AN ACCESS RIGHT GIVEN TO THE DIRECTORY |

FIG. 28

INSPECTION COMMENT INFO

INSPECTED FILE:/NEW PROJECT OUTLINE.TXT

REQUESTER'S COMMENT

| REQUESTER ENTRY | DATE AND TIME | CONTENTS |
|---|---|---|
| HANAKO YAMADA | 2001/09/13 20:02 | PLEASE, VERIFY. |

RETURNED COMMENT

| RETURN SOURCE ENTRY | DATE AND TIME | CONTENTS |
|---|---|---|
| HANAKO YAMADA | 2001/09/13 20:02 | VERIFIED. NO PROBLEMS |

1760

1761

1762

TRANSMIT ~1763    CANCEL ~1764

FIG. 33

FILE(F)  EDIT(E)  VIEW(V)  FAVORITE(A)  TOOL(T)  HELP(H)

GLANCE MANAGEMENT | PROJECT TOP | PASSWORD CHANGE | HELP

PROJECT NAME: DEVELOPMENT PROJECT A
Ms. Tomoko

Menu
- FILE LIST
- INSPECTION LIST
- APPROVAL-CIRCULATION LIST

Additional Menu
- CUT LIST
- STAFF LIST
- SCHEDULE TABLE

▲ DEDICATED LINE — CHANGE TO INTERNET

INSPECTION LIST ~1720

↱1 ITEM ~1721

RECEPTION TABLE

| | FILE NAME | COMMENT | CAPACITY (bytes) | DIRECTORY NAME | RECEPTION DATE AND TIME | SENDER | STATUS | INSPECTION COMMENT |
|---|---|---|---|---|---|---|---|---|
| ☐ | /INTERNAL TEXTS GUIDANCE.TXT | 770 | 2,272 | | 2001.09.13 20:13 | HANAKO YAMADA | ▶ NOT READ | 📄 |
| ☐ | /INTERNAL TEXT/SALES DEPT REPORT.TXT | | 2,272 | | 2001.09.13 20:14 | TARO YAMADA | ALREADY READ | 📄 |

~1726

REQUEST TABLE

| | FILE NAME | COMMENT | CAPACITY (bytes) | DIRECTORY NAME | FILE OPENING DATE AND TIME | RECEIVER | STATUS | INSPECTION COMMENT |
|---|---|---|---|---|---|---|---|---|
| ☐ | /INTERNAL TEXTS STORAGE_SERVICE_MANUAL.TXT | | 2,272 | | 2001.09.13 20:15 | HANAKO YAMADA | ▶ NOT READ | 📄 |

~769    ~1727

▲ RETURN TO GLANCE MANAGEMENT    ▲ RETURN TO PROJECT TOP (COPY) ~757   (COPY TO INTERNET) ~760   (DELETE INSPECTION) ~759

FIG. 34

Menu bar: FILE(F) EDIT(E) VIEW(V) FAVORITE(A) TOOL(T) HELP(H)

Tabs: GLANCE MANAGEMENT | PROJECT TOP | PROJECT: CONTRACT MANAGEMENT | PASSWORD CHANGE | HELP

PROJECT NAME: DEVELOPMENT PROJECT A
ID: Ms. Hanako

Menu:
- FILE LIST
- INSPECTION LIST
- APPROVAL-CIRCULATION LIST (▶1 ITEM)

Additional Menu:
- CUT LIST
- STAFF LIST
- SCHEDULE TABLE
- ▲ DEDICATED LINE — CHANGE TO INTERNET

APPROVAL CIRCULATION LIST — 1726

RECEPTION TABLE — 769, 1724

| FILE NAME | COMMENT | CAPACITY (bytes) | CIRCULATION ROUTE | RECEPTION DATE AND TIME | ORIGINATOR | PERSON IN CIRCULATION | STATUS | APPROVAL-CIRCULATION COMMENT |
|---|---|---|---|---|---|---|---|---|
| ☐ REPORT.TXT | 📄 | 2,272 | CIRCULATION ROUTE 4 | 2001.09.13 11:38 | TOMOKO YAMADA | HANAKO YAMADA | ▶ NOT READ | 📄 |
| ☐ PROPOSAL.TXT | 📄 | 3,840 | CIRCULATION ROUTE 4 | 2001.09.13 11:38 | TARO YAMADA | HANAKO YAMADA | NOT READ APPROVED | 📄 |

ORIGINATOR TABLE — 770, 1725

| FILE NAME | COMMENT | CAPACITY (bytes) | CIRCULATION ROUTE | RECEPTION DATE AND TIME | ORIGINATOR | PERSON IN CIRCULATION | STATUS | APPROVAL-CIRCULATION COMMENT — 1727 |
|---|---|---|---|---|---|---|---|---|
| ☐ GUIDANCE.TXT | 📄 | | | | | | APPROVED | 📄 |
| ☐ STORAGE_SERVICE_MANUAL.TXT | 📄 | 2,272 | CIRCULATION ROUTE 3 | 2001.09.13 11:35 | HANAKO YAMADA | TOMOKO YAMADA | BEING CIRCULATED | 📄 |
| ☐ REPORT.TXT | 📄 | 2,272 | CIRCULATION ROUTE 4 | 2001.09.13 11:38 | TOMOKO YAMADA | HANAKO YAMADA | BEING CIRCULATED | 📄 |
| ☐ VACATION AND WORKTIME.TXT | 📄 | 22,016 | CIRCULATION ROUTE 1 | 2001.09.13 11:34 | HANAKO YAMADA | JIRO YAMADA | NOT READ, REJECTED | 📄 |
| ☐ NEW PROJECT OUTLINE.TXT | 📄 | 3,840 | CIRCULATION ROUTE 1 | 2001.09.13 11:14 | HANAKO YAMADA | TOMOKO YAMADA | NOT READ, APPROVED | 📄 |
| ☐ PROPOSAL.TXT | 📄 | 3,840 | CIRCULATION ROUTE 4 | 2001.09.13 11:38 | TARO YAMADA | HANAKO YAMADA | | |

769

Buttons:
- ▲ RETURN TO GLANCE MANAGEMENT
- COPY — 757
- COPY TO INTERNET — 760
- DELETE APPROVAL CIRCULATION — 759
- ▲ RETURN TO PROJECT TOP

FIG. 38

| FILE(F) | EDIT(E) | VIEW(V) | FAVORITE(A) | TOOL(T) | HELP(H) |

GLANCE MANAGEMENT | PROJECT CONTRACT | PROJECT MANAGEMENT | PASSWORD CHANGE | HELP ~780

PROJECT MANAGEMENT

□— SETTING AN ACCESS GROUP

ENTER THE NAME OF A NEW GROUP TO BE CATALOGED.

830~ GROUP NAME: [ ]

ENTER A CHECK MARK FOR EACH MEMBER.

831~

| | USER NAME | USER ID | COMPANY | DEPARTMENT | e-mail ADDRESS |
|---|---|---|---|---|---|
| ☐ | TARO SUZUKI | UIDkk1234 | CONTRACT MANAGEMENT CORP. | MANUAL | |
| ☐ | TARO YAMADA | UIDkk00 | CONTRACT MANAGEMENT CORP. | MANUAL | taro@co.jp |
| ☐ | HANAKO YAMADA | UIDkk11 | CONTRACT MANAGEMENT CORP. | MANUAL | hana@co.jp |

769~

● CATALOG ~832    ● CANCEL ~833

FIG. 50
| No. | CUT IMAGE | CUT SCALE (TOTAL SCALE) | NARRATION & WORDS | No. | CUT IMAGE | CUT SCALE (TOTAL SCALE) | NARRATION & WORDS |
|---|---|---|---|---|---|---|---|
| 1 |  | 03"00 F [03"00 F] | SUNSET | | | | |
| 2 |  | 02"15 F [05"15 F] | FLOWING CLOUDS | | | | |
| 3 |  | 01"25 F [07"10 F] | | | | | |
| 4 |  | 00"10 F [07"20 F] | BLUE SKY | | | | |
| | | | | | | | |
| | | | | | | | |
| | | | | | | | |
LIST OF CUT-LIST IMAGES
▶ CUT-LIST EDIT   ▶ RETURN TO PDF OUTPUT FORMAT   ▶ SAVE IN PDF

FIG. 52

FILE(F)   EDIT(E)   VIEW(V)   FAVORITE(A)   TOOL(T)   HELP(H)

BACK   FORWARD   STOP   REFRESH   HOME

ADDRESS(D)

*Encoding*

USE AGREEMENT   HELP   MENU

PROJECT NAME         ● ● PROJECT

GO

MENU

■ NEW ENCODING

■ PAST HISTORY

| MANAGEMENT No. | REQUEST DATE AND TIME | COMPLETION DATE AND TIME | SOURCE MOVIE FILE | SAVED FILE | REQUESTER |
|---|---|---|---|---|---|
| ENC-356000 ENCODING GOING ON | 2002/4/24 13:30 | 2002/4/24 13:45 (EXPECTED) | XYZ | ABC | DAISUKE YAMADA |
| ENC-356000 ENCODING COMPLETED | 2002/4/23 13:40 | 2002/4/23 13:45 | XYZ | ABC | DAISUKE YAMADA |
| ENC-356000 CANCELED | 2002/4/22 13:40 | 2002/4/22 13:45 | XYZ | ABC | DAISUKE YAMADA |

FIG. 53

FILE(F)　EDIT(E)　VIEW(V)　FAVORITE(A)　TOOL(T)　HELP(H)

BACK　FORWARD　STOP　REFRESH　HOME

ADDRESS(D)

SETTING OF NEW ENCODING ORDER

UP TO 4 ENCODING ITEMS CAN BE SET. PERFORM THE FOLLOWING OPERATIONS.

1. SELECT A MOVIE FILE TO BE USED IN THE NEW ENCODING.
2. ENTER THE NAME OF A POST-ENCODING FILE.
3. SPECIFY A dotBOX DIRECTORY FOR SAVING THE FILE.
4. SELECT AN ENCODING FORMAT.

| 1 NAME OF MOVIE FILE TO BE USED | 2 NAME OF POST-ENCODING FILE | 3 DIRECTORY FOR SAVING THE FILE | 4 ENCODING FORMAT |
|---|---|---|---|
| SELECT | | SELECT | Quick Time Solenson 2Mbps ▶ |
| SELECT | | SELECT | Quick Time Solenson 2Mbps ▶ |
| SELECT | | SELECT | Quick Time Solenson 2Mbps ▶ |
| SELECT | | SELECT | Quick Time Solenson 2Mbps ▶ |

EXECUTE　CLEAR　CANCEL

STARTING OF NEW ENCODING

AN E-MAIL FOR CONFIRMING SETTING OF NEW ENCODING WAS SENT.
WHEN THE ENCODING IS COMPLETED, A NOTICE E-MAIL WILL BE SENT AGAIN.
IN ADDITION, COMPLETION OF THE ENCODING CAN BE VERIFIED FROM AN ENCODING MENU PAGE.

2280

| MANAGEMENT NUMBER | [1] NAME OF MOVIE FILE TO BE USED | [2] NAME OF POST-ENCODING FILE | [3] dotBOX DIRECTORY FOR SAVING THE FILE | [4] ENCODING FORMAT | COLLECTION TIME | COST | EXPECTED COMPLETION DATE AND TIME |
|---|---|---|---|---|---|---|---|
| ENC-356000 | ABCD.mov | AIUEO | /aaaa/dddddd | Quick Time Solenson 2Mbps | 12:22:20 | ¥1,000 | 2002/04/24 03:45 |
| | | | | | | | |
| | | | | | | | |
| | | | | | | | |

(REQUEST DATE AND TIME: 2002/04/01 12:22)

(NEW-ENCODING SCREEN)   (ENCODING MENU)

FIG. 57

| | |
|---|---|
| ■■ CONFIRMATION AND MODIFICATION OF SETTING DATA | |

DATA SETTING CAN BE CHANGED IN THIS SCREEN.
REWRITE A PORTION TO BE CHANGED AND CLICK A CHANGE BUTTON.
A CHANGE CAN BE MADE ONLY IF THE STATUS INDICATES THAT ENCODING IS GOING ON.

| | |
|---|---|
| MANAGEMENT NUMBER | ENC-356000 |
| REQUESTER | DAISUKE YAMADA |
| CHANGE DATE AND TIME | 2001/11/28 11:30 Ms. HANAKO YAMADA CHANGED |
| PRESENT STATUS | ENCODING GOING ON |
| MOVIE FILE TO BE USED | [ ] [SELECT] |
| POST-ENCODING FILE NAME | [ ] |
| SAVING DIRECTORY | [ ] [SELECT] |
| ENCODING FORMAT | Quick Time Solenson 2Mbps ▼ |
| COLLECTION TIME | |
| COST | |
| REQUEST DATE AND TIME | |
| COMPLETION DATE AND TIME | 2001/11/29 12:30 (EXPECTED) |

[CHANGE] [CLEAR CHANGES] [CANCEL SETTING] [RETURN]

2260

CUT-LIST CREATION SYSTEM, CENTER SERVER, ADVERTISEMENT CREATION TERMINALS, COMPUTER PROGRAMS, STORAGE MEDIA AND CUT-LIST CREATION METHOD OF CENTER SERVER

BACKGROUND OF THE INVENTION

In general, the present invention relates to a computer network system capable of doing indeterminate jobs by the user request. More particularly, the present invention relates to a cut-list creation system, a center server, computer programs, a storage unit and a cut-list creation method adopted by the center server.

In a final process of an image creation work in production of an advertisement such as a TV commercial, cut scenes of created images are extracted to make a cut list, which is a list of scenes. In the following description, a cut has the same meaning as a scene.

The cut list or the list of scenes is a product submitted to a client such as an advertisement agency making a request for creation of an advertisement. The cut list is submitted to a client as a video content and necessary accessories attached to the video content. The video content and its accessories are a complete product obtained as a result of a plurality of creation works such processing to collect and edit inputs for a requested advertisement.

In a final process of an image creation work in production of an advertisement, however, scenes of a completed video content are output to printing media and only required scenes are then extracted. Subsequently, the scenes are pasted one after another to a base in order to create a cut list or a list of scenes to be submitted to the client. The works to extract required scenes and paste the extracted scenes are done manually and could result in low work efficiency and a high cost.

It is thus an object of the present invention addressing the problem described above to provide a new improved cut-list creation system capable of automatically creating and editing a cut list by the user request through a network.

SUMMARY OF THE INVENTION

In order to solve the problem described above, in accordance with an aspect of the present invention, there is provided a cut-list creation system including an advertisement design terminal, a center server and a network for connecting the advertisement design terminal and the server to each other, wherein the center server includes:

a storage unit for storing a video content created by using the advertisement design terminal; and a cut-list creation apparatus for creating template data of a video-content-scene list by extraction of selected scenes from the video content stored in the storage unit in the time-division process carried out for each of the selected scenes in accesses made by the advertisement design terminal to the video content.

In the cut-list creation system provided by the present invention, the center server creates template data of a video-content-scene list by extraction of selected scenes from the video content stored in the storage unit in the time-division process carried out for each of the selected scenes in accesses made by the advertisement design terminal to the video content. As a result, in the configuration described above, the template data of an editable cut list can be created automatically.

In addition, the center server includes:

an access-right management apparatus for executing management of rights of accesses made by the advertisement design terminal to a directory stored in a storage area of the storage unit and rights of accesses made by the advertisement design terminal to a data file accommodated in the directory with an access maker used as a management unit where the access maker is the advertisement design terminal or a group to which the advertisement design terminal pertains; and an access control apparatus for executing control of accesses made by the advertisement design terminal to the storage unit by referring to access-right data, which is transmitted from the access-right management apparatus as a result of inquiring of the access-right management apparatus about the access-right data in accordance with each of the accesses made by the advertisement design terminal, with the access maker used as a control unit where the access maker is the advertisement design terminal or a group including advertisement design terminals.

Thus, in the configuration described above, rights of accesses to a video content stored in a data file can be set for an advertisement design terminal or a group including advertisement design terminals.

In addition, the cut-list creation apparatus is capable of creating template data of a cut list of a video content on the basis of edit information created in a process of editing the video content. Thus, in the configuration described above, the template data of a cut list of a video content can be created and edited by using an advertisement design terminal without regard to a date, a time and a place for doing the editing work.

The template data of the cut list of a video content includes pictures, which are frame units each representing a selected scene of the video content, and additional information affiliated with the selected scene and is displayed as a list of representative pictures each representing a selected scene and appearing along a time axis. Thus, in the configuration described above, it is possible to recognize a list of all scenes composing a video content with ease.

In addition, it is also possible to carry out edit processing on a selected scene and additional information affiliated with the selected scene at a later time. Thus, in the configuration described above, the editing work can be done in accordance with the purpose of the editing work without awareness of the number of times the editing work has been done so far.

Moreover, the edit processing includes one of a modification process, a deletion process, an integration process and a division process. Thus, in the configuration described above, scenes of a video-content cut list or the like can be subjected to various kinds of editing.

Furthermore, the cut-list creation apparatus converts the format of the template data of a video-data-scene list into a format of video-content inspection data that can be output to printing media or viewed on a display screen. As a result, in the configuration described above, inspection data of a created video content can be verified by another advertisement design terminal or distributed to a plurality of users as printed hard copies.

In addition, the layout of a video-content inspection data can be changed. As s result, in the configuration described above, the work to change the layout of a video content can be done in accordance with the purpose of the layout-changing work without awareness of the number of times the layout-changing work has been done so far.

In addition, in order to solve the problem described above, in accordance with another aspect of the present invention, there is provided a center server connected via a network to an advertisement design terminal. It is to be noted that, since the center server according to the other aspect of the present invention has all but the same configuration as the center server of the cut-list creation system described above, a detailed description of the center server according to the other aspect of the present invention is omitted.

Furthermore, in accordance with a further aspect of the present invention, there are provided a computer program to be executed by a computer to carry out functions of the center server described above and a recording medium for storing the computer program in such a way that instructions of the program can be fetched by the computer from the recording medium.

Moreover, in accordance with a still further aspect of the present invention, there is provided an advertisement design terminal connected via a network to a center server wherein the advertisement design terminal receives template data of a scene list of a video content, which is template data created by extraction of selected scenes from the video content in the time-division process carried out in accesses made by the center server to the advertisement design terminal, from the center server. Thus, in the configuration described above, the template data of a cut list of a video content can be edited, inspected or output to a printing medium.

In addition, in accordance with a still further aspect of the present invention, there are provided a computer program to be executed by a computer to carry out functions of the advertisement design terminal described above and a recording medium for storing the computer program in such a way that instructions of the program can be fetched by the computer from the recording medium.

Furthermore, in accordance with a still further aspect of the present invention, there is provided a cut-list creation method adopted by a center server connected via a network to an advertisement design terminal. The cut-list creation method is characterized in that the cut-list creation method includes the steps of:

storing a video content created by using the advertisement design terminal in a storage unit;

receiving accesses made by the advertisement design terminal to the video content stored in the storage unit;

carrying out a time-division process on the video content stored in the storage unit for each of selected scenes in the accesses made by the advertisement design terminal; and creating template data of a video-content-scene list by extraction of the selected scenes from the video content stored in the storage unit.

In addition, the cut-list creation method adopted by the center server further includes the step of managing rights of accesses made by the advertisement design terminal to a directory stored in a storage area of the storage unit and rights of accesses made by the advertisement design terminal to a data file accommodated in the directory with an access maker used as a management unit where the access maker is the advertisement design terminal or a group to which the advertisement design terminal pertains.

Furthermore, the cut-list creation method adopted by the center server may further include the steps of:

inquiring of the access-right management apparatus about access-right data in accordance with each of accesses made by the advertisement design terminal;

referring to the access-right data received from the access-right management apparatus; and controlling accesses made by the advertisement design terminal to the storage unit with the access maker used as a control unit where the access maker is the advertisement design terminal or a group including the advertisement design terminal.

Moreover, the cut-list creation method adopted by the center server may further include the step of creating template data of a cut list of a video content on the basis of edit information created in a process to edit the video content.

In addition, the cut-list creation method adopted by the center server may further include the step of displaying the template data of the cut list of a video content, which is a list including pictures and additional information affiliated with the selected scene, as a list of representative images each representing a selected scene and appearing along a time axis where the pictures are frame units each representing a selected scene of the video content.

Furthermore, the cut-list creation method adopted by the center server may further include the step of carrying out edit processing on the selected scene and the additional information affiliated with the selected scene at a later time.

Moreover, the edit processing may include one of a modification process, a deletion process, an integration process and a division process.

In addition, the cut-list creation method adopted by the center server may further include the step of converting the format of template data of the video-data-scene list into a format of video-content inspection data that can be output to printing media or viewed on a display screen.

Furthermore, the cut-list creation method adopted by the center server may further include the step of changing the layout of the video-content inspection data.

BRIEF DESCRIPTION OF THE DRAWINGS

FIG. 5 is an explanatory diagram showing a typical outline configuration of a notification storage area in the format-conversion management DB apparatus employed in the cut-list creation system implemented by the embodiment of the present invention;

FIG. 6 is an explanatory diagram showing a typical outline configuration of an exclusion-table storage area in the format-conversion management DB apparatus employed in the cut-list creation system implemented by the embodiment of the present invention;

FIG. 7 is an explanatory diagram showing a typical outline configuration of an order-table storage area in the format-conversion management DB apparatus employed in the cut-list creation system implemented by the embodiment of the present invention;

FIG. 15 is an explanatory diagram showing types of access right used in the cut-list creation system implemented by the embodiment of the present invention;

FIG. 28 is an explanatory diagram showing a still further screen appearing on the display unit of a terminal employed in the cut-list creation system implemented by the embodiment of the present invention;

FIG. 33 is an explanatory diagram showing a still further screen appearing on the display unit of a terminal employed in the cut-list creation system implemented by the embodiment of the present invention;

FIG. 34 is an explanatory diagram showing a still further screen appearing on the display unit of a terminal employed in the cut-list creation system implemented by the embodiment of the present invention;

FIG. 38 is an explanatory diagram showing a still further screen appearing on the display unit of a terminal employed in the cut-list creation system implemented by the embodiment of the present invention;

FIG. 50 is an explanatory diagram showing a still further screen appearing on the display unit of a terminal employed in the cut-list creation system implemented by the embodiment of the present invention;

FIG. 52 is an explanatory diagram showing a still further screen appearing on the display unit of a terminal employed in the cut-list creation system implemented by the embodiment of the present invention;

FIG. 53 is an explanatory diagram showing a still further screen appearing on the display unit of a terminal employed in the cut-list creation system implemented by the embodiment of the present invention;

FIG. 56 is an explanatory diagram showing a still further screen appearing on the display unit of a terminal employed in the cut-list creation system implemented by the embodiment of the present invention;

FIG. 57 is an explanatory diagram showing a still further screen appearing on the display unit of a terminal employed in the cut-list creation system implemented by the embodiment of the present invention;

PREFERRED EMBODIMENTS OF THE INVENTION

Figure 1:
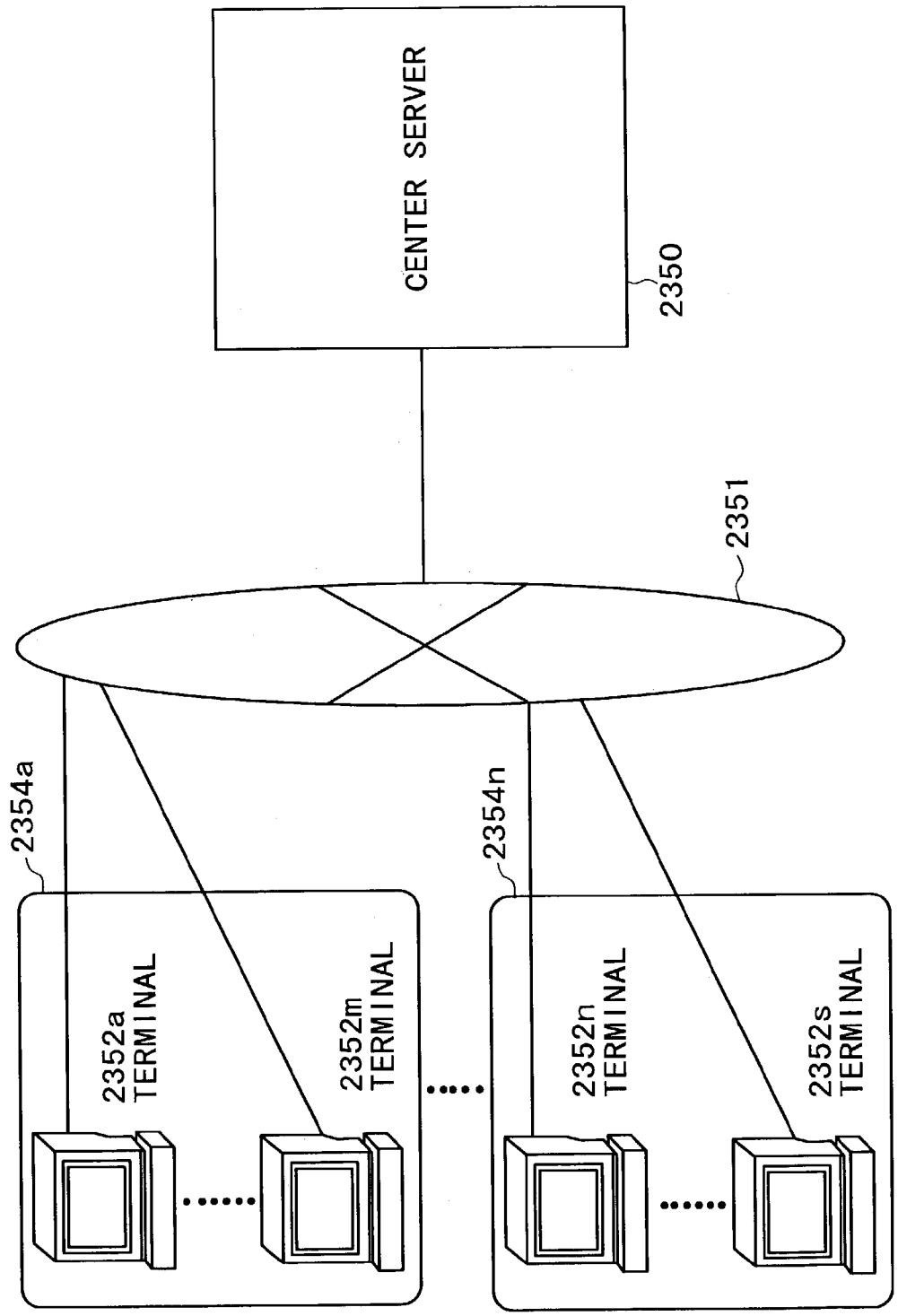
FIG. 1 is a block diagram showing an outline configuration of a cut-list creation system implemented by an embodiment of the present invention.

Next, preferred embodiments of the present invention are explained in detail by referring to diagrams. It is to be noted that, in the following description and reference diagrams, elements having identical functions and identical configurations are denoted by the same reference numeral or the same symbol and such elements are explained only once.

1: Overview of the Business Model

First of all, by referring to FIG. 1, the concept of a business model such as a storage service system based on the present invention is explained. It is to be noted that, in this specification, a storage service implies all services of providing the user with a storage area through a network.

1-1: Storage Service System

As shown in FIG. 1, a center server 2350 is connected to terminals 2352 by a network 2351.

An information-processing apparatus owned by the user constructs each of the terminals 2352, namely, terminals 2352a, 2352b, . . . and 2352s. The user means persons each having a proper qualification to utilize a storage service of the center server 2350 through the network 2351.

It is to be noted that the user utilizing the storage service system conceivably represents, among other people, persons working for enterprises including advertisement companies (or clients) doing activities of managing mainly CMs (commercials) for TV programs in the advertisement industries, companies producing CMs and the like and production companies doing editing work.

In addition, as shown in FIG. 1, a group 2354 is formed to comprise a collection of terminals 2352 for a project in accordance with the structure and the objectives of an organization, in which the group 2354 is created. There may be only one group 2354 or a plurality of groups 2354a, 2354b, . . . 2354n. Each of the groups 2354 comprises one terminal 2352 or a plurality of terminals 2352.

A group 2354 to which terminals 2352 pertain is not necessarily a group covering organizations or departments in an enterprise. Instead, a group 2354 can be a group covering organizations or departments of a plurality of enterprises.

The terminal 2352 makes an access to the center server 2350 through the network 2351 in order to utilize a variety of services to create advertisements by using a storage area (or a disc space) allocated in the center server 2350 as a shared resource to the terminal 2352.

1-1-1: Data Sharing

A service to share data can be utilized by making accesses from a group 2354, to which terminals 2352 belong, to a directory, file data and comment data pertaining to the directory or the file data.

A directory is a generic name of a storage portion or a storage location for accommodating one or more pieces of file data in a storage area of a storage unit employed in a computer. An example of the directory is a folder. File data is a generic name of information handled in a computer. The main example of the file data is video content data comprising digitized moving-picture or static-picture data. Other examples of the file data are text data and audio data. An access is a generic name of processing such as connection, reference and modification.

The terminal 2352 is capable of making a directory and a subdirectory in a storage area included in the center server 2350 and allocated to the group 2354, to which the terminal 2352 pertains, and storing file data in the directory or the subdirectory.

Additional information called comment data can be affiliated with the directory, the subdirectory and the file data. The terminal 2352 is capable of storing proper information separately from a directory or file data.

A right to make an access from terminals 2352 to a directory, a subdirectory, file data and comment data is set for each of the terminals 2352, which is an owner creating the directory and the subdirectory as well as storing the file data and the comment data. It is to be noted that a right to make an access to a directory, a subdirectory and file data can also be set as an access right other than a comment right to make an access to comment data.

It is also possible to set a flag as to whether or not comment data affiliated with a directory or file data is to be copied or moved (inherited) in an operation to copy or move the directory or the file data.

1-1-2: Cut List

In addition, in the storage service system, by making an access to the center server 2350 through the network 2351 and using a video content preserved in the center server 2350, the terminal 2352 is capable of making a cut list, which is a required document to be submitted to a client such as an advertisement agency.

A cut list is a table of results such as video-content scenes including TV CMs, preparing for being submitted to the client at the final step of producing the advertisement. The video-content scenes are extracted from a video content. A cut list is also referred to as a list of video-content scenes.

A cut list further includes additional information such as durations (Scale), elapsed times, narrations and words for required scenes extracted from a video content.

1-1-3: Encoding

In addition, in the storage service system, by making an access to the center server 2350 through the network 2351, the terminal 2352 is capable of converting the format of a video content comprising picture and sound data stored in the center server 2350 into another format.

Some of the terminals 2352 may not be compatible with the format of a video content stored in the center server 2350 and, thus, incapable of directly reproducing the content data.

If a terminal 2352 is not compatible with the format of a video content stored in the center server 2350, the terminal 2352 is required to be capable of converting the format of the video content into a format, with which the terminal 2352 is compatible. In this way, the terminal 2352 is capable of directly reproducing the content data through the network 2351.

1-1-4: Approval Circulation

In addition, in the storage service system, the center server 2350 also provides a service called an approval circulation in which, at a request made by a specific terminal 2352, the center server 2350 circulates a video content stored in the center server 2350 to other terminals 2352 pertaining to the same group 2354 as the specific terminal 2352.

The approval circulation described in this specification is a circulation process including a process to circulate a circulation result such as an approval. However, the approval circulation also includes an inspection process to send a request for verification to the other terminals 2352. In addition, file data can be a video content and is constructed to comprise moving pictures, static pictures, sounds and texts or any combinations of moving pictures, static pictures, sounds and texts.

2: Configurations of Components in the Storage Service System

Figure 2:
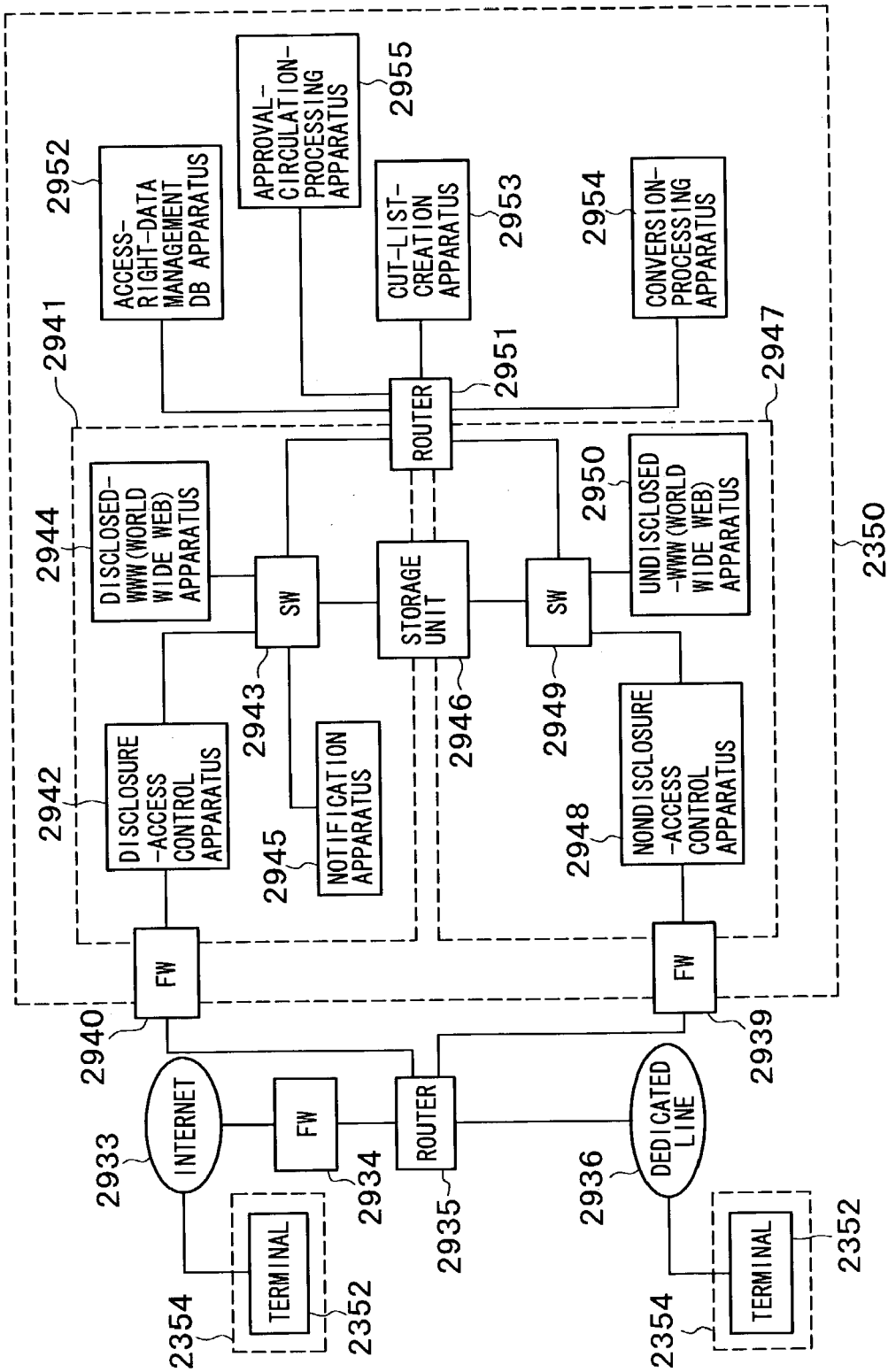
FIG. 2 is a block diagram showing a typical outline configuration of a center server employed in the cut-list creation system implemented by the embodiment of the present invention.

Next, configurations of components in the storage service system are explained by referring to FIGS. 1 and 2.

2-1: Network 2351

The network 2351 is a component for connecting the center server 2350 to the terminals 2352 so that the center server 2350 and the terminals 2352 are capable of communicating in both directions. As shown in FIG. 2, the network 2351 of this embodiment comprises the Internet 2933, which is a public-line network, and dedicated lines 2936, which construct a dedicated-line network. It is to be noted that this embodiment is not to be interpreted as a limitation on the implementation of the network 2351. Instead, the network 2351 can be implemented by other kinds of network such as mainly the wire line network in addition to the radio line network including wireless lines and satellite communication lines.

2-2: The terminal 2352

The terminal 2352 is a terminal apparatus, an advertisement production terminal or an advertisement-staff terminal. Mainly, the terminal 2352 represents all terminal apparatus used by staffs in the advertisement business world or the like to produce video contents. Thus, the terminal 2352 also represents a VTR (Video Tape Recorder) used mainly for reproducing a video content and a non-linear editing machine used for editing a video content.

The terminal 2352 is an information-processing apparatus comprising at least a central processing unit, a communication unit and a storage unit. That is to say, the terminal 2352 is generally a computer. Examples of the terminals 2352 are a laptop portable computer and a desktop computer.

The terminal 2352 makes an access to the center server 2350 by execution of inspection software such as a browser. Information provided by the center server 2350 is displayed on a display unit employed in the terminal 2352 also by the inspection software such as a browser.

In dependence on the type of the user utilizing the terminal 2352, the terminal 2352 is classified into a general terminal and a management terminal. A general terminal is an ordinary terminal pertaining to a group 2354 on the other hand, a management terminal is a terminal playing a role of managing general terminals. A management terminal can be an arbitrarily selected general terminal. It is quite within the bounds of possibility that a plurality of management terminals exist. Unless otherwise specified, in this specification, the terminal 2352 represents both a general terminal and a management terminal.

2-3: The Center Server 2350

The center server 2350 represents a center server, an approval-circulation server, a conversion server and a shared center server. The center server 2350 serving as a base is connected to a plurality of terminals 2352 by the network 2351.

The center server 2350 is an information-processing apparatus comprising at least a central processing unit, a communication unit and a storage unit. The center server 2350 can also be interpreted as a collection of more than one of information-processing apparatus. When accessed by a terminal 2352, the center server 2350 searches a database or the like to collate the access with data in the database in an attempt to determine whether or not an accessed service can be utilized. If a result of collation indicates that the access is a valid access, the use of a service specified in the access made by the terminal 2352 is approved.

FIG. 2 is a diagram showing the configuration of a typical center server 2350. As shown in the figure, the center server 2350 comprises a disclosed-segment apparatus 2941, an undisclosed-segment apparatus 2947, a router 2951, an access-right-data management DB apparatus 2952, an approval-circulation-processing apparatus 2955, a cut-list-creation apparatus 2953 and a conversion-processing apparatus 2954. The disclosed-segment apparatus 2941 is a component for giving a response to an access made by a terminal 2352 through the Internet 2933. On the other hand, the undisclosed-segment apparatus 2947 is a component for giving a response to an access made by a terminal 2352 through a dedicated line 2936. The router 2951 is a component for establishing connections with different LANs (Local Area Networks). The access-right-data management DB apparatus 2952 is a component for managing access rights of authenticated valid terminals 2352 making accesses to the center server 2350. The approval-circulation-processing apparatus 2955 is a component for transmitting a request for an approval circulation to a specified terminal 2352. The cut-list-creation apparatus 2953 is a component for making a video-content-scene list. The conversion-processing apparatus 2954 is a component for converting the format of a video content into a specified format.

Also as shown in FIG. 2, a terminal 2352 is connected to the center server 2350 by a router 2935, a firewall 2934 and the Internet 2933 or the dedicated line 2936.

2-3-1 Disclosed-Segment Apparatus 2941

As shown in FIG. 2, the disclosed-segment apparatus 2941 comprises a firewall 2940, a disclosure-access control apparatus 2942, a notification apparatus 2945, a switch 2943, a storage unit 2946 and a disclosed-WWW (World Wide Web) apparatus 2944. The fire wall 2940 is a component for rejecting an illegal access coming from a terminal other than the terminal 2352 by way of the Internet 2933. The disclosure-access control apparatus 2942 is a component for controlling accesses made by the terminal 2352. The notification apparatus 2945 is a component for notifying the terminal 2352 of various kinds of information. The switch 2943 is a component for selectively establishing a connection in the same LAN. The storage unit 2946 is a component having a storage area for storing data, and a disclosed-WWW apparatus 2944 is a component for providing necessary information to the terminal 2352.

2-3-1-1: Disclosure-Access Control Apparatus 2942

Among other processing, the disclosure-access control apparatus 2942 authenticates a user pertaining to the terminal 2352 making an access to a disclosed segment 2941 and approves the access to the disclosed segment 2941 if the user is found to be a valid user.

In addition, after the authentication processing, the disclosure-access control apparatus 2942 controls an access to the access-right-data management DB apparatus 2952 and a disclosed storage area in the storage unit 2946, which is an access made by the terminal 2352, in conjunction with the disclosed-WWW apparatus 2944.

It is to be noted that the notification apparatus 2945 and the storage unit 2946 are also used by the terminal 2352 making an access to the undisclosed-segment apparatus 2947. The storage unit 2946 is a storage device that can be used for storing file data.

2-3-1-2: Disclosed-WWW (World Wide Web) Apparatus 2944

In conjunction with the disclosure-access control apparatus 2942, the disclosed-WWW apparatus 2944 carries out a process related to an access to the storage unit 2946, which is an access made by the terminal 2352 through the Internet 2933 and the dedicated line 2936, and displays a necessary information screen on a display unit employed in the terminal 2352.

2-3-2: Undisclosed-Segment Apparatus 2947

As shown in FIG. 2, the undisclosed-segment apparatus 2947 comprises a firewall 2939, a nondisclosure-access control apparatus 2948, a switch 2949 and an undisclosed-WWW (World Wide Web) apparatus 2950. The fire wall 2939 is a component for rejecting an illegal access coming from a terminal other than the terminal 2352 through the dedicated line 2936. The nondisclosure-access control apparatus 2948 is a component for controlling accesses made by the terminal 2352. The switch 2949 is a component for selectively establishing a connection in the same LAN. The undisclosed-WWW apparatus 2950 is a component for providing necessary information to the terminal 2352.

2-3-2-1: Nondisclosure-Access Control Apparatus 2948

Among other processing, the nondisclosure-access control apparatus 2948 authenticates a user pertaining to the terminal 2352 making an access to an undisclosed segment 2947 and approves the access to the undisclosed segment 2947 if the user is found to be a valid user.

In addition, after the authentication processing, the nondisclosure-access control apparatus 2948 controls an access to the access-right-data management DB apparatus 2952 and an undisclosed storage area in the storage unit 2946, which is an access made by the terminal 2352, in conjunction with the undisclosed-WWW apparatus 2950.

2-3-2-2: Undisclosed-WWW (World Wide Web) Apparatus 2950

In conjunction with the nondisclosure-access control apparatus 2948, the undisclosed-WWW apparatus 2950 carries out a process related to an access to the storage unit 2946, which is an access made by the terminal 2352 through the dedicated line 2936, and displays a necessary information screen on a display unit employed in the terminal 2352.

2-3-3: Access-Right-Data Management DB Apparatus 2952

The access-right-data management DB apparatus 2952 is a management apparatus for managing rights of accesses to a directory, file data, comment data and the like. The accesses are made by the terminal 2352 or the group 2354 to which the terminal 2352 pertains.

In addition, the access-right-data management DB apparatus 2952 verifies that a terminal 2352 making an attempt to utilize a storage service is a valid terminal by collation of an individual identification (ID) or a password (PW) assigned to the user making use of the terminal 2352 subjected to access-right management at a request for authentication made by the disclosure-access control apparatus 2942 or the nondisclosure-access control apparatus 2948.

An access right is a right to make an access to a directory, file data, comment data and the like. Access-right information set in access-right data is used for forming a judgment as to whether or not an access to a directory, file data, comment data and the like is to be rejected.

The access-right data also includes information on a directory's attributes or a subdirectory's attributes, information on attributes of file data and information on attributes of comment data.

2-3-4: Approval-Circulation-Processing Apparatus 2955

At a request made by a terminal 2352, the approval-circulation-processing apparatus 2955 circulates a notice soliciting for an approval of a moving-picture video content or the like among a terminal 2352 or a plurality of terminals 2352 pertaining to a group 2354 in accordance with a circulation route of terminals 2352 determined in advance to be recipients of the notice. The approval circulation is also a means to be used by a terminal 2352 for inspection of the notice only for the purpose of the confirmation without approval.

In addition, it is only a management terminal 2352 that is capable of newly setting the circulation route for example in order to change the order of circulation of a notice soliciting for an approval. As described earlier, the management terminal 2352 is a terminal 2352 selected among terminals 2352 pertaining to a group 2354 as a terminal 2352 for playing a managerial role.

2-3-5: Cut-list-creation Apparatus 2953

The cut-list-creation apparatus 2953 makes a cut list, which is a list of video-content scenes and additional information associated with each of the video-content scenes. The cut list is used in creation of a television CM or the like. The video-content scenes are selected from a video content by extracting required screens from the video-content scenes. In addition, the cut-list-creation apparatus 2953 also carries out a process to edit, among others, the scenes and the additional information, which are included on the list of video-content scenes, in accordance with an access made by the terminal 2352.

The list of video-content scenes is generally submitted to a client. To be used for delivery or verification, the list of video-content scenes is submitted along with a video-production result such as a video content in the so-called advertisement business world, the so-called broadcasting business world and the like.

2-3-6: Conversion-Processing Apparatus 2954

The conversion-processing apparatus 2954 converts the format of a video content stored in the storage unit 2946 and specified by an access made by the terminal 2352 into a specified format. Components composing the conversion-processing apparatus 2954 are explained by referring to FIG. 3.

Figure 3:
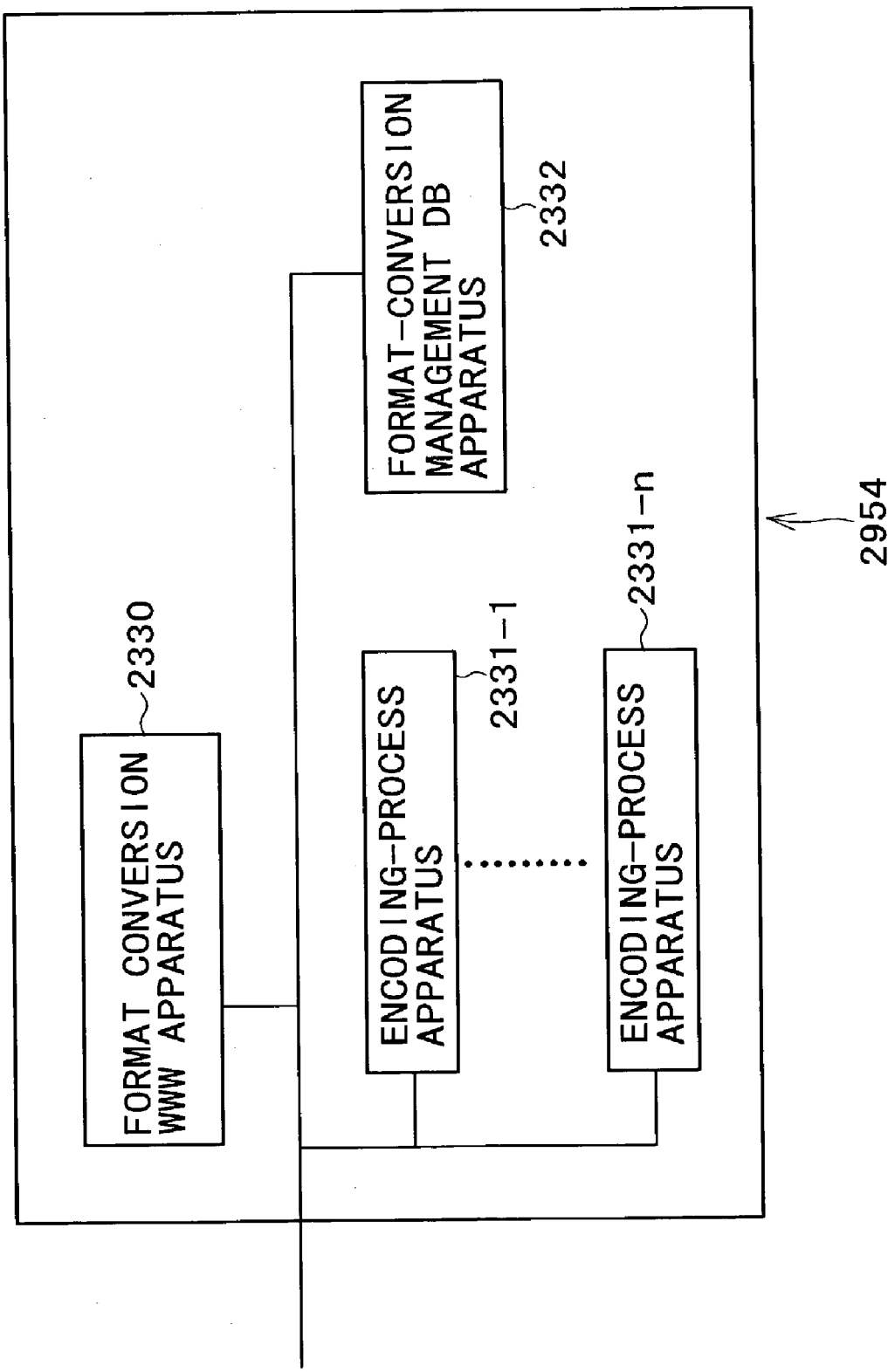
FIG. 3 is a block diagram showing a typical outline configuration of a conversion processing apparatus employed in the cut-list creation system implemented by the embodiment of the present invention.

As shown in FIG. 3, the conversion-processing apparatus 2954 comprises a format-conversion WWW apparatus 2330, an encoding-process apparatus 2331 and a format-conversion management DB apparatus 2332.

2-3-6-1: Format Conversion WWW Apparatus 2330

The format-conversion WWW apparatus 2330 accepts a request for a process to convert the format of a video content stored in the storage unit 2946 and specified by an access made by the terminal 2352 into a specified format.

In addition, in conjunction with the disclosed-WWW apparatus 2944 and the undisclosed-WWW apparatus 2950, the format-conversion WWW apparatus 2330 acquires, among other information, attributes of the specified video content, creates ordered data according to the access made by the terminal 2352 and issues, a command to catalog the ordered data in the format-conversion management DB apparatus 2332.

2-3-6-2: Format-Conversion Management DB Apparatus 2332

The format-conversion management DB apparatus 2332 is a management apparatus for storing a process condition, which shows how a format conversion process requested by the terminal 2352 has been carried out, in a storage area and for managing such stored process conditions.

Figure 4:
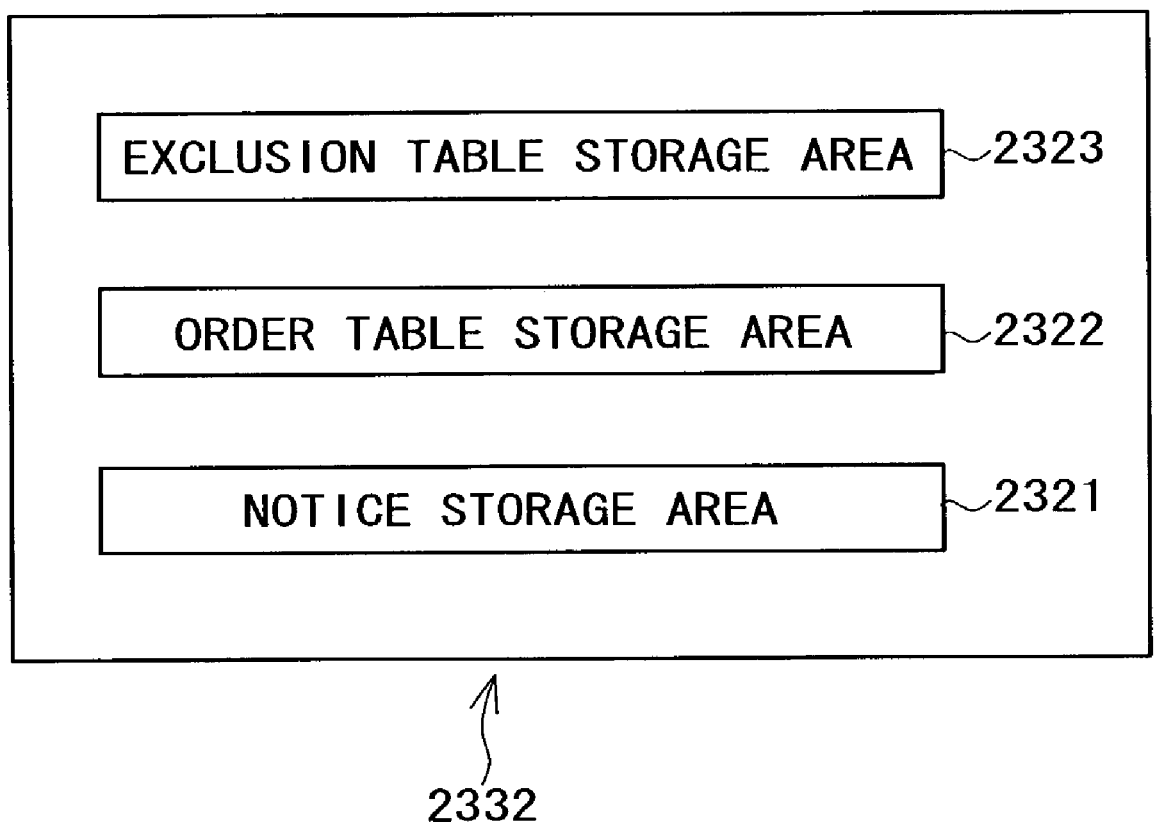
FIG. 4 is a block diagram showing a typical outline configuration of a storage area in a format-conversion management DB apparatus employed in the cut-list creation system implemented by the embodiment of the present invention.

Next, storage areas in the format-conversion management DB apparatus 2332 are explained by referring to FIG. 4.

As shown in FIG. 4, the format-conversion management DB apparatus 2332 comprises an exclusive table storage area 2323, an order table storage area 2322 and a notice storage area 2321. The exclusive table storage area 2323 is a storage area used by the encoding process apparatus 2331 to carry out a process to convert a format exclusively. The order table storage area 2322 is a storage area for storing details of a format conversion process specified by the terminal 2352. The notice storage area 2321 is a storage area for cataloging notices sent to the terminal 2352.

Figure 6:
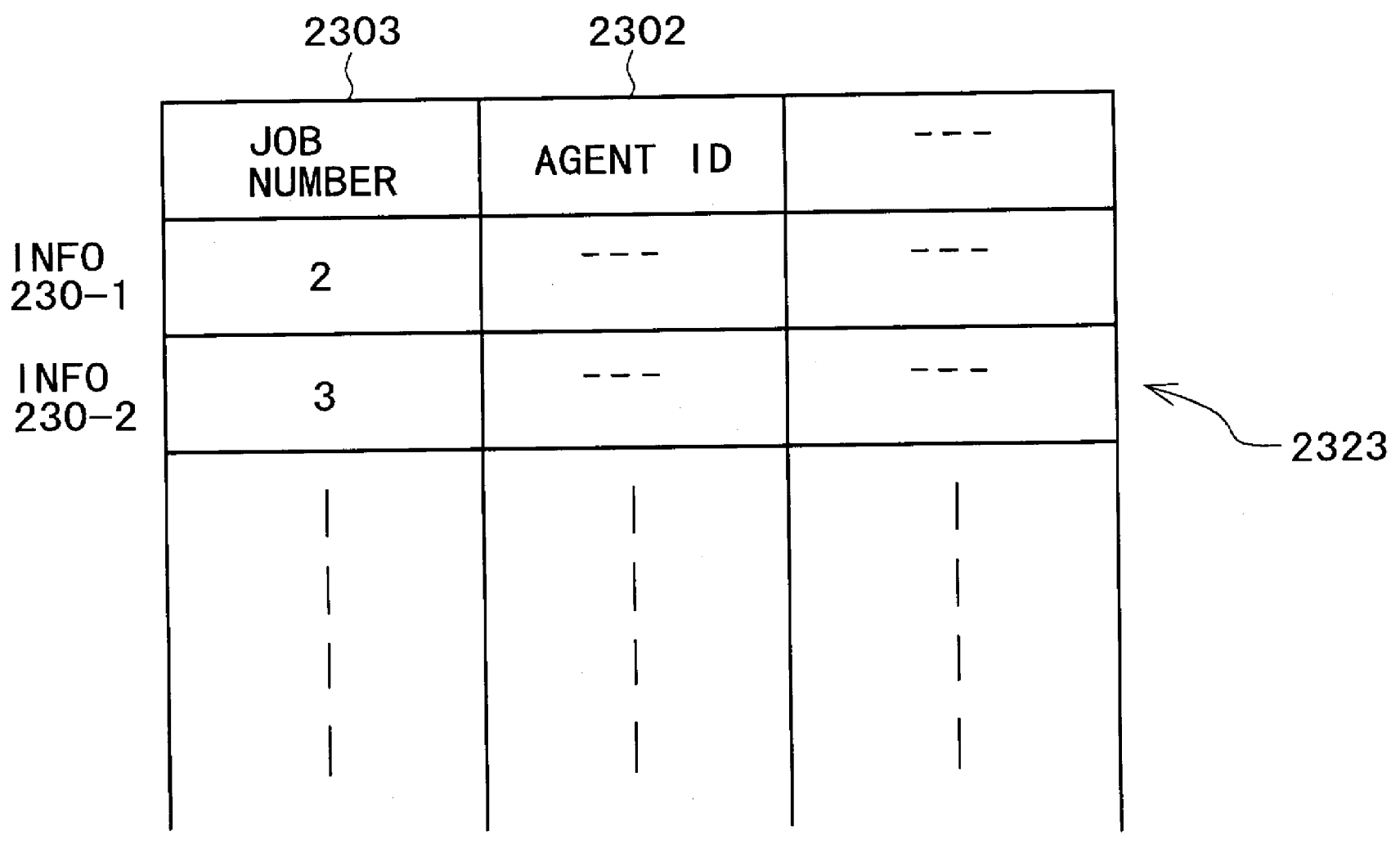

By referring to FIGS. 5, 6 and 7, the following description explains the storage areas in the format-conversion management DB apparatus 2332, namely, the exclusive table storage area 2323, the order table storage area 2322 and the notice storage area 2321.

2-3-6-2-1: Notice Storage Area 2321

As shown in FIG. 5, the notice storage area 2321 is a storage area having a database structure in which stored items include a mail type 2292, a job number 2293, a management number 2294 and a project name 2295. The mail type 2292 is the type of notified information. The job number 2293 is a unique number appended at the start of a process to convert a format. The management number 2294 is a unique number assigned at an order-cataloging time. The notice storage area 2321 includes one information row 229 or a plurality of information rows 229-1, 229-2, . . . and 229-n. Each of the information rows comprises the stored items explained above. The notification apparatus 2945 transmits an information row to the terminal 2352. It is to be noted that the items stored in the notice storage area 2321 in this embodiment are not limited to the example shown in FIG. 5. The embodiment may have a notice storage area 2321 including different items.

2-3-6-2-2: Exclusive Table Storage Area 2323

As shown in FIG. 6, the exclusive table storage area 2323 is a storage area having a database structure in which stored items include a job number 2303 and an agent ID 2302. The job number 2303 is a unique number for a process to convert a format. The agent ID 2302 is the ID of the encoding process apparatus 2331. The exclusive table storage area 2323 includes one information row 230 or a plurality of information rows 230-1, 230-2, . . . and 230-n, which are stored by the encoding process apparatus 2331. Each of the information rows comprises the stored items explained above. It is to be noted that the items stored in the exclusive table storage area 2323 in this embodiment are not limited to the example shown in FIG. 6. The embodiment may have an exclusive table storage area 2323 including different items.

2-3-6-2-3: Order Table Storage Area 2322

As shown in FIG. 7, the order table storage area 2322 is a storage area having a database structure in which stored items include a job number 2311, a management number 2312, a project name 2313, a requester 2314 and other 2315. The job number 2311 is a unique number for a process to convert a format. The management number 2312 is a unique number assigned at an order-cataloging time. The requester 2314 is the terminal 2352 placing an order. The order table storage area 2322 includes one information row 231 or a plurality of information rows 231-1, 231-2, . . . and 231-n, which are stored by the encoding process apparatus 2331. Each of the information rows comprises the stored items explained above. It is to be noted that the items stored in the order table storage area 2322 in this embodiment are not limited to the example shown in FIG. 7. The embodiment may have an order table storage area 2322 including different items.

2-3-6-3: Encoding-Process Apparatus 2331

The encoding-process apparatus 2331 converts the format of a video content into a specified format on the basis of the process condition of the order data specified by the terminal 2352 and stored in the format-conversion management DB apparatus 2332.

2-3-7: Storage Unit 2946

The storage unit 2946 is a component for storing information such as file data. The storage unit 2946 carries out various kinds of processing such as a storing process, a deletion process, a copy process, a transfer process and a modification process on file data such as a video content, which comprises moving pictures, at a request made in an access made by the terminal 2352.

The storage area comprises a disclosed storage area and an undisclosed storage area. The disclosed storage area is accessed by the terminal 2352 through the Internet 2933 and the dedicated line 2936. On the other hand, the undisclosed storage area is accessed by the terminal 2352 through the dedicated line 2936 only.

2-3-8: Router 2951

The router 2951 selectively establishes a connection to a component requested in an access. The requested component may be the access-right-data management DB apparatus 2952, the approval-circulation-processing apparatus 2955, the cut-list-creation apparatus 2953, the conversion-processing apparatus 2954, the storage unit 2946, the disclosed-segment apparatus 2941 or the undisclosed-segment apparatus 2947.

3: Screen Configuration in the Storage Service System

In order to give the reader better understanding of the storage service system implemented by this embodiment, by referring to diagrams, the following description explains typical configurations of screens appearing on a display unit of the terminal 2352 to which the storage service system implemented by this embodiment is applied.

It is to be noted that, while the typical screen configurations explained below are configurations of screens provided by the undisclosed-WWW apparatus 2950 to the terminal 2352 in accordance with an access made by the terminal 2352 through the dedicated line 2936, the description also applies to screens provided by the disclosed-WWW apparatus 2944 to the terminal 2352 almost as well.

In addition, even though the screens described below are displayed on the display unit by using inspection software called a browser, it is possible to implement the storage service system of this embodiment without regard to the type of the inspection software.

3-1: Top-Page Screen and Its Related Screen

Figure 8:
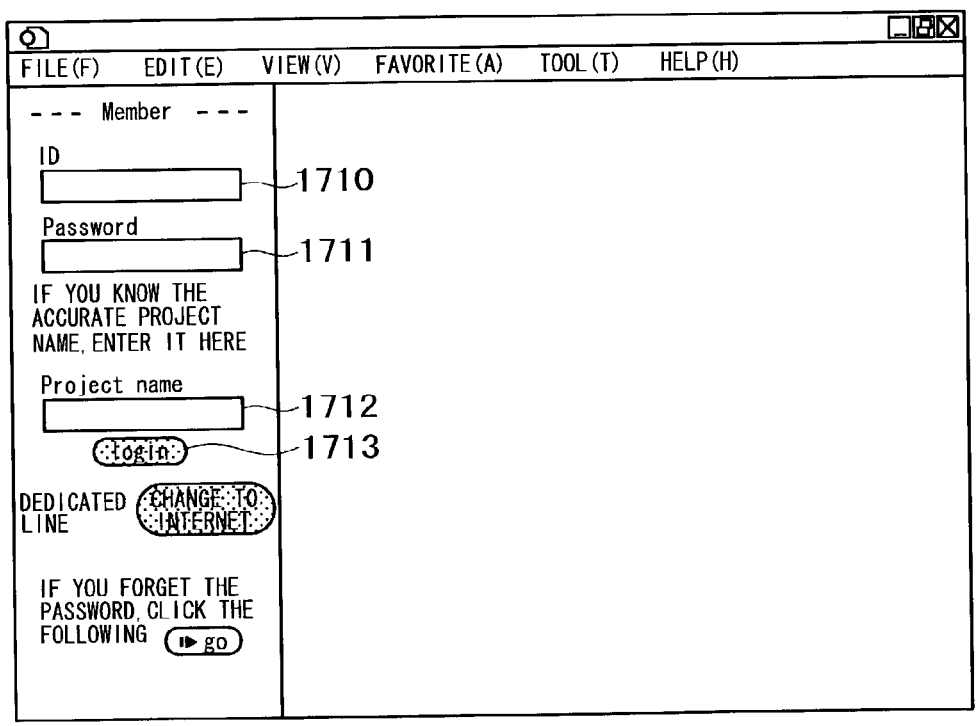
FIG. 8 is an explanatory diagram showing a screen appearing on a display unit of a terminal employed in the cut-list creation system implemented by the embodiment of the present invention.

First of all, a login screen appears on the display unit of the terminal 2352 as a top-page screen for utilizing a storage service. As shown in FIG. 8, the login screen includes an ID box 1710, a PW box 1711, a project-name box 1712 and a login button 1713. The ID box 1710 and the PW box 1711 are display boxes to which the user enters an individual identification number and a password respectively.

To put it in detail, a user pertaining to the terminal 2352 enters information on the identification of the user to the ID box 1710 and the PW box 1711 of the login screen and, as the user selects the login button 1713 by typically clicking a mouse, the center server 2350 authenticates the user. If the authentication of the user is successful, the utilization of the storage service is started.

Figure 9:
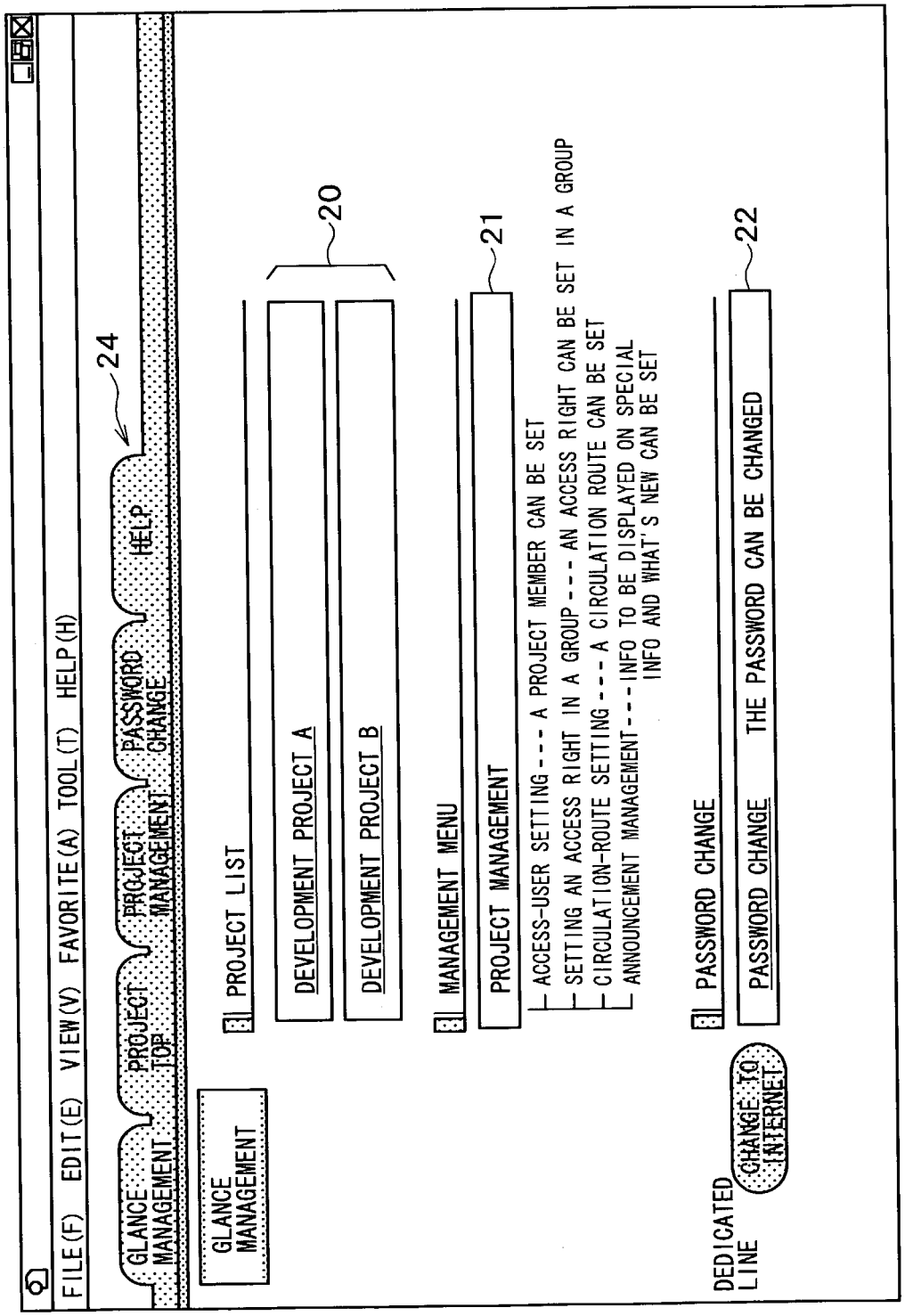
FIG. 9 is an explanatory diagram showing another screen appearing on the display unit of a terminal employed in the cut-list creation system implemented by the embodiment of the present invention.

A screen shown in FIG. 9 is a management-terminal glance-management screen, which is displayed initially by the terminal 2352 after a login in order to play a management role of the terminal 2352. As shown in FIG. 9, the management-terminal glance-management screen includes a project-portion box 20, a project-management box 21, a PW box 22 and a directory group 24. On the project-portion box 20, the names of projects in the group 2354 to which the terminal 2352 pertains are displayed. The project-management box 21 is used by the user for carrying out various kinds of setting. The PW box 22 is used by the user for changing a password.

Figure 10:
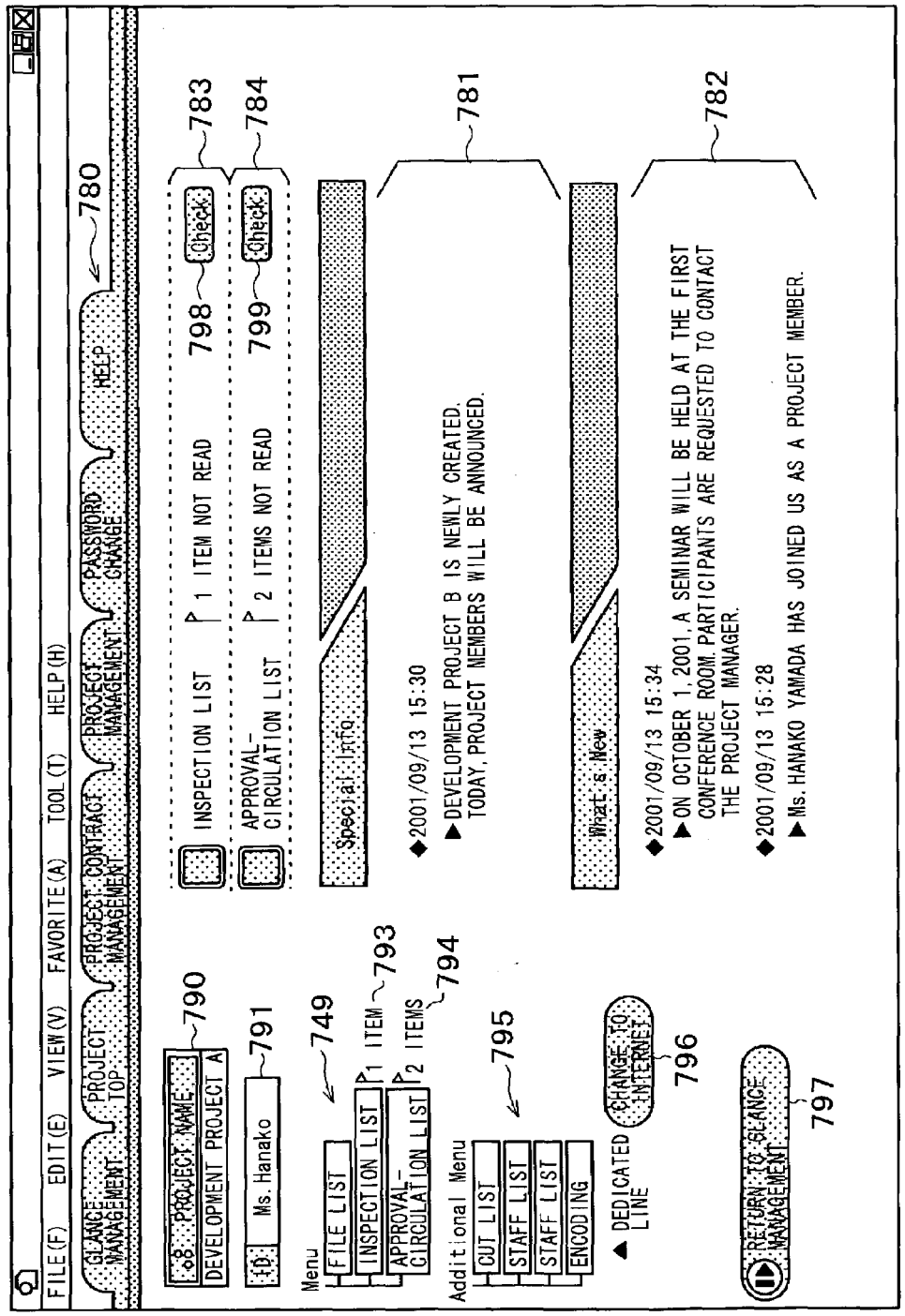
FIG. 10 is an explanatory diagram showing a further screen appearing on the display unit of a terminal employed in the cut-list creation system implemented by the embodiment of the present invention.

Names of projects in the group 2354 to which the terminal 2352 pertains are included in the project-portion box 20 as a project list. By selecting one of the project names displayed in the project-portion box 20, a project-top screen linked to the selected name of the project in the group 2354 is displayed as shown in FIG. 10.

Figure 11:
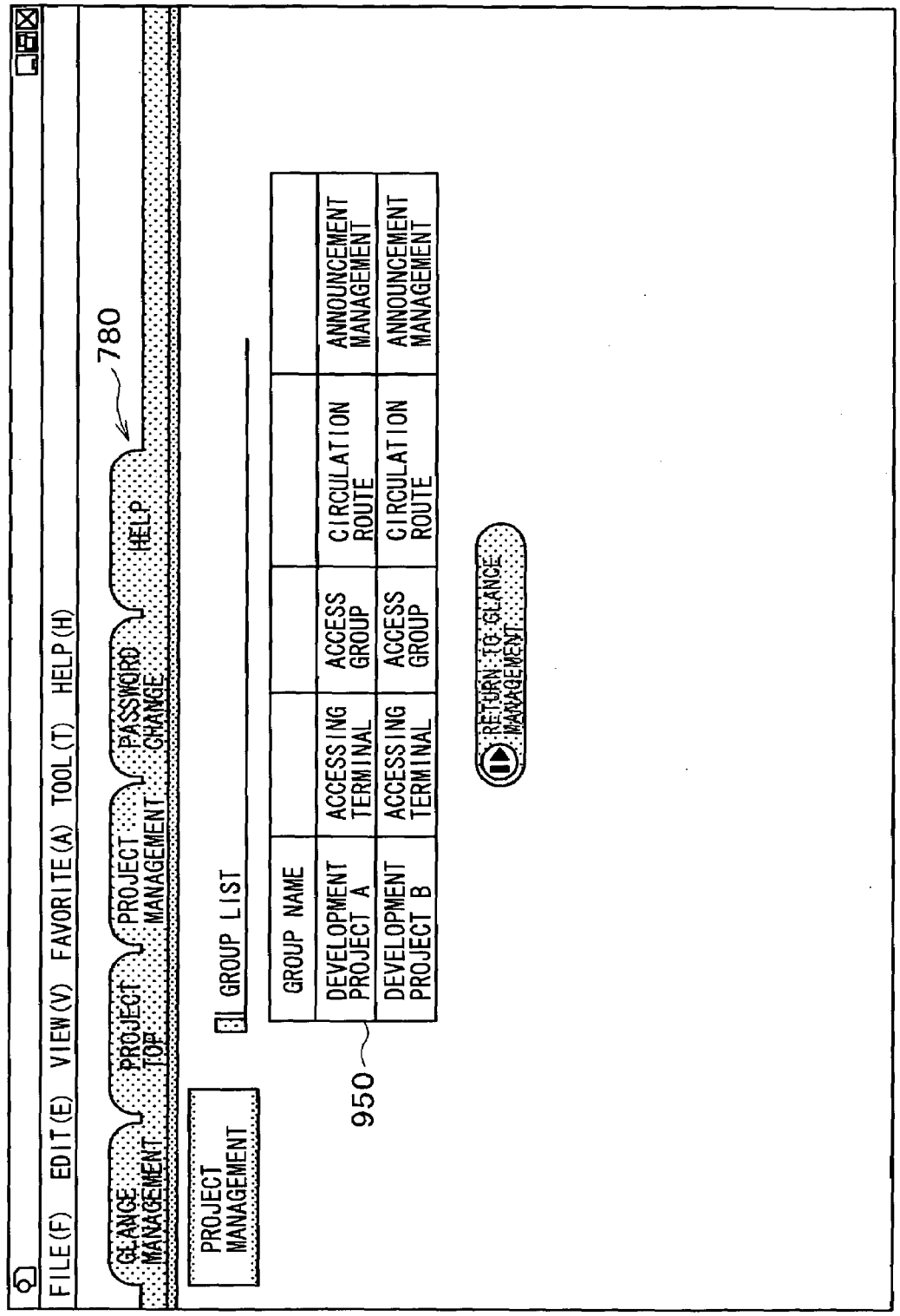
FIG. 11 is an explanatory diagram showing a still further screen appearing on the display unit of a terminal employed in the cut-list creation system implemented by the embodiment of the present invention.

The project-management box 21 displayed under a management-menu phrase can be selected by the user of a management terminal 2352 for managing terminals 2352. If the project-management box 21 is selected, a project-management screen linked to the project-management box 21 is displayed as shown in FIG. 11. The project-management screen is a screen used for setting various kinds of cataloged information relevant to terminals 2352 pertaining to the group 2354.

The PW box 22 is displayed under a password-change phrase. By selecting the PW box 22, a password-change screen linked to the PW box 22 is displayed, allowing a password cataloged in the terminal 2352 to be changed.

By the way, a directory group 24 is displayed on the top of the screen shown in FIG. 9. As shown in the figure, the directory group 24 includes buttons named Glance management, Project top, Project management, Password change and Help. If one of these buttons is selected, a screen linked to the selected button is displayed in the same way as the way any one of the linked screens described above is displayed. If the button named Password change in the directory group 24 is selected, for example, a password-change screen is displayed, allowing a password cataloged in the terminal 2352 to be changed.

Figure 12:
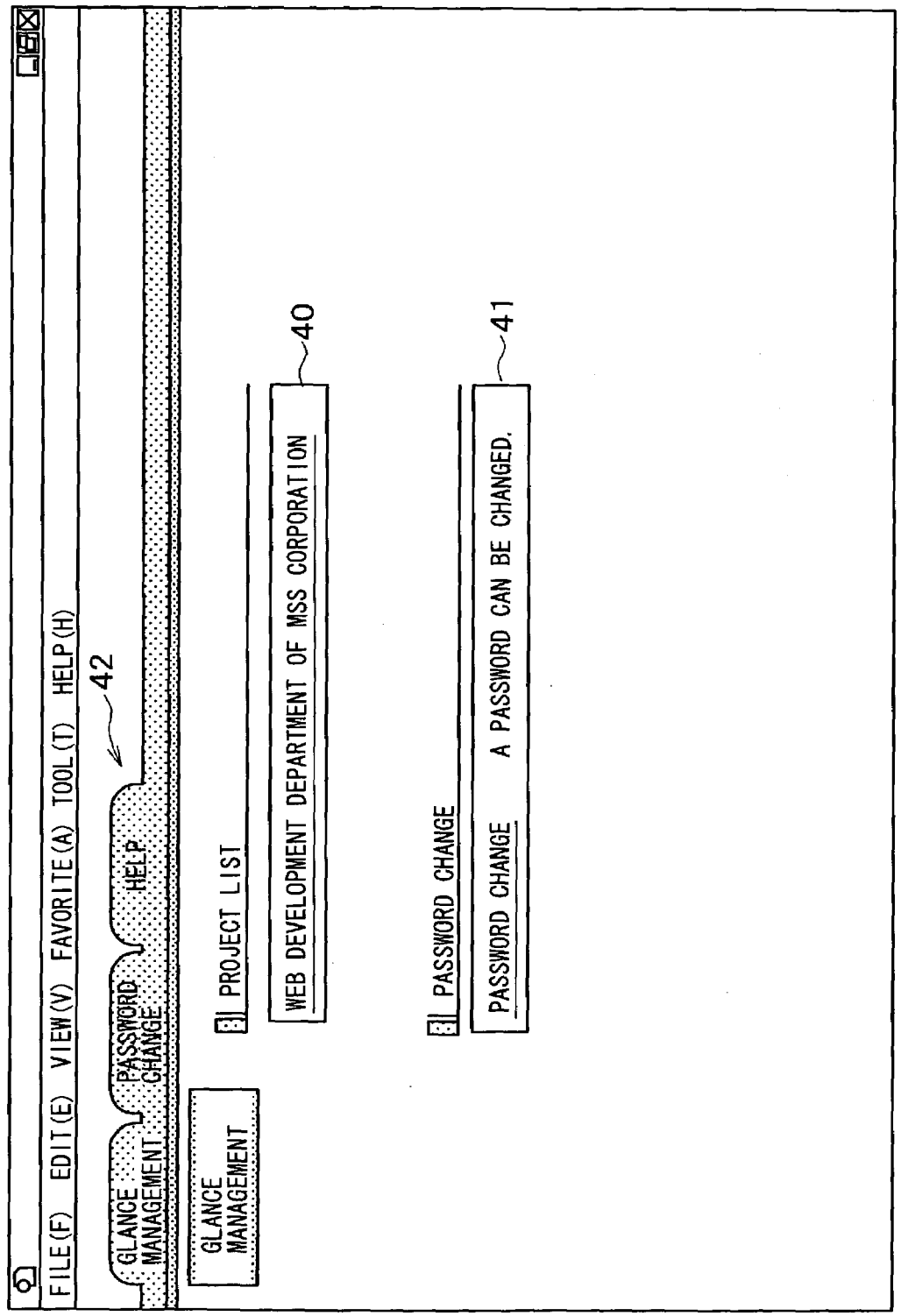
FIG. 12 is an explanatory diagram showing a still further screen appearing on the display unit of a terminal employed in the cut-list creation system implemented by the embodiment of the present invention.

A screen shown in FIG. 12 is a general-terminal glance-management screen of a general the terminal 2352. The general-terminal glance-management screen is a screen initially displayed after a login. As shown in FIG. 12, the general-terminal glance-management screen includes a project box 40, a password-change box 41 and a directory group 42. The project box 40 shows a group 2954 to which the terminal 2352 pertains. The password-change box 41 is used for changing the password stored in the terminal 2352.

A project list shown in FIG. 12 is similar to that shown in FIG. 9. That is to say, by selecting a project in the project box 40, a glance information screen of the group 2354, which is a screen linked to the selected project, is displayed. The password-change box 41 is used for changing a password in a way similar to the PW box 22 shown in FIG. 9.

The directory group 42 is almost the same as the directory group 24 shown in FIG. 9, making it unnecessary to repeat the explanation.

3-2: Screen Configurations of the Storage Service System

The following description explains configurations of screens appearing on, among others, a display unit of a terminal 2352 employed in the storage service system. It is to be noted that, in the case of this embodiment, only screens of a terminal 2352 making accesses to the center server 2350 through the dedicated line 2936 are explained. However, the explanation also applies to screens of a terminal 2352 making accesses to the center server 2350 through lines of the Internet 2933 almost as well.

3-2-1: Project-Top Screen and Its Relevant Screen

First of all, the description explains a project-top screen, which is an initial screen or an entrance screen displayed on the display unit employed in the terminal 2352 utilizing a storage service. As shown in the figure, the project-top screen includes a project name 790, an ID 791, a menu portion 749, an additional-menu portion 795, a line switch 796, a button 797, announcement display portions 781 and 782, an inspection display portion 783, an approval-circulation display portion 784 and a directory group 780. The project name 790 is the name of a group 2354 to which the terminal 2352 pertains. The ID 791 is the ID of a user belonging to the terminal 2352.

The menu portion 749 is a list of menus of a storage service that can be utilized by the terminal 2352. If the user selects an item on the list of menus, the display unit employed in the terminal 2352 displays a screen for utilizing a function of a service corresponding to the selected item. When an item called File list is selected, for example, a screen showing a list of directories and file data is displayed. The directories and the file data can be accessed by the terminal 2352. The additional-menu portion 795 is almost the same as the menu portion 749. When an item named Cut list is selected, for example, a screen for making a cut list is displayed. If an unread inspection exists, a mark 793 is displayed. By the same token, if an unread approval circulation exists, a mark 794 is displayed.

The announcement display portions 781 and 782 are set by the management terminal 2352. When all general terminals 2352 pertaining to the group 2354 display the project-top screen, information such as comments set in the announcement display portions 781 and 782 is displayed.

The inspection display portion 783 and the approval-circulation display unit 784 display information such as the existence of a request for respectively an inspection item and an approval circulation, which are destined for the terminal 2352. When the user wants to check the contents of such an inspection item, the user needs to select a button 798. By the same token, when the user wants to check the contents of such an approval circulation, the user needs to select a button 799. When the user selects the button 798, an inspection-list screen is displayed, allowing the user to verify the contents of the inspection item. When the user selects the button 799, on the other hand, an approval-circulation-list screen is displayed, allowing the user to verify the contents of the approval circulation. It is to be noted that the inspection-list screen and the approval-circulation-list screen will be described later in detail.

3-2-2: File-List Screen and its Relevant Screens

Figure 13:
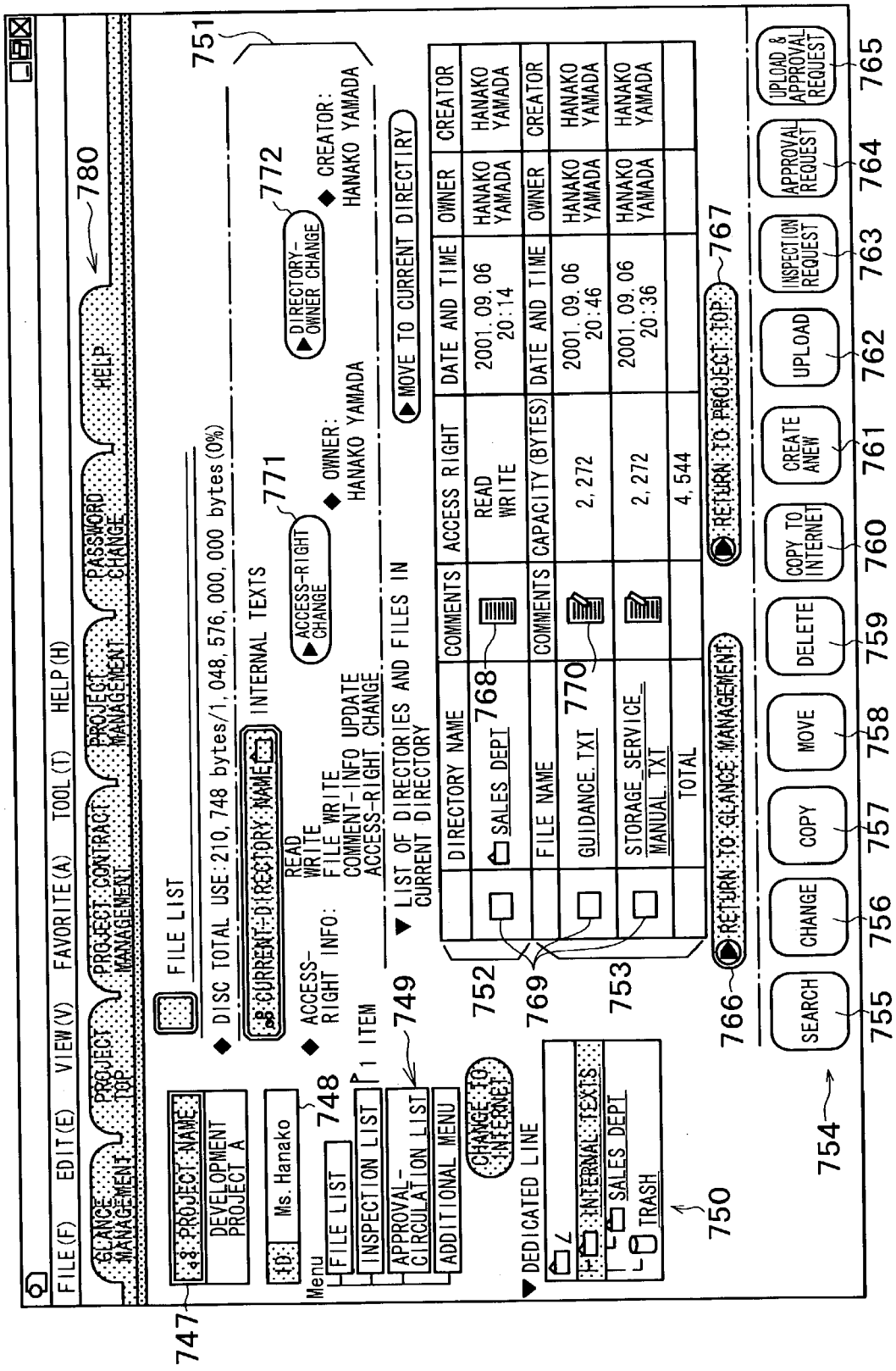
FIG. 13 is an explanatory diagram showing a still further screen appearing on the display unit of a terminal employed in the cut-list creation system implemented by the embodiment of the present invention.

By referring to FIG. 13, the following description explains a file-list screen linked to the project-top screen shown in FIG. 10. As shown in FIG. 13, the file-list screen includes a project name 747, an ID 748, a menu portion 749, a tree display portion 750, a directory-attribute display portion 751, a subdirectory-attribute display portion 752, a file-attribute display portion 753, a button group 754, an access-right button 771, an owner-change button 772 and check boxes 769. The menu portion 749 shows a variety of items. The tree display portion 750 shows a tree structure of directories in an accessible storage area allocated to the terminal 2352. The directory-attribute display portion 751 shows attributes of a specified directory. The subdirectory-attribute display portion 752 shows attributes of a subdirectory subordinate to the specified directory. The file-attribute display portion 753 shows attributes of a file in the specified directory. The button group 754 is a collection of various buttons. The access-right button 771 is operated when it is desired to display an access-right screen. By the same token, the owner-change button 772 is operated when it is desired to display a screen for changing the owner of a directory. The check boxes 769 are each a box to be checked to select a directory or a file data associated with the box.

The tree display portion 750 shows a tree of directories prescribed in a storage area of the storage unit 2946. In this embodiment, the storage area is an undisclosed storage area. The tree display portion 750 does not show information on attributes of each directory, for which the terminal 2352 does not have a read right. A read right is a kind of access right to make a read right to the directory. That is to say, the tree display portion 750 shows only information on attributes of each directory, for which the terminal 2352 have a read right.

When the terminal 2352 makes an access to the undisclosed storage area, the ID of the terminal 2352 is examined to form a judgment as to whether or not the user has an access right to read out data from the undisclosed storage area on the basis of access-right data managed by the access-right-data management DB apparatus 2952.

The tree display portion 750 displays a directory specified by the terminal 2352 in a shaded area. The directory specified by the terminal 2352 is referred to as a current directory. In the screen shown in FIG. 13, the name of the specified directory is Internal texts.

The attributes displayed in the directory-attribute display portion 751 include disc-total-use associated with the specified directory, an access right for the directory, an owner of the directory and a creator of the directory.

The disc-total-use exhibits the size of an area used for a project and the maximum size of a usable area in the disc.

The displayed access right for the disc is a right to make an access to the specified (current) directory. The right to make such an access has been granted to the terminal 2352.

The attributes displayed in the subdirectory-attribute display portion 752 are the attributes of a subdirectory prescribed in the specified directory. The attributes are pieces of information including the name of the subdirectory, a comment, rights of accesses to the subdirectory, a creation date and time of the subdirectory, the owner of the subdirectory and the creator of the subdirectory.

The attributes shown in the file-attribute display portion 753 are pieces of information on file data stored in a specified subdirectory. The attributes include the name of the file, a comment for the file, the size of the file, a creation date and time of the file, the owner of the file and the creator of the file.

A comment reference mark 768 shown on a comment column in the subdirectory-attribute display portion 752 and on a comment column in the file-attribute display portion 753 indicates that the contents of the comment can be referenced. When a comment reference mark 768 is selected by typically clicking a mouse, the contents of the comment are displayed on another screen.

A comment update mark 770 shown on a comment column in the subdirectory-attribute display portion 752 and on a comment column in the file-attribute display portion 753 indicates that the contents of the comment can be referenced and updated. When a comment updated mark 770 is selected by typically clicking a mouse, the contents of the comment are displayed on another screen.

It is to be noted that a comment reference mark 768 and a comment update mark 770 shown on a comment column of other screen have the same functions as the comment reference mark 768 and the comment update mark 770 shown in the subdirectory-attribute display portion 752 and the file-attribute display portion 753.

A comment-change right is used to manage the comment reference mark 768 and the comment update mark 770. The comment-change right is an access right included in the access-right data. A screen relevant to comment data will be described later in detail.

The button group 754 comprises a Search button 755, a Change button 756, a Copy button 757, a Move button 758, a Delete button 759, a Copy-to-Internet button 760, a Create-anew button 761, an Upload button 762, an Inspection-request button 763, an Approval-request button 764 and an Upload & approval-request button 765.

When the user operates the terminal 2352 to select any one of the buttons included in the button group 754, the undisclosed-WWW apparatus 2950 provides a screen relevant to a function associated with the selected button to the terminal 2352.

Assume for example that the user selects the Search button 755 by typically clicking a mouse of the terminal 2352. In this case, the undisclosed-WWW apparatus 2950 provides the terminal 2352 with a function screen showing a directory and a file that match a specified search condition. Function screens associated with the buttons included in the button group 754 will be described later in detail.

3-3: Access-Right Screen

Figure 14:
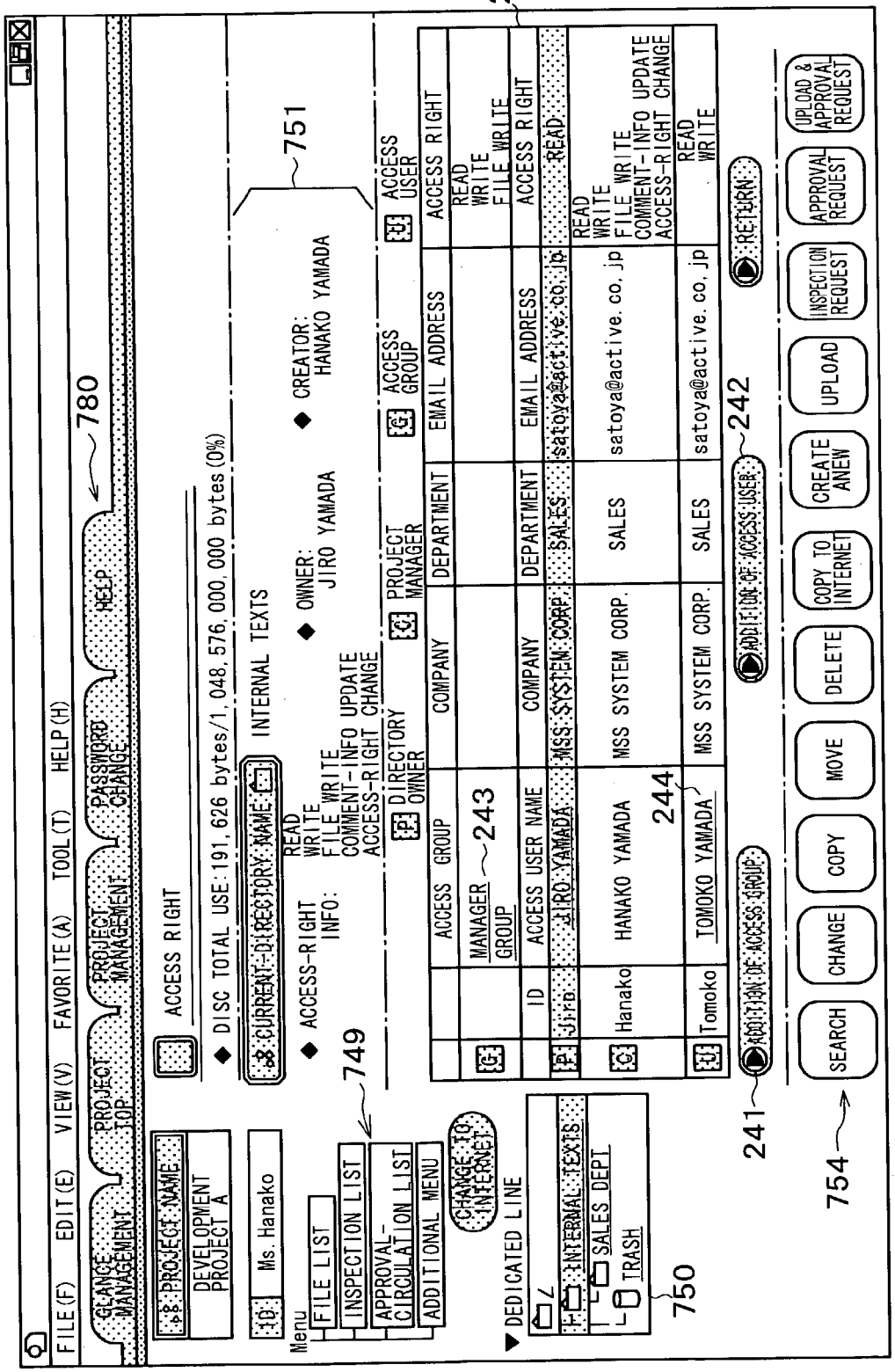
FIG. 14 is an explanatory diagram showing a still further screen appearing on the display unit of a terminal employed in the cut-list creation system implemented by the embodiment of the present invention.

By referring to FIG. 14, the following description explains an access-right screen showing rights of accesses to a directory specified by using the terminal 2352. The access-right screen shown in FIG. 14 is displayed when the access-right change button 771 displayed on the file-list screen shown in FIG. 13 is selected.

The access-right screen shows the terminal 2352 having rights to make accesses to the specified directory and a list of groups 2354 having rights to make accesses to the specified directory. As shown in FIG. 14, the access-right screen includes a tree display portion 750, a menu portion 749, a directory-attribute display portion 751, a directory group 780, a button group 754 and an access-table portion 240. The tree display portion 750 shows a tree of directories prescribed in a storage area allocated to the terminal 2352. The access-table portion 240 shows a table of users each having access rights.

The functions of the tree display portion 750, the menu portion 749, the directory-attribute display portion 751, the directory group 780, and the button group 754 are just indicated by their names. The access-table portion 240 shows a list of terminals 2352 each having access rights and a list of groups 2354 each having access rights.

The list of groups 2354 each having access rights includes a group name, a company, a department, an e-mail address and rights of accesses for every group on every row. The group name is a name for identifying the group 2354. The company is the name of a company to which the group 2354 pertains The list of terminals 2352 each having access rights includes an ID, a user name, a department, an e-mail address and rights of accesses to every the terminal 2352 on every row. The ID is an ID for identifying a user pertaining to the terminal 2352. The company is the name of a company to which the terminal 2352 pertains.

3-3-1: Access Rights 2370

Access rights are explained by referring to FIG. 15. As shown in FIG. 15, the access rights 2370 can be any of five rights of accesses 2371, 2372, 2373, 2374 and 2375.

The access right 2371 is a read right, which is a right to receive (reference) a display of the directory. The access right 2372 is a write right, which is a right to carry out operations including an operation to change the name of the directory, an operation to make a subdirectory subordinate to the directory and an operation to make a new file data as a file subordinate to the directory.

The access right 2373 is a file-write right or a right to write data into a file in the directory. In other words, the file-write right 2373 is a right to carry out operations including an operation to change data stored in a file in the directory.

The access right 2374 is a comment-change right, which is a right to change a comment for a file in the directory. The access right 2375 is an access-change right, which is a right to change rights of accesses to the directory.

3-3-2: Screen for Addition of Access Group 2354

Figure 16:
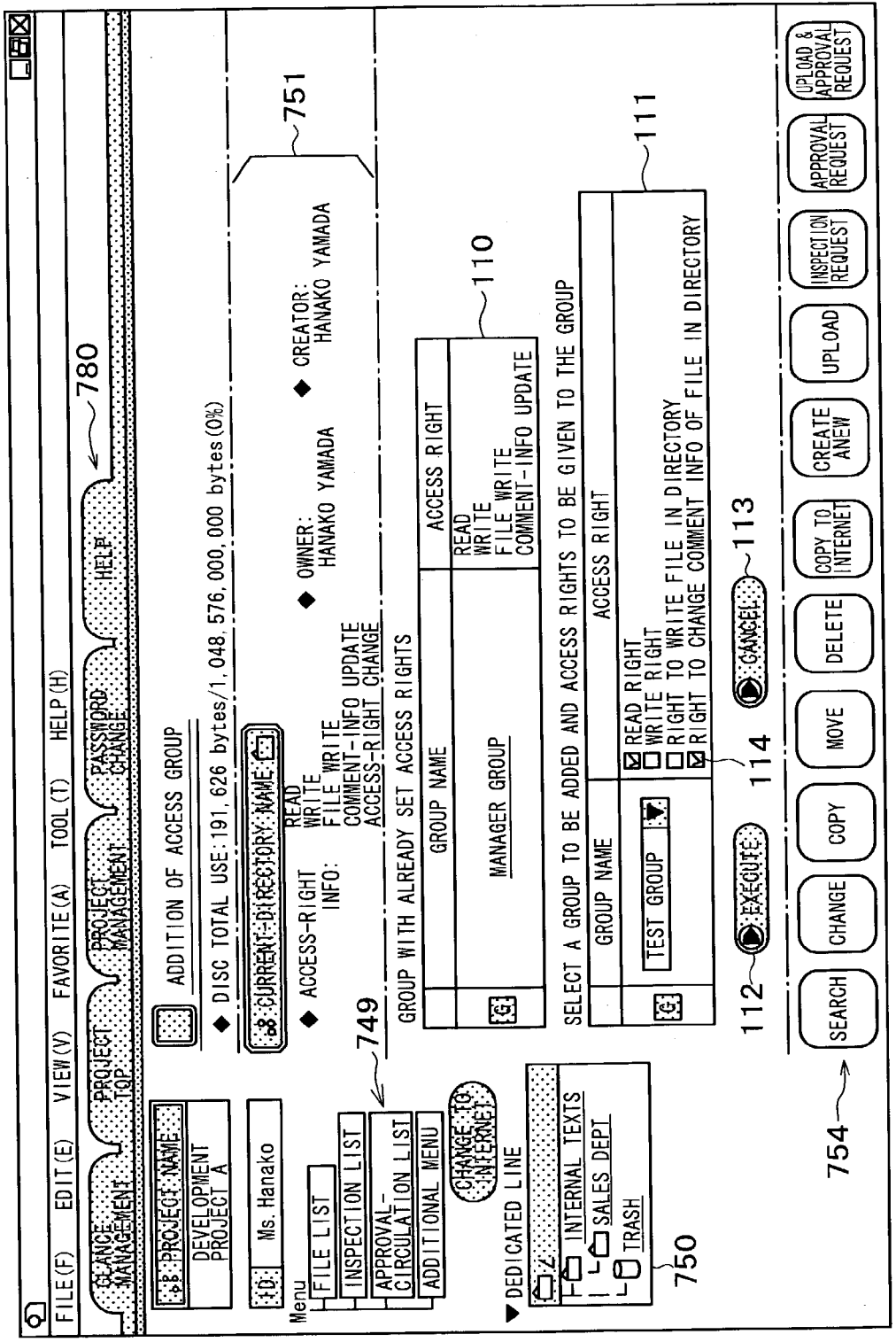
FIG. 16 is an explanatory diagram showing a still further screen appearing on the display unit of a terminal employed in the cut-list creation system implemented by the embodiment of the present invention.

By referring to FIG. 16, the following description explains a screen for addition of an access group 2354. The screen for addition of an access group 2354 is displayed when the user selects the button 241 shown in FIG. 14 by typically clicking the mouse. The screen for addition of an access group 2354 includes a tree display portion 750, a menu portion 749, a directory-attribute display portion 751, a directory group 780, a button group 754, an already-set-right-group portion 110 and an add-group-and-rights portion 111.

The already-set-right-group portion 110 shows a list of groups 2354 each having already set rights of accesses to the specified directory or the current directory displayed in the tree display portion 750. As shown in the already-set-right-group portion 110 of FIG. 16, the group 2354 with access rights already set therein is named Manager group. The access rights already set in the group 2354 are obviously a read right, a write right, a right to write data onto a file of the directory and a right to change a comment, which are listed on an access-right column.

The add-group-and-rights portion 111 shows a group 2354 to be added and access rights to be selected and assigned to the selected group 2354 for accessing the specified directory. To be more specific, a group 2354 is selected from a group-name column, and access rights to be set are selected from an access-right column and assigned to the selected group 2354. An access right can be selected by marking a check box 114 associated with the access right. In the access-right column of the add-group-and-rights portion 111 shown in FIG. 16, the read right and the right to change a comment are selected as indicated by their marked check boxes.

As described above, in this embodiment, an access right to be assigned to a selected group 2354 is selected by marking the check box 114 of the access right in the access-right column. It is to be noted, however, that the scope of the present invention is not limited to this embodiment. That is to say, an access right to be assigned to a selected group 2354 can be selected in any way.

After a group 2354 and access rights are selected by using the add-group-and-rights portion 111, the user selects a button 112 by typically clicking the mouse in order to set the selected rights of accesses to the selected directory in the selected group 2354. If the user selects a button 113, instead, the selected access rights are not set in the group 2354, but merely deleted.

3-3-3: Screen for Adding Access Rights to a terminal 2352

Figure 17:
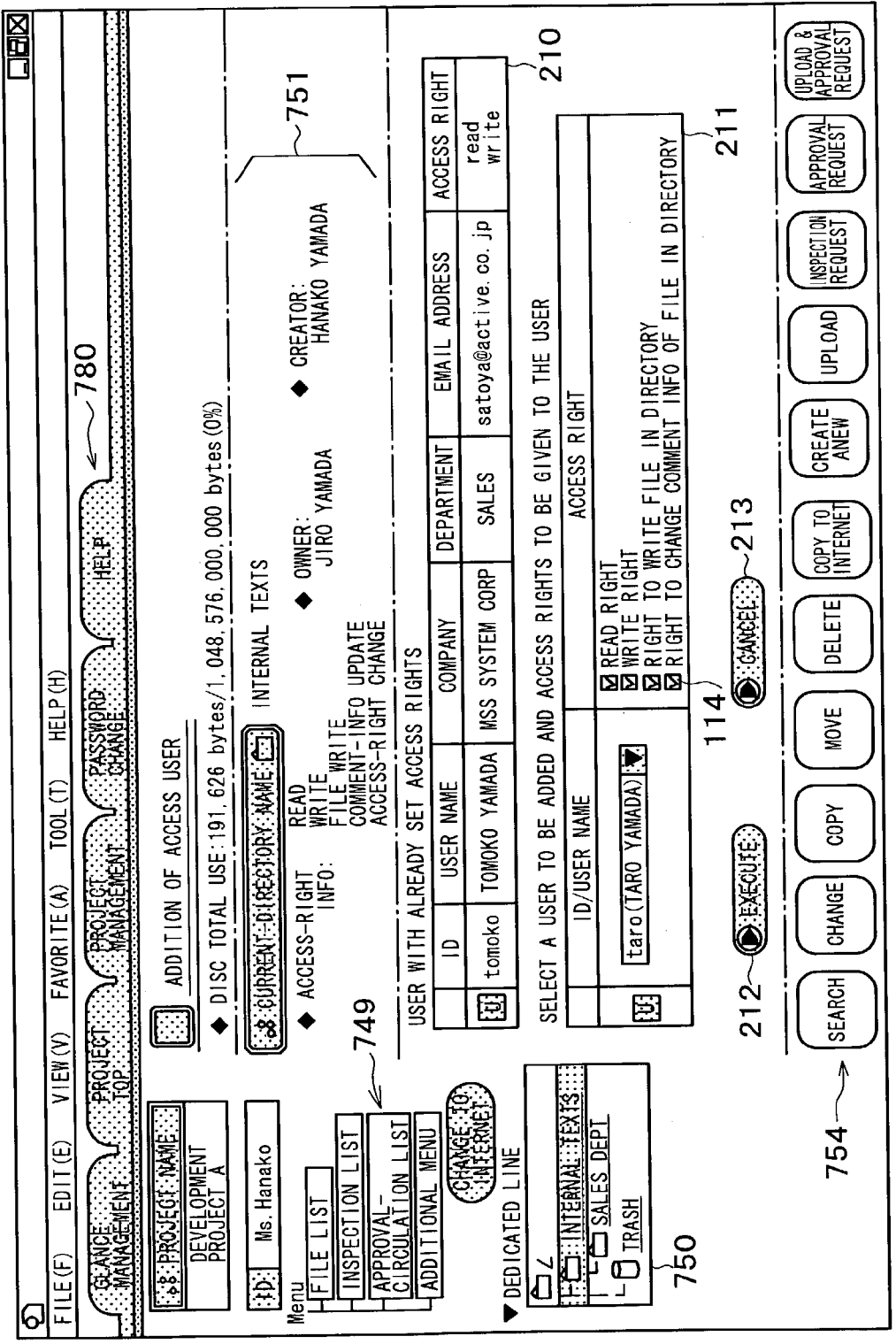
FIG. 17 is an explanatory diagram showing a still further screen appearing on the display unit of a terminal employed in the cut-list creation system implemented by the embodiment of the present invention.

By referring to FIG. 17, the following description explains a screen for adding access rights in a terminal 2352. The screen for adding access rights to a terminal 2352 is displayed when the user selects the button 242 shown in FIG. 14 by typically clicking the mouse. The screen for adding access rights to a terminal 2352 includes a tree display portion 750, a menu portion 749, a directory-attribute display portion 751, a directory group 780, a button group 754, an already-set-right-terminal portion 210 and an add-terminal-and-rights portion 211.

The already-set-right-terminal portion 210 shows a list of terminals 2352 each having already set rights of accesses to the specified directory or the current directory displayed in the tree display portion 750. As shown in the already-set-right-terminal portion 210 of FIG. 17, the terminal 2352 with access rights already set therein has an ID of "tomoko" and a user name of "Tomoko Yamada." The access rights already set in the terminal 2352 are obviously a read right and a write right, which are listed on an access-right column.

The add-terminal-and-rights portion 211 shows a terminal 2352 to be added and access rights to be selected and assigned to the selected terminal 2352 for accessing the specified directory. To be more specific, a user name associated with a terminal 2352 is selected from an ID/user-name column, and access rights are selected from an access-right column and assigned to the terminal 2352. An access right can be selected by marking a check box 114 associated with the access right. In the access-right column of the add-terminal-and-rights portion 211 shown in FIG. 17, the read right, the write right, the right to write data into a file in the directory and the right to change a comment are selected as indicated by their marked check boxes 114.

As described above, in this embodiment, an access right to be assigned to a selected terminal 2352 is selected by marking the check box 114 of the access right in the access-right column. It is to be noted, however, that the scope of the present invention is not limited to this embodiment. That is to say, an access right to be assigned to a selected terminal 2352 can be selected in any way.

After a terminal 2352 and access rights are selected by using the add-terminal-and-rights portion 211, the user selects a button 212 by typically clicking the mouse in order to set the selected rights of accesses to the selected directory in the selected terminal 2352. If the user selects a button 213, instead, the selected access rights are not set in the terminal 2352, but merely deleted.

3-3-4: Access-Right-Change Screen

Figure 18:
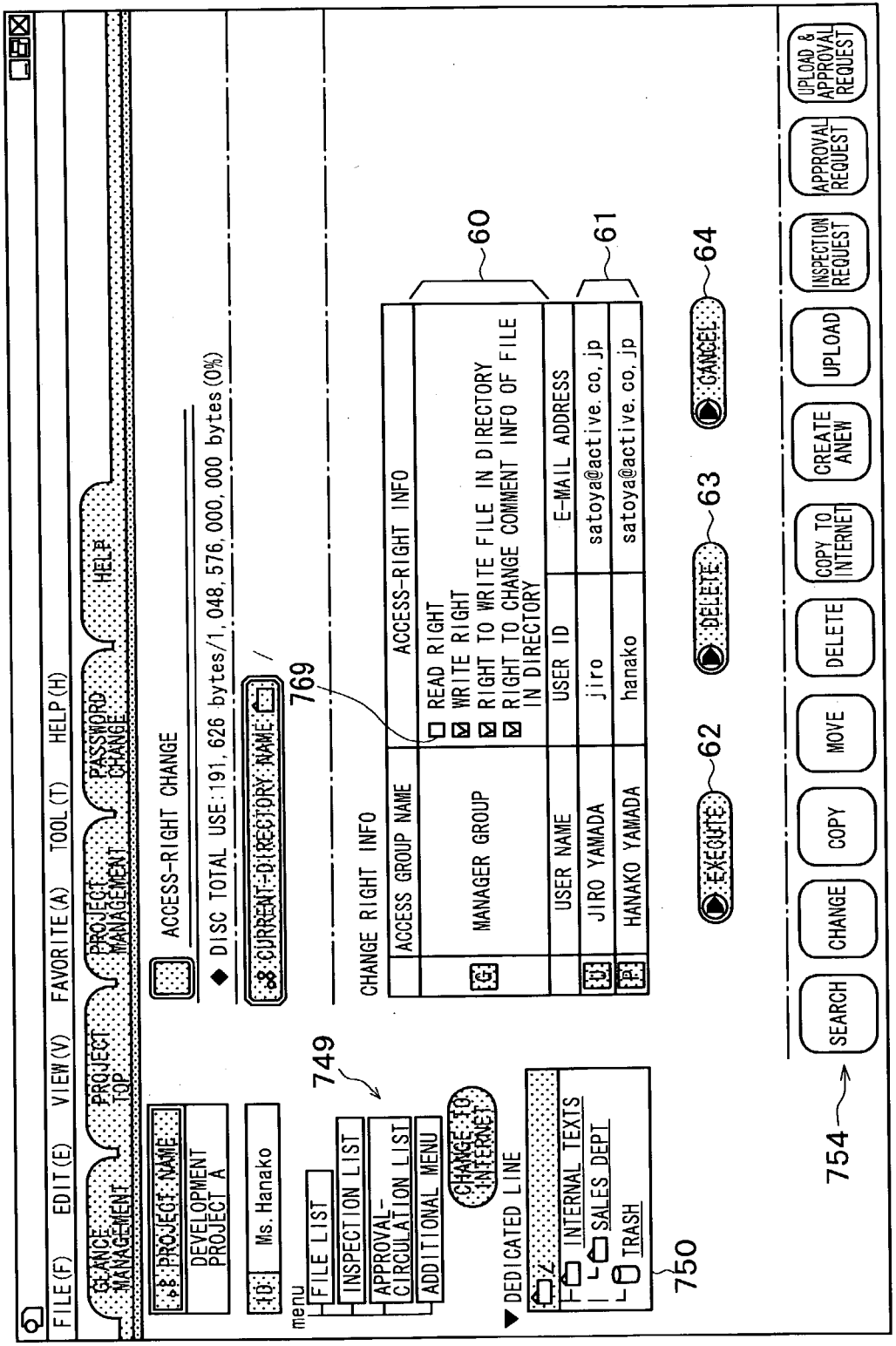
FIG. 18 is an explanatory diagram showing a still further screen appearing on the display unit of a terminal employed in the cut-list creation system implemented by the embodiment of the present invention.

If a group name 243 on the access-group-name column of the access table 240 or a user name 244 on the access-user name column of the access table 240 shown in FIG. 14 for the specified directory is selected, an access-right-change screen shown in FIG. 18 is displayed. The access-right-change screen is a screen for changing access rights granted to a selected group 2354 indicated by the selected group name 243 or access rights granted to a terminal 2352 associated with a user indicated by the selected user name 244.

As shown in FIG. 18, the access-right-change screen includes a tree display portion 750, a menu portion 749, a button group 754, a group-right-changing portion 60, a terminal-right-changing portion 61, an Execute button 62, a Delete button 63 and a Cancel button 64. The group-right-changing portion 60 is a portion for specifying changes in access rights of a selected group 2354. The terminal-right-changing portion 61 is a portion for specifying changes in access rights of a selected terminal 2352. The Execute button 62 is selected to carry out a process to change the specified access rights. The Delete button 63 is selected to delete specified changes in access rights set in the group-right-changing portion 60 and terminal-right-changing portion 61. The Cancel button 64 is selected to cancel the process to change access rights.

The group-right-changing portion 60 includes an access-group-name column showing the name of a group 2354, access rights of which are to be changed as specified on an access-right-information column. On the other hand, the terminal-right-changing portion 61 includes a username column showing user names each associated with a terminal 2352, access rights of which are to be changed as specified on the above access-right-information column.

Access rights granted to a group 2354 are changed by marking check boxes 769 associated with access rights on the access-right-information column of the group-right-changing portion 60. A check box 769 can be marked typically by clicking the mouse. An access right with the check box 769 thereof marked is newly granted to the group 2354. On the other hand, an access right with the check box 769 thereof unmarked is not granted to the group 2354. In the example shown in FIG. 18, the read right with the check box 769 thereof unmarked is not granted to the group 2354.

The screen shown in FIG. 18 is displayed because the group name 243 appearing on the screen shown in FIG. 14 is selected. If the user name 244 appearing on the screen shown in FIG. 14 is selected, on the other hand, information on access rights will be displayed in the terminal-right-changing portion 61.

3-4-5: Directory-owner-change Screen

Figure 19:
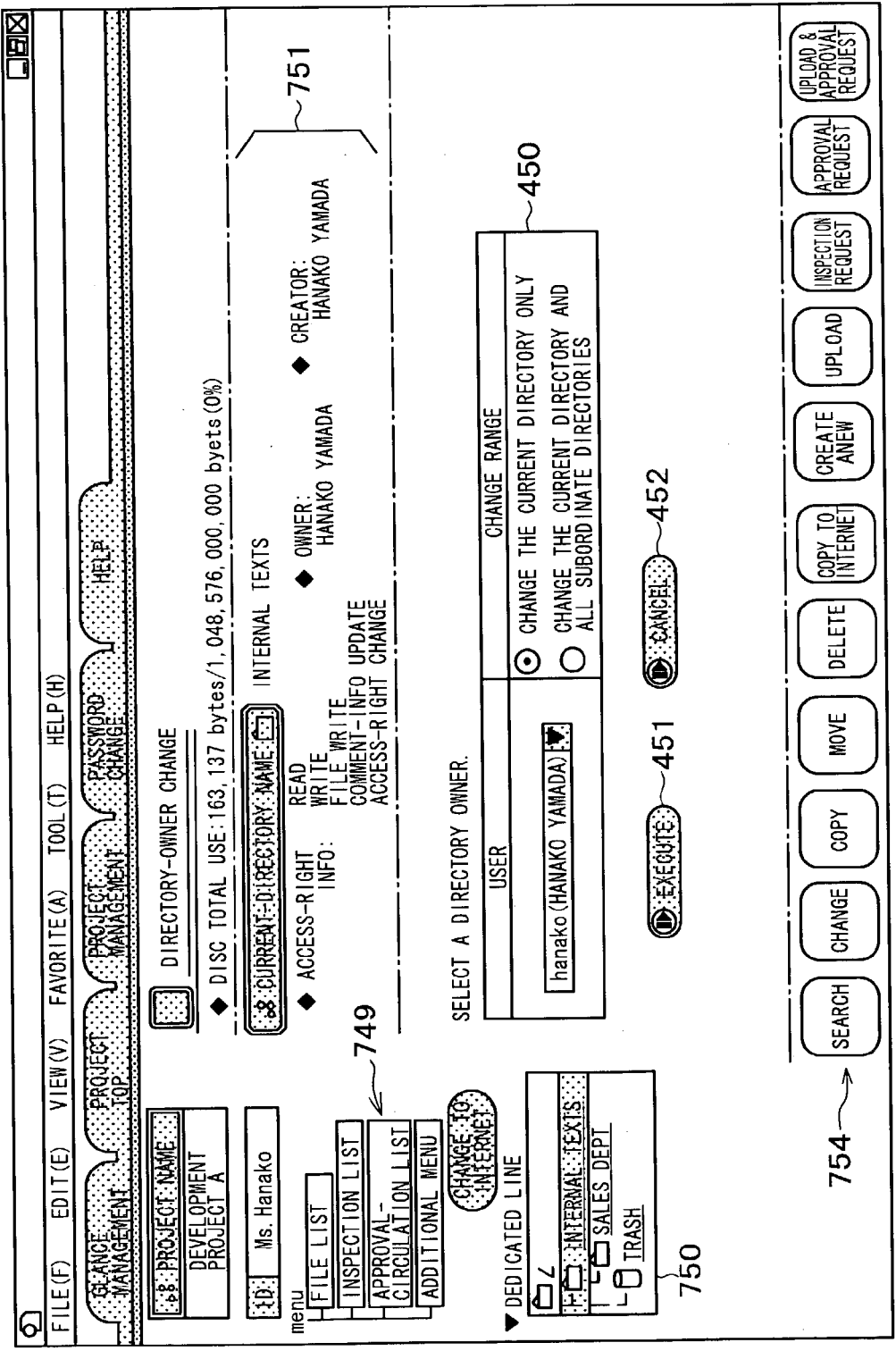
FIG. 19 is an explanatory diagram showing a still further screen appearing on the display unit of a terminal employed in the cut-list creation system implemented by the embodiment of the present invention.

When a directory-owner-change button 772 appearing on the screen shown in FIG. 13 is selected, a directory-owner-change screen shown in FIG. 19 is displayed. The directory-owner-change screen is a screen used for changing the owner of a specified directory or the current directory.

As shown in FIG. 19, the directory-owner-change screen includes a tree display portion 750, a menu portion 749, a directory-attribute display portion 751, a button group 754, an owner-setting portion 450, an Execute button 451 and a Cancel button 452. The owner-setting portion 450 is used for specifying directories subjected to a change. The Execute button 451 is selected to carry out a process to change the owner of each specified directory. On the other hand, the Cancel button 452 is selected to cancel a process to change the owners of each specified directory.

3-4-6: Function Screens Displayed from File-List Screen

The following description explains function screens, which each appear on the display unit employed in the terminal 2352 when a function button in the button group 754 of the file-list screen shown in FIG. 13 is selected by typically clicking the mouse.

3-4-7: Search Screen

Figure 20:
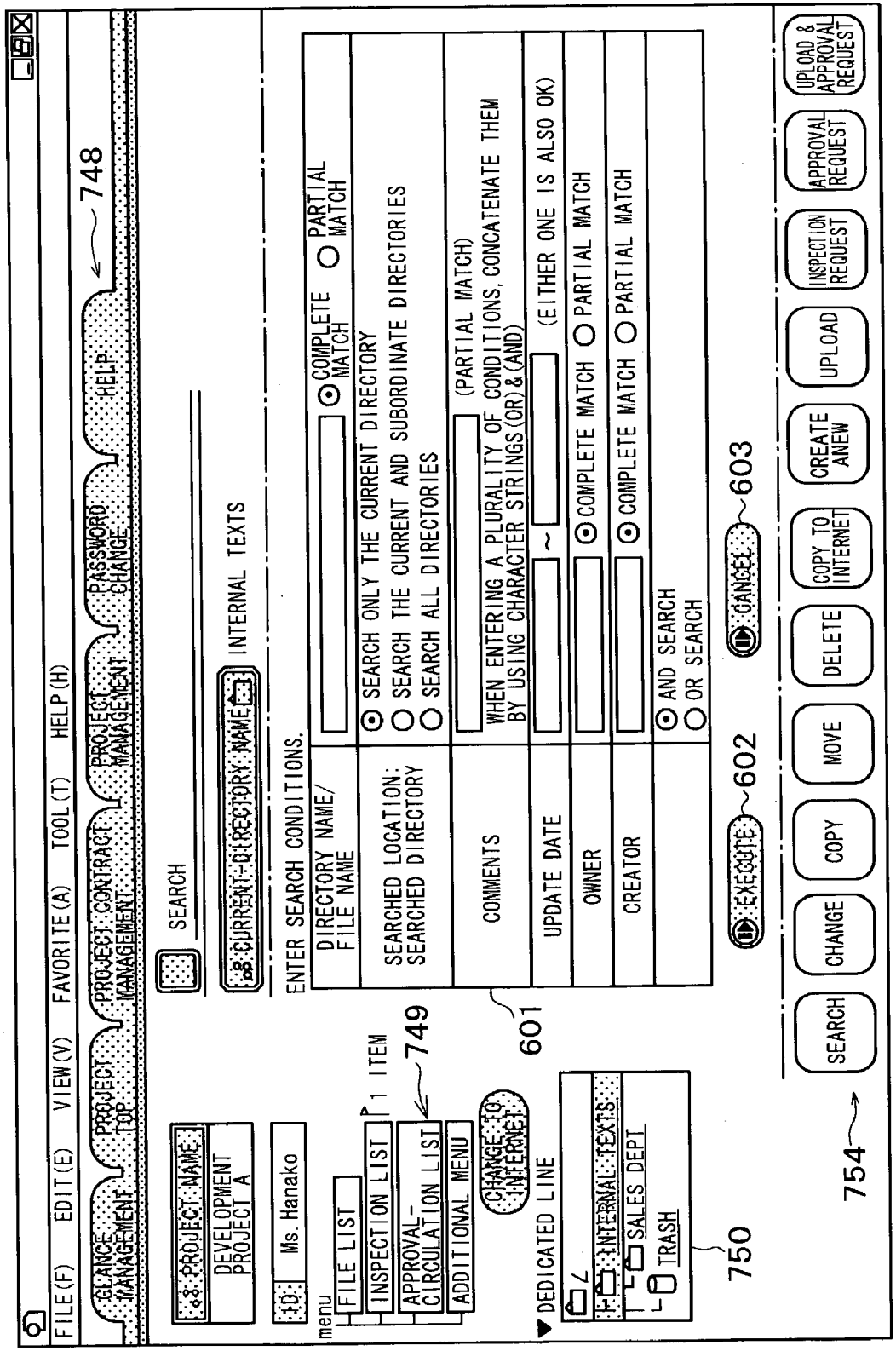
FIG. 20 is an explanatory diagram showing a still further screen appearing on the display unit of a terminal employed in the cut-list creation system implemented by the embodiment of the present invention.

When the Search button 755 appearing on the file-list screen shown in FIG. 13 is selected by typically clicking the mouse, a search screen shown in FIG. 20 is displayed. The search screen is a screen used for setting a search condition as a condition to be specified by the terminal 2352. By setting a search condition on the search screen, it is possible to utilize a function to search the storage unit 2946 for a desired directory or a desired file data.

As shown in FIG. 20, the search screen comprises a tree display portion 750, a menu portion 749, a button group 754, a search-condition portion 601, an Execute button 602 and a Cancel button 603. The search-condition portion 601 is used for specifying a condition for searching the center server 2350 for a desired directory or a desired file data. The Execute button 602 is selected to carry out a process to search the storage unit 2946 for a desired directory or a desired file data. On the other hand, the Cancel button 603 is selected to cancel a process to search the storage unit 2946 for a desired directory or a desired file data.

3-4-8: Change Screen

Figure 21:
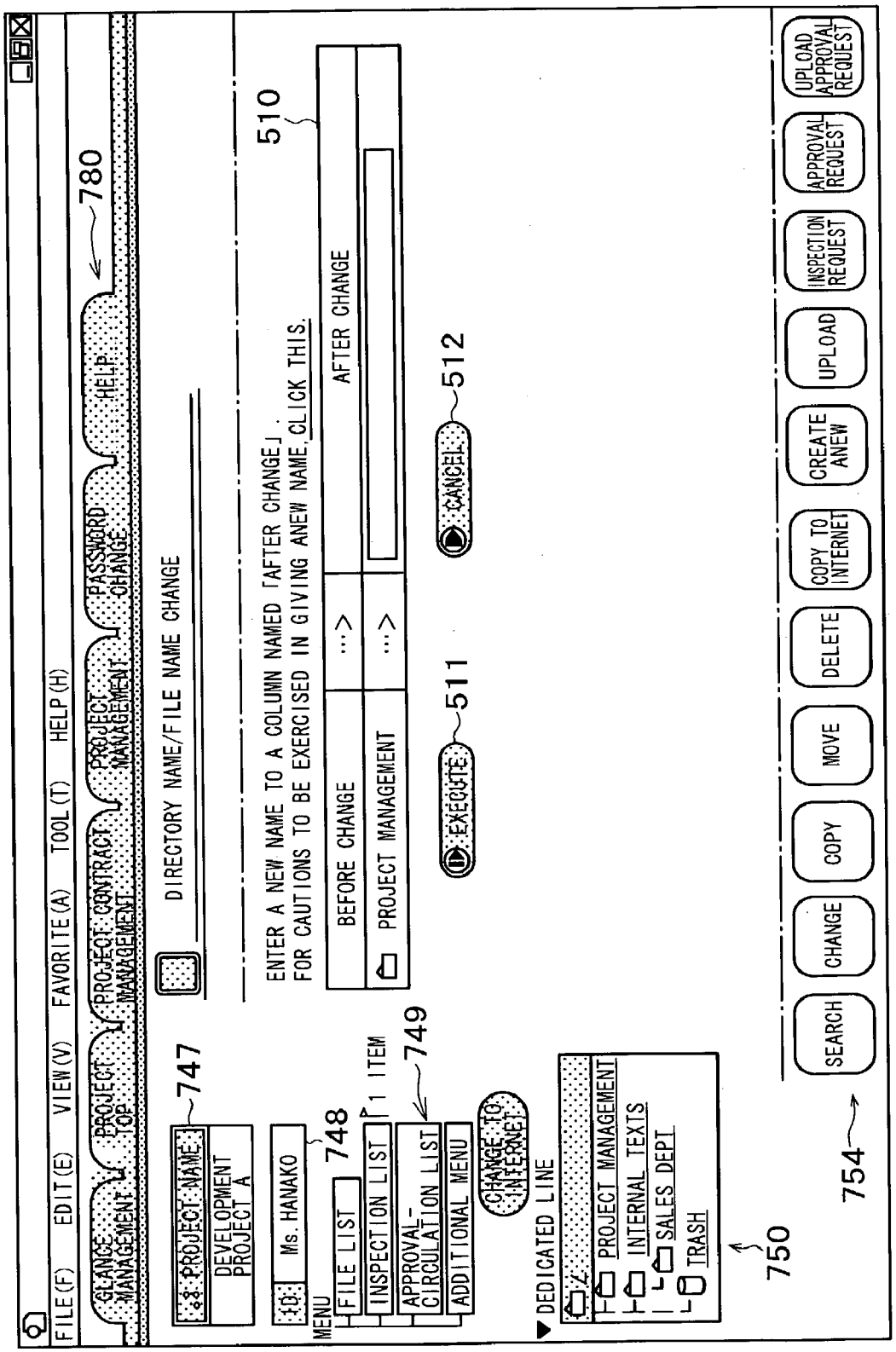
FIG. 21 is an explanatory diagram showing a still further screen appearing on the display unit of a terminal employed in the cut-list creation system implemented by the embodiment of the present invention.

When the user operates the terminal 2352 in order to select the Change button 756 appearing on the screen shown in FIG. 13 by typically clicking the mouse after marking a check box 769 also appearing on the same screen to select a directory or a file data, the name of which is to be changed, a change screen shown in FIG. 21 is displayed. The change screen is a screen used for changing the name of a selected directory or a selected file data. A function for changing the name of a selected directory or a selected file data is carried out by specifying a new name to be used after the change in the change screen.

As shown in FIG. 21, the search screen comprises a tree display portion 750, a menu portion 749, a button group 754, a name-changing portion 510, an Execute button 511 and a Cancel button 512. The name-changing portion 510 is used for setting a new name for a selected directory or a selected file data. The Execute button 511 is selected to carry out a process to change the name of a selected directory or a selected file data. On the other hand, the Cancel button 512 is selected to cancel a process to change the name of a selected directory or a selected file data.

The name-changing portion 510 shows a current name of a selected directory or a selected file data and a field for entering a new name for the selected directory or the selected file data. In the example shown in FIG. 21, the current name of a selected directory is Project Management.

3-4-9: Copy Screen

Figure 22:
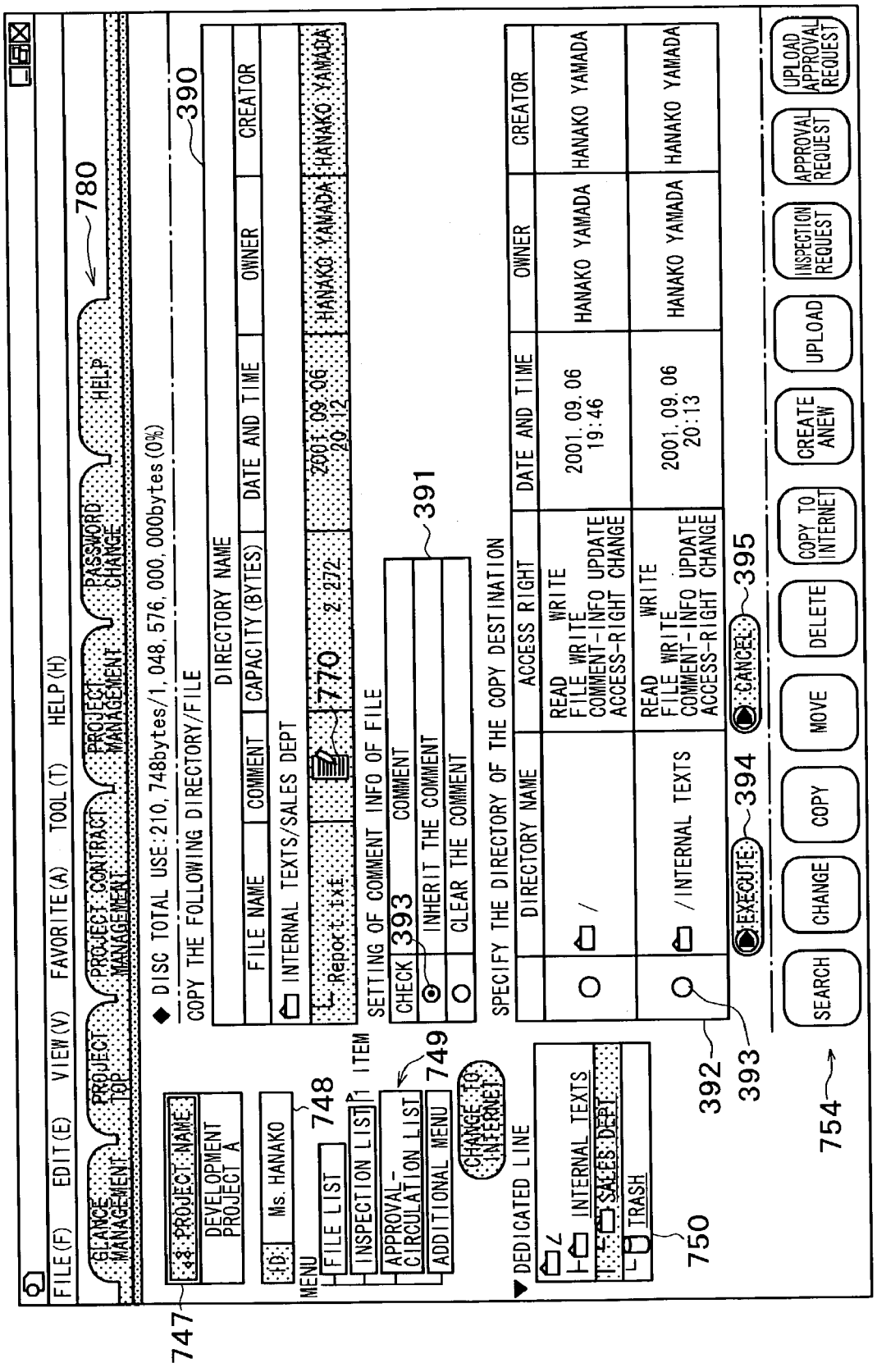
FIG. 22 is an explanatory diagram showing a still further screen appearing on the display unit of a terminal employed in the cut-list creation system implemented by the embodiment of the present invention.

When the user operates the terminal 2352 in order to select the Copy button 757 appearing on the screen shown in FIG. 13 by typically clicking the mouse after marking a check box 769 also appearing on the same screen to select a directory or a file data, which the user wants to copy, a copy screen shown in FIG. 22 is displayed. The copy screen is a screen used for copying a selected directory or a selected file data to a copy destination. A function for copying a selected directory or a selected file data is carried out by specifying a copy destination of the selected directory or the selected file data.

As shown in FIG. 22, the copy screen comprises a tree display portion 750, a menu portion 749, a button group 754, a copy-source display portion 390, a comment-setting portion 391, a copy-destination display portion 392, an Execute button 394 and a Cancel button 395. The copy-source display portion 390 is used for displaying a selected directory or a selected file data serving as a copy source. The comment-setting portion 391 is used for specifying what is to be done to a comment affiliated to the copy source. The copy-destination display portion 392 is used for specifying a copy destination of a selected directory or a selected file data. The Execute button 394 is selected to carry out a process to copy a selected directory or a selected file data to a copy destination. On the other hand, the Cancel button 395 is selected to cancel a process to copy a selected directory or a selected file data to a copy destination.

A comment column of the comment-setting portion 391 displays phrases "Inherit the comment" and "Clear the comment" as options, one of which is to be selected by marking a check item 393 associated with the desired option on a check column of the comment-setting portion 391. If the option "Inherit the comment" is selected, a comment affiliated with a selected directory or a selected file data is also copied along with the selected directory or the selected file data. If the option "Clear the comment" is selected, on the other hand, a comment affiliated with a selected directory or a selected file data is not copied along with the selected directory or the selected file data. In the example shown in FIG. 22, the option "Inherit the comment" is selected as indicated by a marked check item associated with the option.

As described above, one of the options shown on a check column of the comment-setting portion 391 is selected in every copy process. It is to be noted, however, that the scope of the present invention is not limited to this embodiment. For example, a desired option regarding a comment can also be included in advance in the access-right data of the terminal 2352.

The copy-source display portion 392 displays a table of directories that can each be selected as a copy destination by marking a check item 393 on a check column of the copy-source display portion 392. A selected directory or a selected file data is then copied to the copy destination.

3-4-10: Move Screen

When the user operates the terminal 2352 in order to select the Move button 758 appearing on the screen shown in FIG. 13 by typically clicking the mouse after marking a check box 769 also appearing on the same screen to select a directory or a file data, which the user wants to move, a move screen shown in none of the figures of this specification is displayed. The move screen is a screen used for moving a selected directory or a selected file data to a move destination. A function for moving a selected directory or a selected file data is carried out by specifying a move destination of the selected directory or the selected file data.

It is to be noted that a copy process is different from a move process in that, while a process to copy a directory or a file data from a copy source to a copy destination does not delete the directory or the file data from the copy source and, hence, leaves the directory or the file data in the copy source as it is, a process to move a directory or a file data from a move source to a move destination deletes the directory or the file data from the move source and, hence, does not leave the directory or the file data in the move source so that the directory or the file data exists only in the move destination. Since the move screen is all but the same as the copy screen, no explanation of the move screen is given.

3-4-11: Delete Screen

Figure 23:
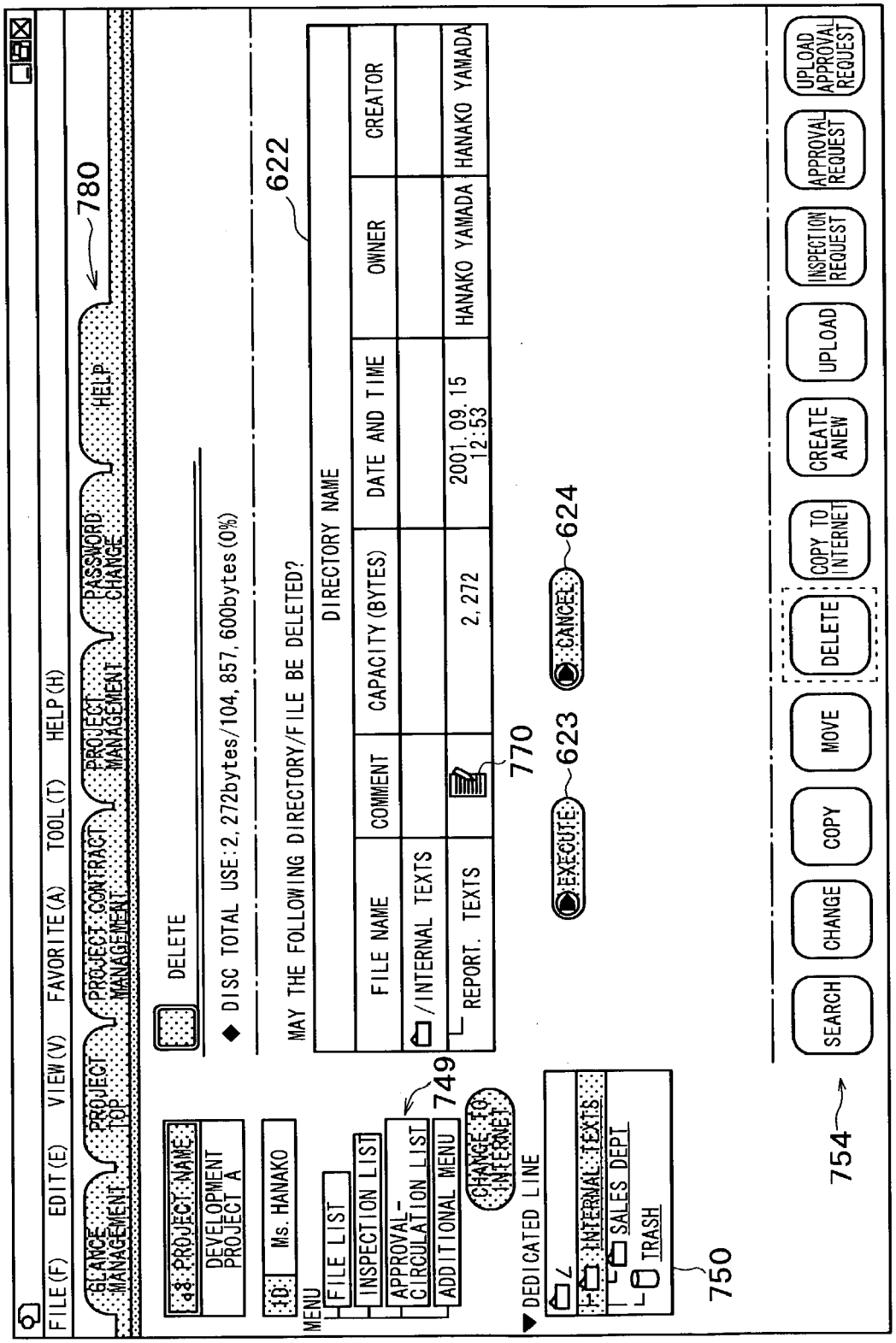
FIG. 23 is an explanatory diagram showing a still further screen appearing on the display unit of a terminal employed in the cut-list creation system implemented by the embodiment of the present invention.

When the user operates the terminal 2352 in order to select the Delete button 759 appearing on the screen shown in FIG. 13 by typically clicking the mouse after marking a check box 769 also appearing on the same screen to select a directory or a file data, which the user wants to delete, a delete screen shown in FIG. 23 is displayed. The delete screen is a screen used for deleting a selected directory or a selected file data. A function for deleting the name of a selected directory or the name of a selected file data is carried out when a process for deleting the selected directory or the selected file data is performed. The selected directory or the selected file data is displayed on the delete screen.

As shown in FIG. 23, the delete screen comprises a tree display portion 750, a menu portion 749, a button group 754, a delete portion 622, an Execute button 623 and a Cancel button 624. The delete portion 622 shows a directory or a file data to be deleted. The Execute button 623 is selected to carry out a process to delete a selected directory or a selected file data. On the other hand, the Cancel button 624 is selected to cancel a process to delete a selected directory or a selected file data.

To put in detail, the delete portion 622 shows the name of a directory or the name of a file data to be deleted, a comment affiliated with the directory or the file data, the storage capacity of the directory or the file data, a date and a time, the owner of the directory or the owner of the file data and the creator of the directory or the creator of the file data.

When a delete process is carried out on a directory or a file data, the directory or the file data and a comment affiliated with the directory or the file data are also erased as well.

3-4-12: Copy-to-the-Internet Screen

Figure 24:
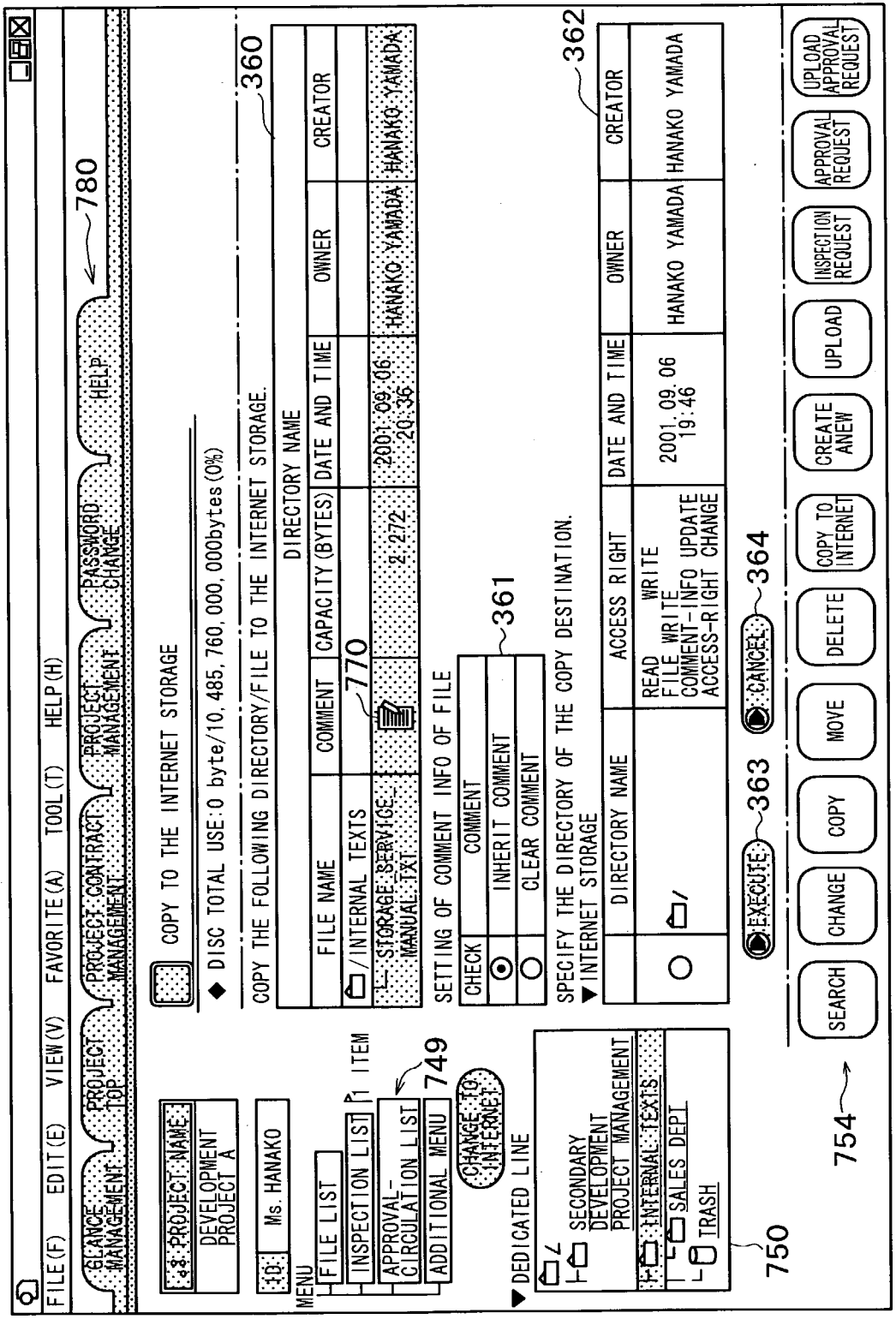
FIG. 24 is an explanatory diagram showing a still further screen appearing on the display unit of a terminal employed in the cut-list creation system implemented by the embodi

When the user operates the terminal 2352 in order to select the 'Copy to Internet' button 760 appearing on the screen shown in FIG. 13 by typically clicking the mouse after marking a check box 769 also appearing on the same screen to select a directory or a file data, which the user wants to copy to the Internet, a screen used for copying the directory or the file data to the Internet is displayed as shown in FIG. 24. This screen is a screen used for copying a selected directory or a selected file data to the Internet. A function for copying a selected directory or a selected file data to the Internet is carried out when a directory to serve as a copy destination is specified in the screen used for copying a directory or a file data to the Internet.

In an operation to copy a selected directory or a selected file data to the Internet 2933, the terminal 2352 makes an access to an undisclosed storage area of the storage unit 2946 through the dedicated line 2936. In the access, the terminal 2352 copies the selected directory or the selected file data to an accessible disclosed storage area of the storage unit 2946 through the Internet 2933.

As shown in FIG. 24, the screen for copying a directory or a file data to the Internet comprises a tree display portion 750, a menu portion 749, a button group 754, a copy-source display portion 360, a comment-setting portion 361, a copy-destination display portion 362, an Execute button 363 and a Cancel button 364. The copy-source display portion 360 displays a directory or a file data selected as a copy source. The comment-setting portion 361 is used for setting a comment affiliated with the selected directory or the selected file data. The copy-destination display portion 362 is used for specifying a copy destination of the selected directory or the selected file data. The Execute button 363 is operated to carry out a process to copy the selected directory or the selected file data to the copy destination. On the other hand, the Cancel button 364 is operated to cancel a process to copy the selected directory or the selected file data to the copy destination. It is to be noted that, since the screen for copying a directory or a file data to the Internet is all but the same as the copy screen, the screen for copying the directory or the file data to the Internet is not explained in detail.

3-4-13: Create-new-directory Screen

Figure 25:
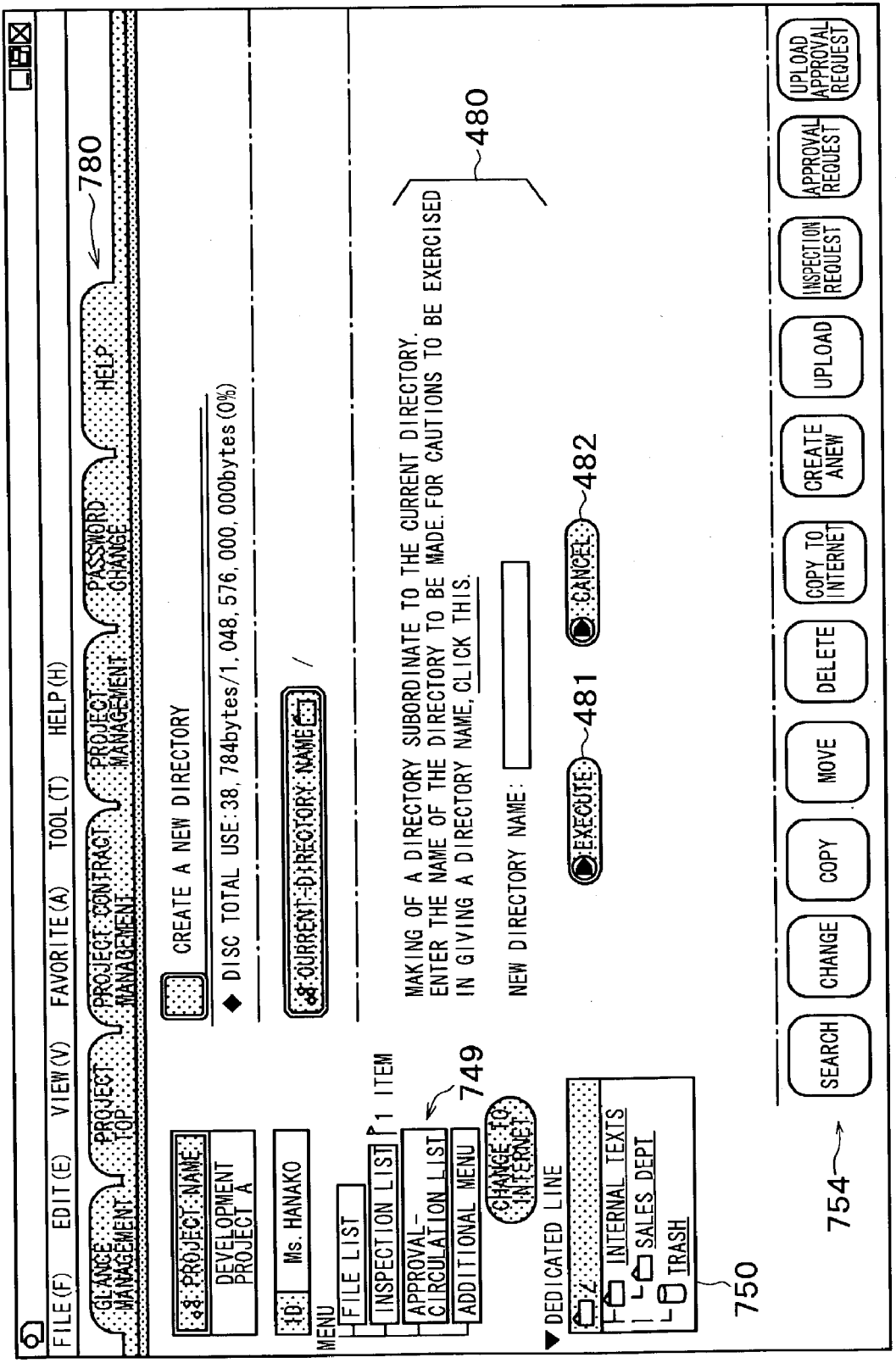
- FIG. 25 is an explanatory diagram showing a still further screen appearing on the display unit of a terminal employed in the cut-list creation system implemented by the embodiment of the present invention.

When the Create-anew button 761 appearing on the screen shown in FIG. 13 is selected, a create-new-directory screen shown in FIG. 25 is displayed on the display unit employed in the terminal 2352. The create-new-directory screen is a screen used for making a new subdirectory in a directory specified by the terminal 2352. By setting required items on the create-new-directory screen, a function to make the new subdirectory is carried out.

As shown in FIG. 25, the create-new-directory screen includes a tree display portion 750, a menu portion 749, a button group 754, a directory-setting portion 480, an Execute button 481 and a Cancel button 482. The directory-setting portion 480 is used for inputting the name of a new directory to be made. The Execute button 481 is operated to carry out a process to make the new directory. On the other hand, the Cancel button 482 is operated to cancel the process to make the new directory.

3-4-14: Upload Screen

Figure 26:
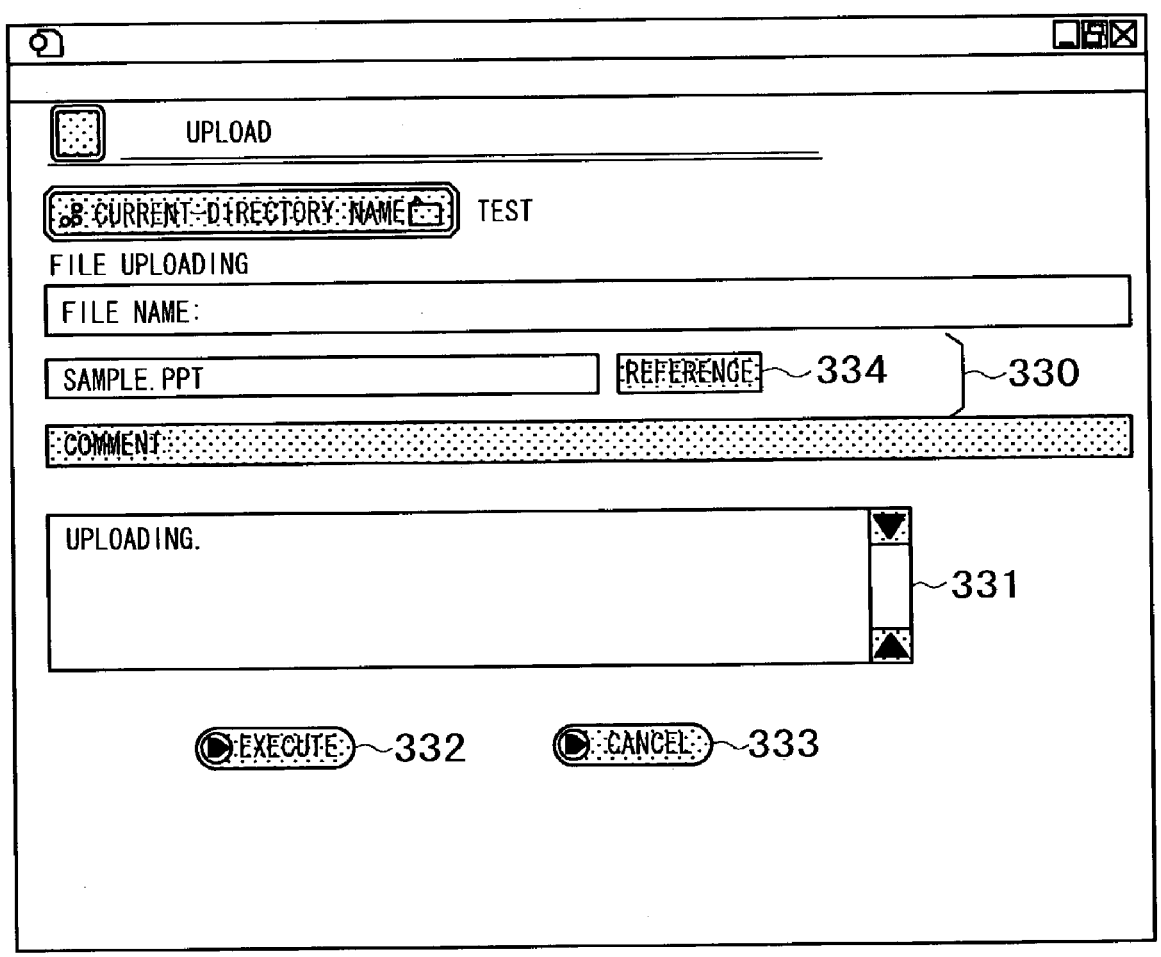
FIG. 26 is an explanatory diagram showing a still further screen appearing on the display unit of a terminal employed in the cut-list creation system implemented by the embodiment of the present invention.

When the Upload button 762 appearing on the screen shown in FIG. 13 is selected, an upload screen shown in FIG. 26 is displayed on the display unit employed in the terminal 2352 for a directory specified in a shaded area of the tree display portion 750. The upload screen is a screen used for uploading (or storing) a selected file data stored in a storage unit employed in the terminal 2352 into the selected directory, that is, the current directory. By entering the name of the file data to be uploaded to the upload screen, a function to upload the file data into the selected directory is carried out.

As shown in FIG. 26, the upload screen includes a select portion 330, an information-setting portion 331, an Execute button 332 and a Cancel button 333. The select portion 330 is used for selecting a file data to be uploaded to the selected directory or the current directory. The comment-setting portion 331 is used for setting a comment affiliated with the selected file data. The Execute button 332 is operated to carry out a process to upload the selected file data to the current directory. On the other hand, the Cancel button 333 is operated to cancel the process to upload the selected file data to the current directory.

When a Reference button 334 appearing on the select portion 330 is operated, a list of file names is displayed. One of the file names can be selected. In the typical upload screen shown in FIG. 26, a file name of "sample.ppt" is specified.

3-4-15: Inspection-Request-Originating Screen

Figure 27:
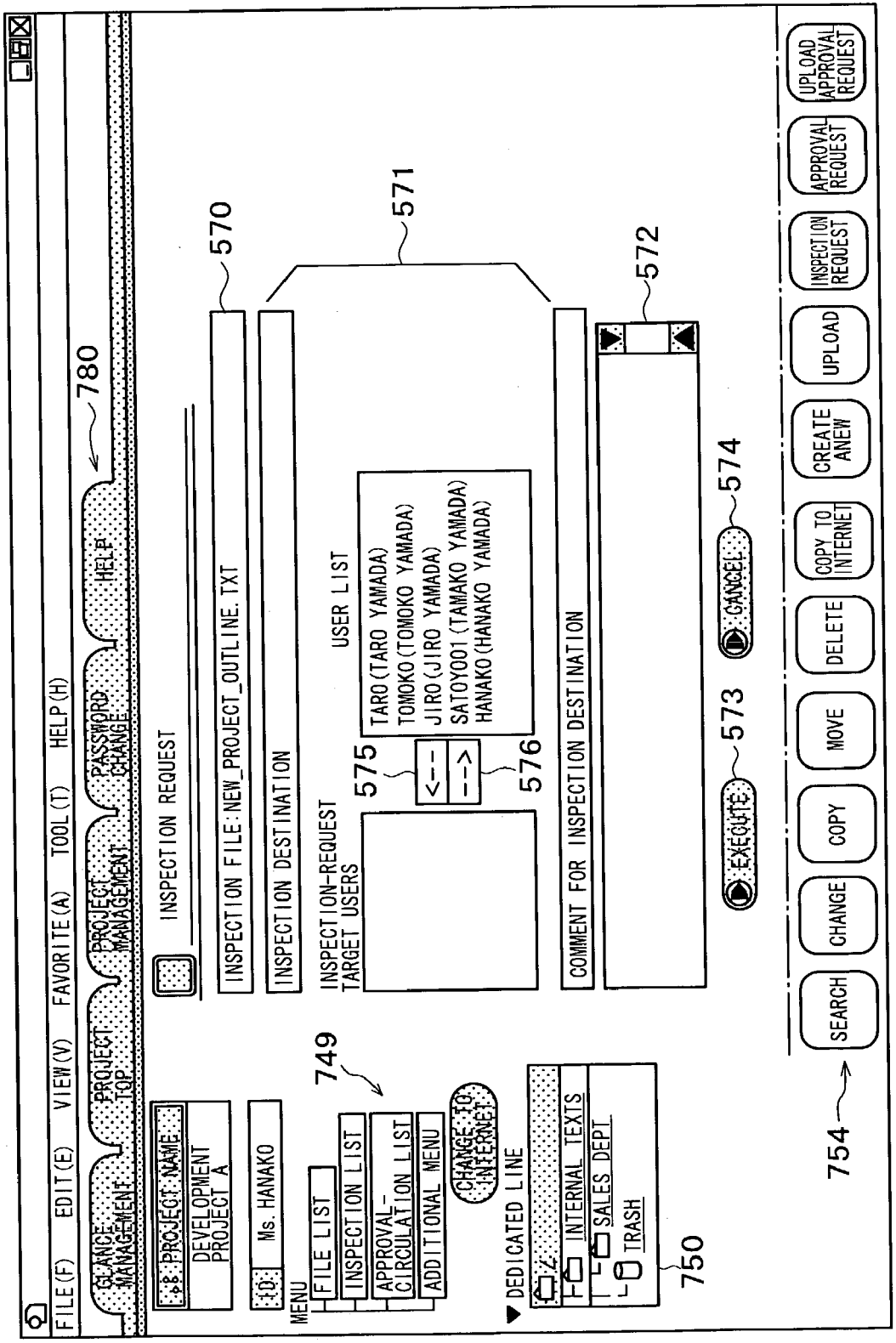
FIG. 27 is an explanatory diagram showing a still further screen appearing on the display unit of a terminal employed in the cut-list creation system implemented by the embodiment of the present invention.

When the user operates the terminal 2352 in order to select the Inspection-request button 763 appearing on the screen shown in FIG. 13 by typically clicking the mouse after marking a check box 769 appearing in a file-attribute display portion 753 of the same screen to select a file data, inspection of which is to be requested, an inspection-request-originating screen shown in FIG. 27 is displayed on the display unit employed in the terminal 2352. The inspection-request-originating screen is a screen used for selecting a file data stored in the terminal 2352 as a file, inspection of which is to be requested. As users of terminals 2352 each serving as a target of a request for inspection of the selected file data are specified from the inspection-request-originating screen, a function to transmit such a request to the specified terminals 2352 is carried out.

As shown in FIG. 27, the inspection-request-originating screen includes a tree display portion 750, a menu portion 749, a button group 754, a display portion 570, an inspection-request-target select portion 571, a comment-setting portion 572, an Execute button 573 and a Cancel button 574. The display portion 570 displays a file data selected as a file, inspection of which is to be requested. The inspection-request-target select portion 571 is used for specifying users of terminals 2352 each serving as a target of a request for inspection of the selected file data. The comment-setting portion 572 is used for setting a comment to be transmitted to the specified terminals 2352 each serving as a target of a request for inspection of the selected file data. The Execute button 573 is operated to carry out a process to make a request for inspection of the selected file data. On the other hand, the Cancel button 574 is operated to cancel the process to make a request for inspection of the selected file data.

The inspection-request-target select portion 571 shows a user list and a list of inspection-request target users. The user list is a list of users pertaining to terminals 2352. On the other hand, the list of inspection-request target users is actually a list of terminals 2352 each serving as a target of a request for inspection of a selected file data. When a user is selected from the user list by typically clicking the mouse and, then, a button 575 is selected also by typically clicking the mouse, the selected user is put on the list of inspection-request target users, which is actually a list of terminals 2352 each serving as a target of a request for inspection of a selected file data. In order to cancel a terminal 2352 cataloged on the list of inspection-request target users as a target of a request for inspection of a selected file data, select the terminal 2352 from the list of inspection-request target users and select a button 576.

The comment-setting portion 572 allows the terminal 2352 originating such a request for inspection to set an inspection comment to be transmitted to the terminals 2352 each serving as a target of a request for inspection of a selected file data. The terminals 2352 each serving as a target of a request for inspection of a selected file data are each capable of viewing the inspection comment.

When the Execute button 573 operated to carry out a process to make a request for inspection of a selected file data is selected, a message indicating the request is displayed on a screen appearing on the display unit employed in each terminal 2352 serving as a target of the request. Examples of the screen are the file-list screen described earlier or an inspection-list screen. Then, information on an approval-circulation request is transmitted to the terminals 2352 by e-mail. It is to be noted that the inspection-list screen will be described later.

3-4-15-1: Inspection-Request-Response Screen

By referring to FIG. 28, the following description explains an inspection-request-response screen appearing on the display unit employed in a terminal 2352 serving as a target of a request for inspection of a file data. The inspection-request-response screen is a screen used for transmitting a return inspection comment to the terminal 2352 originating the inspection request after completing inspection of the file data.

As shown in FIG. 28, the inspection-request-response screen includes an inspection-request-originator comment portion 1760, an inspection-request-target comment portion 1761, a comment-setting portion 1762, a Transmit button 1763 and a Cancel button 1764. The inspection-request-originator comment portion 1760 displays a history of inspection comments each generated by an originator of a request for inspection of a file data. On the other hand, the inspection-request-target comment portion 1761 displays a history of inspection comments each generated by the target of a request for inspection of a file data. The comment-setting portion 1762 is used for setting an inspection comment generated by the target of a request for inspection of a file data. The Transmit button 1763 is selected to carry out a process to transmit the inspection comment generated by the target of a request for inspection of a file data to the inspection-request-originator. On the other hand, the Cancel button 1764 is selected to cancel the process to transmit the inspection comment generated by the target of a request for inspection of a file data.

The inspection-request-originator comment portion 1760 and the inspection-request-target comment portion 1761 may each display a history of same inspection comments. However, an inspection comment displayed in the inspection-request-originator comment portion 1760 is received from a terminal 2352 serving as an originator of an inspection request while an inspection comment displayed in the inspection-request-target comment portion 1761 is originated in a process carried out by the terminal 2352 serving as a target of an inspection request to return the inspection comment.

3-4-15-2: Inspection-Request-Comment Confirmation Screen

Figure 29:
FIG. 29 is an explanatory diagram showing a still further screen appearing on the display unit of a terminal employed in the cut-list creation system implemented by the embodiment of the present invention.

As shown in FIG. 29, the inspection-request-comment confirmation screen for confirming an inspection comment includes the inspection-request-originator comment portion 1760, the inspection-request-target comment portion 1761 and a Close button 1765. The inspection-request-originator comment portion 1760 displays a history of inspection comments each generated by an originator of a request for inspection of a file data. On the other hand, the inspection-request-target comment portion 1761 displays a history of inspection comments each generated by the target of a request for inspection of a file data. The Close button 1765 is selected to close the inspection-request-comment confirmation screen.

The inspection-request-originator comment portion 1760 and the inspection-request-target comment portion 1761 may each display a history of same inspection comments. However, an inspection comment displayed in the inspection-request-originator comment portion 1760 is received from a terminal 2352 serving as an originator of an inspection request while an inspection comment displayed in the inspection-request-target comment portion 1761 is originated in a process carried out by the terminal 2352 serving as a target of an inspection request to return the inspection comment.

3-4-16: Approval-Circulation-Request-Originating Screen

Figure 30:
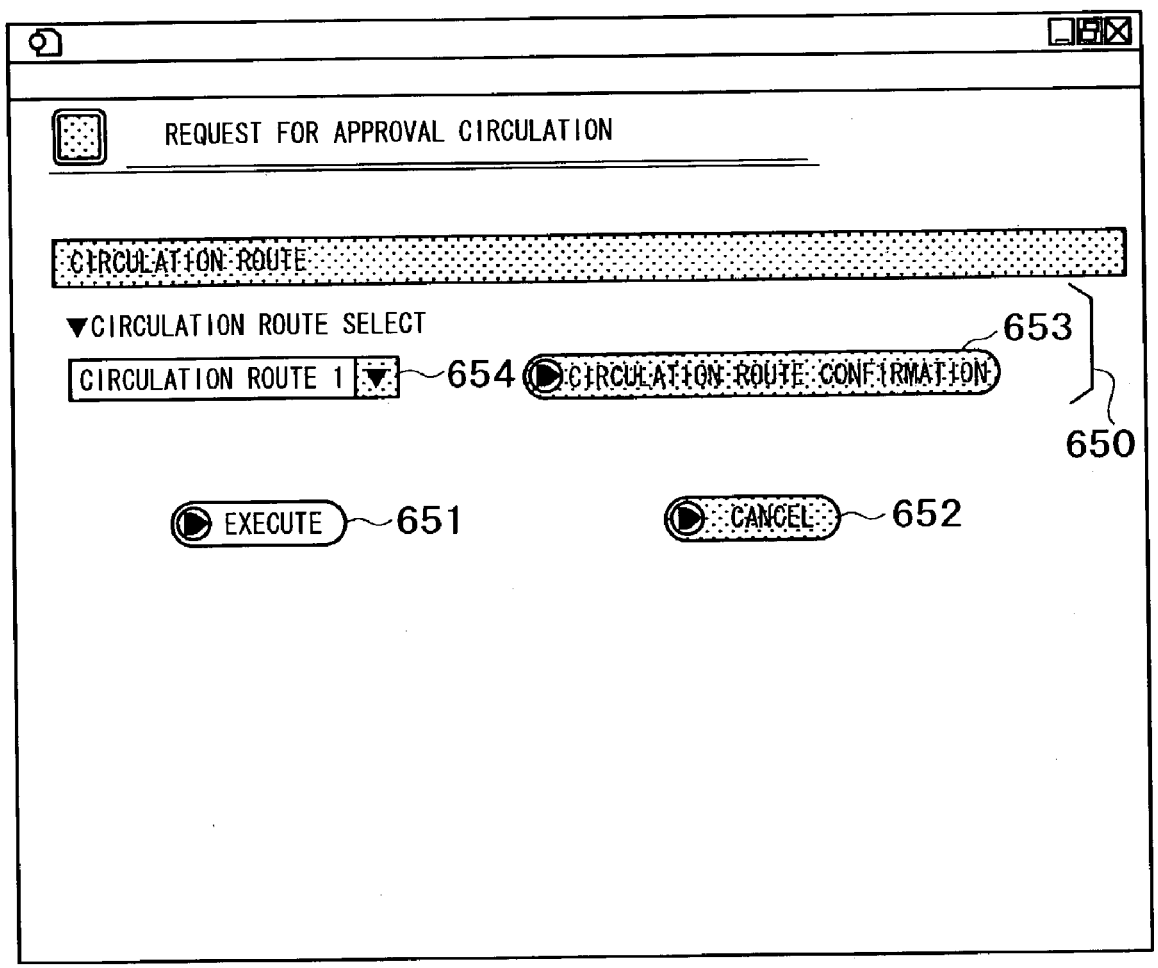
FIG. 30 is an explanatory diagram showing a still further screen appearing on the display unit of a terminal employed in the cut-list creation system implemented by the embodiment of the present invention.

When the user operates the terminal 2352 in order to select the Approval-circulation-request button 764 appearing on the screen shown in FIG. 13 by typically clicking the mouse after marking a check box 769 appearing in a file-attribute display portion 753 of the same screen to select a file data to be subjected to an approval circulation, an approval-circulation-request-originating screen shown in FIG. 30 is displayed on the display unit employed in the terminal 2352. The approval-circulation-request-originating screen is a screen used for originating a request for an approval circulation of a selected file data among terminals 2352 each specified as a circulation-target terminal on a route of circulation one terminal after another. By selecting a circulation route including terminals 2352 requested to circulate a request for an approval from the approval-circulation-request-originating screen, it is possible to carry out a function to make a request for an approval circulation of a selected file data among terminals 2352 each specified as a circulation-target terminal on a route of circulation one terminal after another.

As shown in FIG. 30, the approval-circulation-request-originating screen includes a circulation-route select portion 650, an Execute button 651 and a Cancel button 652. The circulation-route select portion 650 is used for selecting a circulation route. The Execute button 651 is selected to carry out an approval-circulation process. On the other hand, the Cancel button 652 is selected to cancel an approval-circulation process.

The circulation-route select portion 650 comprises a Circulation-route confirmation button 653 and a circulation-route display portion 654. The Circulation-route confirmation button 653 is selected to confirm a selected circulation route. The circulation-route display portion 654 displays a selected circulation route.

When the Circulation-route confirmation button 653 is selected by typically clicking the mouse of the terminal 2352, a screen for confirming an order of circulation through circulation-target terminals 2352 on a circulation route selected by using a circulation-route select item is displayed.

As is obvious from the example shown in FIG. 30, the circulation-route display portion 654 displays circulation route 1 as a selected circulation route. Thus, when the Circulation-route confirmation button 653 is selected, a screen for confirming an order of circulation through circulation-target terminals 2352 on circulation route 1 is displayed.

As described above, the circulation-route display portion 654 shown in FIG. 30 displays a selected circulation route. In order to switch the display of the circulation-route display portion 654 to another circulation route, select the circulation-route display portion 654 by typically clicking the mouse.

When the Execute button 651 operated to carry out a process to make a request for an approval circulation is selected, a message indicating the request is displayed on a screen appearing on the display unit employed in each terminal 2352 serving as a target of the request. Examples of the screen are the file-list screen described earlier or an approval-circulation-list screen. Then, information on an approval-circulation request is transmitted to the circulation-target terminals 2352 by e-mail. It is to be noted that the approval-circulation-list screen and a circulation-route-setting screen will be described later.

3-4-16-1: Approval-Circulation-Request-Result Screen

Figure 31:
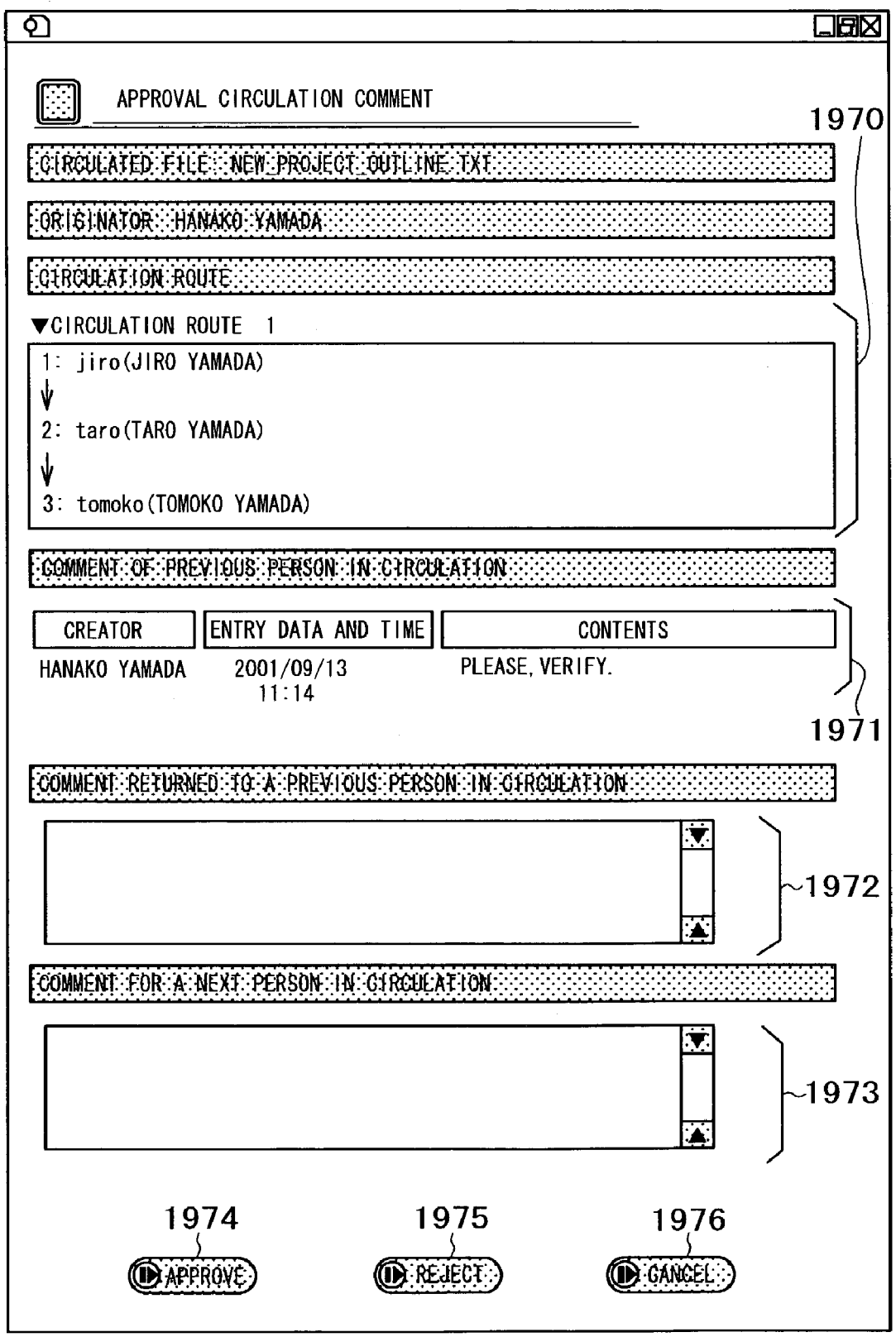
FIG. 31 is an explanatory diagram showing a still further screen appearing on the display unit of a terminal employed in the cut-list creation system implemented by the embodiment of the present invention.

By referring to FIG. 31, the following description explains an approval-circulation-request-result screen appearing on the display unit employed in a particular terminal 2352 set as a circulation-target terminal on a circulation route. The approval-circulation-request-result screen is a screen used for requesting the user of the particular terminal 2352 to circulate a selected file data to the next terminal 2352 set as a circulation-target terminal on the circulation route in accordance with an order of circulation after completing verification of the file data.

As shown in FIG. 31, the approval-circulation-request-result screen includes a circulation-route portion 1970, a previous-circulation-comment portion 1971, a previous-circulation-comment-setting portion 1972, a next-circulation-comment portion 1973, an Approve button 1974, a Reject button 1975 and a Cancel button 1976. The circulation-route portion 1970 shows a circulation route. The previous-circulation-comment portion 1971 is a table showing a history of approval-circulation comments, which were written when the request for the approval circulation was made and written by preceding circulation-target terminals 2352 on the circulation route. The previous-circulation-comment-setting portion 1972 is used for setting an approval-circulation comment for the preceding circulation-target terminals 2352 on the circulation route. The next-circulation-comment portion 1973 is used for setting an approval-circulation comment for the succeeding circulation-target terminals 2352 on the circulation route. The Approve button 1974 is selected to carry out an approval process. On the other hand, the Reject button 1975 is selected to carry out a rejection process. The Cancel button 1976 is selected to close the screen display without carrying out approval and rejection processes.

An approval-circulation comment set in the previous-circulation-comment-setting portion 1972 is transmitted by e-mail to the preceding circulation-target terminals 2352 on the circulation route during the approval or rejection process.

An approval-circulation comment set in the next-circulation-comment-setting portion 1973 is added to the previous-circulation-comment portion 1971 to update the previous-circulation-comment portion 1971 during an approval or rejection process. In addition, an approval-circulation comment set in the next-circulation-comment portion 1973 is added to the previous-circulation-comment portion 1971 to be transmitted by e-mail to the succeeding circulation-target terminals 2352 on the circulation route along with a request for an approval circulation.

As described above, the previous-circulation-comment portion 1971 is a table showing a history of approval-circulation comments. However, the scope of the present invention is not limited to this embodiment. For example, the previous-circulation-comment portion 1971 can also be used for showing an approval-circulation comment written by the immediately preceding target the terminal 2352 on the circulation route.

3-4-17: Upload & Approval-Circulation-Request Select Screen

Figure 32:
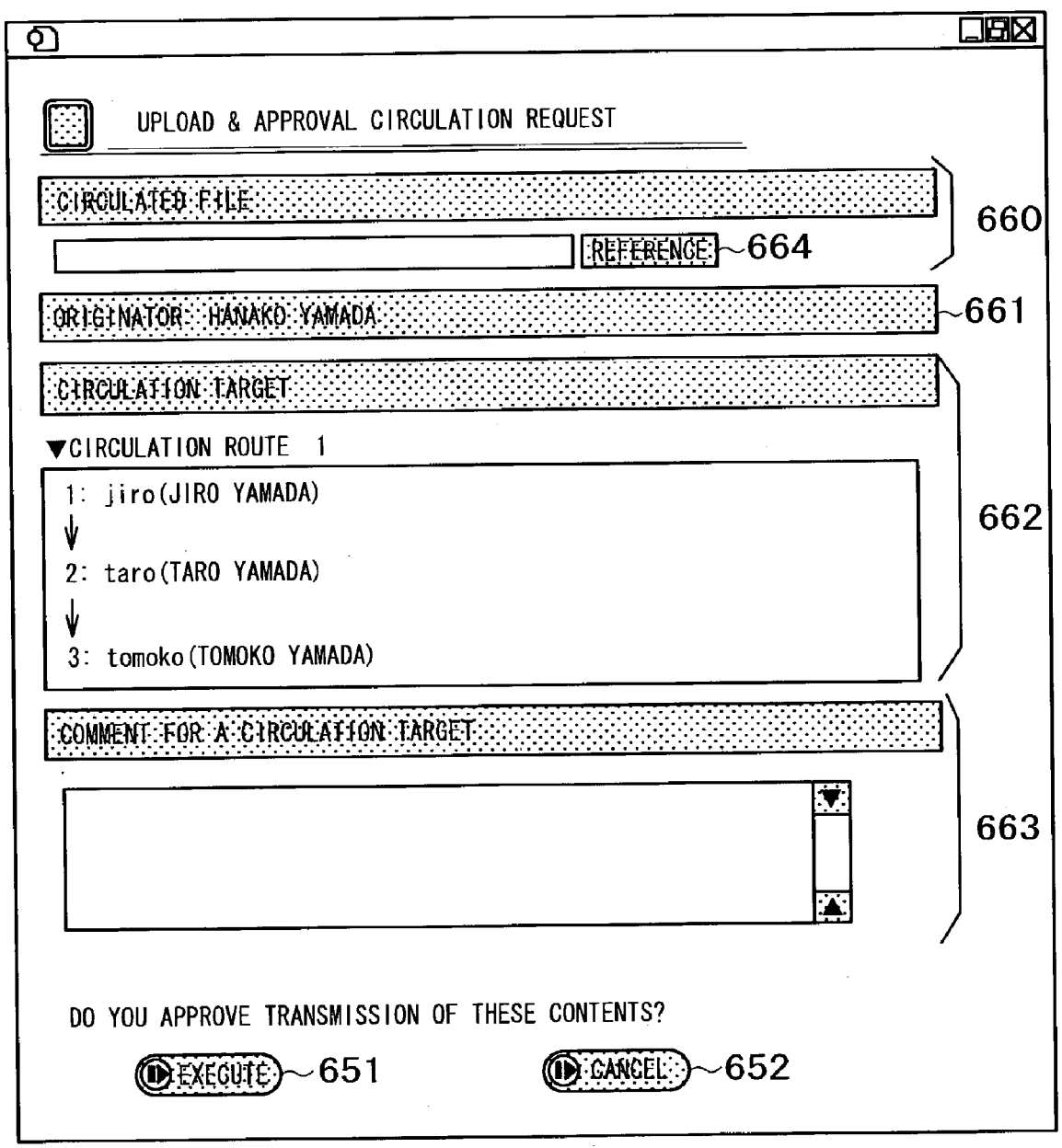
FIG. 32 is an explanatory diagram showing a still further screen appearing on the display unit of a terminal employed in the cut-list creation system implemented by the embodiment of the present invention.

When the Upload & approval-circulation request button 765 appearing on the screen shown in FIG. 13 is selected, an upload & approval-circulation-request select screen having all but the same configuration as the approval-circulation-request-originating screen shown in FIG. 30 is displayed. The upload & approval-circulation-request select screen is shown in none of the figures of this specification. When a circulation route displayed on the upload & approval-circulation-request select screen is selected, an upload & approval-circulation-request-originating screen shown in FIG. 32 is displayed on the display unit employed in the terminal 2352. It is possible to carry out a function to transmit a request for an inspection of a selected file data to circulation-target terminals 2352 set in advance on a circulation route one terminal after another by selecting the file data among file data stored in the storage unit employed in the terminal 2352 through use of the upload & approval-circulation-request select screen and selecting the circulation route through use of an upload & approval-circulation-request-originating screen.

The approval-circulation-request-originating screen is a screen for originating an approval circulation of a file data selected among those stored in the center server 2350. On the other hand, the upload & approval-circulation-request-originating screen is a screen for originating an approval circulation of a file data selected among those stored in the terminal 2352.

As shown in FIG. 32, the upload & approval-circulation-request-originating screen includes a circulation select portion 660, an originator display portion 661, a circulation display portion 662, a comment-setting portion 663, an Execute button 651 and a Cancel button 652. The circulation select portion 660 is used for selecting a file data subjected to an approval circulation. The originator display portion 661 shows the user pertaining to a terminal 2352 serving as the originator of the approval circulation. The circulation display portion 662 displays a circulation route. The comment-setting portion 663 is used for setting a comment. The Execute button 651 is selected to carry out a process to make a request for an approval circulation. On the other hand, the Cancel button 663 is selected to cancel the process to make a request for an approval circulation.

The circulation select portion 660 is used for selecting a file data subjected to an approval circulation by typically clicking a Reference button 664. A file data subjected to an approval circulation is selected among those stored in the storage unit employed in the terminal 2352. When a file data is selected, the name of the selected file data is displayed on the circulation select portion 660.

When a process to make a request for an approval circulation is carried out by selecting the Execute button 651, the selected file data is transmitted to the center server 2350 by way of the network 2351 to be accommodated in a specified directory. Then, much like the approval-circulation-request-originating screen explained earlier, a request for an approval circulation is displayed on a screen of a terminal 2352 set on the circulation route as a target of the approval circulation. Examples of the screen are the file-list screen and the approval-circulation-list screen, which have been explained before. In addition, the request for an approval circulation is transmitted by e-mail to the terminal 2352.

3-4-17-1: Upload & Approval-Circulation-Request Approve Screen

After the terminal 2352 set on the circulation route as the first target of the approval circulation completes verification of the selected file data, an upload & approval-circulation-request approve screen is displayed. The upload & approval-circulation-request approve screen is a screen used for transmitting the file data to a terminal 2352 set on the circulation route as a next target of the approval circulation. Since the upload & approval-circulation-request approve screen has all but the same configuration as the approval-circulation-request-result screen described previously, however, no description of the upload & approval-circulation-request approve screen is given.

3-4-18: Inspection-List Screen

By referring to FIG. 33, the following description explains an inspection-list screen linked to the project-top screen shown in FIG. 10. The inspection-list screen appearing on the display unit employed in a particular terminal 2352 pertaining to a group 2354 is a screen for displaying a list of files originated by the terminal 2352 and a list of received files. The files originated by the terminal 2352 are transmitted to other terminals 2352 pertaining to the same group 2354, which are requested to inspect the files. On the other hand, received files are files received by this particular terminal 2352 from the other terminals 2352 to be inspected by this particular terminal 2352.

As shown in FIG. 33, the inspection-list screen includes a reception table 1720 and a request table 1721. The reception table 1720 is the list of received files to be inspected by the particular terminal 2352 while the request table 1721 is the list of originated files to be inspected by the other terminals 2352.

Each row of the reception table 1720 includes a file name, a comment update mark 770, a capacity, a reception date and time, a sender, status and an inspection comment. The file name is the name of a received file data to be inspected by this particular terminal 2352. The comment update mark 770 is selected to update a comment affiliated with the received file data. The capacity is the size of the received file data. The sender is the user pertaining to a terminal 2352 transmitting a request for inspection of the received file data by this particular terminal 2352. The status indicates whether or not this particular terminal 2352 has inspected the received file data. The inspection comment is an inspection result to be transmitted to the terminal 2352 to which the sender pertains.

In the example shown in FIG. 33, the first file name in the reception table 1720 is Guidance.txt, which is the name of a file data received on 2001/09/13 at 20:13 as indicated by the reception date and time. The status indicates that the file data has not been read yet by this particular terminal 2352.

As the user of this particular terminal 2352 selects and references this file data, which this particular terminal 2352 is requested to inspect, the status is changed from 'Not read' to 'Already read.' It is to be noted, however, that the scope of the present invention is not limited to this embodiment. For example, it is possible to provide an embodiment in which the status is changed at a point of time the inspection comment is transmitted to the terminal 2352 to which the sender pertains. In addition, it is also possible to provide an embodiment, which changes the status from 'Not read' to 'Already read' with any timing.

Each row of the request table 1721 includes a file name, a comment update mark 770, a capacity, a file opening date and time, a receiver, status and an inspection comment. The file name is the name of a file data originated by this particular terminal 2352 and transmitted to other terminals 2354 pertaining to the same group 2354, which are requested to inspect the file. The comment update mark 770 is selected to update a comment affiliated with the originated file data. The capacity is the size of the originated file data. The receiver is the user pertaining to a terminal 2352, which is supposed to receive the originated file data and requested to inspect the file. The status indicates whether or not the user of the terminal 2352 receiving the originated file data has inspected the file data. The inspection comment is a comment received from the terminal 2352 receiving the originated file data and completing inspection of the file data in accordance with a request for the inspection.

In the example shown in FIG. 33, the file name in the request table 1721 is Storage_service_manual.txt, which is the name of an originated file data opened on 2001/09/13 at 20:15 as indicated by the file opening date and time. The status indicates that the file data has not been read yet by the terminal 2352 receiving the originated file data.

It is to be noted that, as described above, a comment update mark 770 shown on the comment column is a mark allowing a comment affiliated with the file data to be referenced and/or edited. By the same token, an inspection approval circulation comment update mark 1726 shown on the inspection-comment column of the reception table 1720 is a mark allowing the inspection comment to be referenced and/or edited. On the other hand, an inspection approval circulation comment reference mark 1727 shown on the inspection-comment column of the request table 1721 is a mark allowing the inspection comment to be referenced only. A comment update mark 770, an inspection approval circulation comment update mark 1726 and an inspection approval circulation comment reference mark 1727, which are shown on other screens, have the same functions.

3-4-18-1: Inspected-List-Copy Screen

When the user operates the terminal 2352 in order to select a Copy button 757 appearing on the screen shown in FIG. 33 by typically clicking the mouse after marking a check box 769 appearing in the reception table 1720 or the request table 1721 on the same screen to select a directory or a file data, which the user wants to copy, an inspected-list-copy screen for copying the selected directory or the selected file data is displayed. Since the inspected-list-copy screen has all but the same configuration as the copy screen described earlier, however, the inspected-list-copy screen is shown in none of the figures and not explained in particular.

3-4-18-2: Inspected-List-Copy-to-Internet Screen

When the user operates the terminal 2352 in order to select a Copy-to-Internet button 760 appearing on the screen shown in FIG. 33 by typically clicking the mouse after marking a check box 769 appearing in the reception table 1720 or the request table 1721 on the same screen to select a directory or a file data, which the user wants to copy to the Internet, an inspected-list-copy-to-Internet screen for copying the selected directory or the selected file data is displayed. Since the inspected-list-copy-to-Internet screen has all but the same configuration as the copy-to-Internet screen described earlier, however, the inspected-list-copy-to-Internet screen is shown in none of the figures and not explained in particular.

3-4-18-3: Inspected-List-Delete Screen

When the user operates the terminal 2352 in order to select a Delete Inspection button 759 appearing on the screen shown in FIG. 33 by typically clicking the mouse after marking a check box 769 appearing in the reception table 1720 or the request table 1721 on the same screen to select a directory or a file data, which the user wants to delete, an inspected-list-delete screen for deleting the selected directory or the selected file data is displayed. Since the inspected-list-delete screen has all but the same configuration as the delete screen described earlier, however, the inspected-list-delete screen is shown in none of the figures and not explained in particular.

3-4-19: Approval-Circulation-List Screen

By referring to FIG. 34, the following description explains an approval-circulation-list screen linked to the button 799 appearing on the project-top screen shown in FIG. 10. The approval-circulation-list screen appearing on the display unit employed in a particular terminal 2352 pertaining to a group 2354 is a screen for displaying a list of outgoing files each subjected to an approval circulation and a list of incoming files each received in an approval circulation. The outgoing files are each subjected to an approval circulation to other terminals 2352, which pertain to the same group 2354 and are requested to inspect the files. The other terminals 2352 are each specified in advance by the particular terminal 2352 as a circulation-target terminal on a circulation route. On the other hand, incoming files are to be inspected by this particular terminal 2352 in an approval circulation.

As shown in FIG. 34, the approval-circulation-list screen includes a reception table 1724 and an originator table 1725. The reception table 1724 is the list of incoming files to be inspected by the particular terminal 2352 in an approval circulation while the originator table 1725 is the list of outgoing files each to be subjected to an approval circulation among the other terminals 2352.

Each row of the reception table 1720 includes a file name, a comment update mark 770, a capacity, a circulation route, a reception date and time, an originator, an inspector, status and an approval-circulation comment. The file name is the name of a received file data to be inspected by this particular terminal 2352 in an approval circulation. The comment update mark 770 is a mark to be selected to update a comment affiliated with the received file data. The capacity is the size of the received file data. The circulation route is the order of the terminals 2352 each serving as an approval-circulation target. The originator is the user pertaining to a terminal 2352 initiating the approval circulation. The inspector is the name of the user of this particular terminal 2352, that is, the current terminal 2352 on the circulation route of the approval circulation. The status indicates whether or not the current terminal 2352 on the circulation route of the approval circulation has inspected the received file data. The approval-circulation comment is an approval-circulation result to be transmitted to the terminal 2352 to which the originator pertains.

In the example shown in FIG. 34, the first file name in the reception table 1724 is Report.txt, which is the name of a file data received on 2001/09/13 at 11:38 as indicated by the reception date and time. The circulation route is circulation route 4. The status indicates that the file data has not been read yet by this particular terminal 2352.

As the user of this particular terminal 2352 selects and references this file data in the approval circulation, the status is changed from 'Not read' to 'Already read.' It is to be noted, however, that the scope of the present invention is not limited to this embodiment. For example, it is possible to provide an embodiment in which the status is changed at a point of time this particular terminal 2352 reveals an approval or reject as a result of inspection. In addition, it is also possible to provide an embodiment, which changes the status from 'Not read' to 'Already read' with any timing. Each row of the originator table 1725 includes a file name, a comment update mark 770, a capacity, a file route, a reception date and time, an originator, an inspector, status and an approval-circulation comment. The file name is the name of a file data received by this particular terminal 2352 to be transmitted to other terminals 2354, which pertain to the same group 2354 and are requested to inspect the file, in an approval circulation. The comment update mark 770 is a mark to be selected to update a comment affiliated with the file data. The capacity is the size of the file data. The circulation route is the order of the terminals 2352 each serving as an approval-circulation target. The originator is the name of the user of the terminal 2352 initiating the approval circulation. The inspector is the name of the user of the current terminal 2352 on the circulation route of the approval circulation, that is, the terminal 2352 currently holding the file data. The status indicates whether or not the terminal 2352 currently holding the file data has inspected the file data. The approval-circulation comment is an approval-circulation result to be transmitted to the originator.

In the example shown in FIG. 34, the first file name in the originator table 1725 is Guidance.txt, which is the name of a file data opened on 2001/09/13 at 11:35 as indicated by the reception date and time. The circulation route is circulation route 3. The status indicates that the file data has been approved.

It is to be noted that, as described above, a comment update mark 770 shown on the comment column is a mark allowing a comment affiliated with the file data to be referenced and/or edited. By the same token, an inspection approval circulation comment update mark 1726 shown on the approval-circulation comment column of the reception table 1724 is a mark allowing the approval-circulation comment to be referenced and/or edited. On the other hand, an inspection approval circulation comment reference mark 1727 shown on the approval-circulation comment column of the originator table 1725 is a mark allowing the approval-circulation comment to be referenced only. A comment update mark 770, an inspection approval circulation comment update mark 1726 and an inspection approval circulation comment reference mark 1727, which are shown on other screens, have the same functions.

3-4-19-1: Approval-Circulation-List-Copy Screen

When the user operates the terminal 2352 in order to select a Copy button 757 appearing on the screen shown in FIG. 34 by typically clicking the mouse after marking a check box 769 appearing in the reception table 1724 or the originator table 1725 on the same screen to select a directory or a file data, which the user wants to copy, an approval-circulation-list-copy screen for copying the selected directory or the selected file data is displayed. Since the approval-circulation-list-copy screen has all but the same configuration as the copy screen described earlier, however, the approval-circulation-list-copy screen is shown in none of the figures and not explained in particular.

3-4-19-2: Approval-Circulation-List-Copy-to-Internet Screen

When the user operates the terminal 2352 in order to select a Copy-to-Internet button 760 appearing on the screen shown in FIG. 34 by typically clicking the mouse after marking a check box 769 appearing in the reception table 1720 or the originator table 1721 on the same screen to select a directory or a file data, which the user wants to copy to the Internet, an approval-circulation-list-copy-to-Internet screen for copying the selected directory or the selected file data is displayed. Since the approval-circulation-list-copy-to-Internet screen has all but the same configuration as the copy-to-Internet screen described earlier, however, the approval-circulation-list-copy-to-Internet screen is shown in none of the figures and not explained in particular.

3-4-19-3: Approval-Circulation-List-Delete Screen

When the user operates the terminal 2352 in order to select a delete button 759 appearing on the screen shown in FIG. 34 by typically clicking the mouse after marking a check box 769 appearing in the reception table 1724 or the originator table 1725 on the same screen to select a directory or a file data, which the user wants to delete, an approval-circulation-list-delete screen for deleting the selected directory or the selected file data is displayed. Since the approval-circulation-list-delete screen has all but the same configuration as the delete screen described earlier, however, the approval-circulation-list-delete screen is shown in none of the figures and not explained in particular.

3-4-20: Referenced-Comment-Data Screen

Figure 35:
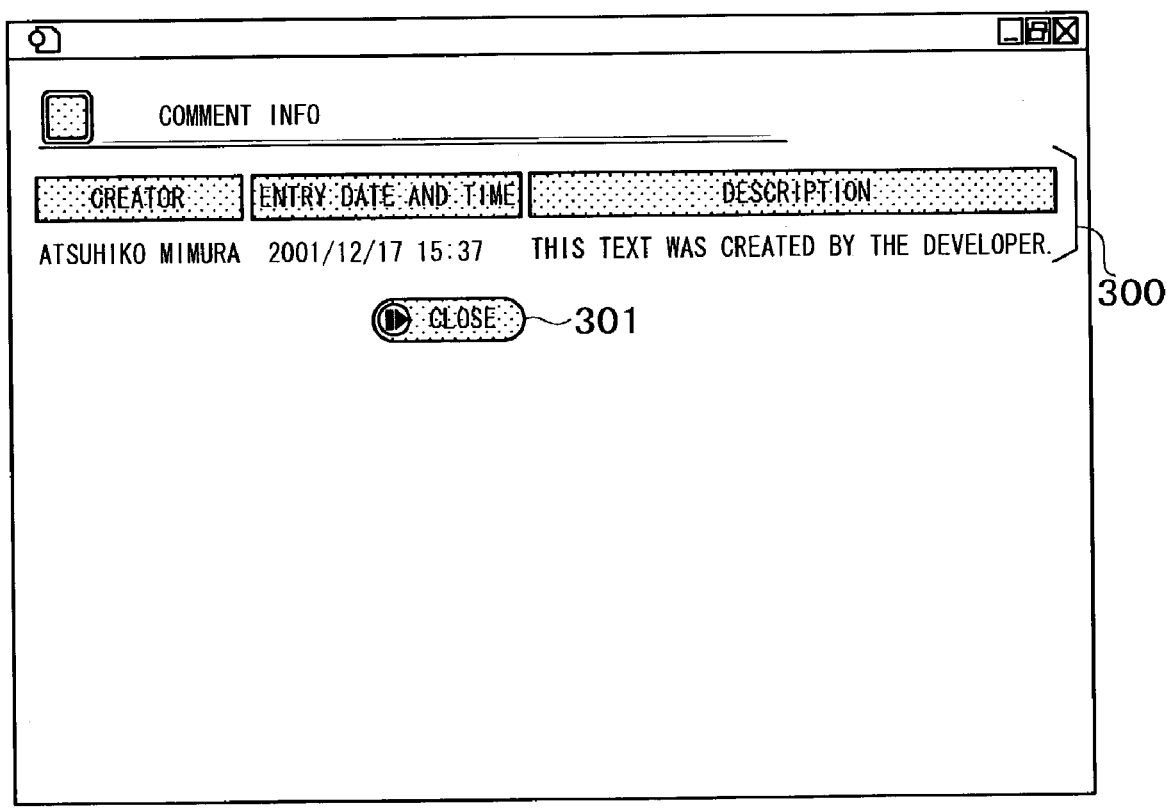
FIG. 35 is an explanatory diagram showing a still further screen appearing on the display unit of a terminal employed in the cut-list creation system implemented by the embodiment of the present invention.

If the comment reference mark 768 appearing on the screen shown in FIG. 13 is selected by typically clicking the mouse of the terminal 2352, a referenced-comment-data screen displaying a comment as shown in FIG. 35 is displayed. By displaying the referenced-comment-data screen, a function of verifying a comment to be used for a number of purposes can be carried out.

As shown in FIG. 35, the referenced-comment-data screen includes a comment display portion 300 and a Close button 301. The comment display portion 300 shows a history of comments. The Close button 301 is selected to close the referenced-comment-data screen.

Each row of the comment display portion 300 includes a creator, an entry date and time and a description. The creator is the name of a user pertaining to the terminal 2352. The user is a person creating the comment. The entry date and time is a date and a time on and at which the comment was created. It is to be noted that a comment reference mark 768 appearing on other screens has the same function as the comment reference mark 768 selected for displaying the referenced-comment-data screen.

3-4-21: Update-Comment-Data Screen

Figure 36:
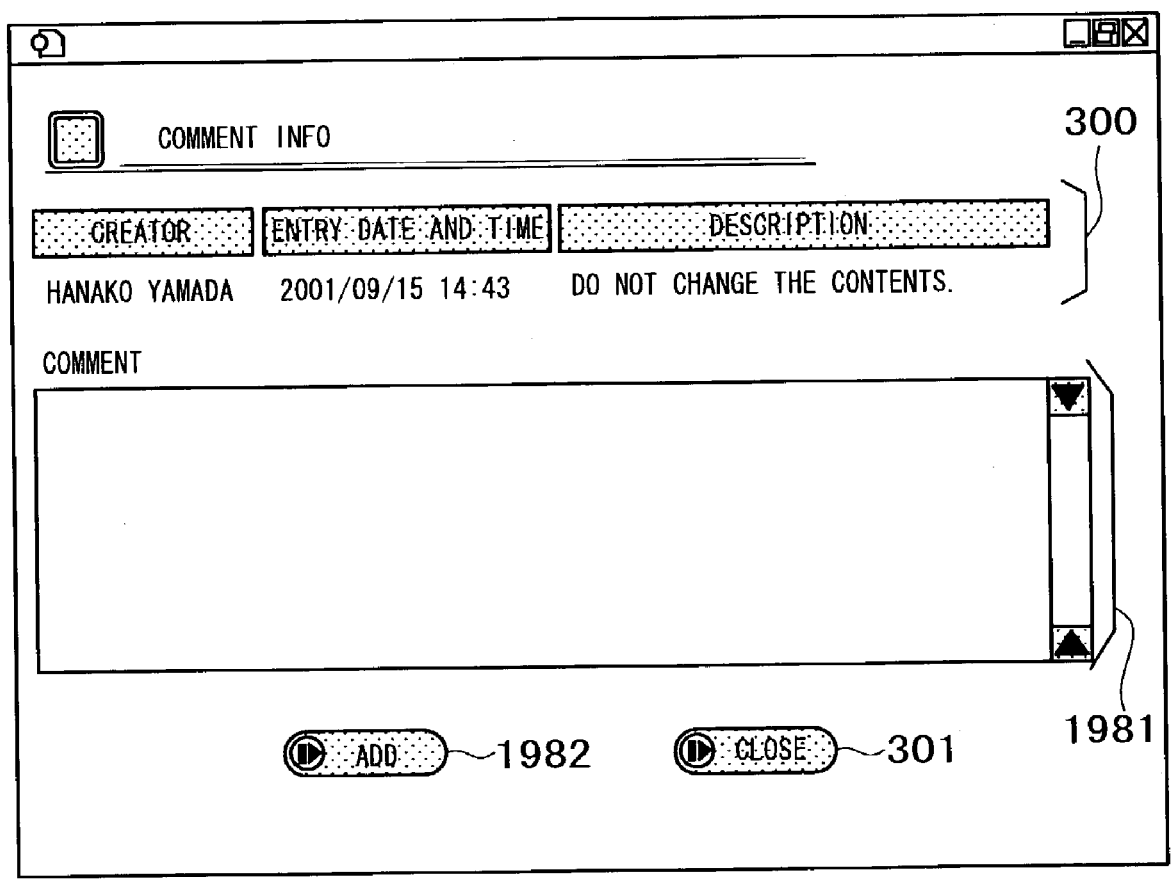
FIG. 36 is an explanatory diagram showing a still further screen appearing on the display unit of a terminal employed in the cut-list creation system implemented by the embodiment of the present invention.

If the comment update mark 770 appearing on the screen shown in FIG. 13 is selected by typically clicking the mouse of the terminal 2352, an update-comment-data screen shown in FIG. 36 and used for adding a comment is displayed.

As shown in FIG. 36, the update-comment-data screen includes a comment display portion 300, an added-comment-setting portion 1981, an Add button 1982 and a Close button 301. The comment display portion 300 shows a history of comments. The added-comment-setting portion 1981 is used for setting a new comment to be added to the comment display portion 300. The Add button 1982 is selected to carry out a process to add the new comment to the comment display portion 300. The Close button 301 is selected to close the referenced-comment-data screen.

As described above, a new comment can be added to the comment display portion 300, each row of which comprises a creator, an entry date and time and a description. The creator is the name of a user pertaining to the terminal 2352. The user is a person creating the comment. The entry date and time is a date and a time on and at which the comment was created. It is to be noted that a comment update mark 770 appearing on other screens has the same function as the comment update mark 770 selected for displaying the update-comment-data screen.

3-5: Project-Management Screen and Its Relevant Screens

Only a management terminal 2352 is capable of displaying a project-management screen and making an access to the project-management screen typically by selecting a project-management item appearing on the directory group 780 of any screen. From the project-management screen, screens linked to the project-management screen and used for managing an entire group 2354 can be displayed. The screens linked to the project-management screen include a group-setting screen, a circulation-route screen and an announcement-management screen. The group-setting screen is a screen used for granting an access right to a group 2354. The circulation-route screen is a screen used in an approval circulation. The announcement-management screen is a window displayed on a project-top screen.

First of all, the project-management screen is explained by referring to FIG. 11. As shown in FIG. 11, the project-management screen includes a group list 950. The group list 950 is a table of groups 2354 to which the management terminal 2352 pertains.

Each row of the group list 950 comprises the name of a group, an accessing terminal, an access group, a circulation route and an announcement-management item, any of which can be selected for the purpose of setting various kinds of data. The accessing terminal is a terminal 2352 carrying out operations including an addition of a terminal 2352.

3-5-1: Access-group Screen

Figure 37:
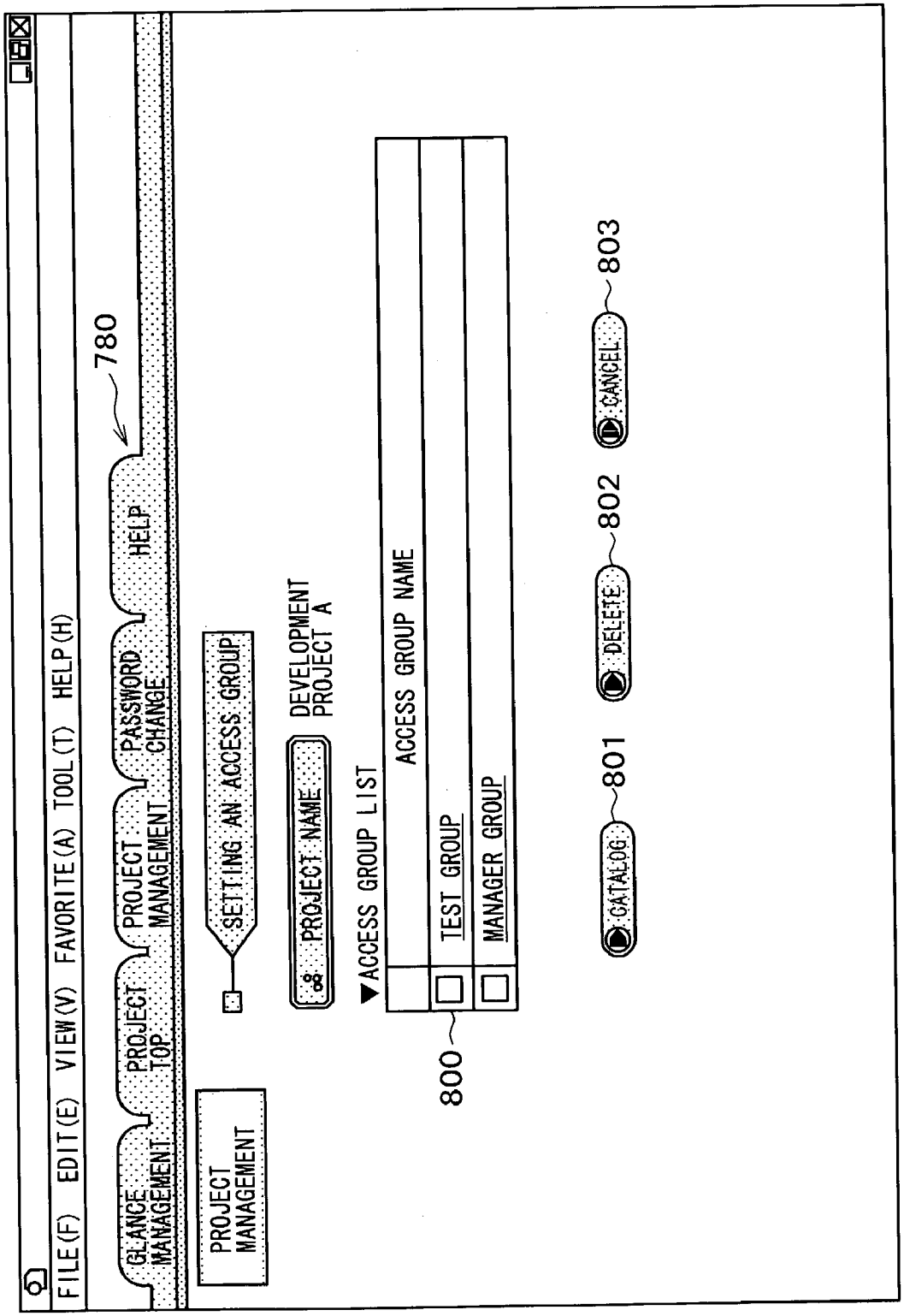
FIG. 37 is an explanatory diagram showing a still further screen appearing on the display unit of a terminal employed in the cut-list creation system implemented by the embodiment of the present invention.

An access-group screen shown in FIG. 37 is displayed when an access group appearing on a row of the group list 950 appearing on the screen shown in FIG. 11 is selected. The access-group screen shows a list of groups 2354 each having rights of accesses to a group 2354 to which this terminal 2352 pertains.

As shown in FIG. 37, the access-group screen includes an access-group list 800, a Catalog button 801, a Delete button 802 and a Cancel button 803. The Catalog button 801 is selected to catalog a new access group 2354 on the access-group list 800. The Delete button 802 is selected to delete a group 2354, which is selected among those on the access-group list 800, from the access-group list 800.

If the Catalog button 801 appearing on the screen shown in FIG. 37 is selected, a new-group-cataloging screen shown in FIG. 38 is displayed. As shown in FIG. 38, the new-group-cataloging screen comprises a group-name-inputting portion 830 and a cataloged-user portion 831, which is a table of users. Each row of the cataloged-user portion 831 includes a check box 769 and the name of a user to be cataloged as a user pertaining to a group 2354 newly entered to the group-name-inputting portion 830. If a check box 769 is selected, a user whose name is listed on the same row as the selected check box 769 is cataloged as a user of a terminal 2352 pertaining to a group 2354 newly entered to the group-name-inputting portion 830.

3-5-2: Circulation-Route Screen

Figure 39:
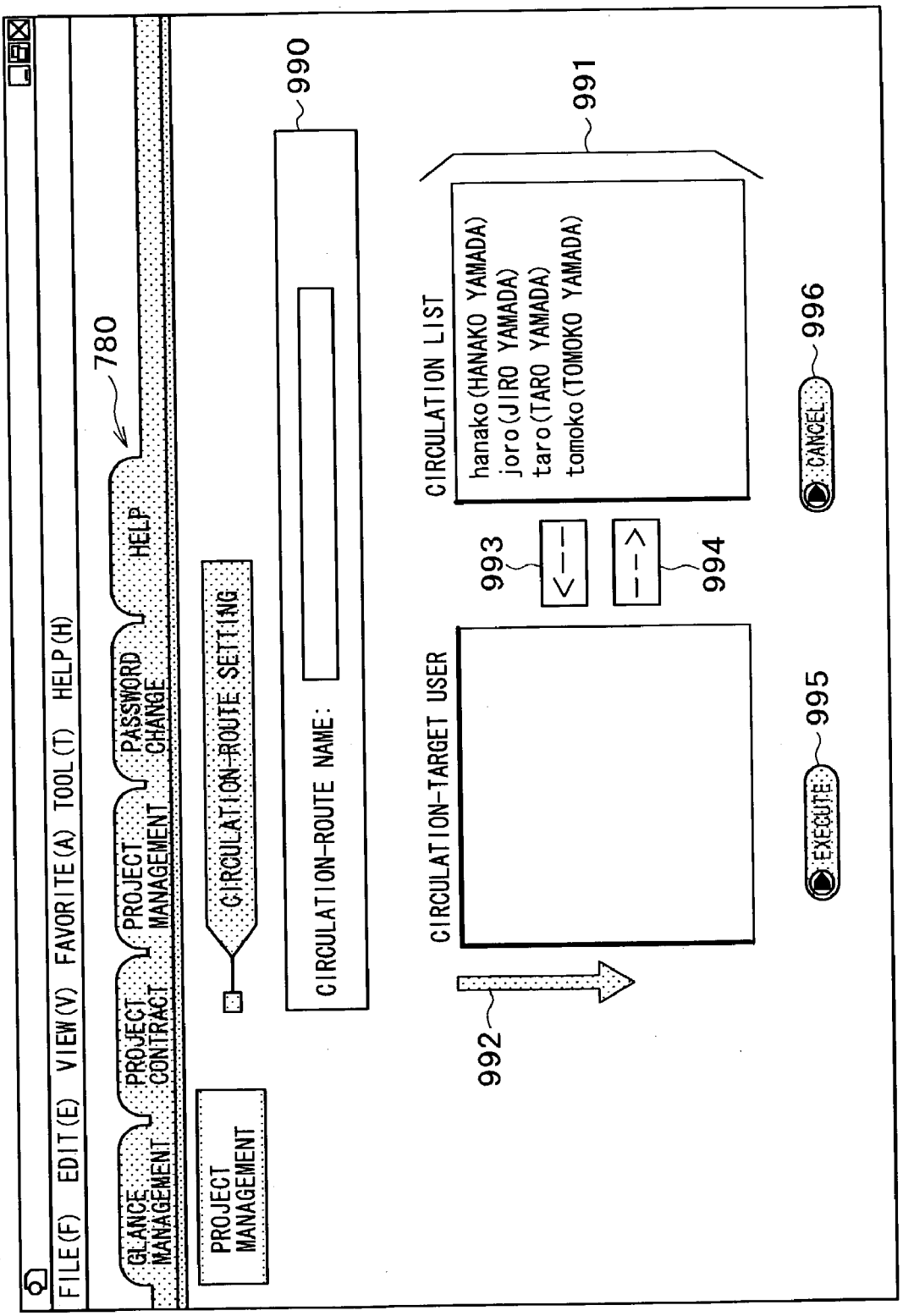
FIG. 39 is an explanatory diagram showing a still further screen appearing on the display unit of a terminal employed in the cut-list creation system implemented by the embodiment of the present invention.

Next, a circulation-route screen is explained by referring to FIG. 39. The circulation-route screen is a screen used for setting a circulation route showing a circulation order of users utilizing terminals 2352 each serving as a circulation target of a requested approval circulation.

As shown in FIG. 39, the circulation-route screen comprises a name-cataloging portion 990 and a route-setting portion 991 showing a list of users utilizing terminals 2352 and a circulation order of users utilizing terminals 2352 each serving as a circulation target of a requested approval circulation.

When a user in the circulation list displayed in the route-setting portion 991 and a button 993 are selected, the selected user is moved to the circulation-target user box. A user in the circulation list and the button 993 are selected repeatedly to construct the list of circulation-target user. An operation to click an Execute button 995 sets an approval route of circulation according to the constructed list of circulation-target user utilizing terminals 2352 each serving as a circulation target of the approval circulation. The direction of the circulation order is indicated by an arrow 992. That is to say, the lower the position of a user in the list of the circulation-target user, the later the turn of a terminal 2352 utilized by the user.

3-5-3: Announcement-Management Screen

Figure 40:
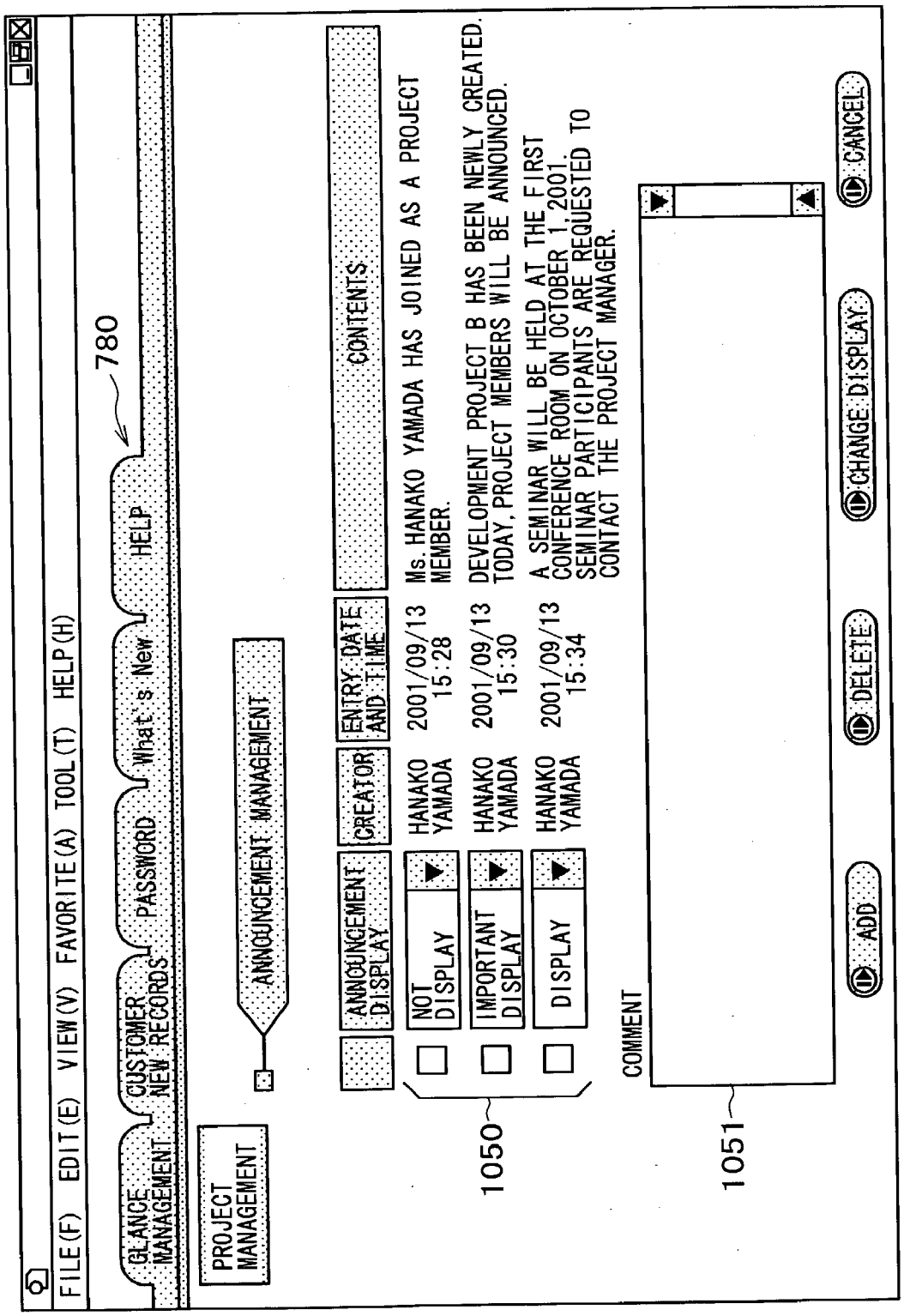
FIG. 40 is an explanatory diagram showing a still further screen appearing on the display unit of a terminal employed in the cut-list creation system implemented by the embodiment of the present invention.

As shown in FIG. 40, an announcement-management screen includes a switch portion 1050 and a comment-setting portion 1051. The switch portion 1050 is used for changing a way of displaying an announcement on an announcement display window. The comment-setting portion 1051 is used for writing a new announcement to be cataloged.

As shown in FIG. 40, each row of the switch portion 1050 includes an announcement display and a check box 769 for confirming a selected way of displaying an announcement on an announcement display window. The announcement display shows a selected way of displaying an announcement on an announcement display window. Ways of displaying an announcement on an announcement display window include 'Not display', 'Important display' and 'Display'.

3-6: Additional-Information Screen and Its Relevant Screens

The storage service system also provides the terminal 2352 with a cut-list creation screen and an encoding screen as additional functions. The cut-list screen is a screen used for creating a cut list while the encoding screen is a screen used for converting the format of a video content into another format. The cut-list creation screen and the encoding screen are described as follows.

3-6-1: Cut-List Creation Screen

Figure 41:
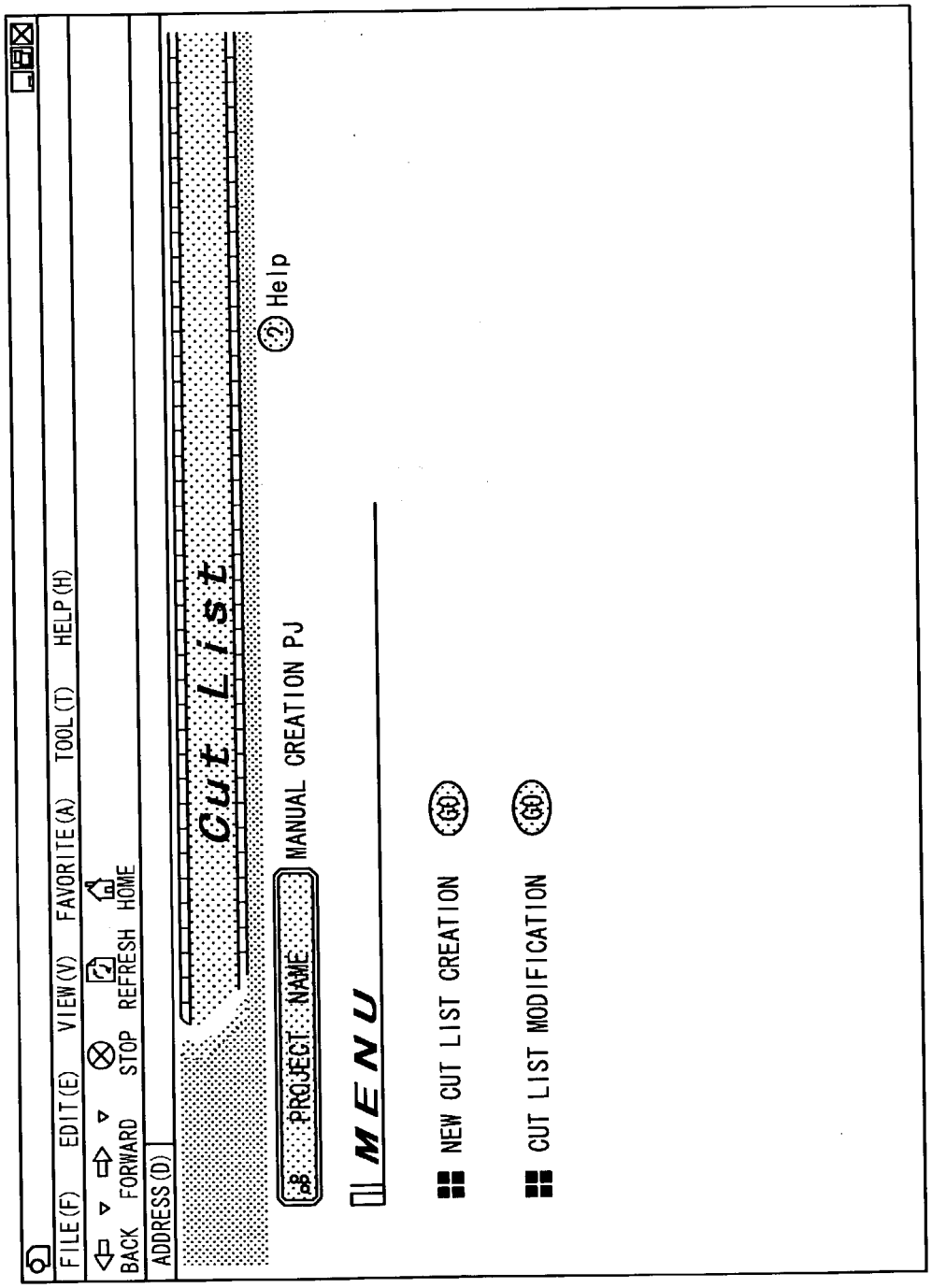
FIG. 41 is an explanatory diagram showing a still further screen appearing on the display unit of a terminal employed in the cut-list creation system implemented by the embodiment of the present invention.

First of all, the cut-list creation screen is described by referring to FIG. 41. The cut-list creation screen is a screen, which is displayed when a cut-list item appearing typically in the additional menu 795 shown in FIG. 10 is selected by typically clicking the mouse.

A GO button beside a phrase saying: 'New cut list creation' as shown in FIG. 41 is selected to create a new cut list. On the other hand, a GO button beside a phrase saying: 'Cut list modification' as shown in the same figure is selected to edit an already existing cut list.

3-6-1-1: New-Cut-List-Creation Screen

Figure 42:
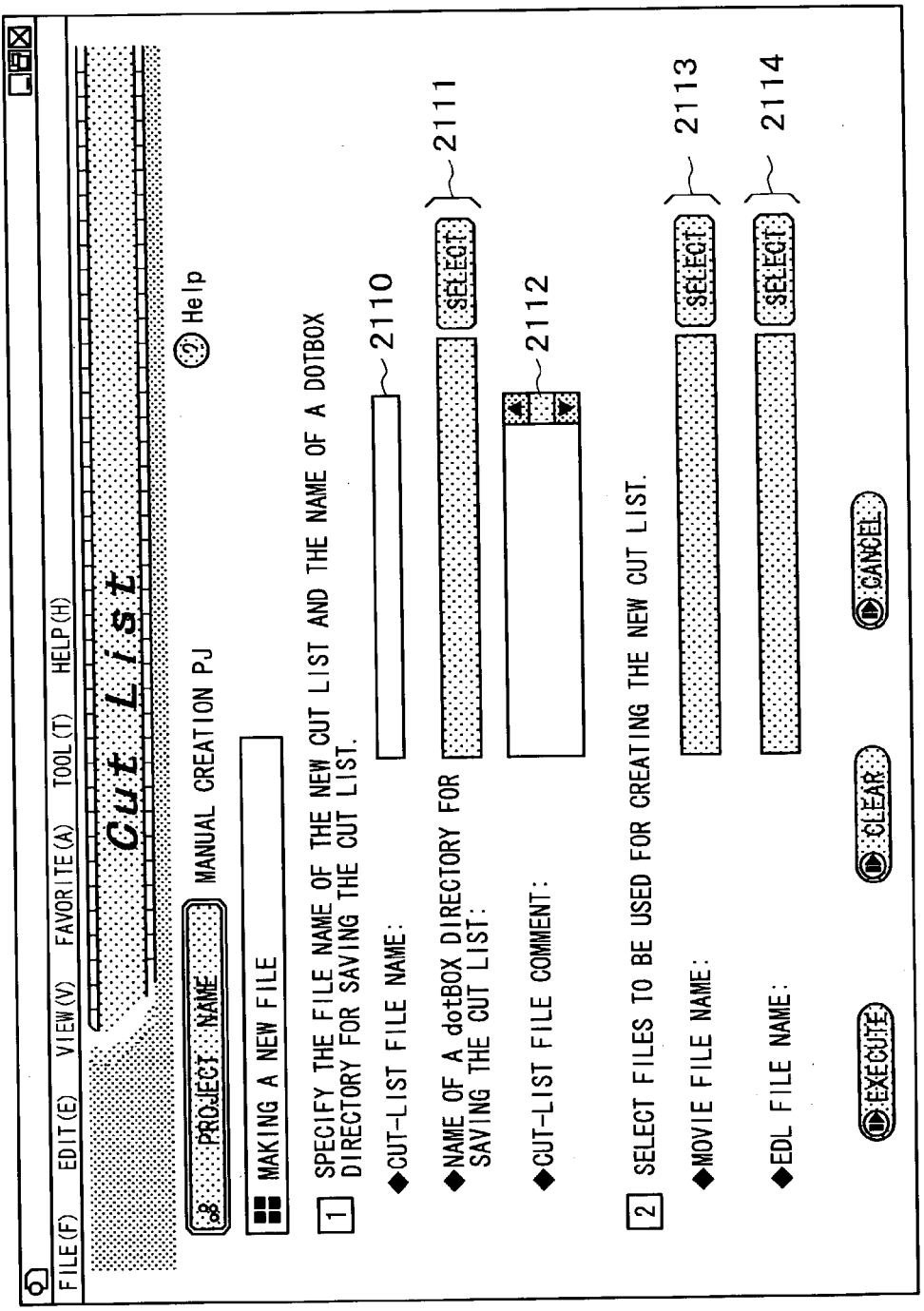
FIG. 42 is an explanatory diagram showing a still further screen appearing on the display unit of a terminal employed in the cut-list creation system implemented by the embodiment of the present invention.

Next, a cut-list-creation screen is explained by referring to FIG. 42. The cut-list-creation screen is displayed when the GO button shown in FIG. 41 beside the phrase saying: 'Cut-list creation' is selected.

As shown in FIG. 42, the cut-list-creation screen comprises a new-list portion 2110, a storage-setting portion 2111, a comment-setting portion 2112, a content-select portion 2113 and an edit select portion 2114. The new-list portion 2110 is used for setting the name of a file for a newly created cut list. The storage-setting portion 2111 is used for setting a directory for storing the file of a newly created cut list. The comment-setting portion 2112 is used for setting a comment to be affiliated with template data of a newly created cut list. The content-select portion 2113 is used for selecting a file containing a video content used for creation of a newly created cut list. The edit select portion 2114 is used for selecting an EDL (Edit Decision List) file data containing edit information data.

The file data selected by using the content-select portion 2113 of the screen shown in FIG. 42 is a file data absolutely required for the creation of a cut list. On the other hand, the file data selected by using the edit select portion 2114 of the screen shown in FIG. 42 is a file data containing necessary edit information data to be affiliated at a creation time of a video content.

3-6-1-2: Cut-List-Modification Screen

Figure 43:
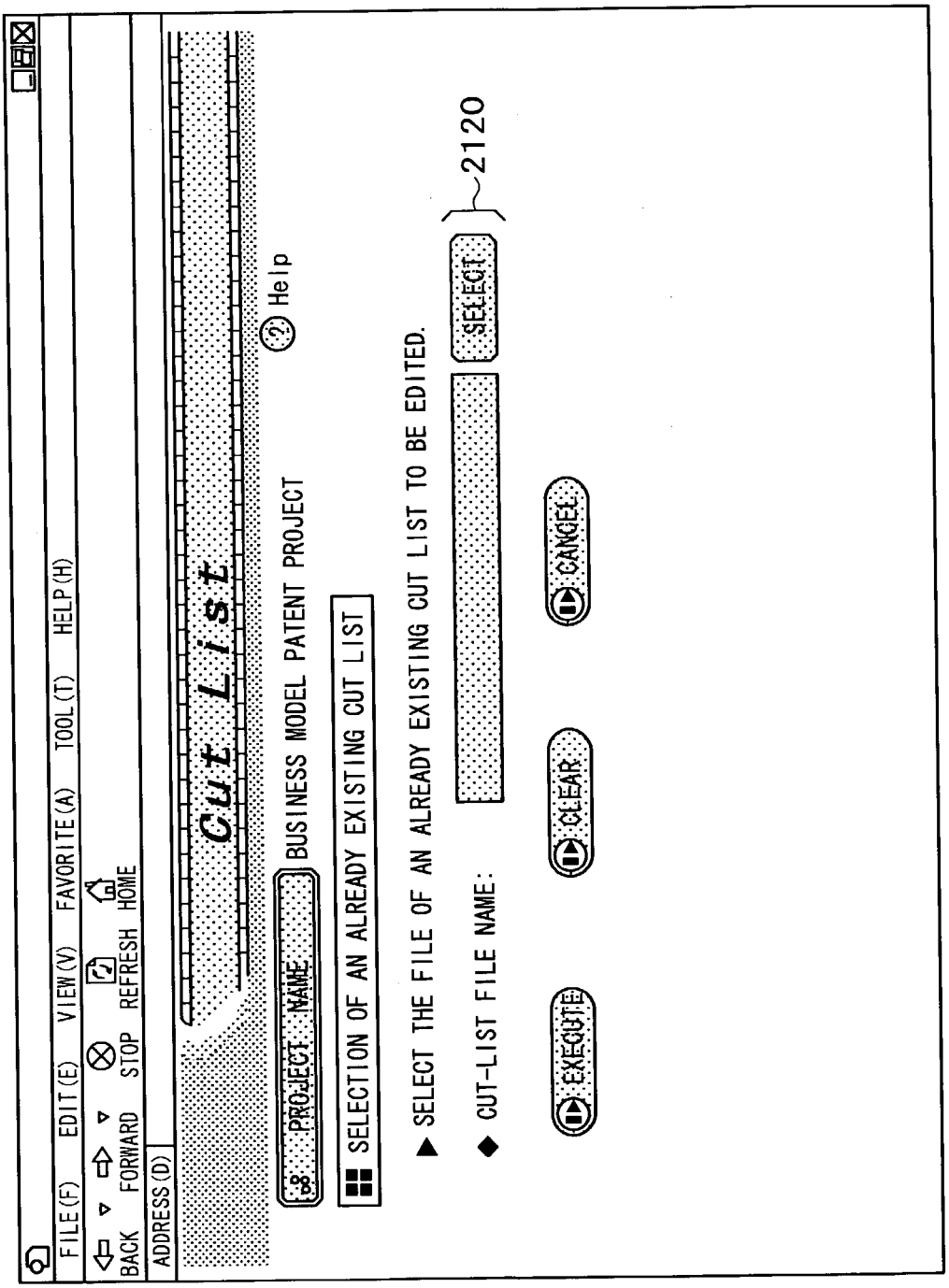
FIG. 43 is an explanatory diagram showing a still further screen appearing on the display unit of a terminal employed in the cut-list creation system implemented by the embodiment of the present invention.

Next, a cut-list-modification screen is explained by referring to FIG. 43. The cut-list-modification screen is displayed when the GO button shown in FIG. 41 beside the phrase saying: 'Cut-list modification' is selected.

As shown in FIG. 43, the cut-list-modification screen includes an edit-data select portion 2120 used for selecting stored template data of a cut list. A Select button of the edit-data select portion 2120 is used for selecting stored template data of a cut list.

3-6-1-3: Cut-List-Template-Data Screen

Figure 44:
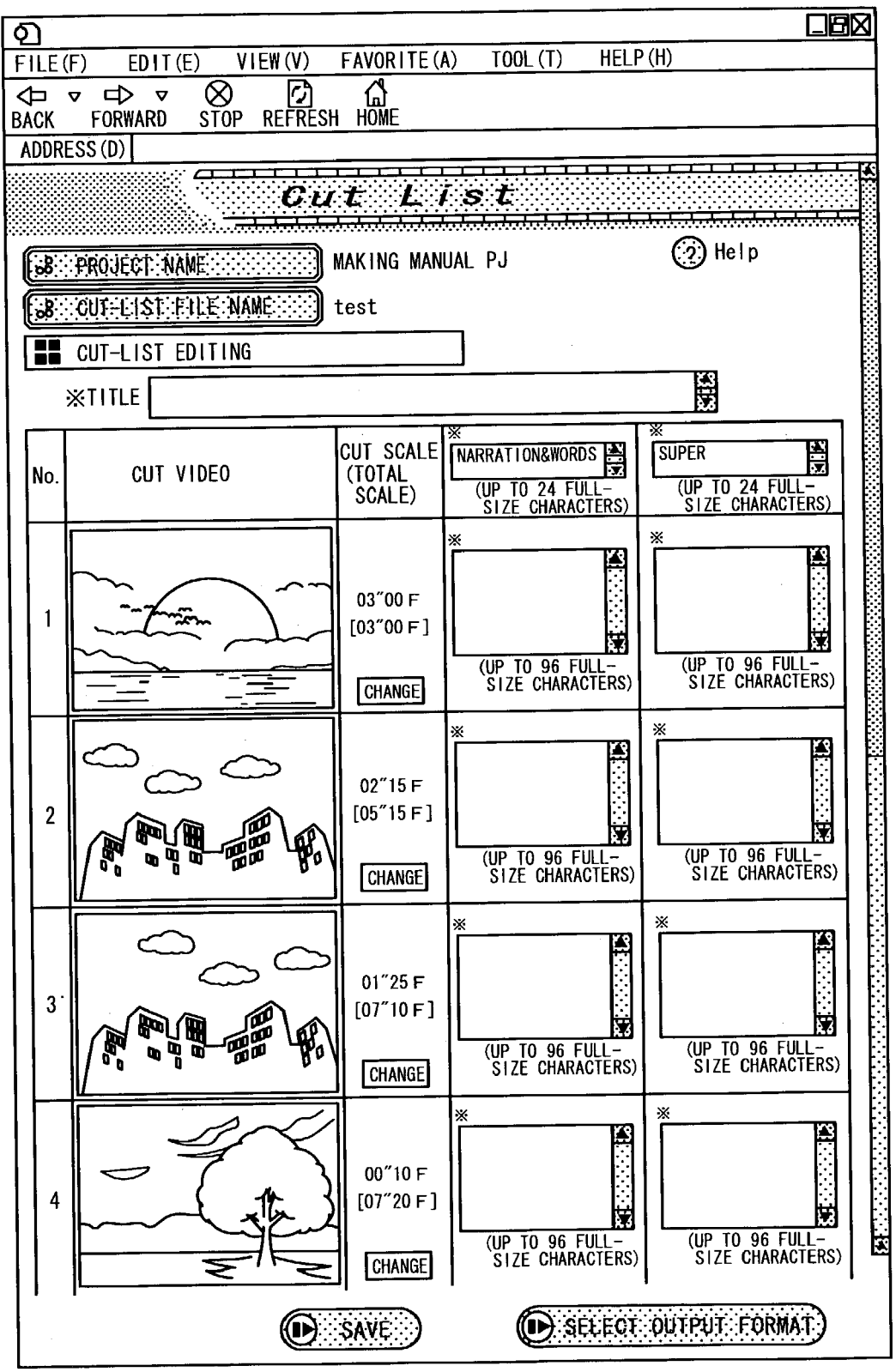
FIG. 44 is an explanatory diagram showing a still further screen appearing on the display unit of a terminal employed in the cut-list creation system implemented by the embodiment of the present invention.

Next, a cut-list-template-data screen is explained by referring to FIG. 44. The cut-list-template-data screen is a screen, which is displayed when an Execute button appearing on the cut-list-creation screen or the cut-list-modification screen is selected.

The cut-list-template-data screen shown in FIG. 44, is an edit screen used for editing a cut list. A cut number is assigned to each of scenes arranged along the time axis. Each scene is represented by a cut image picture and information affiliated with the representative picture. The affiliated information includes a narration and words. A Change button associated with a cut number assigned to a scene to be edited is selected in order to carry out various kinds of editing.

3-6-1-4: Cut-List-Template-Data-Edit-Select Screen

Figure 45:
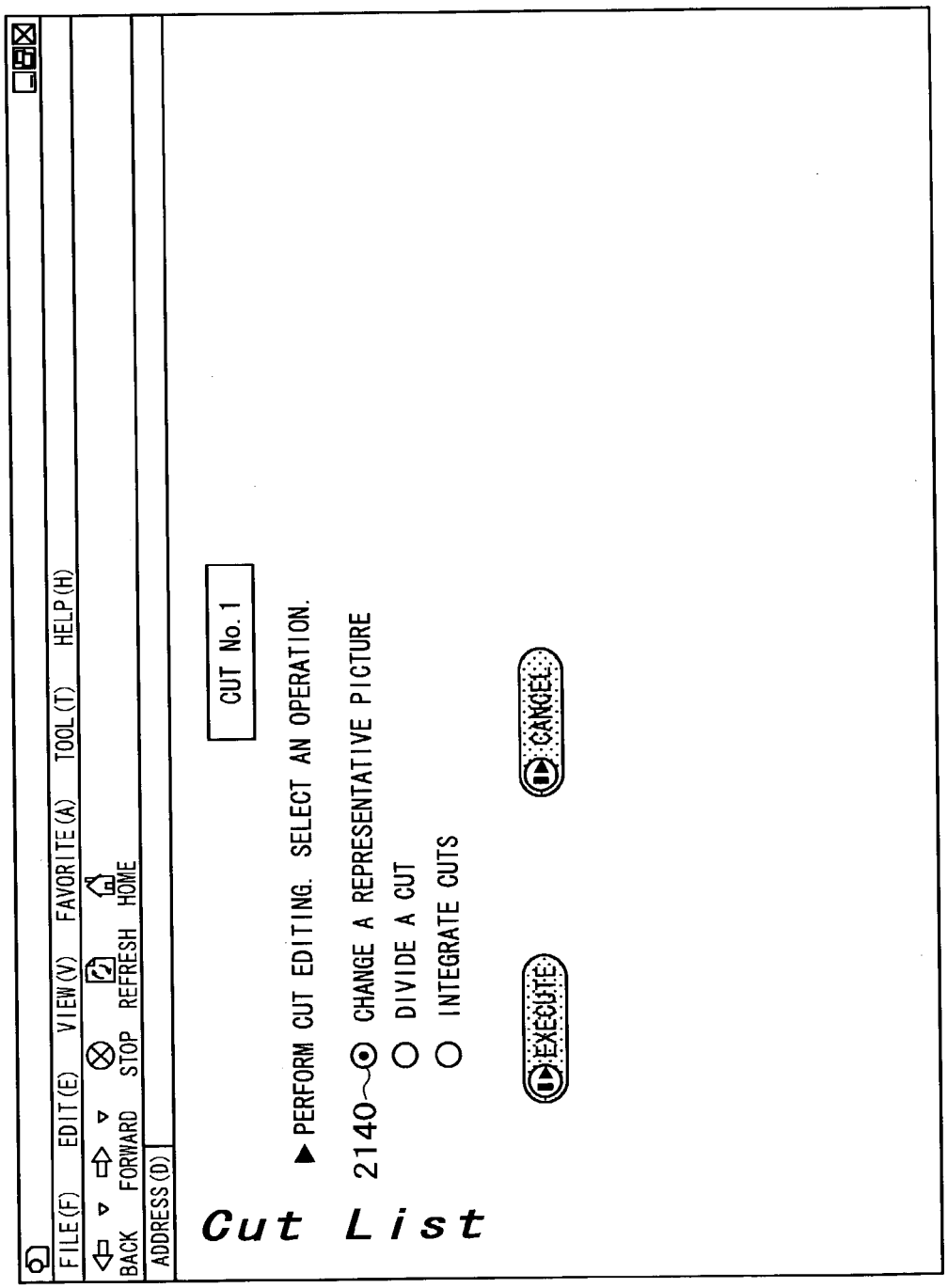
FIG. 45 is an explanatory diagram showing a still further screen appearing on the display unit of a terminal employed in the cut-list creation system implemented by the embodiment of the present invention.

Next, a cut-list-template-data-edit-select screen is explained by referring to FIG. 45. The cut-list-template-data-edit-select screen is displayed when a Change button provided for each scene on a cut-list-template-data screen shown in FIG. 44 is selected.

The cut-list-template-data-edit-select screen shown in FIG. 45 is an edit select screen used for selecting the type of editing work to edit a cut list. The cut-list-template-data-edit-select screen shows a selected cut number assigned to a scene to be edited. The types of editing work are 'Change a representative picture', 'Divide a cut' and 'Integrate cuts', which can each be selected by clicking a check box 2140 associated with a desired type of editing work. In addition, as an Execute button is selected typically by carrying out a clicking operation, one of various edit screens associated with the types of editing work is displayed. The various edit screens are explained as follows.

3-6-1-5: Cut-List-Template-Data-Integration-Editing Screen

Figure 46:
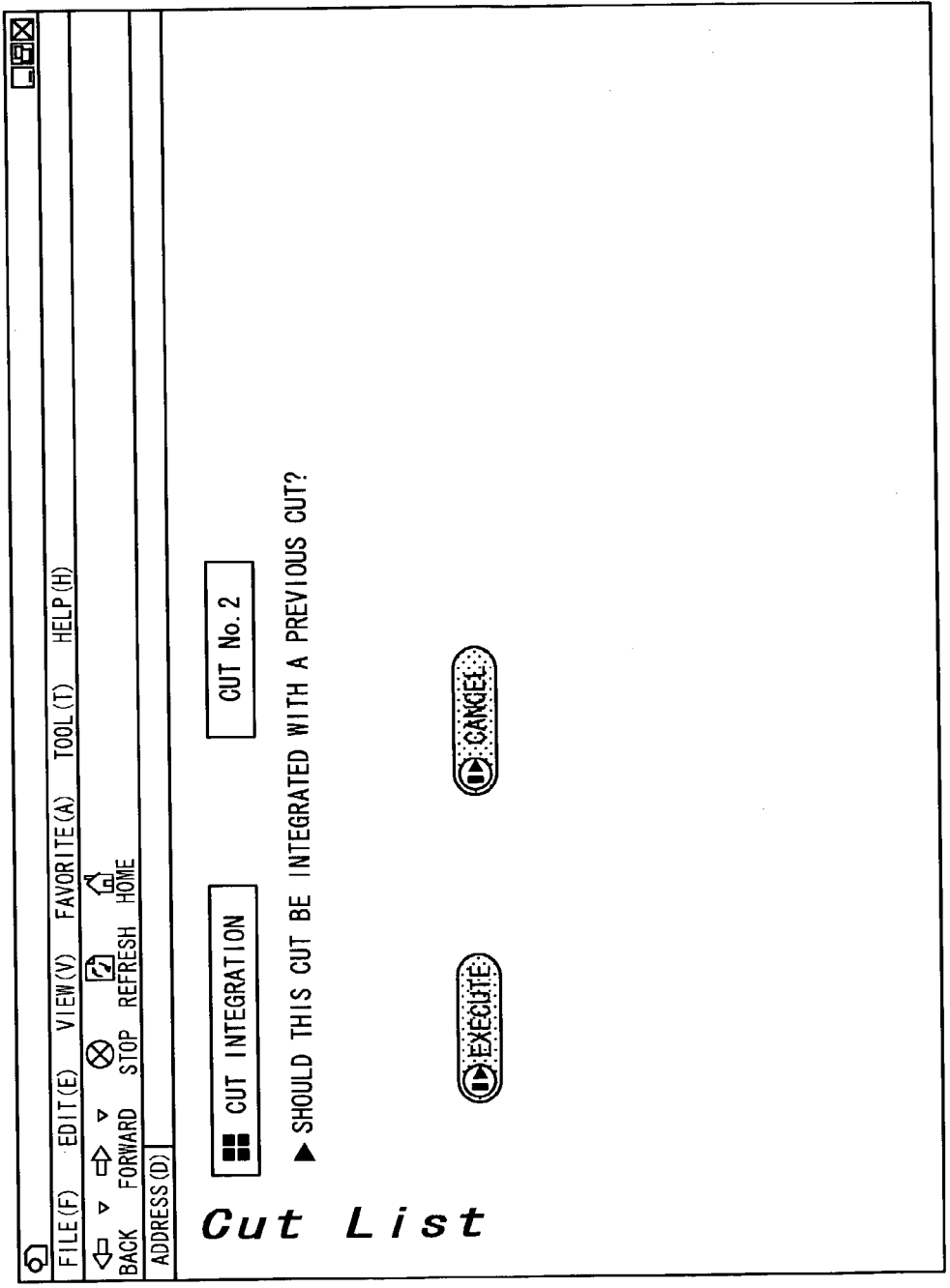
FIG. 46 is an explanatory diagram showing a still further screen appearing on the display unit of a terminal employed in the cut-list creation system implemented by the embodiment of the present invention.

Next, a cut-list-template-data-integration-editing screen is explained by referring to FIG. 46. The cut-list-template-data-integration-editing screen is displayed when the 'Integrate cuts' type of editing work appearing on the cut-list-template-data-edit-select screen shown in FIG. 45 is selected and then the Execute button appearing on the same cut-list-template-data-edit-select screen is selected typically by clicking the mouse.

The cut-list-template-data-integration-editing screen shown in FIG. 46 is an edit screen for concatenating a cut selected from a cut list with a cut selected immediately before. By a cut, a scene is implied. As an Execute button is selected typically by carrying out a clicking operation, a process to concatenate the cuts is performed.

3-6-1-6: Cut-List-Template-Data-Representative-Picture-Changing Screen

Figure 47:
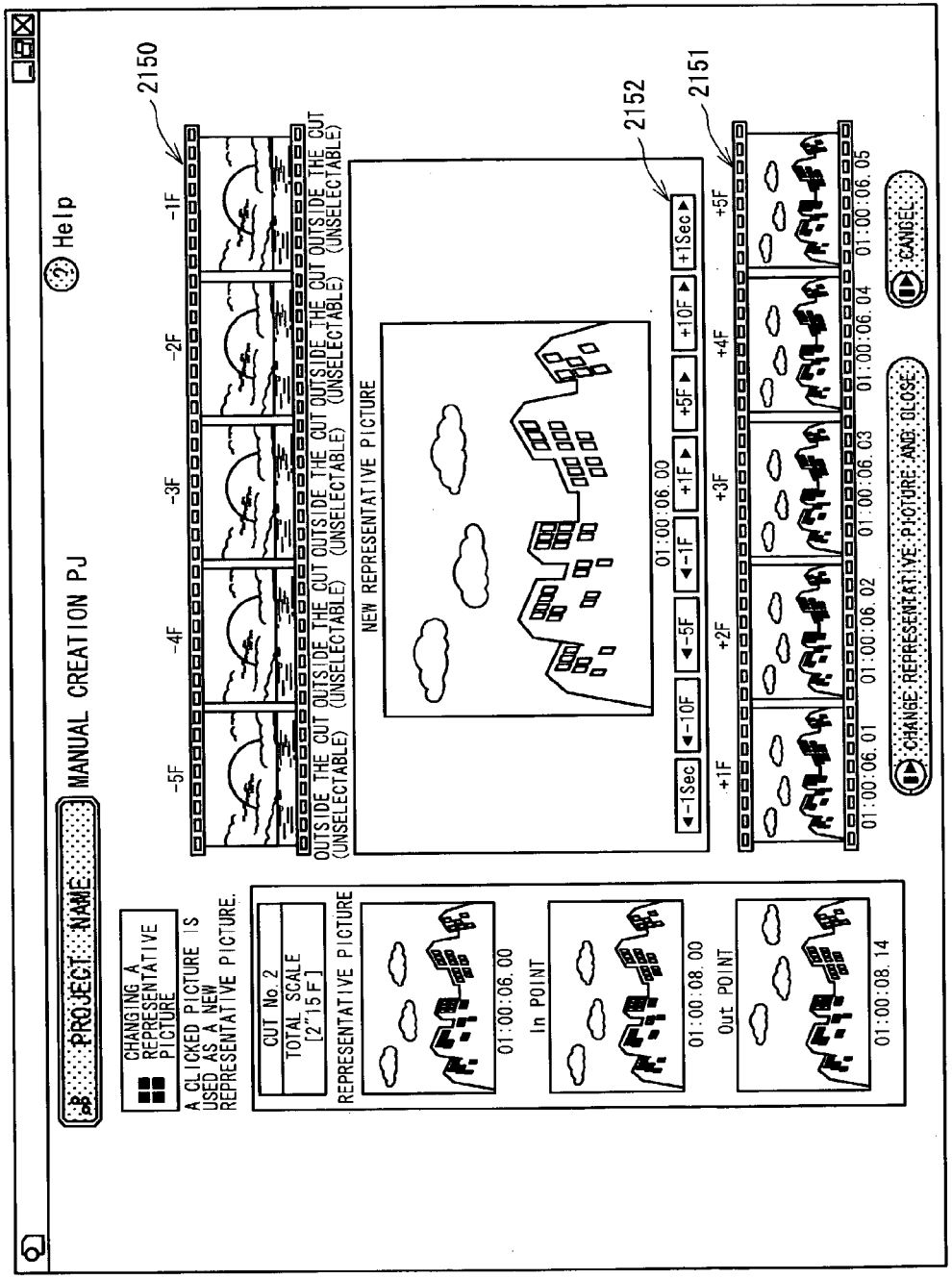
FIG. 47 is an explanatory diagram showing a still further screen appearing on the display unit of a terminal employed in the cut-list creation system implemented by the embodiment of the present invention.

Next, a cut-list-template-data-representative-picture-changing screen is explained by referring to FIG. 47. The cut-list-template-data-representative-changing screen is displayed when the 'Change a representative picture' type of editing work appearing on the cut-list-template-data-editselect screen shown in FIG. 45 is selected and then the Execute button appearing on the same cut-list-template-data-edit-select screen is selected typically by clicking the mouse.

The cut-list-template-data-representative-picture-changing screen shown in FIG. 47 is an edit screen for changing the representative picture of a selected scene (or selected cut) of the cut list to another picture in the same scene. A representative picture appearing on the left-hand side of the cut-list-template-data-representative-picture-changing screen is a current representative picture to be changed. A new representative picture appearing in the middle of the cut-list-template-data-representative-picture-changing screen is a newly selected representative picture.

The new representative picture can be selected arbitrarily from a representative-picture select portion 2150 or 2151 of the screen shown in FIG. 47 typically by clicking the mouse. The representative-picture select portion 2150 or 2151 is a list of pictures of the same scene, which are arranged along the time axis.

If a desired picture does not exist in the representative-picture select portions 2150 and 2151, the scene or the cut can be scrolled in frame units in the forward or backward direction along the time axis by selecting a frame scroll button 2152. If a +10F button is selected, for example, the scene is scrolled in the forward direction by 10 frames and pictures obtained as a result of the scrolling are displayed in the representative-picture select portions 2150 and 2151. Nevertheless, a picture appearing in the representative-picture select portion 2150 or 2151 but marked with 'Outside the cut (Unselectable)' cannot be selected as the new representative picture.

If a 'Change representative picture and close' button is selected after a desired picture is selected and displayed as the new representative picture, the representative picture of the template data of the scene is replaced by the new representative picture.

3-6-1-7: Cut-List-Template-Data-Division-Edit Screen

Figure 48:
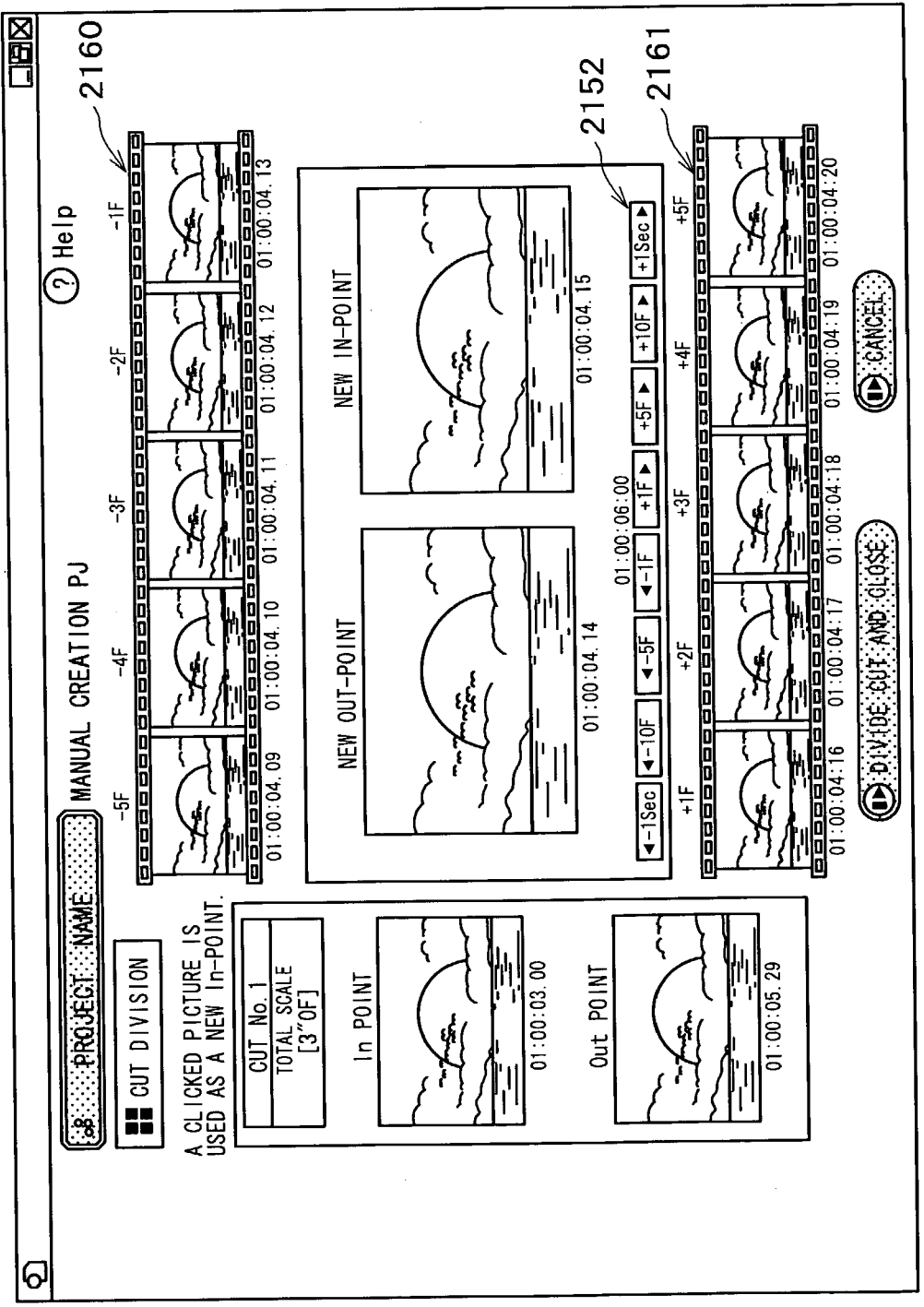
FIG. 48 is an explanatory diagram showing a still further screen appearing on the display unit of a terminal employed in the cut-list creation system implemented by the embodiment of the present invention.

Next, a cut-list-template-data-division-edit screen is explained by referring to FIG. 48. The cut-list-template-data-division-edit screen is displayed when the 'Divide a cut' type of editing work appearing on the cut-list-template-data-edit-select screen shown in FIG. 45 is selected and then the Execute button appearing on the same cut-list-template-data-edit-select screen is selected typically by clicking the mouse.

The cut-list-template-data-division-edit screen shown in FIG. 48 is an edit screen for dividing a selected scene of a cut list into 2 scenes (or cuts) at any arbitrary division location. A picture displayed as an in-point is a start picture of the selected scene. On the other hand, a picture displayed as an out-point is an end picture of the selected scene.

One of the two post-division scenes is a scene beginning with the in-point start picture and ending with a picture selected as a new out-point picture. On the other hand, the other post-division scene is a scene beginning with a new in-point picture immediately following the new out-point picture and ending with the out-point start picture.

A new out-point picture or a new in-point picture can be selected arbitrarily from a division select portion 2160 or 2161 typically by clicking the mouse. When a new out-point picture or a new in-point picture is selected as such, respectively, a new-out-point screen or a new-in-point screen is displayed. If a desired picture does not exist in the division select portions 2160 and 2161, the scene or the cut can be scrolled in frame units in the forward or backward direction along the time axis by selecting a frame scroll button 2152 as is the case with the cut-list-template-data-representative-picture-changing screen explained above.

When a 'Divide cut and close' button is selected after the desired pictures are displayed as a new out-point picture and a new in-point picture, a process to divide a selected cut into two cuts is carried out.

3-6-1-8: Cut-List-Output-Format Screen

It is possible to convert created template data into video-content inspection data to be output to a printing medium. A cut-list-output-format screen showing formats of video-content inspection data is explained by referring to FIG. 49 as follows.

Figure 49:
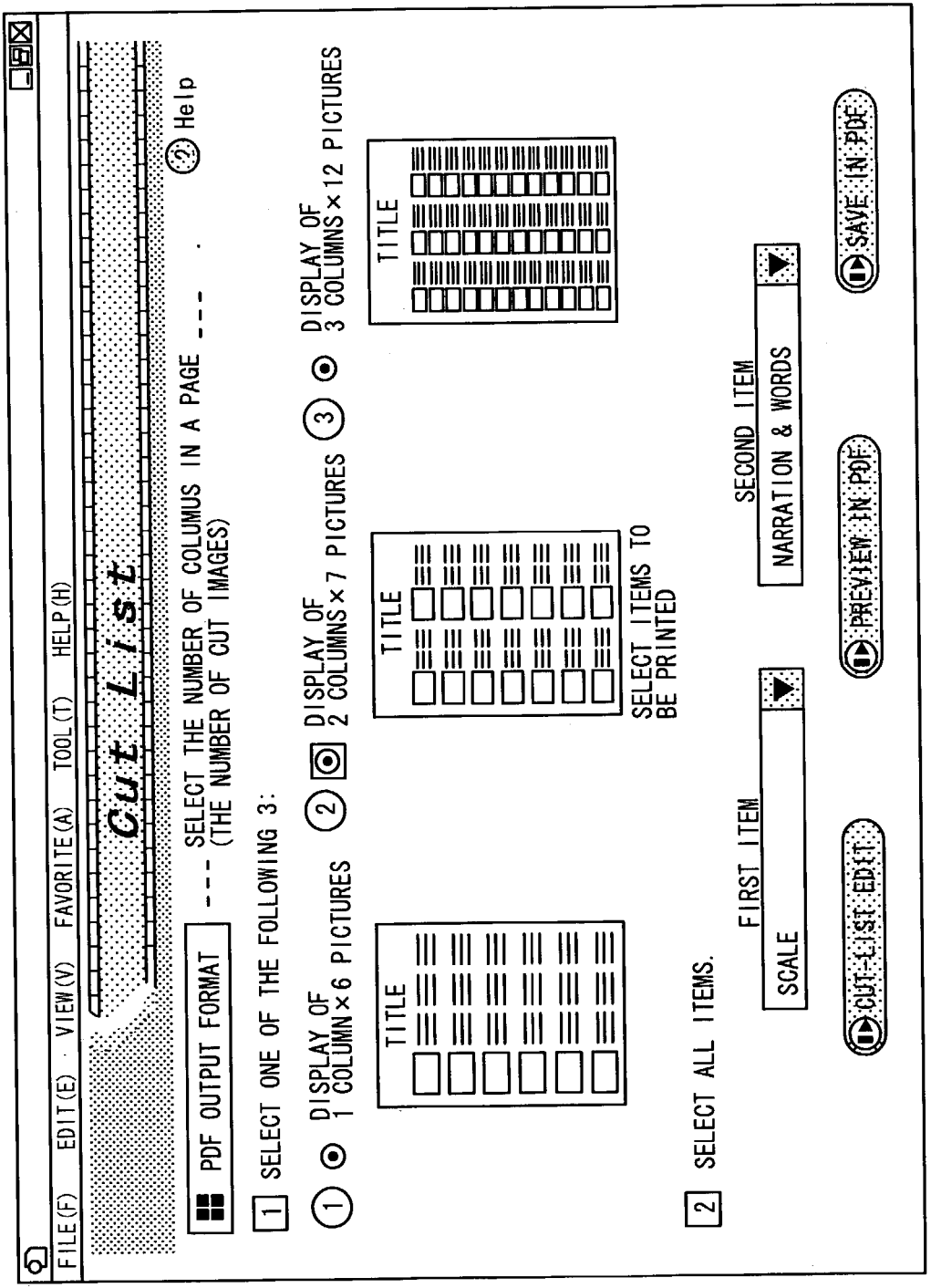
FIG. 49 is an explanatory diagram showing a still further screen appearing on the display unit of a terminal employed in the cut-list creation system implemented by the embodiment of the present invention.

The cut-list-output-format screen shown in FIG. 49 is a screen for selecting a layout of video-content inspection data from three different typical layouts of a cut and its attributes such as a narration on one page. The three layouts provided by this embodiment are a cut display of 1 column×6 pictures, a cut display of 2 columns×7 pictures and a cut display of 3 columns×12 pictures. Additional information such as a narration for the displayed layout is selected from first and second items. It is to be noted that the embodiment is not limited to the three layouts described above. Any layout such as a cut display of 5 columns×20 pictures is also possible.

3-6-1-9: Cut-List-Preview Screen

Next, by referring to FIG. 50, a cut-list-preview screen is explained. The cut-list-preview screen is a screen used for confirming the PDF (Portable Document Format) of video-content inspection data appearing on the display unit employed in the terminal 2352 before the data is output to the printing medium. The PDF is a result of conversion according to a layout selected by using the cut-list-output-format screen shown in FIG. 49 as described above.

The cut-list-preview screen is displayed when a 'Preview in PDF' button appearing on the cut-list-output-format screen shown in FIG. 49 is selected. As shown in FIG. 50, the cut-list-preview screen shows video-content inspection data in the PDF resulting from the conversion. In addition, the video-content inspection data can be output to the printing medium by selecting a button appearing on the cut-list-preview screen.

3-6-1-10: Cut-List-Saving Screen

Figure 51:
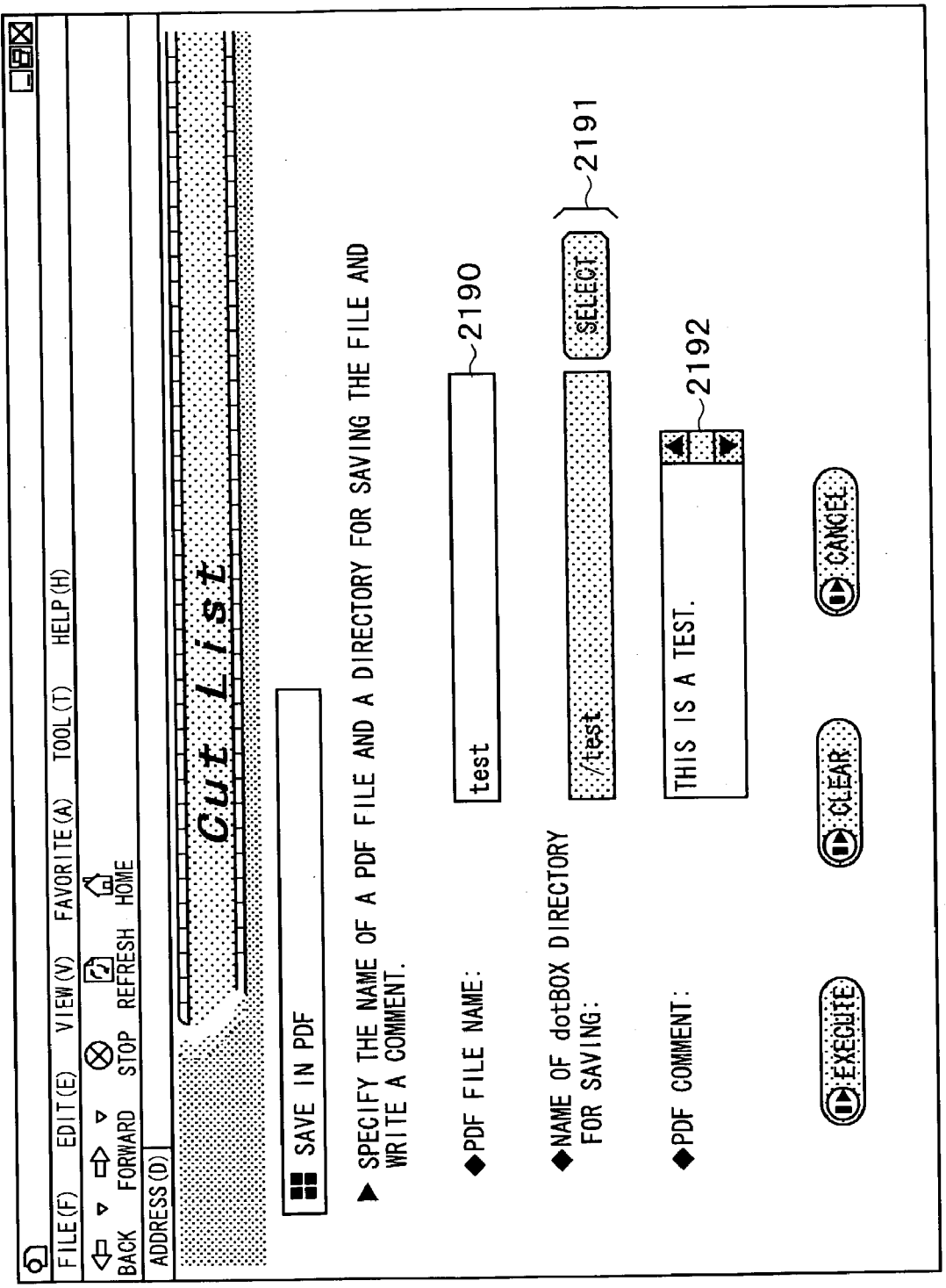
FIG. 51 is an explanatory diagram showing a still further screen appearing on the display unit of a terminal employed in the cut-list creation system implemented by the embodiment of the present invention.

Next, by referring to FIG. 51, a cut-list-saving screen is explained. The cut-list-saving screen is a screen used for saving video-content inspection data in the PDF into a storage area of the storage unit 2946, which is a storage area allocated to the terminal 2352. The PDF is a result of conversion according to a layout selected by using the cut-list-output-format screen shown in FIG. 49 as described above.

The cut-list-saving screen shown in FIG. 51 is displayed when a 'Save in PDF' button appearing on the cut-list-output-format screen shown in FIG. 49 is selected typically by clicking the mouse.

In order to store video-content inspection data into the storage unit 2946, the user needs to specify a name as a PDF file name 2190 and a name of a directory for accommodating a PDF file indicated by the PDF file name 2190 as a directory name 2191, as well as select an Execute button.

In addition, if a comment is described in a comment-setting portion 2192, the comment will also be saved as a comment affiliated with the video-content inspection data. As described above, in this embodiment, the format of video-content inspection data is converted into the PDF. It is to be noted, however, that the scope of the present invention is not limited to this embodiment. That is to say, the format of video-content inspection data can be converted into a format other than the PDF. For example, the format of video-content inspection data can be converted into an HTML (Hyper Text Markup Language) before the data is output.

3-7-1: Encoding Screen

First of all, an encoding screen for converting the format of a video content into another format is explained by referring to FIG. 52. The encoding screen is displayed when an encoding item appearing on an additional-menu portion 795 displayed on typically the screen shown in FIG. 10 is selected by clicking the mouse.

In order to make a request for new encoding, it is necessary to select a GO button displayed beside a phrase saying: "New encoding" as shown in FIG. 52. In addition, the encoding screen also shows a past history of video contents, for which an encoding order has been placed. Each row of the past history comprises a management number, a request date and time, a completion date and time, a source movie file, a saved file and a requester. The management number is a format-conversion number assigned to a video content, for which an encoding order has been placed. The column of the management number also includes encoding status. The source movie file is an original file subjected to format conversion. The saved file is the name of a file for storing a result of the format conversion.

3-7-1-1: New-Encoding Screen

Next, a new-encoding screen is explained by referring to FIG. 53. When the GO button displayed beside a phrase saying: "New encoding" on the screen shown in FIG. 52 is selected typically by clicking the mouse, the new-encoding screen is displayed.

As shown in FIG. 53, the new-encoding screen includes a new-encoding portion 2270 for placing an order for new encoding. An order for new encoding is placed by selecting a movie file to be used in the new encoding, entering the name of a post-encoding file, specifying a directory for saving the post-encoding file and selecting an encoding format. The movie file to be used in the new encoding is a file containing a video content, the format of which is to be converted in the new encoding into the encoding format. The post-encoding file is a file for storing a video content obtained as a result of the format conversion. The directory is a directory for accommodating the post-encoding file. The encoding format is a format, into which the format of the video content is to be converted. In this embodiment, the format, into which the format of the video content is to be converted, is a Quick Time format having a variable bit rate. It is to be noted, however, that the scope of the present invention is not limited to this embodiment. That is to say, the format of a video content can also be converted into another format such as an AVI (Audio Video Interleave) format or a digital video format.

3-7-1-2: Directory-Selection Screen

Figure 54:
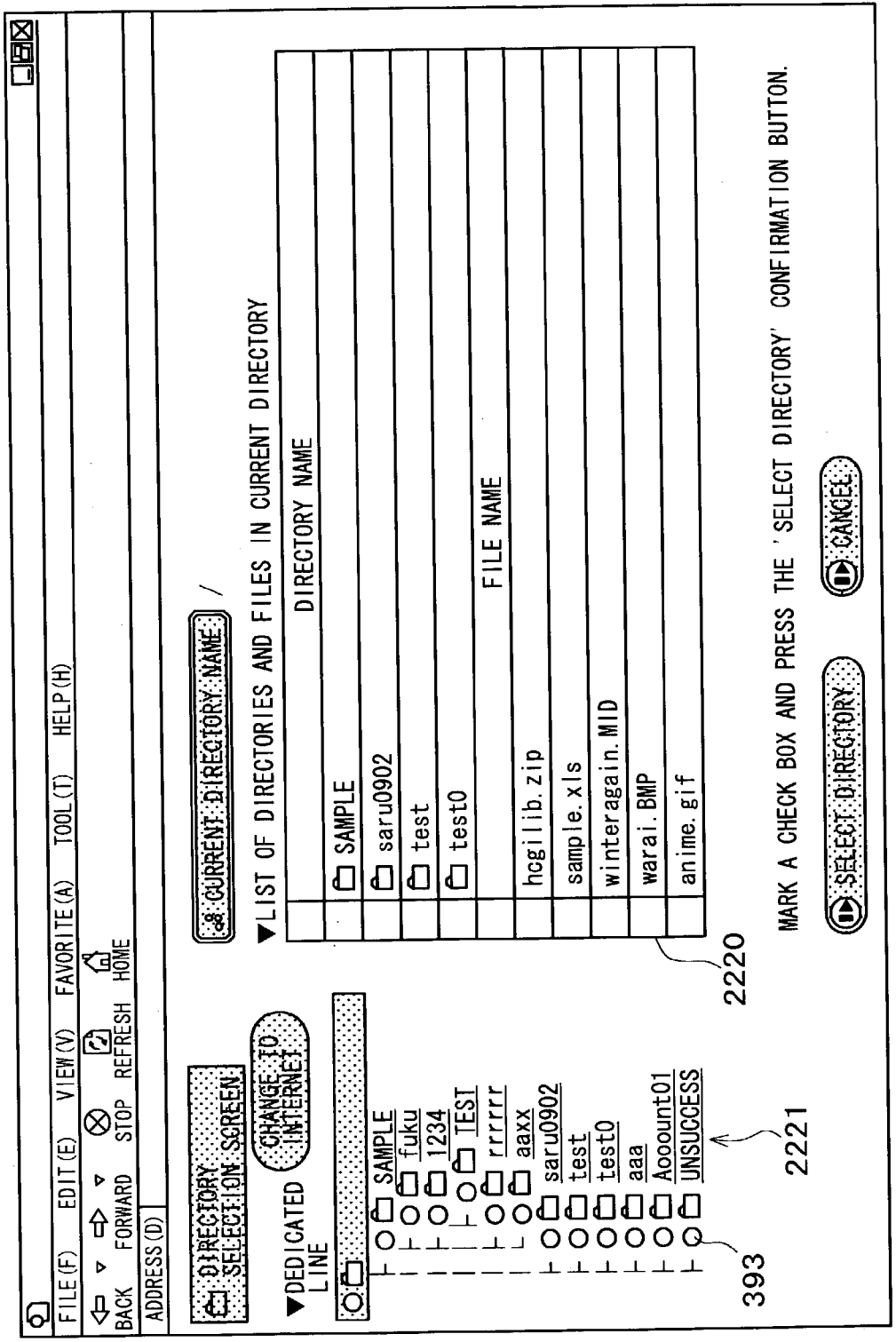
FIG. 54 is an explanatory diagram showing a still further screen appearing on the display unit of a terminal employed in the cut-list creation system implemented by the embodiment of the present invention.

Next, a directory-selection screen is explained by referring to FIG. 54. The directory-selection screen is displayed by selecting a Select button associated with a directory for accommodating a post-encoding file displayed on the new-encoding screen shown in FIG. 53 through typically an operation to click the mouse.

The directory-selection screen is a screen for selecting a directory for accommodating a post-encoding file containing a video content obtained as a result of format conversion. As shown in FIG. 54, the directory-selection screen includes a directory/file list 2220 and a directory-tree display portion 2221. The directory/file list 2220 is a list of directories and video-content-file data accommodated in the directories.

On the other hand, the directory-tree display portion 2221 shows a hierarchical tree structure of directories subordinate to the current directory. The directories subordinate to the current directory are stored in a storage area of the storage unit 2946, which is a storage area assigned to the terminal 2352. In the directory-tree display portion 2221, the current directory, which is a directory specified by the terminal 2352, is a directory shown in a shaded area.

The directory/file list 2220 is a list of subdirectories directly subordinate to a directory specified in the directory-tree display portion 2221, and video-content-file data accommodated in the subdirectories.

When a directory is selected in the directory-tree display portion 2221 by specifying a check mark 393 through typically an operation to click the mouse and a 'Select directory' button is selected, the directory for accommodating a post-encoding file, which is a directory described by referring to the new-encoding screen shown in FIG. 53, is cataloged on the new-encoding screen as a selected directory.

3-7-1-3: File-Selection Screen

Figure 55:
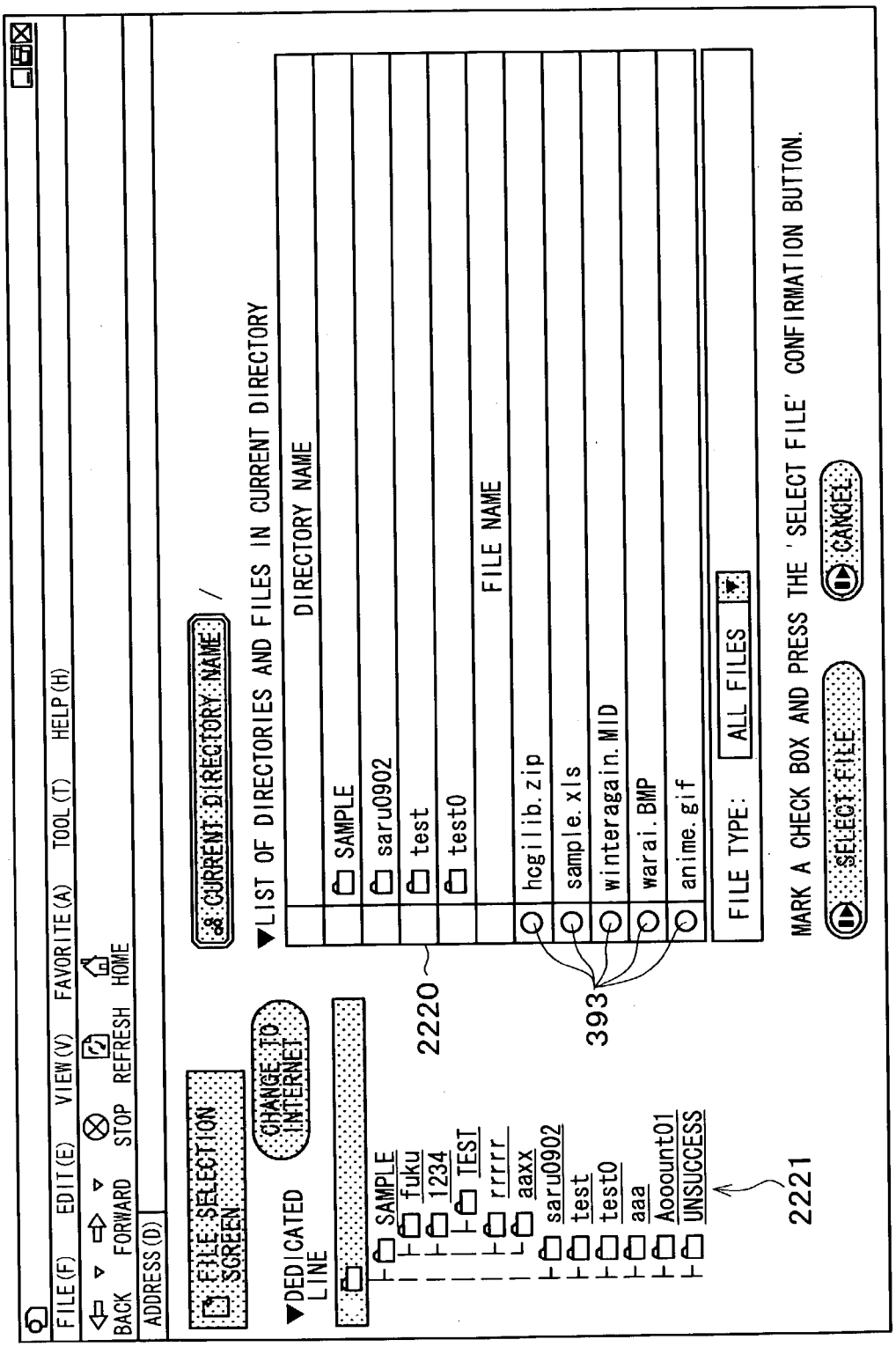
FIG. 55 is an explanatory diagram showing a still further screen appearing on the display unit of a terminal employed in the cut-list creation system implemented by the embodiment of the present invention.

Next, a file-selection screen is explained by referring to FIG. 55. The file-selection screen is displayed by selecting a Select button associated with a movie file to be subjected to new encoding as shown on the new-encoding screen of FIG. 53 through typically an operation to click the mouse.

The file-selection screen is a screen for selecting a file containing a video content to be subjected to format conversion. As shown in FIG. 55, the-file-selection screen includes a directory/file list 2220 and a directory-tree display portion 2221. The directory/file list 2220 is a list of directories and video-content-file data accommodated in the directories.

On the other hand, the directory-tree display portion 2221 shows a hierarchical tree structure of directories subordinate to the current directory. The directories subordinate to the current directory are stored in a storage area of the storage unit 2946, which is a storage area assigned to the terminal 2352. In the directory-tree display portion 2221, the current directory, which is a directory specified by the terminal 2352, is a directory shown in a shaded area.

The directory/file list 2220 is a list of subdirectories directly subordinate to a directory specified in the directory-tree display portion 2221, and video-content-file data accommodated in the subdirectories. When a video-content-file data is selected in the directory/file list 2220 by specifying a check mark 393 through typically an operation to click the mouse and a 'Select file' button is selected, the video-content-file data, which is the movie file described by referring to the new-encoding screen shown in FIG. 53, is cataloged on the new-encoding screen as a selected movie file to be subjected to format conversion.

3-7-1-4: Encoding-Start Screen

Next, an encoding-start screen is explained by referring to FIG. 56. The encoding-start screen is displayed when the required items have been cataloged on the new-encoding screen shown in FIG. 53 and an Execute button appearing on the new-encoding screen shown in FIG. 53 is selected by typically clicking the mouse.

The encoding-start screen is a screen for indicating that a new order has been cataloged and the encoding has been started. As shown in FIG. 56, the encoding-start screen includes a management table 2280, which is a table of cataloged orders.

An electronic mail containing information indicating that the encoding has been started is transmitted to the terminal 2352 with the same timing as the operation to display the encoding start screen.

3-7-1-5: Encoding-Change Screen

Next, an encoding-change screen is explained by referring to FIG. 57. The encoding-change screen is displayed when a management number appearing on the management-number column of the encoding screen shown in FIG. 52 is selected by typically clicking the mouse. It is to be noted that the encoding-change screen can be displayed only while an encoding process is going on.

The encoding-change screen is a screen for changing the contents of a cataloged order. As shown in FIG. 57, the encoding-change screen includes a change management table 2260 showing the contents of each cataloged order.

The change management table 2260 shows a movie file to be used, a post-encoding file name, a saving directory and an encoding format, into which the format of video data contained in the movie file is being converted. The contents of the cataloged order can be modified as follows. By selecting a Select button associated with the movie file to be used through an operation to click the mouse, the movie file can be changed to another file. By the same token, by selecting a Select button associated with the saving directory through an operation to click the mouse, the saving directory can be changed to another directory. The post-encoding file can be changed by entering another file name. The encoding format can be changed by selecting another format.

As a Change button is selected after the new contents of the cataloged order are set in a change management portion 2260, the new contents of an order are changed. Then, the new contents of the order are reported to the terminal 2352 making a request for the changes by transmitting an e-mail to the terminal 2352.

3-7-1-6: Change-Completion Screen

Figure 58:
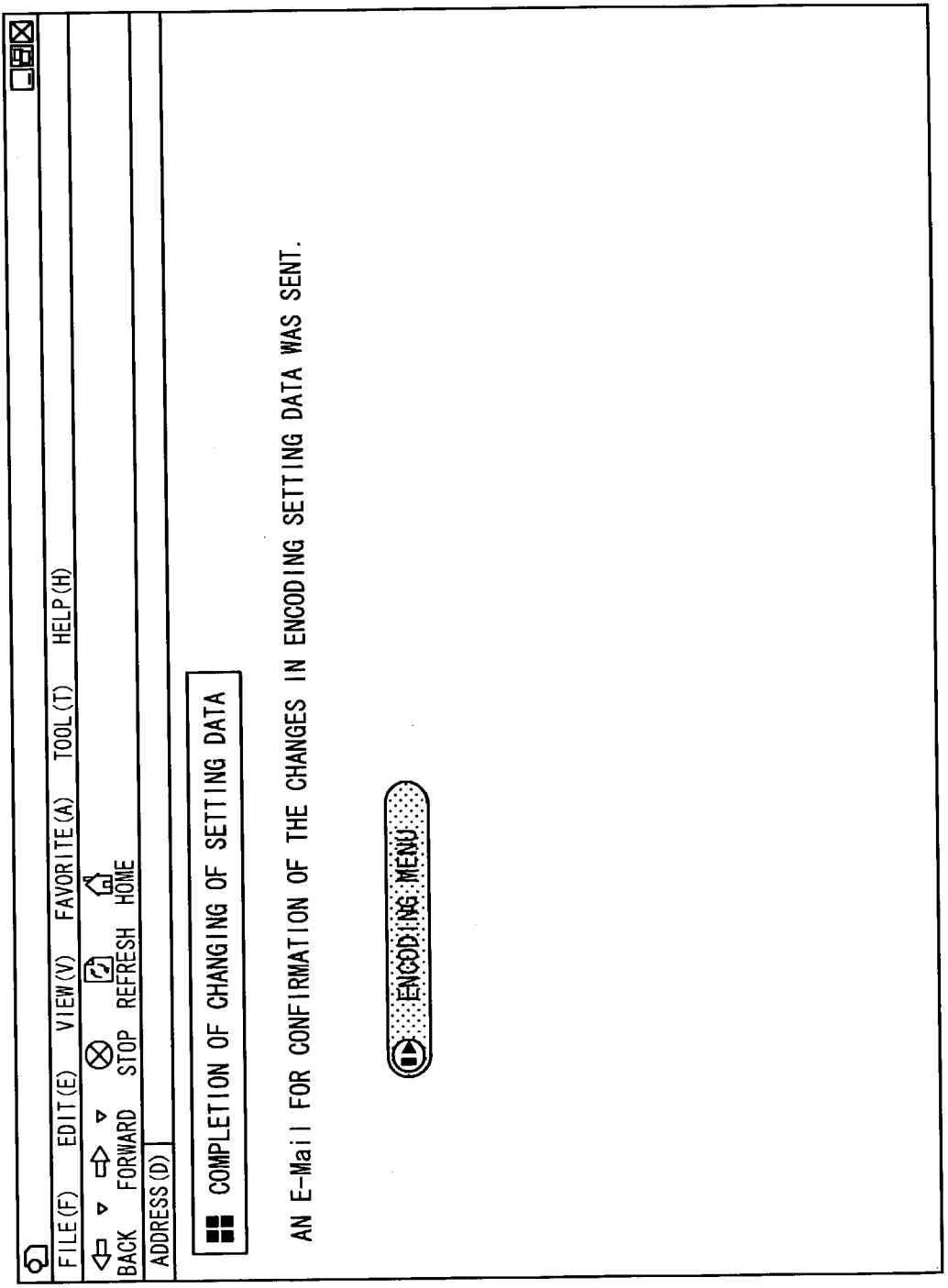
FIG. 58 is an explanatory diagram showing a still further screen appearing on the display unit of a terminal employed in the cut-list creation system implemented by the embodiment of the present invention.

Next, a change-completion screen is explained by referring to FIG. 58. The change-completion screen is displayed when the Change button appearing on the encoding-change screen shown in FIG. 57 is selected by typically clicking the mouse.

The change-completion screen shown in FIG. 58 is a screen showing that an operation to set changes in order contents has been completed. An electronic mail containing information on the changes in order contents is transmitted to the terminal 2352 with the same timing as the operation to display the change-completion screen.

3-7-1-7: Cancel-Completion Screen

Figure 59:
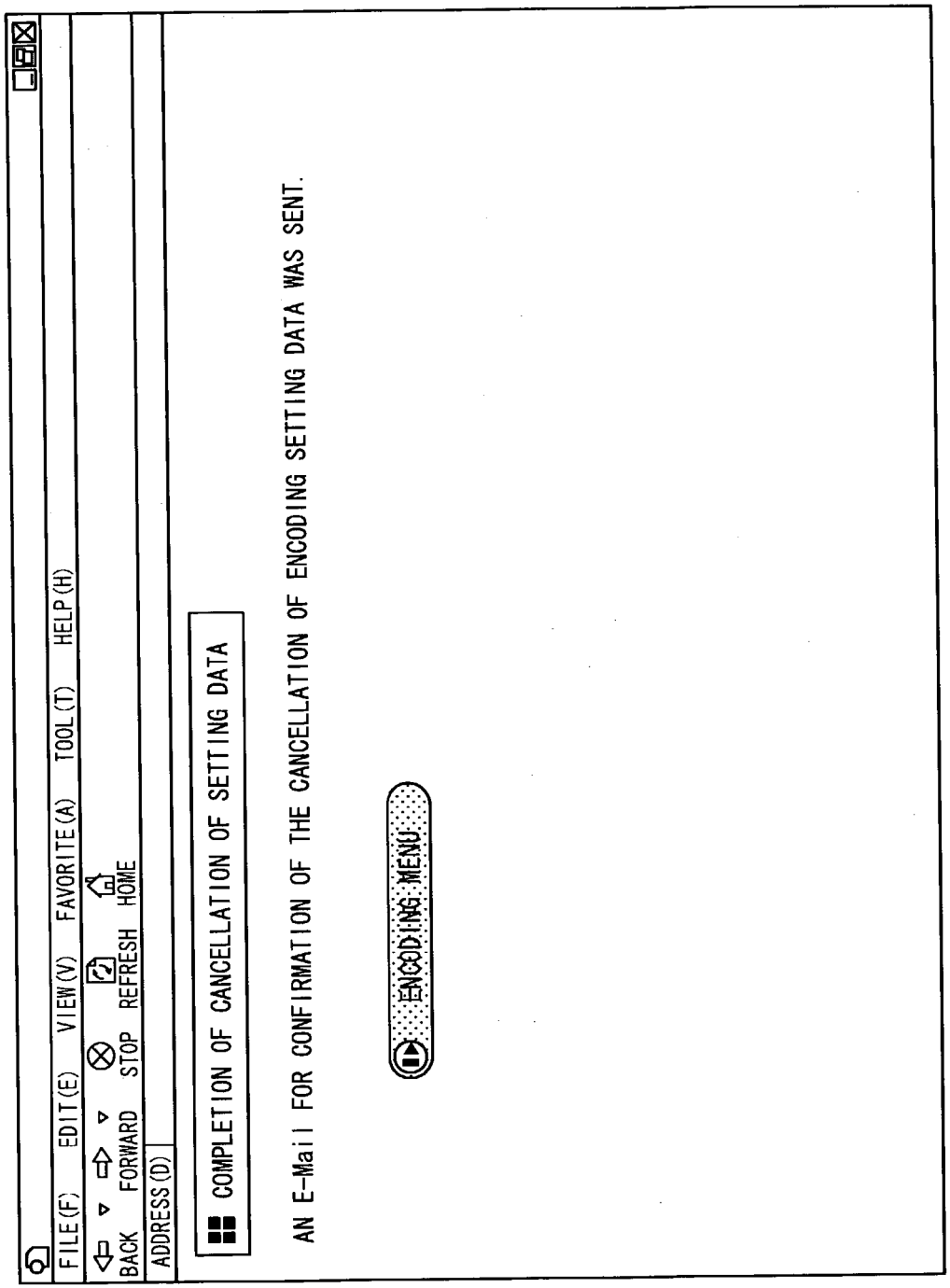
FIG. 59 is an explanatory diagram showing a still further screen appearing on the display unit of a terminal employed in the cut-list creation system implemented by the embodiment of the present invention.

Next, a cancel-completion screen is explained by referring to FIG. 59. The cancel-completion screen is displayed when a 'Cancel setting' button appearing on the encoding-change screen shown in FIG. 57 is selected by typically clicking the mouse.

The cancel-completion screen shown in FIG. 59 is a screen showing that an operation to cancel changes in order contents has been completed. An electronic mail containing information on the changes in order contents is transmitted to the terminal 2352 with the same timing as the operation to display the cancel-completion screen.

As described above, when the new-encoding-start screen, the change-completion screen or the cancel-completion screen is displayed, information is transmitted to the terminal 2352 by using an electronic mail. It is to be noted, however, that the scope of the present invention is not limited to this embodiment. That is to say, the information can be transmitted to the terminal 2352 by using other transmission media.

4: Operations of the Storage Service System

The following description explains an embodiment of operations carried out by the storage service system having the configuration described above. It is to be noted that the embodiment described below implements operations, which are carried out by the storage service system when the terminal 2352 makes an access to the center server 2350 by way of the dedicated line 2936.

It is to be noted that, in the operations described below, while the terminal 2352 makes an access to the center server 2350 by way of the dedicated line 2936, the following description also applies to operations, which are carried out by the storage service system when the terminal 2352 makes an access to the center server 2350 by way of the Internet 2933.

4-1: Login Processing

Login processing is a process to authenticate the user pertaining to a terminal 2352 in order to determine whether or not the user is a valid user making an attempt to utilize a storage service. If the user is determined to be a valid user in the login processing, the terminal 2352 to which the user pertains is allowed to make an access to the center server 2350 through the network 2351 to utilize the storage service.

In an authentication process to determine whether or not the user is a valid user, the user's ID and password are required. That is to say, in a login operation, the user needs to enter an ID and a password, which must be the same as those specified in an application for utilization of the storage service, to an ID box 1710 and a password box 1711 respectively. It is to be noted that the user is allowed to change the password specified in the application for utilization of the storage service with a high degree of freedom.

As a login button 1712 is selected typically by clicking the mouse after an ID and a password have been entered to an ID box 1710 and a password box 1711 respectively, the undisclosed WWW apparatus 2950 examines the entered ID and the entered password to determine whether or not the user is a valid user. If the user is determined to be a valid user, the storage service can be utilized right away.

4-1: Directory-Accessing Operations

It is possible to carry out operations including search, copy, move and delete operations on a file or a directory stored in a storage area allocated to a group 2354 or a terminal 2352.

4-2-1: File/Directory Search Processing

Figure 60:
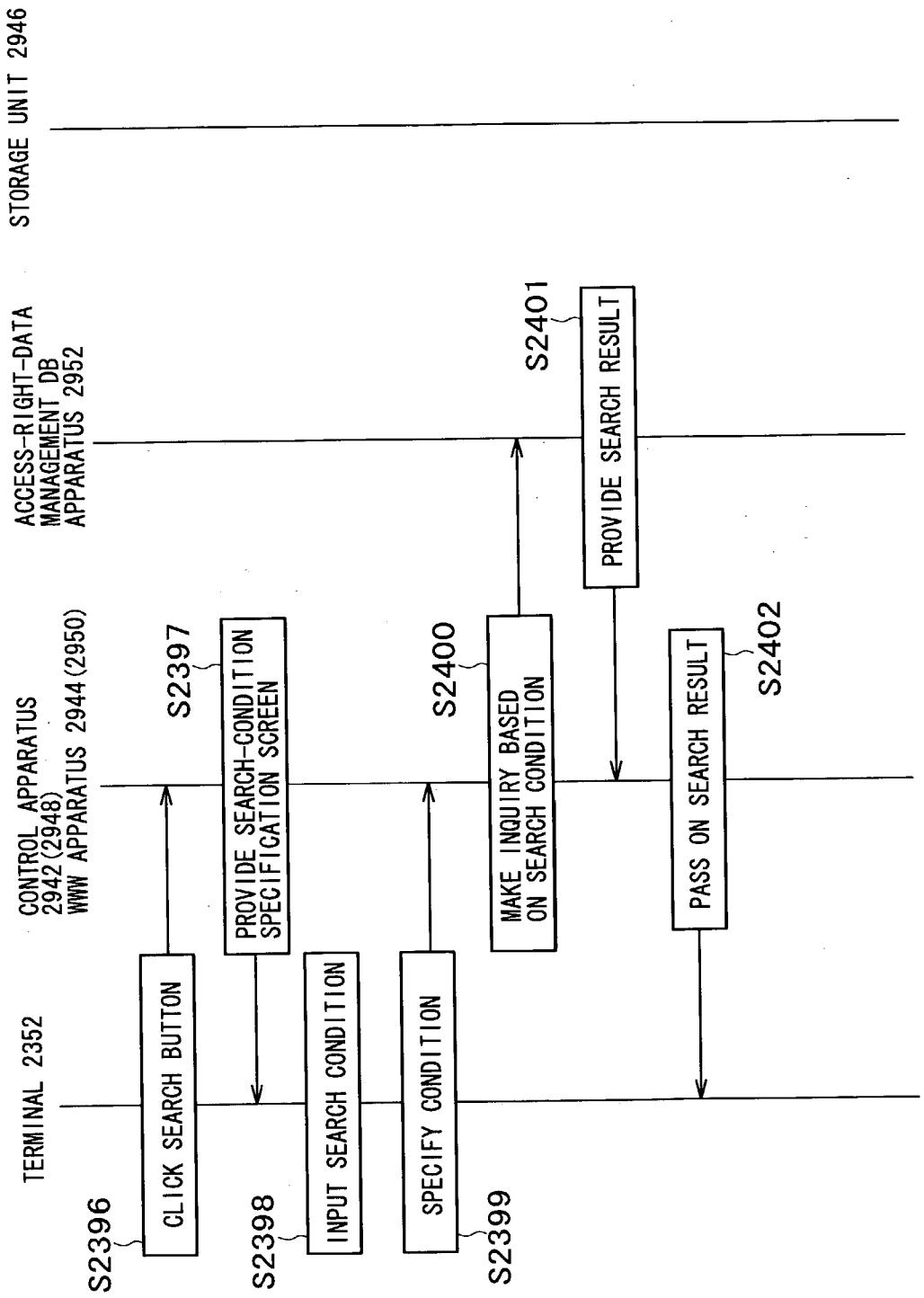
FIG. 60 shows a flowchart representing an outline of a process to search a data file or directory in the cut-list creation system implemented by the embodiment of the present invention.

First of all, processing to search the storage unit 2946 for a file or a directory is explained by referring to FIG. 60. It is to be noted that FIG. 60 shows a flowchart representing an outline of the processing to search the storage unit 2946 for a file or a directory. On the other hand, FIG. 20 is a diagram showing a typical configuration of a screen appearing on the display unit of the terminal 2352 in a search for a file or a directory.

At a first step S2396, by typically clicking the mouse, the user selects the Search button 755 of the button group 754 comprising a variety of icons as described before by referring to FIG. 20 in order to search the storage unit 2946 for a specified file or a specified directory. Then, at the next step S2397, the undisclosed WWW apparatus 2950 displays a search screen used for specifying a search condition on the display unit of the terminal 2352 in accordance with the request for the search.

Subsequently, at the next step S2398, the user enter required items of the search condition to a 'Directory name/file name' field, a 'Search directory' field, a 'Comments' field, 'Update date' field, an 'Owner' field, a 'Creator' field and/or a 'Search technique' field in the search-condition portion 601.

As the Execute button 602 appearing on the screen shown in FIG. 20 is selected by typically clicking the mouse after necessary items of the search condition are entered, the terminal 2352 transmits a search command to the undisclosed WWW apparatus 2950 at the next step S2399.

Then, at the next step S2400, the undisclosed WWW apparatus 2950 makes an inquiry by providing the access-right-data-management DB apparatus 2952 with a directory or a file data specified in the access condition included in the search command received from the terminal 2352.

In response to the inquiry about the directory of the file data, that is, an inquiry made by the undisclosed WWW apparatus 2950, the access-right-data-management DB apparatus 2952 makes a search for the directory or the file data and transfers a result of the search to the undisclosed WWW apparatus 2950 at the next step S2401.

After receiving the result of the search from the access-right-data-management DB apparatus 2952, the undisclosed WWW apparatus 2950 creates a search-result display screen based on the result of the search and transmits the search-result display screen to the terminal 2352 to be displayed on the display unit of the terminal 2352.

4-2-2: File/Directory Copy Processing

Figure 61:
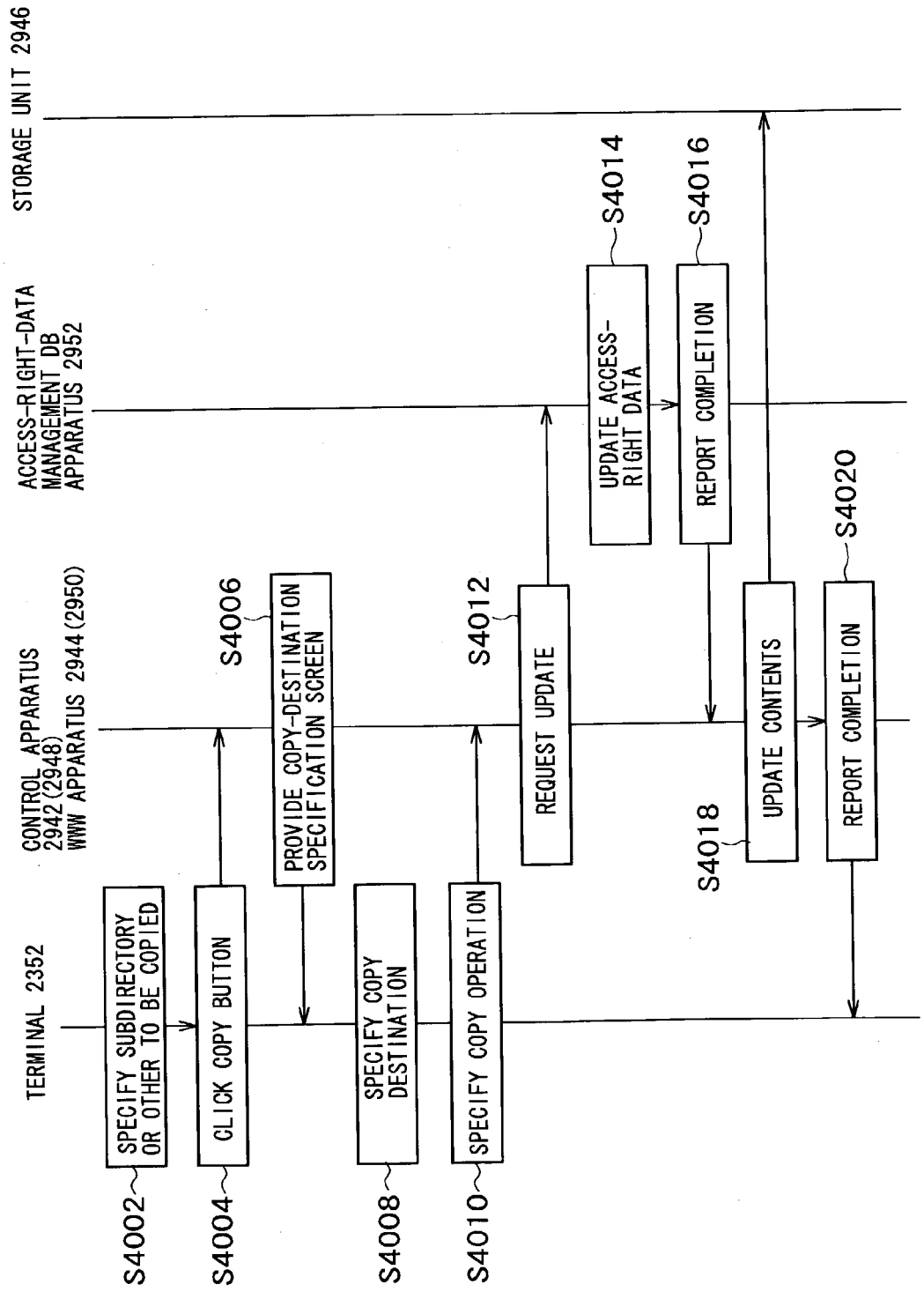
FIG. 61 shows a flowchart representing an outline of a process to copy a data file or a directory in the cut-list creation system implemented by the embodiment of the present invention.

Next, processing to copy a specified file data or a specified directory to another specified directory is explained by referring to FIG. 61. It is to be noted that FIG. 61 shows a flowchart representing an outline of the processing to copy a specified file data or a specified directory to another specified directory. On the other hand, FIG. 22 is a diagram showing a typical configuration of a screen appearing on the display unit of the terminal 2352 in the processing carried out by the terminal 2352 to copy a specified file data or a specified directory to another specified directory.

As described before, in the processing carried out by the terminal 2352 to copy a file data or a directory specified by the terminal 2352 to another specified directory, the user marks a check box 769 of the screen appearing on the display unit of the terminal 2352 as shown in FIG. 13 to select a file data or a directory as a copy source of the copy processing at a first step S4002.

Then, at the next step S4004, by typically clicking the mouse, the user selects the Copy button 757 of the button group 754 comprising a variety of icons as described before by referring to FIG. 13. Subsequently, at the next step S4006, the undisclosed WWW apparatus 2950 requests the terminal 2352 to display the directory screen shown in FIG. 22 on the display unit so as to allow the user to specify another directory as a copy destination. In the case of this embodiment, a copy destination is selected among directories stored in an undisclosed storage area of the storage unit 2946.

Then, at the next step S4008, the user selects a directory to serve as a copy destination from a copy-destination display portion 392 of the screen shown in FIG. 22 typically by clicking the mouse.

It is to be noted that, in the case of this embodiment, it is possible to select a directory into which the terminal 2352 has a write right to store a file data as a copy destination among directories in the undisclosed storage area of the storage unit 2946 that is a storage area accessible to the terminal 2352.

If it is desired to specify a subdirectory of the selected directory as a copy destination, the subdirectory can be selected from a copy-destination display portion 392. Finally, an option as to how to handle a comment affiliated with the file data or the directory to be copied is selected from a comment-setting portion 393.

In accordance with an option selected from the comment-setting portion 391, a comment affiliated with the file data or the directory to be copied is copied to the copy destination to be inherited by the copy destination as it is, or the comment is cleared.

As described above, in the case of this embodiment, one of the comment options shown on a check column of the comment-setting portion 391 is selected in every copy process. It is to be noted, however, that the scope of the present invention is not limited to this embodiment. For example, any comment option described in the comment-setting portion 391 can be set for each terminal 2352.

Then, as the Execute button 394 on the screen shown in FIG. 22 is selected by typically clicking the mouse after the copy destination is determined, the terminal 2352 transmits a copy command including the name of the file data or the name of the directory selected as a copy source and the name of the specified copy destination to the undisclosed WWW apparatus 2950 at the next step S4010.

Subsequently, at the next step S4012, under control executed by the nondisclosure-access control apparatus 2948, the undisclosed WWW apparatus 2950 examines the copy command received from the terminal 2352 in order to verify validity of an access-right deletion command on the basis of the user's ID and access rights. The user is a user pertaining to the terminal 2352. After the validity of the access-right deletion command is verified, the undisclosed WWW apparatus 2950 creates an access-right-data modification command and transfers the access-right-data modification command to the access-right-data-management DB apparatus 2952.

Then, at the next step S4014, the access-right-data-management DB apparatus 2952 updates access-right data in accordance with the access-right-data modification command received from the undisclosed WWW apparatus 2950. Subsequently, at the next step S4016, the access-right-data-management DB apparatus 2952 sends a notice indicating completion of the operation to modify the access-right data to the undisclosed WWW apparatus 2950.

Receiving the notice indicating completion of the operation to modify the access-right data from the access-right-data-management DB apparatus 2952, the undisclosed WWW apparatus 2950 updates data stored in the storage unit 2946 on the basis of the copy command at the next step S4018. To be more specific, the undisclosed WWW apparatus 2950 carries out a process to copy the data of the copy source to the directory specified as a copy destination in the storage unit 2946.

After the process to copy the data of the copy source to the directory specified as a copy destination in the storage unit 2946 is completed, the undisclosed WWW apparatus 2950 requests the terminal 2352 to display a completion-notice screen showing completion of the copy processing on the display unit of the terminal 2352 at the next step S4020.

4-2-3: File/Directory Move Processing

Figure 62:
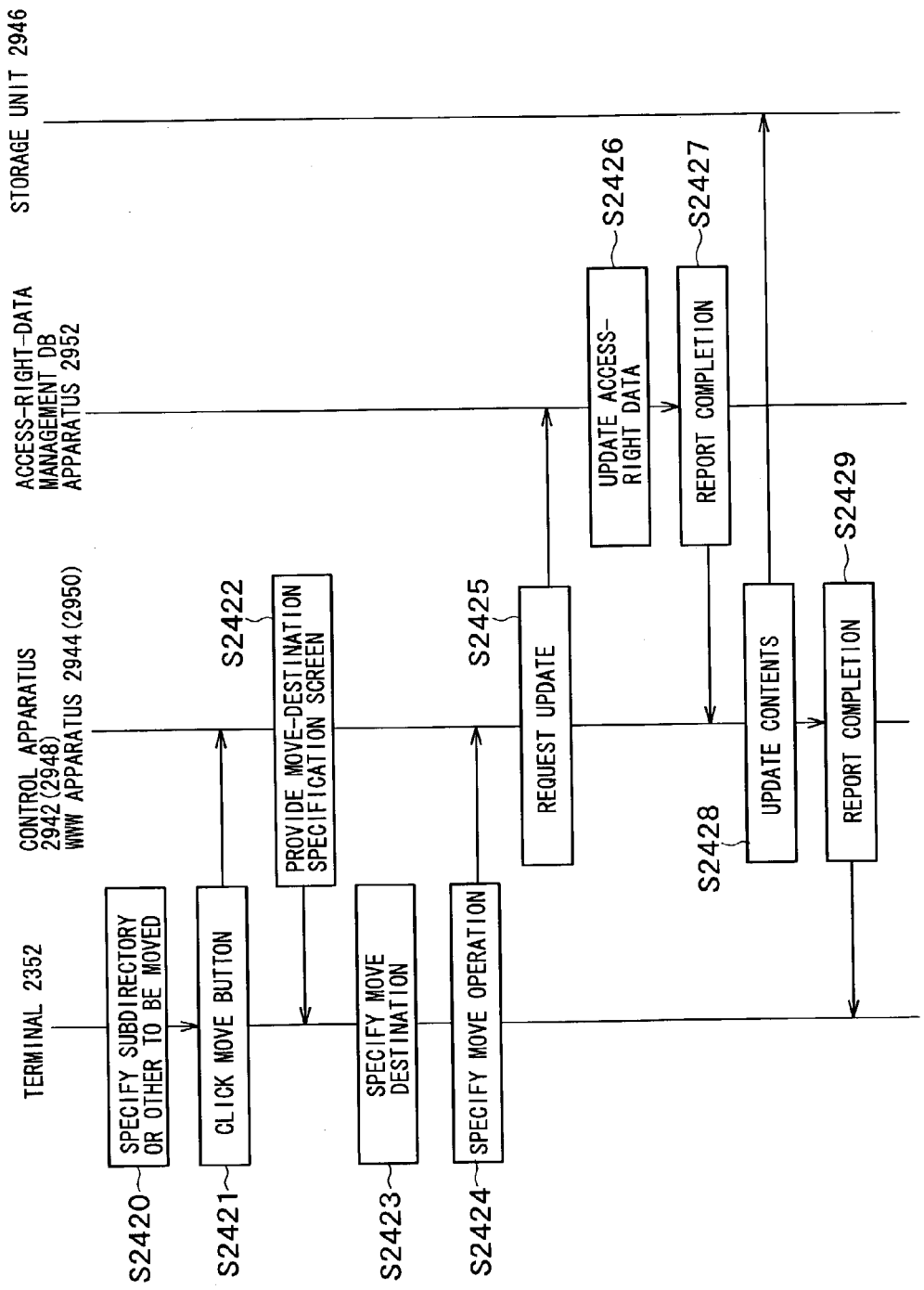
FIG. 62 shows a flowchart representing an outline of a process to move a data file or a directory in the cut-list creation system implemented by the embodiment of the present invention.

Next, processing to move a specified file data or a specified directory to another specified directory is explained by referring to FIG. 62. It is to be noted that FIG. 62 shows a flowchart representing an outline of the processing to move a specified file data or a specified directory to another specified directory.

As described before, in the processing carried out by the terminal 2352 to move a file data or a directory specified by the terminal 2352 to another directory, the user marks a check box 769 of the screen appearing on the display unit of the terminal 2352 as shown in FIG. 13 to select the file data or the directory as a move source of the move processing at a first step S2420.

Then, at the next step S2421, by typically clicking the mouse, the user selects the Move button 758 of the button group 754 comprising a variety of icons as described before by referring to FIG. 13. Subsequently, at the next step S2422, the undisclosed WWW apparatus 2950 requests the terminal 2352 to display a directory screen on the display unit so as to allow the user to specify another directory as a move destination.

It is to be noted that, in the-case of this embodiment, a move destination is selected among directories stored in an undisclosed storage area of the storage unit 2946, which is a storage area accessible to the terminal 2352. In addition, the terminal 2352 must have a write right to store a file data in a directory selected as the move destination.

Then, at the next step S2423, by typically clicking the mouse, the user selects a directory to serve as a move destination from the screen appearing on the display unit of the terminal 2352 and selects an Execute button 394. Subsequently, the terminal 2352 transmits a move command including the name of the file data or the name of the directory selected as a move source and the name of the specified move destination to the undisclosed WWW apparatus 2950 at the next step S2424.

Subsequently, at the next step S2425, under control executed by the nondisclosure-access control apparatus 2948, the undisclosed WWW apparatus 2950 transfers an access-right-data modification command to the access-right-data-management DB apparatus 2952.

Then, at the next step S2426, the access-right-data-management DB apparatus 2952 updates access-right data in accordance with the access-right-data modification command received from the undisclosed WWW apparatus 2950. Subsequently, at the next step S2427, the access-right-data-management DB apparatus 2952 sends a notice indicating completion of the operation to modify the access-right data to the undisclosed WWW apparatus 2950.

Receiving the notice indicating completion of the operation to modify the access-right data from the access-right-data-management DB apparatus 2952, the undisclosed WWW apparatus 2950 updates data stored in the storage unit 2946 on the basis of the move command at the next step S2428. To be more specific, the undisclosed WWW apparatus 2950 carries out a process to move the data of the move source to the directory specified as a move destination in the storage unit 2946.

After the process to move the data of the move source to the directory specified as a move destination in the storage unit 2946 is completed, the undisclosed WWW apparatus 2950 requests the terminal 2352 to display a completion-notice screen showing completion of the move processing on the display unit of the terminal 2352 at the next step S2429.

4-2-4: File/Directory Delete Processing

Figure 63:
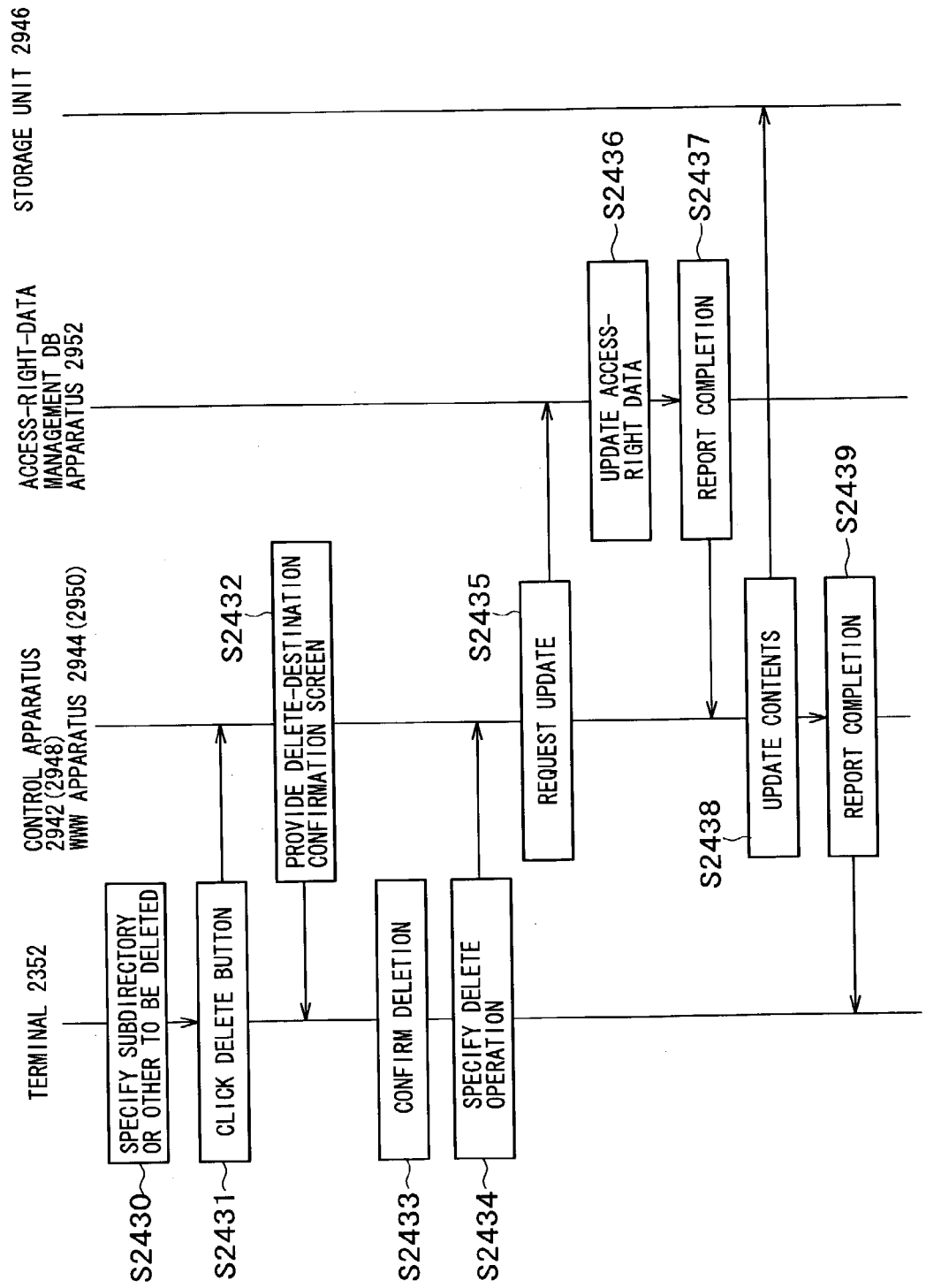
FIG. 63 shows a flowchart representing an outline of a process to delete a data file or a directory in the cut-list creation system implemented by the embodiment of the present invention.

Next, processing to delete a specified file data or a specified directory is explained by referring to FIG. 63. It is to be noted that FIG. 63 shows a flowchart representing an outline of the processing to delete a specified file data or a specified directory. On the other hand, FIG. 23 is a diagram showing a typical configuration of a deletion-confirmation screen appearing on the display unit of the terminal 2352 in the processing carried out by the terminal 2352 to delete a specified file data or a specified directory.

As described before, in the processing carried out by the terminal 2352 to delete a file data or a directory specified by the terminal 2352, the user marks a check box 769 of the screen appearing on the display unit of the terminal 2352 as shown in FIG. 13 to select the file data or the directory to be deleted in the delete processing at a first step S2430. The file data is selected from those shown in the file-attribute display portion 753. On the other hand, the directory is selected from those shown in the subdirectory-attribute display portion 752.

Then, at the next step S2431, by typically clicking the mouse, the user selects the Delete button 759 of the button group 754 comprising a variety of icons as described before by referring to FIG. 13. Subsequently, at the next step S2432, the undisclosed WWW apparatus 2950 requests the terminal 2352 to display the deletion-confirmation screen shown in FIG. 23 on the display unit so as to allow the user to confirm the deletion of the selected file data or the selected directory.

Then, at the next step S2433, the user selects the Execute button 623, which is included in the deletion-conformation screen appearing on the display unit of the terminal 2352 as shown in FIG. 23, typically by clicking the mouse.

Then, as the Execute button 623 on the screen shown in FIG. 23 is selected by typically clicking the mouse after the deletion is confirmed, the terminal 2352 transmits a delete command including the name of the file data to be deleted or the name of the directory to be deleted to the undisclosed WWW apparatus 2950 at the next step S2434.

Subsequently, at the next step S2435, under control executed by the nondisclosure-access control apparatus 2948, the undisclosed WWW apparatus 2950 creates an access-right-data modification command based on the delete command received from the terminal 2352. Then, the undisclosed WWW apparatus 2950 transfers the access-right-data modification command to the access-right-data-management DB apparatus 2952.

Then, at the next step S2436, the access-right-data-management DB apparatus 2952 updates access-right data in accordance with the access-right-data modification command received from the undisclosed WWW apparatus 2950. Subsequently, at the next step S2437, the access-right-data-management DB apparatus 2952 sends a notice indicating completion of the operation to modify the access-right data to the undisclosed WWW apparatus 2950.

Receiving the notice indicating completion of the operation to modify the access-right data from the access-right-data-management DB apparatus 2952, the undisclosed WWW apparatus 2950 updates data stored in the storage unit 2946 on the basis of the delete command at the next step S2438. To be more specific, the undisclosed WWW apparatus 2950 carries out a process to delete the specified file data or the specified directory from the storage unit 2946.

After the process to delete the specified file data or the specified directory from the storage unit 2946 is completed, the undisclosed WWW apparatus 2950 requests the terminal 2352 to display a completion-notice screen showing completion of the delete processing on the display unit of the terminal 2352 at the next step S2439.

It is to be noted that, in the case of this embodiment, a file data or a directory that can be specified as a file or a directory to be deleted must be respectively a file or a directory in the undisclosed storage area included in the storage unit 2946. In addition, the storage area must be accessible to the terminal 2352. Moreover, a directory that can be specified as a directory to be deleted must be an empty directory into which the terminal 2352 has a write right to store a file data. An empty directory is a directory that does not have a file data and a subdirectory including a file data. A file data that can be specified as a file to be deleted must be a file data into which the terminal 2352 has a file write right to store data.

4-2-5: File/Directory-Name Change Processing

Figure 64:
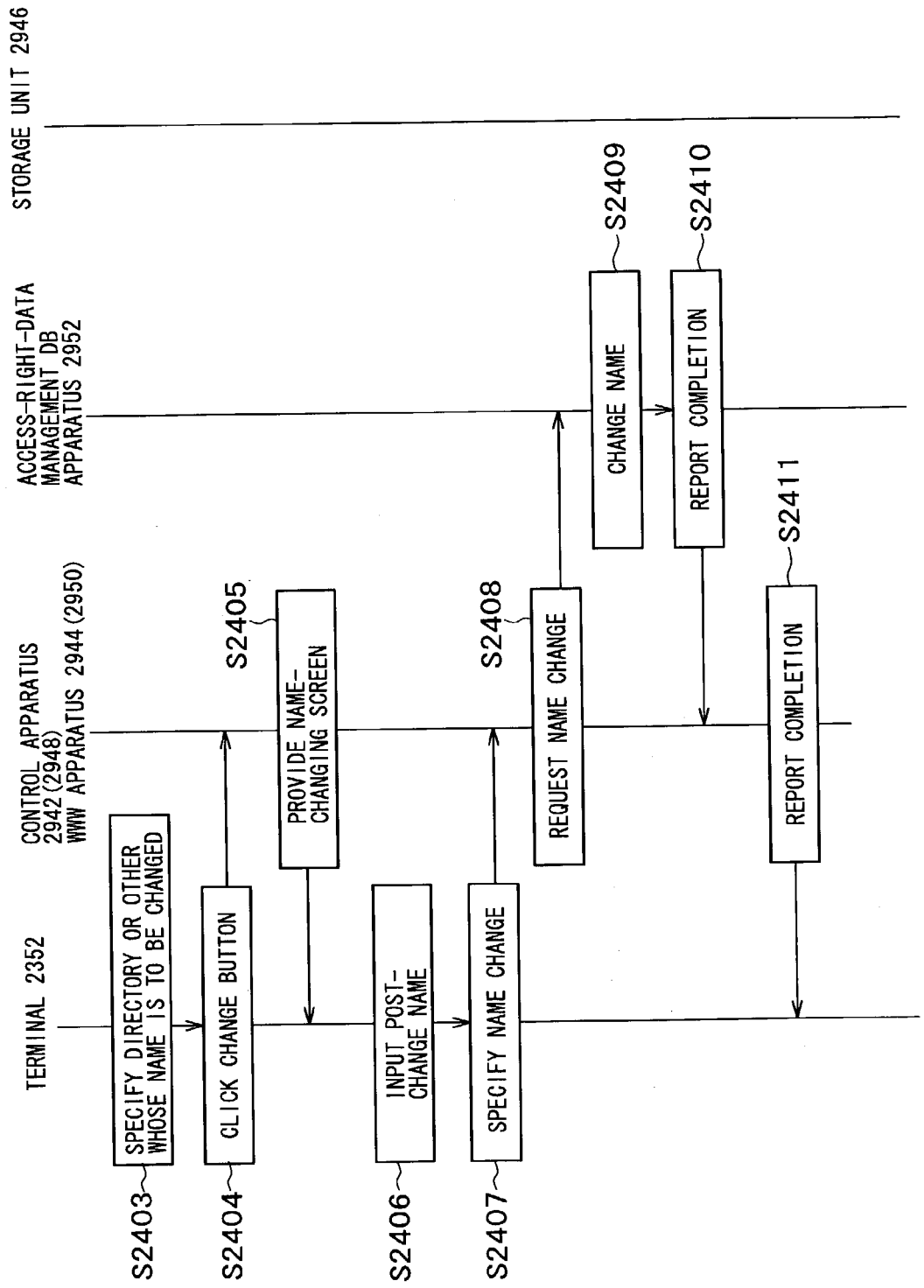
FIG. 64 shows a flowchart representing an outline of a process to change the name of a data file or the name of a directory in the cut-list creation system implemented by the embodiment of the present invention.

Next, processing to change the name of a specified file data or the name of a specified directory is explained by referring to FIG. 64. It is to be noted that FIG. 64 shows a flowchart representing an outline of the processing to change the name of a specified file data or the name of a specified directory. On the other hand, FIG. 21 is a diagram showing a typical configuration of a name-change screen appearing on the display unit of the terminal 2352 in the processing carried out by the terminal 2352 to change the name of a specified file data or the name of a specified directory.

As described before, in the processing carried out by the terminal 2352 to change the name of a file data or the name of a directory specified by the terminal 2352, the user marks a check box 769 of the screen appearing on the display unit of the terminal 2352 as shown in FIG. 13 to select the file data or the directory, the name of which is to be changed in the change processing at a first step S2403. The file data is selected from those shown in the file-attribute display portion 753. On the other hand, the directory is selected from those shown in the subdirectory-attribute display portion 752.

Then, at the next step S2404, by typically clicking the mouse, the user selects the Change button 756 of the button group 754 comprising a variety of icons as described before by referring to FIG. 13. Subsequently, at the next step S2405, the undisclosed WWW apparatus 2950 requests the terminal 2352 to display the name-change screen shown in FIG. 21 on the display unit so as to allow the user to enter a new name to be given to the selected file data or the selected directory.

Then, at the next step S2406, the user selects the Execute button 511, which is included in the name-change screen appearing on the display unit of the terminal 2352 as shown in FIG. 21, typically by clicking the mouse.

Then, as the Execute button 511 on the name-change screen is selected by typically clicking the mouse, the terminal 2352 transmits a name-change command including the new and previous names of the file data or the directory, the name of which is to be changed, to the undisclosed WWW apparatus 2950 at the next step S2407.

Subsequently, at the next step S2408, under control executed by the nondisclosure-access control apparatus 2948, the undisclosed WWW apparatus 2950 creates an access-right-data modification command based on the name-change command received from the terminal 2352. Then, the undisclosed WWW apparatus 2950 transfers the access-right-data modification command to the access-right-data-management DB apparatus 2952.

Then, at the next step S2409, the access-right-data-management DB apparatus 2952 changes the name of the specified file data or the name of the specified directory in accordance with the access-right-data modification command received from the undisclosed WWW apparatus 2950. Subsequently, at the next step S2410, the access-right-data-management DB apparatus 2952 sends a notice indicating completion of the operation to modify the name of the specified file data or the name of the specified directory to the undisclosed WWW apparatus 2950.

Receiving the notice indicating completion of the operation to modify the name of the specified file data or the name of the specified directory from the access-right-data-management DB apparatus 2952, the undisclosed WWW apparatus 2950 requests the terminal 2352 to display a completion notification screen indicating completion of the operation to modify the name of the specified file data or the name of the specified directory on the display unit at the next step S2411.

It is to be noted that, in the case of this embodiment, a file data or a directory that can be specified as a file or a directory, the name of which is to be changed, must be respectively a file of a directory in the undisclosed storage area in the storage unit 2946. Moreover, the undisclosed storage area must be a storage area accessible to the terminal 2352. In addition, a directory that can be specified as a directory to be changed must be a directory into which the terminal 2352 has a write right to store a file data. On the other hand, a file data that can be specified as a file to be changed must be a file data into which the terminal 2352 has a file write right to store data.

4-2-6: Processing to Copy File/Directory to Internet

Figure 65:
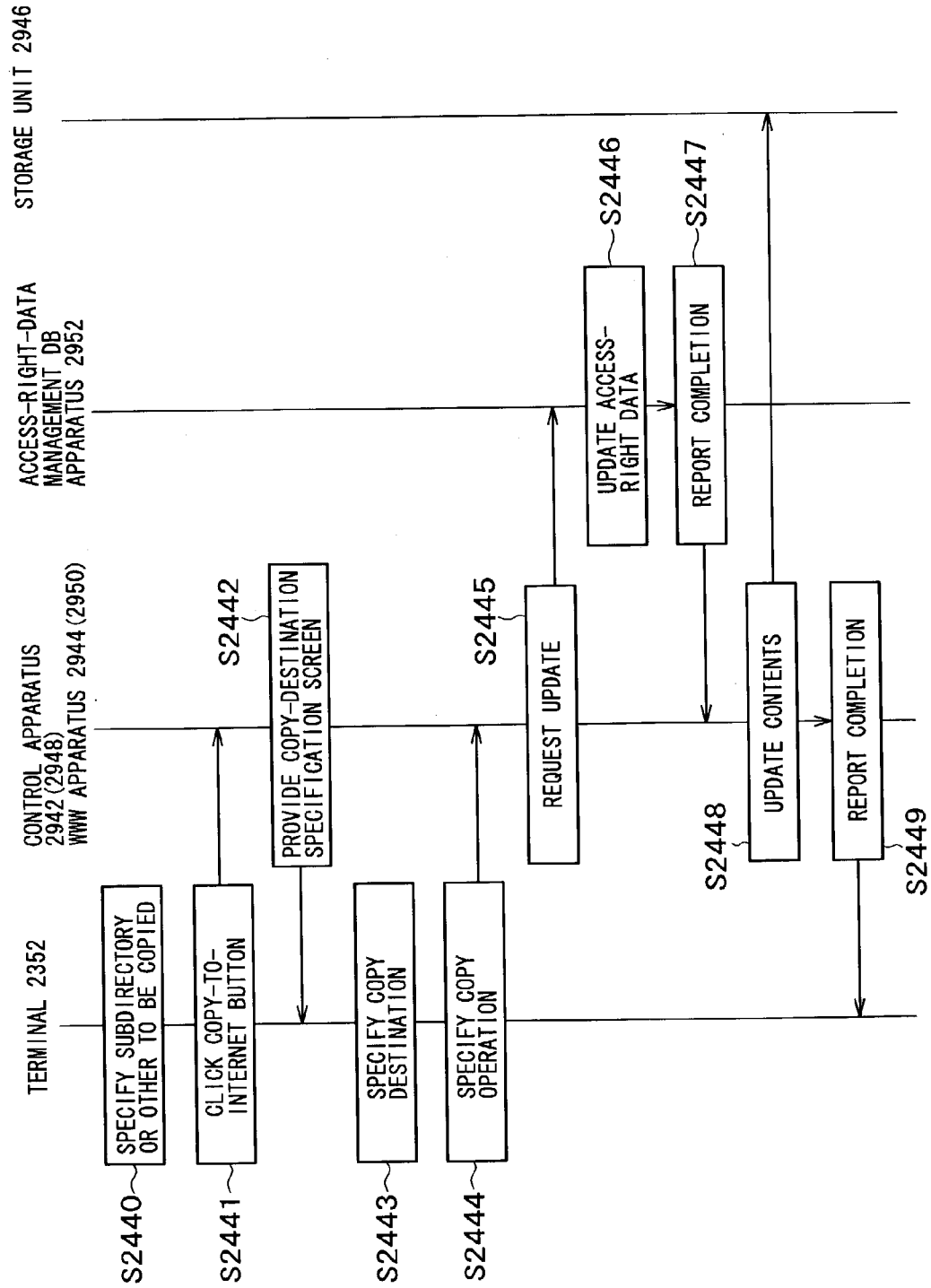
FIG. 65 shows a flowchart representing an outline of a process to copy a data file or a directory to the Internet in the cut-list creation system implemented by the embodiment of the present invention.

Next, processing to copy a specified file data or a specified directory to the Internet is explained by referring to FIG. 65. It is to be noted that FIG. 65 shows a flowchart representing an outline of the processing to copy a specified file data or a specified directory to the Internet. A screen appearing on the display unit of the terminal 2352 in the processing carried out by the terminal 2352 to copy a specified file data or a specified directory to the Internet has all but the same configuration as the screen for the processing to copy a specified file data or a specified directory to another specified directory. For this reason, the screen for the processing to copy a specified file data or a specified directory to the Internet is not explained in detail.

As described before, in the processing carried out by the terminal 2352 to copy a file data or a directory specified by the terminal 2352 to the Internet, the user marks a check box 769 of the screen appearing on the display unit of the terminal 2352 as shown in FIG. 13 to select the file data from or the directory as a copy source of the copy processing at a first step S2440. The file data is selected from those shown in the file-attribute display portion 753. On the other hand, the directory is selected from those shown in the subdirectory-attribute display portion 752.

Then, at the next step S2441, by typically clicking the mouse, the user selects the 'Copy to Internet' button 760 of the button group 754 comprising a variety of icons as described before by referring to FIG. 13. Subsequently, at the next step S2442, the undisclosed WWW apparatus 2950 requests the terminal 2352 to display a screen shown in none of the figures on the display unit so as to allow the user to specify a copy destination.

Then, at the next step S2443, the user selects a copy destination. Subsequently, as the Execute button on the screen is selected by typically clicking the mouse after the copy destination is determined, the terminal 2352 transmits a 'copy-to-the-Internet' command including the name of the file data or the name of the directory selected as a copy source and the name of the specified copy destination to the undisclosed WWW apparatus 2950 at the next step S2444.

Subsequently, at the next step S2445, under control executed by the nondisclosure-access control apparatus 2948, the undisclosed WWW apparatus 2950 examines the 'copy-to-the-Internet' command received from the terminal 2352 in order to verify validity of the 'copy-to-the-Internet' command on the basis of the user's ID and access rights. The user is a user pertaining to the terminal 2352. After the validity of the 'copy-to-the-Internet' command is verified, the undisclosed WWW apparatus 2950 creates an access-right-data modification command and transfers the access-right-data modification command to the access-right-data-management DB apparatus 2952.

Then, at the next step S2446, the access-right-data-management DB apparatus 2952.updates access-right data in accordance with the access-right-data modification command received from the undisclosed WWW apparatus 2950. Subsequently, at the next step S2447, the access-right-data-management DB apparatus 2952 sends a notice indicating completion of the operation to modify the access-right data to the undisclosed WWW apparatus 2950.

Receiving the notice indicating completion of the operation to modify the access-right data from the access-right-data-management DB apparatus 2952, the undisclosed WWW apparatus 2950 updates data stored in the storage unit 2946 on the basis of the 'copy-to-the-Internet command' at the next step S2448. To be more specific, the undisclosed WWW apparatus 2950 carries out a process to copy the data of the copy source in an undisclosed storage area of the storage unit 2946 to the specified copy destination in a disclosed storage area of the storage unit 2946.

After the process to copy the data of the copy source to the specified copy destination in a disclosed storage area of the storage unit 2946 is completed, the undisclosed WWW apparatus 2950 requests the terminal 2352 to display a completion-notice screen showing completion of the copy-to-the Internet processing on the display unit of the terminal 2352 at the next step S2449.

It is to be noted that, in the case of this embodiment, a file data or a directory that can be specified as a file or a directory, to serve as a copy source must be respectively a file of a directory in the undisclosed storage area in the storage unit 2946. Moreover, the undisclosed storage area must be a storage area accessible to the terminal 2352. In addition, a directory that can be specified as a directory to be copied must be a directory into which the terminal 2352 has a write right to store a file data. On the other hand, a file data that can be specified as a file to be changed must be a file data into which the terminal 2352 has a file write right to store data.

4-2-7: New-Directory-Creation Processing

Figure 66:
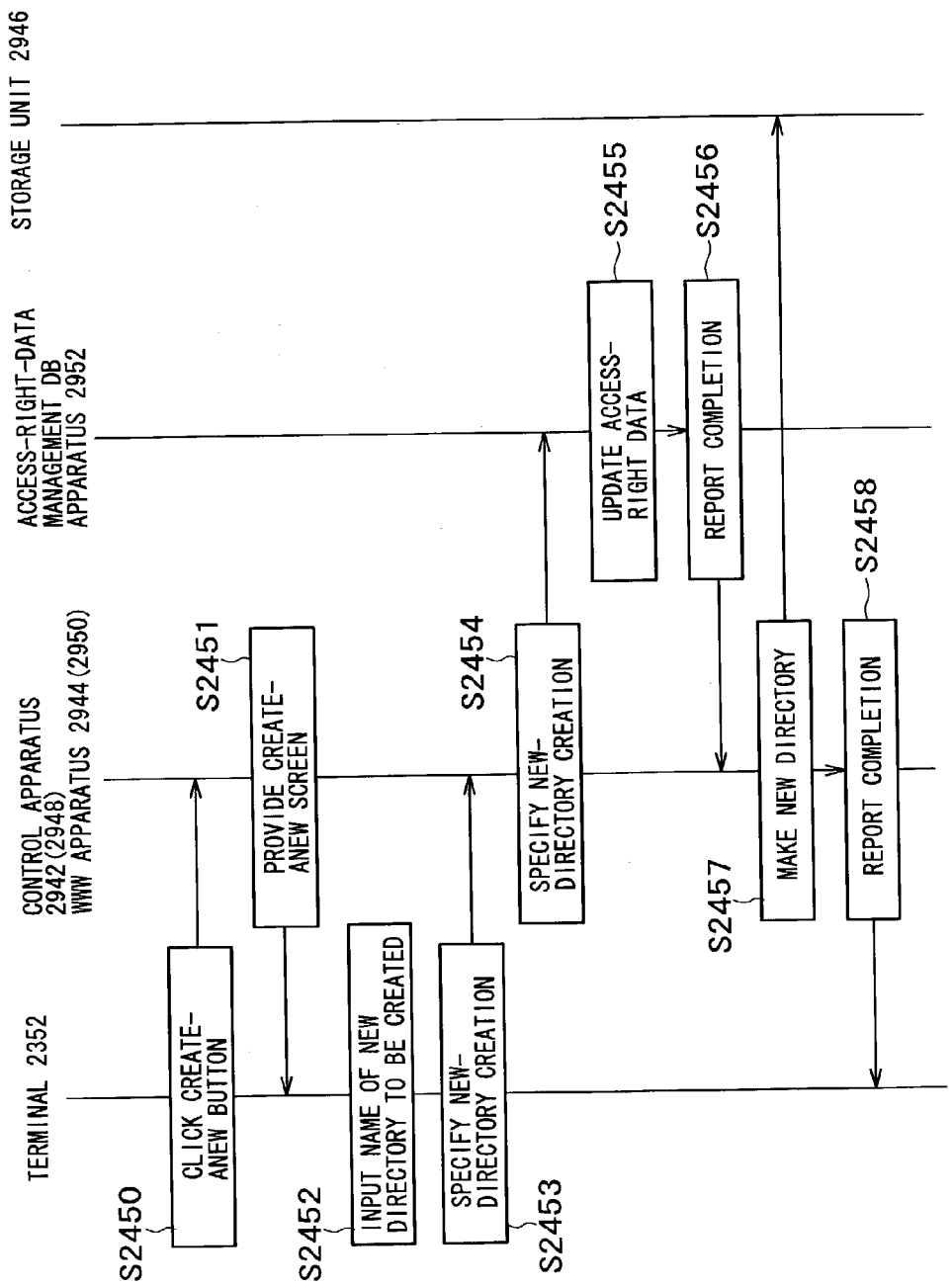
FIG. 66 shows a flowchart representing an outline of a process to create a new directory in the cut-list creation system implemented by the embodiment of the present invention.

Next, processing to create a new directory is explained by referring to FIG. 66. It is to be noted that FIG. 66 shows a flowchart representing an outline of the processing to create a new directory. On the other hand, FIG. 25 is a diagram showing a typical configuration of a screen appearing on the display unit of the terminal 2352 in the processing carried out by the terminal 2352 to create a new directory.

As described before, in the processing carried out by the terminal 2352 to create a new directory specified by the terminal 2352, the user specifies a directory in a subdirectory-attribute display portion 752 of the screen appearing on the display unit of the terminal 2352 as shown in FIG. 13 as a place for a newly created directory.

At a first step S2450, by typically clicking the mouse, the user selects the Create-anew button 761 of the button group 754 comprising a variety of icons as described before by referring to FIG. 13. Subsequently, at the next step S2451, the undisclosed WWW apparatus 2950 requests the terminal 2352 to display the screen shown in FIG. 25 on the display unit so as to allow the user to specify the name of a new directory to be created.

Then, at the next step S2452, the user enters the name of a new directory to be created to a directory-setting portion 480 of the screen appearing on the display unit of the terminal 2352 as shown in FIG. 25. Subsequently, as the user selects an Execute button 481 for the directory-setting portion 480 of the same screen typically by clicking the mouse, the terminal 2352 transmits a new-directory creation command including the name of the new directory to the undisclosed WWW apparatus 2950 at the next step S2453.

Subsequently, at the next step S2454, under control executed by the nondisclosure-access control apparatus 2948, the undisclosed WWW apparatus 2950 examines the new-directory creation command received from the terminal 2352 in order to verify validity of the new-directory creation command on the basis of the user's ID and access rights. The user is a user pertaining to the terminal 2352. After the validity of the new-directory creation command is verified, the undisclosed WWW apparatus 2950 creates an access-right-data modification command and transfers the access-right-data modification command to the access-right-data-management DB apparatus 2952.

Then, at the next step S2455, the access-right-data-management DB apparatus 2952 updates access-right data in accordance with the access-right-data modification command received from the undisclosed WWW apparatus 2950. Subsequently, at the next step S2456, the access-right-data-management DB apparatus 2952 sends a notice indicating completion of the operation to modify the access-right data to the undisclosed WWW apparatus 2950.

Receiving the notice indicating completion of the operation to modify the access-right data from the access-right-data-management DB apparatus 2952, the undisclosed WWW apparatus 2950 updates data stored in the storage unit 2946 on the basis of the new-directory creation command at the next step S2457. To be more specific, the undisclosed WWW apparatus 2950 carries out a process to create a new directory in the undisclosed storage area of the storage unit 2946 and give the specified name to the new directory.

After the process to create the new directory in the undisclosed storage area of the storage unit 2946 and give the specified name to the new directory is completed, the undisclosed WWW apparatus 2950 requests the terminal 2352 to display a completion-notice screen showing completion of the new-directory creation processing on the display unit of the terminal 2352 at the next step S2458.

It is to be noted that, in the case of this embodiment, a directory that can be specified as a directory to accommodate a new directory to be created must be a directory in the undisclosed storage area in the storage unit 2946. Moreover, the undisclosed storage area must be a storage area accessible to the terminal 2352. In addition, a directory that can be specified as a directory to accommodate a new directory to be created must be a directory for which the terminal 2352 has a write right allowing the terminal 2352 to create a new directory in the directory.

4-2-8: Upload Processing

Figure 67:
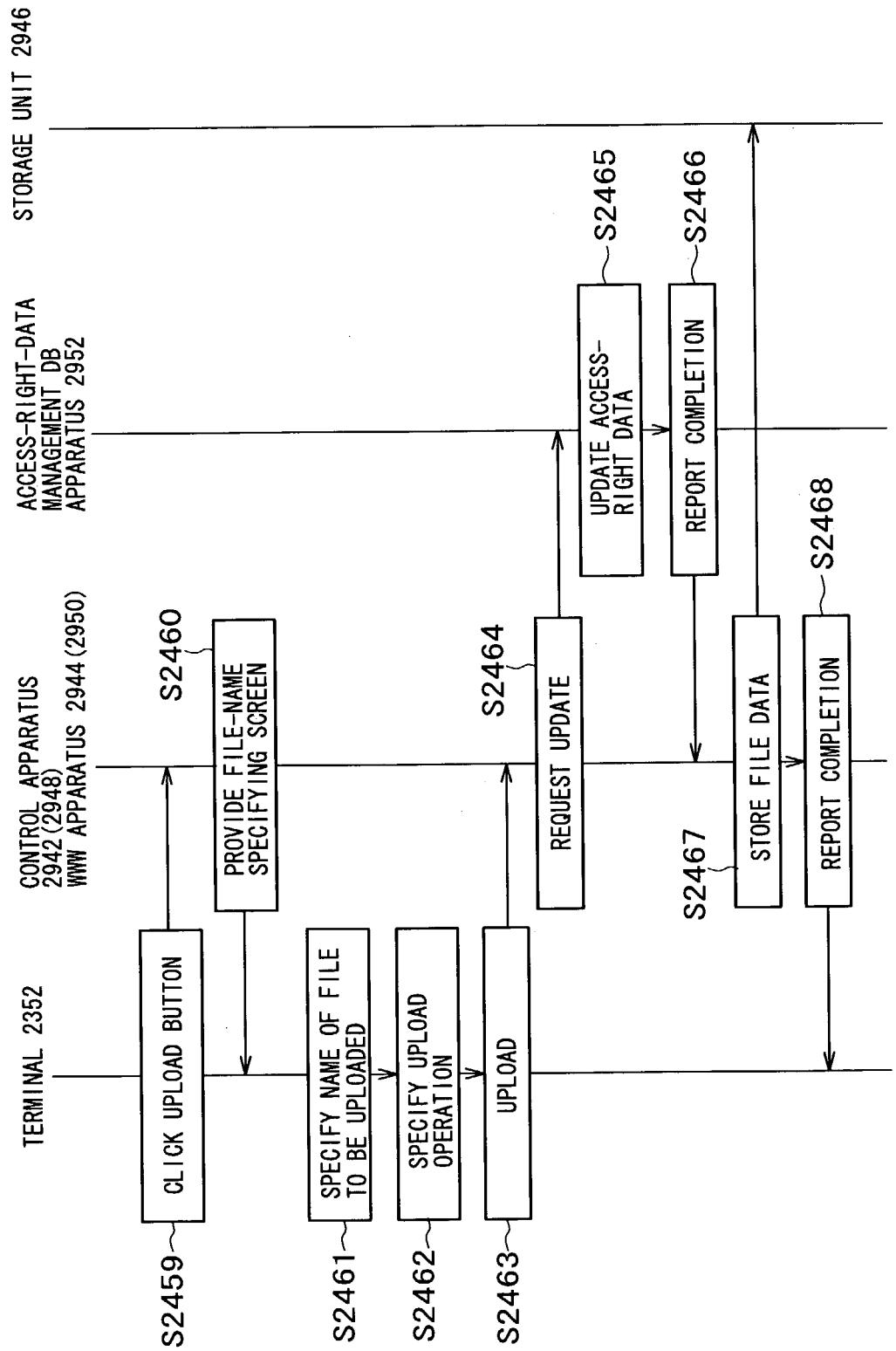
FIG. 67 shows a flowchart representing an outline of a process to upload a data file in the cut-list creation system implemented by the embodiment of the present invention.

Next, upload processing is explained by referring to FIG. 67. It is to be noted that FIG. 67 shows a flowchart representing an outline of the upload processing. On the other hand, FIG. 26 is a diagram showing a typical configuration of a screen, which is displayed on the display unit of the terminal 2352 when the upload processing is carried out.

As described before, in the processing carried out by the terminal 2352 to upload (store) a specified file data from the terminal 2352 to a destination directory in the center server 2350, the user selects the destination directory from a list of directories in the tree display portion 750 of the screen shown in FIG. 13. In the figure, the selected directory is shown as a directory in a shaded area.

Then, at a first step S2459, by typically clicking the mouse, the user selects the Upload button 762 of the button group 754 comprising a variety of icons as described before by referring to FIG. 13. Subsequently, at the next step S2460, the undisclosed WWW apparatus 2950 requests the terminal 2352 to display a screen shown in FIG. 26 on the display unit so as to allow the user to select the name of a file data to be uploaded.

Then, at the next step S2461, the user selects the name of a file data to be uploaded in a select portion 330 of the screen shown in FIG. 26. Subsequently, as the user selects an Execute button 332 appearing on the same screen typically by clicking the mouse for the terminal 2352 at the next step S2462, the terminal 2352 transmits an upload command including the name of the file data to be uploaded by the terminal 2352 to the undisclosed WWW apparatus 2950.

Subsequently, at the next step S2463, under control executed by the nondisclosure-access control apparatus 2948, the undisclosed WWW apparatus 2950 examines the upload command received from the terminal 2352 in order to verify validity of the upload command on the basis of the user's ID and access rights. The user is a user pertaining to the terminal 2352. After the validity of the upload command is verified, the file data having the specified name is uploaded from the terminal 2352 to the center server 2350 by way of the network 2351.

Then, at the next step S2464, the access-right-data-management DB apparatus 2952 receives an access-right-data modification command received from the undisclosed WWW apparatus 2950. Subsequently, at the next step S2465, the access-right-data-management DB apparatus 2952 updates the access-right data for the uploaded file data.

Then, at the next step S2466, the access-right-data management DB apparatus 2952 sends a notice indicating completion of the operation to update the access-right data to the undisclosed WWW apparatus 2950. Receiving the notice indicating completion of the operation to update the access-right data from the access-right-data-management DB apparatus 2952, the undisclosed WWW apparatus 2950 stores the uploaded file data into an undisclosed storage area in the storage unit 2946 at the next step S2467.

After the process to upload the file data from the terminal 2352 to the storage unit 2946 is completed, the undisclosed WWW apparatus 2950 requests the terminal 2352 to display a completion-notice screen showing completion of the upload processing on the display unit of the terminal 2352 at the next step S2468.

It is to be noted that, in the case of this embodiment, a directory that can be specified as a directory to accommodate a file data to be uploaded must be a directory in the undisclosed storage area in the storage unit 2946. Moreover, the undisclosed storage area must be a storage area accessible to the terminal 2352. In addition, a directory that can be specified as a directory to accommodate a file data to be uploaded must be a directory to which the terminal 2352 has a write right allowing the terminal 2352 to upload a file data.

4-2-9: Access-Right-Change Processing

Figure 68:
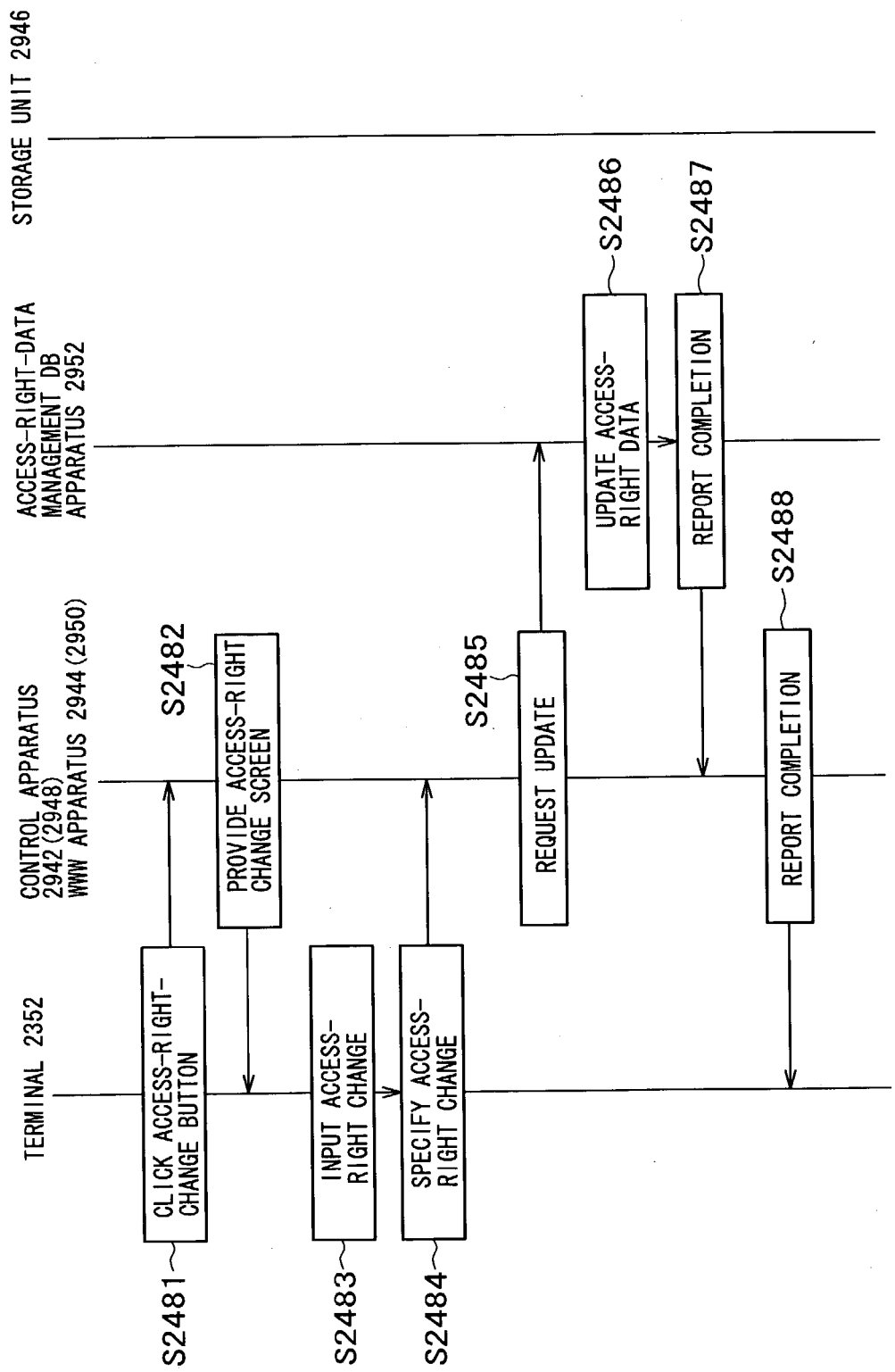
FIG. 68 shows a flowchart representing an outline of a process to change a right of an access in the cut-list creation system implemented by the embodiment of the present invention.

Next, processing to change a right of an access to a specified directory, that is, a right owned by a specified group 2354 or a specified terminal 2352, is explained by referring to FIG. 68. It is to be noted that FIG. 68 shows a flowchart representing an outline of the processing to change a right of an access to a specified directory. On the other hand, FIG. 18 is a diagram showing a typical configuration of an access-right-change screen appearing on the display unit of the terminal 2352 in the processing carried out by the terminal 2352 to change a right of an access to a specified directory, that is, a right owned by a specified group 2354 or the terminal 2352.

As described before, in order to request the terminal 2352 to carry out the processing to change a right of an access to a directory specified and displayed on the tree display portion 750 of the file-list screen shown in FIG. 13, that is, a right owned by a specified group 2354 or the terminal 2352, the user selects the access-right change button 771 on the same screen typically by clicking the mouse. When the user selects the access-right change button 771, a screen showing a list of groups 2354 or a list of terminals 2352 as shown in FIG. 14 is displayed on the display unit of the terminal 2352. The user utilizes the screen to select a group 2354 or a terminal 2352 whose access right is to be changed by the undisclosed WWW apparatus 2950.

At a first step S2481, the user of the terminal 2352 selects a group 2354 or a terminal 2352 whose access right is to be changed by the undisclosed WWW apparatus 2950 from those shown on a list of access-group names or a list of access-user names on the terminal shown in FIG. 14 typically by clicking the mouse. When the user of the terminal 2352 selects such a group 2354 or such a terminal 2352, a screen used for changing the access right of the selected group 2354 or the selected terminal 2352 as shown in FIG. 18 is displayed on the display unit of the terminal 2352 at the next step S2482.

Then, at the next step S2483, by typically clicking the mouse for the terminal 2352, the user specifies access rights listed in a group-access-right change portion 60 to be retained in the selected group 2354 by marking check boxes for the access rights as shown in FIG. 18. The access-right change screen shown in FIG. 18 is a screen for specifying access rights to be retained in a selected group 2354. It is to be noted that an access-right change screen for specifying access rights to be retained in a selected terminal 2352 has the same configuration as the access-right change screen for specifying access rights to be retained in a selected group 2354.

Then, as the Execute button 62 on the access-right-change screen shown in FIG. 18 is selected by typically clicking the mouse, the terminal 2352 transmits an access-right-change command including the access rights to be retained in the selected group 2354 or in the selected terminal 2352 to the undisclosed WWW apparatus 2950 at the next step S2484.

Subsequently, at the next step S2485, under control executed by the nondisclosure-access control apparatus 2948, the undisclosed WWW apparatus 2950 examines the access-right change command received from the terminal 2352 in order to verify validity of the access-right change command on the basis of the user's ID and access rights. The user is a user pertaining to the terminal 2352. After the validity of the access-right change command is verified, the undisclosed WWW apparatus 2950 passes on the access-right change command to the access-right-data management DB apparatus 2952.

Then, at the next step S2486, the access-right-data-management DB apparatus 2952 updates the access-right data of the selected group 2354 or the selected terminal 2352 for the specified directory in accordance with the access-right-change command received from the undisclosed WWW apparatus 2950. Subsequently, at the next step S2487, the access-right-data-management DB apparatus 2952 sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 requests the terminal 2352 to display a completion notification screen indicating completion of the operation to change the access-right data on the display unit at the next step S2488.

4-2-10: Access-Right-Delete Processing

Figure 69:
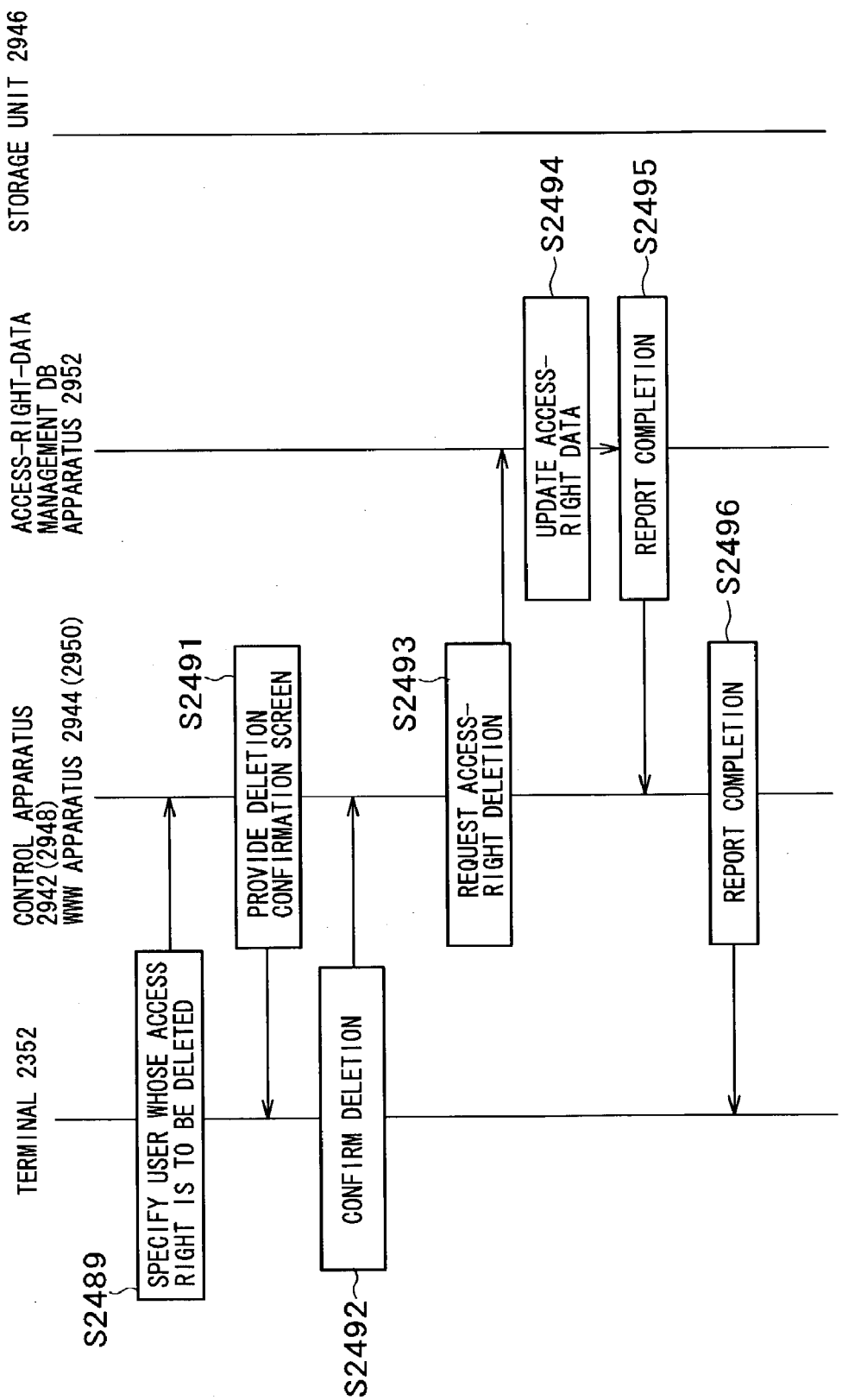
FIG. 69 shows a flowchart representing an outline of a process to delete a right of an access in the cut-list creation system implemented by the embodiment of the present invention.

Next, processing to delete a right of an access to a specified directory, that is, a right owned by a specified group 2354 or a specified terminal 2352, is explained by referring to FIG. 69. It is to be noted that FIG. 69 shows a flowchart representing an outline of the processing to delete a right of an access to a specified directory. On the other hand, FIG. 18 is a diagram showing a typical configuration of an access-right-change screen appearing on the display unit of the terminal 2352 in the processing carried out by the terminal 2352 to delete a right of an access to a specified directory, that is, a right owned by a specified group 2354 or a specified terminal 2352.

As described before, in order to request the terminal 2352 to carry out the processing to delete a right of an access to a directory specified and displayed on the tree display portion 750 of the file-list screen shown in FIG. 13, that is, a right owned by a specified group 2354 or a specified terminal 2352, the user selects the access-right change button 771 on the same screen typically by clicking the mouse. When the user selects the access-right change button 771, a screen showing a list of groups 2354 or a list of terminals 2352 as shown in FIG. 14 is displayed on the display unit of the terminal 2352. The user utilizes the screen to select a group 2354 or a terminal 2352 whose access right is to be deleted by the undisclosed WWW apparatus 2950.

At a first step S2489, the user of the terminal 2352 selects a group 2354 or a terminal 2352 whose access right is to be deleted by the undisclosed WWW apparatus 2950 among those shown on a list of access-group names or a list of access-user names on the screen shown in FIG. 14 typically by clicking the mouse. When the user of the terminal 2352 selects such a group 2354 or such a terminal 2352, a screen used for deleting an access right of the selected group 2354 or the selected terminal 2352 as shown in FIG. 18 is displayed on the display unit of the terminal 2352 at the next step S2491.

A group 2354, access rights of which are to be deleted, is displayed in a group-right-changing portion 60 of the access-right change screen as shown in FIG. 18. The access-right change screen shown in FIG. 18 is a screen for deleting access rights already granted to a selected group 2354. It is to be noted that an access-right change screen for deleting access rights already granted to a selected terminal 2352 has the same configuration as the access-right change screen for deleting access rights already granted to a selected group 2354.

Then, as the Delete button 63 on the access-right-change screen shown in FIG. 18 is selected by typically clicking the mouse, an access-right-delete command including information on access rights to be deleted from those already granted to the selected group 2354 or from those already granted to the selected terminal 2352 is transmitted by the terminal 2352 to the undisclosed WWW apparatus 2950 at the next step S2492.

Subsequently, at the next step S2493, under control executed by the nondisclosure-access control apparatus 2948, the undisclosed WWW apparatus 2950 examines the access-right delete command received from the terminal 2352 in order to verify validity of the access-right delete command on the basis of the user's ID and access rights. The user is a user pertaining to the terminal 2352. After the validity of the access-right delete command is verified, the undisclosed WWW apparatus 2950 passes on the access-right delete command to access-right-data management DB apparatus 2952.

Then, at the next step S2494, the access-right-data-management DB apparatus 2952 updates the access-right data of the selected group 2354 or the selected terminal 2352 for the specified directory in accordance with the access-right-delete command received from the undisclosed WWW apparatus 2950. Subsequently, at the next step S2495, the access-right-data-management DB apparatus 2952 sends a notice indicating completion of the operation to delete the access rights to the undisclosed WWW apparatus 2950.

Receiving the notice indicating completion of the operation to delete the access-right data from the access-right-data-management DB apparatus 2952, the undisclosed WWW apparatus 2950 requests the terminal 2352 to display a completion notification screen indicating completion of the operation to delete the access rights data on the display unit at the next step S2496.

4-2-11: Comment-Reference Display Processing

Figure 70:
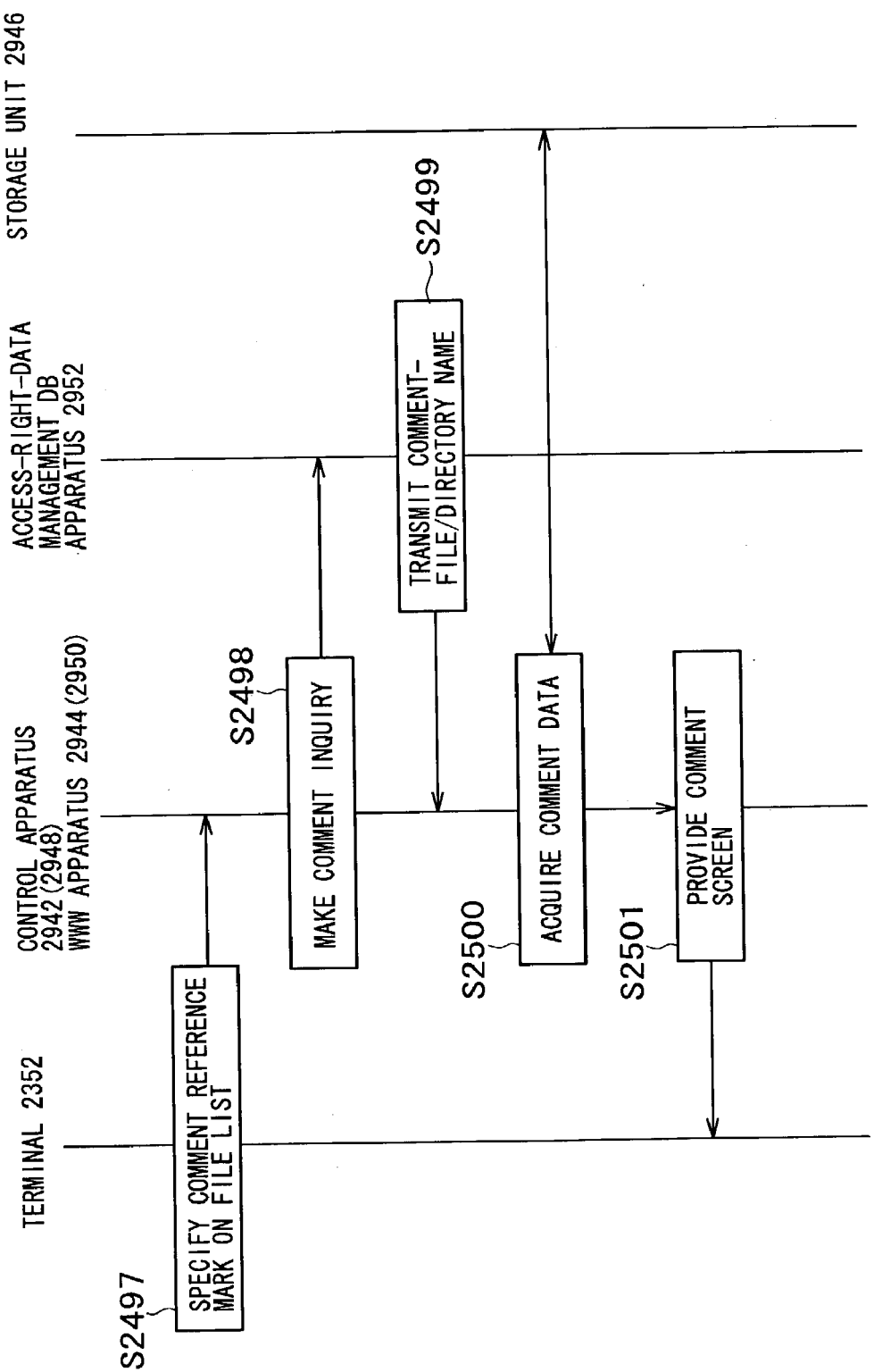
FIG. 70 shows a flowchart representing an outline of a process to reference a comment in the cut-list creation system implemented by the embodiment of the present invention.

Next, comment-reference display processing is explained by referring to FIG. 70. It is to be noted that FIG. 70 shows a flowchart representing an outline of the comment-reference display processing. On the other hand, FIG. 35 is a diagram showing a typical configuration of a screen appearing on the display unit of the terminal 2352 in the comment-reference display processing.

At a first step S2497, typically by clicking the mouse, the user selects a comment-reference mark 768 on the screen shown in FIG. 13 in order to reference a comment affiliated to a directory or a file data. It is to be noted that a comment-reference mark 768 displayed on another screen has the same function as the comment-reference mark 768 displayed on the screen shown in FIG. 13.

When the user selects the comment-reference mark 768, under control executed by the nondisclosure-access control apparatus 2948, the undisclosed WWW apparatus 2950 examines a comment reference command in order to verify validity of the comment reference command on the basis of the user's ID and access rights. The user is a user pertaining to the terminal 2352. After the validity of the comment reference command is verified, the undisclosed WWW apparatus 2950 sends an inquiry including the name of a file data to which the specified comment is affiliated or the name of a directory to which the specified comment is affiliated to the access-right-data management DB apparatus 2952 at the next step S2498.

Then, at the next step S2499, the access-right-data management DB apparatus 2952 collates the data-file name or the directory name included in the inquiry and then transfers collation information for obtaining a comment affiliated with the file data or the directory to the undisclosed WWW apparatus 2950.

After receiving the collation information from the access-right-data management DB apparatus 2952, the undisclosed WWW apparatus 2950 uses the collation information to obtain a comment affiliated with the specified file data or the specified directory from the storage unit 2946 at the next step S2500.

Then, at the next step S2501, the undisclosed WWW apparatus 2950 displays the comment on the referenced-comment screen appearing on the display unit of the terminal 2352 as shown in FIG. 35.

It is to be noted that, in the case of this embodiment, a comment that can be referenced must be a comment affiliated with a directory or a file data stored in an undisclosed storage area of the storage unit 2946. In addition, the undisclosed storage area must be an area accessible to the terminal 2352 and the terminal 2352 must have a read right to reference the comment.

4-2-12: Comment-Addition Processing

Figure 71:
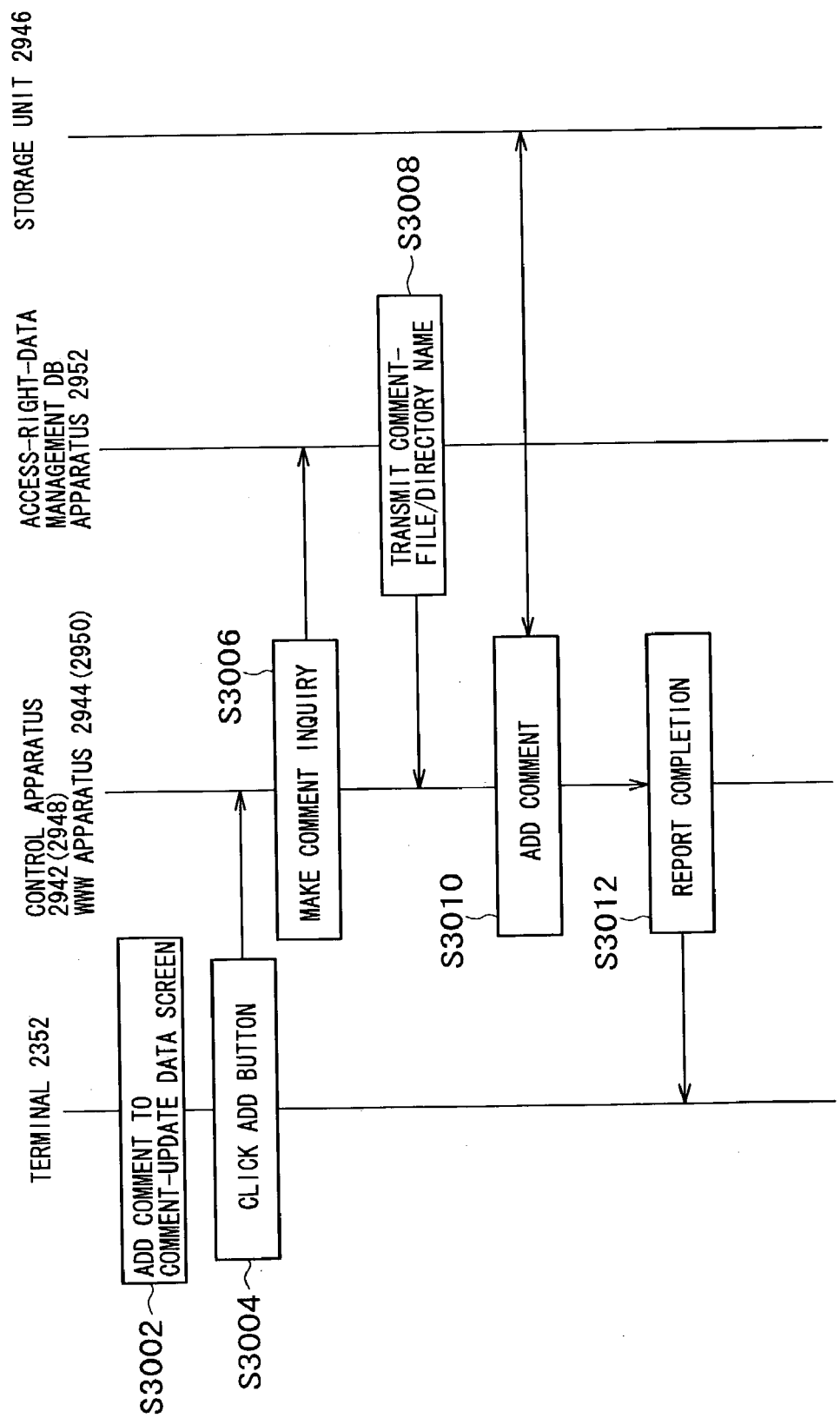
FIG. 71 shows a flowchart representing an outline of a process to add a comment in the cut-list creation system implemented by the embodiment of the present invention.

Next, comment-addition processing is explained by referring to FIG. 71. It is to be noted that FIG. 71 shows a flowchart representing an outline of the comment-addition processing. On the other hand, FIG. 36 is a diagram showing a typical configuration of a screen appearing on the display unit of the terminal 2352 in the comment-addition processing.

As described earlier, when a comment update mark 770 appearing on the screen shown in FIG. 13 is selected by typically clicking the mouse in order to add a comment to a directory or a file data, a comment-update data screen shown in FIG. 36 is displayed. It is to be noted that a comment update mark 770 appearing on another screen has the same function as the comment update mark 770 appearing on the screen shown in FIG. 13.

At a first step S3002, the user enters an additional comment, which is to be added an existing comment, to an added-comment-setting portion 1981 of the comment-update data screen shown in FIG. 36 by typically operating a keyboard of the terminal 2352.

Then, at the next step S3004, the user selects an Add button 1982 on the screen shown in FIG. 36 by typically clicking the mouse after entering the additional comment to the added-comment-setting portion 1981.

When the user selects the Add button 1982, under control executed by the nondisclosure-access control apparatus 2948, the undisclosed WWW apparatus 2950 examines a comment addition command in order to verify validity of the comment addition command on the basis of the user's ID and access rights. The user is a user pertaining to the terminal 2352. After the validity of the comment addition command is verified, the undisclosed WWW apparatus 2950 sends an inquiry including the name of a file data to which the entered comment is to be added or the name of a directory to which the entered comment is to be added to the access-right-data management DB apparatus 2952 at the next step S3006.

Then, at the next step S3008, the access-right-data management DB apparatus 2952 collates the data-file name or the directory name included in the inquiry and then transfers collation information for obtaining a comment affiliated with the file data or the directory to the undisclosed WWW apparatus 2950.

After receiving the collation information from the access-right-data management DB apparatus 2952, the undisclosed WWW apparatus 2950 uses the collation information to carry out a process to obtain a comment affiliated with the specified file data or the specified directory from the storage unit 2946 by making an access to the storage unit 2946 and then add the additional comment to the comment obtained from the storage unit 2946 at the next step S3010.

Then, after the process to add the additional comment is completed, the undisclosed WWW apparatus 2950 displays a completion-notice screen for showing completion of the comment addition on the display unit of the terminal 2352 at the next step S3012.

It is to be noted that, in the case of this embodiment, a comment to which an additional comment can be added must be a comment affiliated with a directory or a file data stored in an undisclosed storage area of the storage unit 2946. In addition, the undisclosed storage area must be an area accessible to the terminal 2352 and the terminal 2352 must have a comment change right to add an additional comment to the comment.

As is obvious from the above description, the comment change right, which is an access right required in a process to add an additional comment to an already existing comment, is different from an access right required in processes such as operations to copy and delete a file data or a directory, with which the already existing comment is affiliated. Thus, it is possible to manage comments, as well as file data and directories to which the comments are affiliated, by treating the comments separately from the file data and the directories.

4-3: Approval-Circulation Processing

The following description explains an approval circulation-process for subjecting a video content stored in the center server 2350 to an approval circulation among terminals 2352 pertaining to the same group 2354 as a terminal 2352 making a request for the approval circulation.

4-3-1: Approval-Circulation-Requesting Processing

Figure 72:
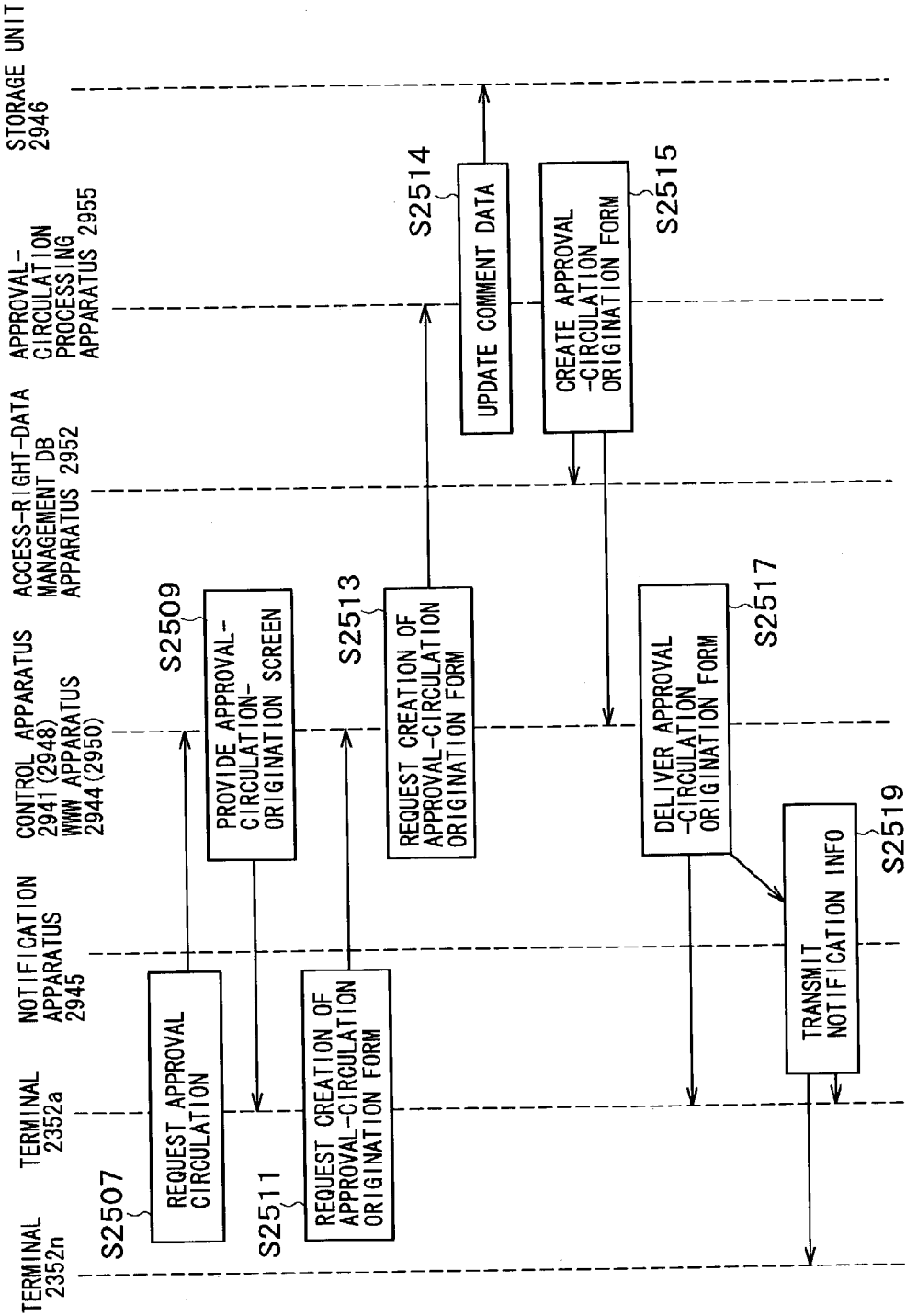
FIG. 72 shows a flowchart representing an outline of a process to make a request for an approval circulation of a data file in the cut-list creation system implemented by the embodiment of the present invention.

The description begins with an explanation of an approval-circulation-requesting process carried out by a particular terminal 2352 to make a request for an approval circulation among other terminals 2352 with reference to FIG. 72. It is to be noted that FIG. 72 shows a flowchart representing an outline of the approval-circulation-requesting processing. On the other hand, FIG. 30 is a diagram showing a typical configuration of a screen appearing on the display unit of the particular terminal 2352 during execution of the approval-circulation-requesting processing.

As described earlier, in order for the user of a particular 2352a to put a specified video content in an approval circulation among other terminals 2352, the user of the particular terminal 2352a selects the specified video content to be put in an approval circulation typically by clicking the mouse against a check box 769 on the screen shown in FIG. 13. It is to be noted that a video content or a plurality of video contents can be selected to be put in an approval circulation.

Then, at a first step S2507 of the flowchart shown in FIG. 72, by typically clicking the mouse, the user selects the 'Approval circulation request' button 764 of the button group 754 constituting a variety of icons as described before by referring to FIG. 13. Subsequently, at the next step S2509, the undisclosed WWW apparatus 2950 requests the particular terminal 2352a to display an approval-circulation-request origination screen shown in FIG. 30 on the display unit of the terminal 2352a to allow the user of the terminal 2352a to specify other terminals 2352 to each serve as a target of the approval circulation.

Then, at the next step S2511, the user selects the other terminals 2352 to each serve as a target of the approval circulation from a circulation-route display 654 on the screen shown in FIG. 30 and, as the user selects the Execute button 651 on the same screen by typically clicking the mouse, the particular terminal 2352a serving as the originator of the approval circulation transmits an approval-circulation request command including the approval circulation's circulation route showing the specified terminals 2352 and information on a video content to be put in the approval circulation to the undisclosed WWW apparatus 2950.

When the undisclosed WWW apparatus 2950 receives the approval-circulation request command from the particular terminal 2352a, under control executed by the nondisclosure-access control apparatus 2948, the undisclosed WWW apparatus 2950 examines the approval-circulation request command in order to verify validity of the approval-circulation request command on the basis of user ID and access rights. After the validity of the approval-circulation request command is verified, the undisclosed WWW apparatus 2950 passes on the approval-circulation request command to the approval-circulation-processing apparatus 2955 at the next step S2513.

Then, at the next step S2514, the approval-circulation-processing apparatus 2955 updates an inspection approval circulation comment affiliated to a video content selected from the storage unit 2946 to be put in an approval circulation in accordance with the approval-circulation request command.

Subsequently, at the next step S2515, the approval-circulation-processing apparatus 2955 requests the access-right-data management DB apparatus 2952 to update the access-right data and, after verifying that the processing to update the access-right data has been completed, the access-right-data management DB apparatus 2952 transmits a completion notice indicating completion of the processing of the request for an approval circulation to the undisclosed WWW apparatus 2950.

Then, at the next step S2517, after receiving the completion notice, the undisclosed WWW apparatus 2950 requests the particular terminal 2352a to display a completion-notice screen showing completion of a process to handle the request for an approval circulation on the display unit employed in the terminal 2352a and transmits an approval circulation request notice created on the basis of the completion notice to the notification apparatus 2945.

Subsequently, receiving the approval circulation request notice at the next step S2519, the notification apparatus 2945 creates information indicating the existence of the request for an approval circulation, and transmits a notification mail such as an e-mail containing the information to the terminals 2352n each serving as a target of the approval circulation.

It is to be noted that, in the case of this embodiment, a video content that can be selected to be put in an approval circulation must be a video content stored in a file data in an undisclosed storage area of the storage unit 2946. In addition, the undisclosed storage area must be an area accessible to the terminal 2352a and the terminals 2352n. In addition, these terminals. 2352a and 2352n must each have a write right to store a file data into the directory including a file data containing the video content.

4-3-2: Approval-Circulation Verification Processing

Figure 73:
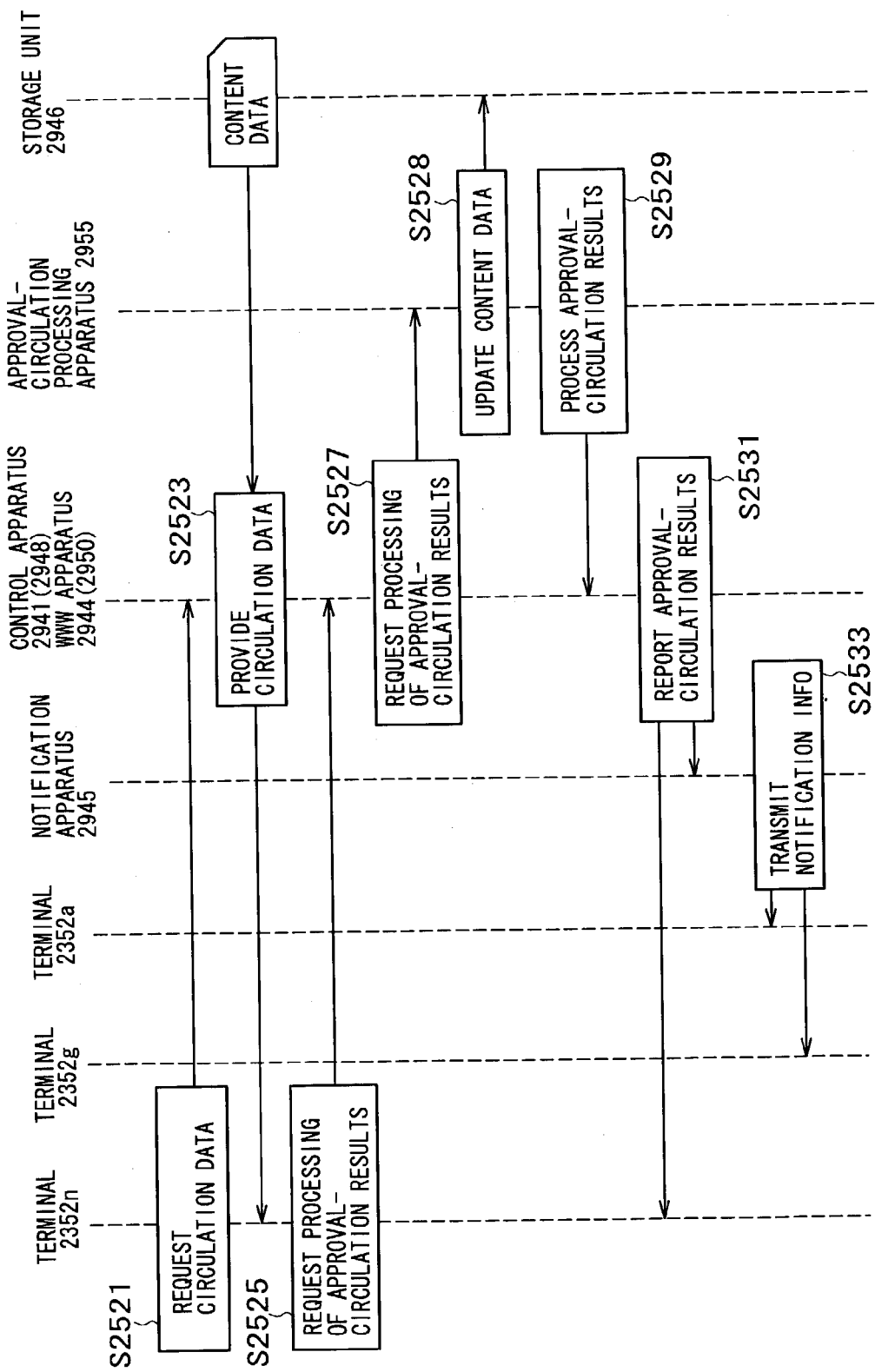
FIG. 73 shows a flowchart representing an outline of a process to verify a data file put in an approval circulation in the cut-list creation system implemented by the embodiment of the present invention.

The following description explains an approval-circulation confirmation process carried out by a terminal 2352n to verify a video content put in an approval circulation by referring to FIG. 73. It is to be noted that FIG. 73 shows a flowchart representing an outline of the approval-circulation verification processing. On the other hand, FIG. 74 is a diagram showing a typical configuration of a screen appearing on the display unit of the terminal 2352n in the approval-circulation verification processing.

As described earlier, when a terminal 2352a serving as an originator of an approval circulation requests an approval circulation, the display unit of each terminal 2352n serving as a target of the approval circulation displays a screen including a reception table 1724 showing a list of video contents put in the approval circulation as shown in FIG. 34. When the user of the terminal 2352n selects the name of a desired file data containing a video content from the reception table 1724 by typically clicking the mouse at a first step S2521 of the flowchart shown in FIG. 73, the terminal 2352n transmits an approval-circulation verification command including the selected name of the file data containing the video content to the undisclosed WWW apparatus 2950.

After receiving the approval-circulation verification command from terminal 2352n, under control executed by the nondisclosure-access control apparatus 2948, the undisclosed WWW apparatus 2950 examines an access-right delete command in order to verify validity of the access-right delete command. After the validity of the access-right delete command is verified, the undisclosed WWW apparatus 2950 collates the selected name of the file data containing the video content with the access-right-data management DB apparatus 2952. Then, at the next step S2523, the undisclosed WWW apparatus 2950 obtains the selected video content from the storage unit 2946 on the basis of a result of collation, and requests the terminal 2352n to display a video-content verification screen showing the video content obtained from the storage unit 2946 on the display unit employed in the terminal 2352n as shown in FIG. 74.

Figure 74:
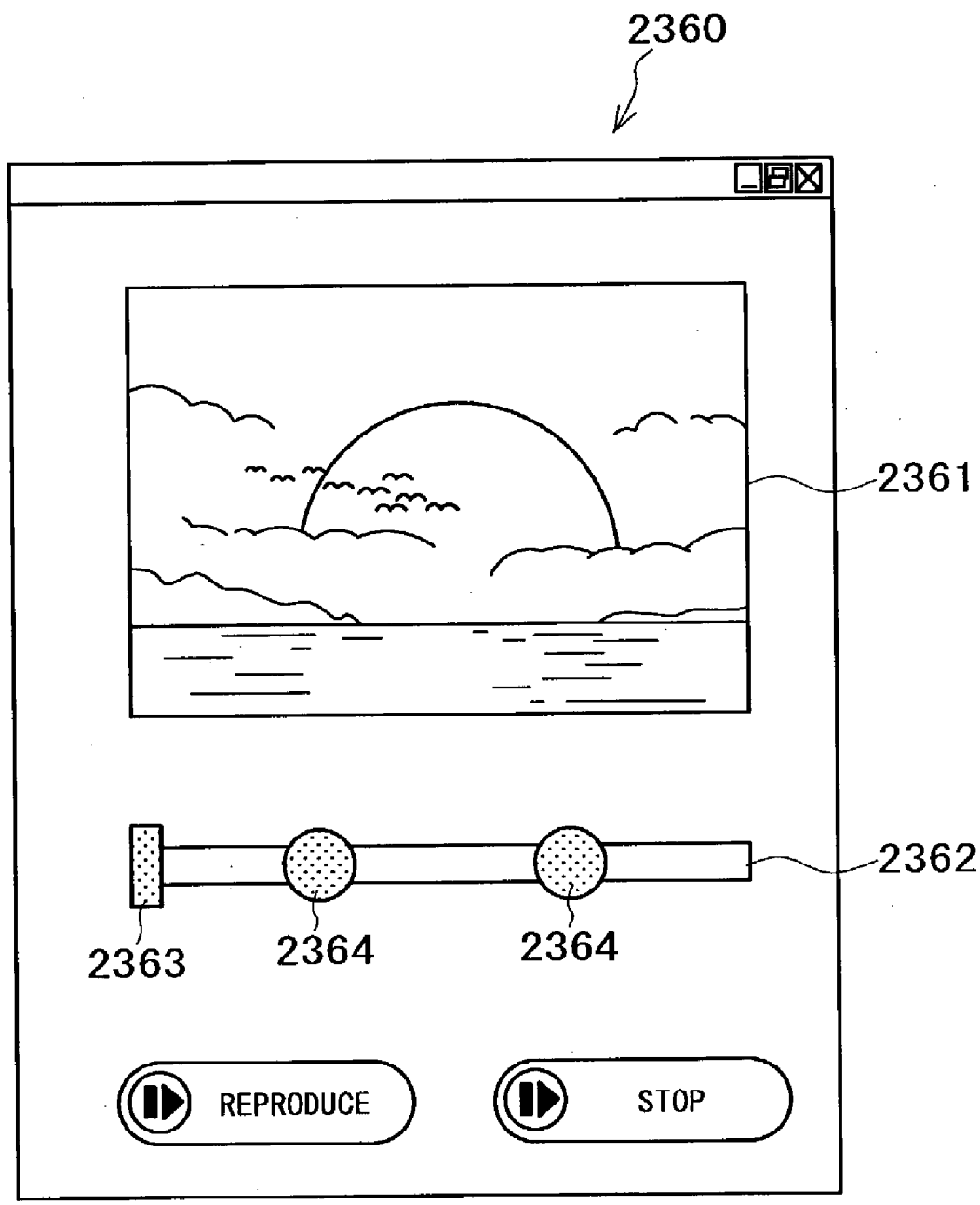
FIG. 74 is an explanatory diagram showing a still further screen appearing on the display unit of a terminal employed in the cut-list creation system implemented by the embodiment of the present invention.

The following description explains the video-content verification screen by referring to FIG. 74. As shown in the figure, video-content verification screen includes a monitor portion 2361, a slide portion 2362, a guide 2363 and marks 2364. The monitor portion 2361 displays an image of the video content. The slide portion 2362 represents the length of time required for reproducing the video content from its start to its end. The guide 2363 is a movable item representing the progress of the operation to reproduce the video content.

When a Reproduce button of the screen shown in FIG. 74 is selected by typically clicking the mouse, the operation to reproduce the video content is started. At that time, the guide 2363 begins to move along the slide portion 2362 in the right direction.

If a cut or a frame causing concern appears in the course of the operation to reproduce the video content, the user may select a Stop button to display the cut causing concern on the monitor portion 2361 in a standstill state. In this state, marks 2364 can be set at locations on the slide portion 2362 as shown in FIG. 74 by selecting each of the locations through typically an operation to click the mouse. By setting marks 2364 as such, a comment for the cut can be set in comment data affiliated to the video content.

If an operation to click the mouse is carried out while the guide 2363 is passing through a mark 2364 set as described above, a picture corresponding to a location represented by the position of the mark 2364 appears on the monitor portion 2361 in a standstill state and the comment set in the comment data is displayed.

By using the marks 2364 described above, a comment related to a frame of a video content such as a moving picture can be displayed with ease during verification of the video content by a terminal 2352n. In addition, it is also possible to determine an action or the like for the comment with a high degree of accuracy. It is to be noted, however, that the scope of the present invention is not limited to the particulars of the embodiment. For example, it is also possible to slide the guide 2363 directly to a mark 2364 once the location of the mark 2364 has been selected so as to display a picture corresponding to the location of the mark 2364 on the monitor portion 2361.

4-3-3: Approval-Circulation-Request-Result Processing

As a result of verification of a video content, a verification result such as an approval or a rejection can be reported by the terminal 2352n serving as a target of an approval circulation to the terminal 2352a serving as the originator of the approval circulation. In this case, when an inspection approval circulation comment update mark 1726 on the screen shown in FIG. 34 is selected typically by clicking the mouse, an approval-circulation-request-result screen shown in FIG. 31 is displayed.

If necessary, at a step S2525 of the flowchart shown in FIG. 73, the user of the terminal 2352n serving as a target of the approval circulation sets a comment in the previous-circulation-comment portion 1972 or the next-circulation-comment portion 1973 of the approval-circulation-request-result screen shown in FIG. 31. Then, as the user selects an Approve button 1974 or a Reject button 1975 as a result of verification, the terminal 2352n transmits an approval-circulation result command including the comment, which has been set in accordance with necessity, and including the result of verification to the undisclosed WWW apparatus 2950.

After receiving the approval-circulation result command from the terminal 2352n, under control executed by the nondisclosure-access control apparatus 2948, the undisclosed WWW apparatus 2950 examines the approval-circulation-result command in order to verify validity of the approval-circulation result command on the basis of the user ID and access rights. After the validity of the approval-circulation result command is verified, the undisclosed WWW apparatus 2950 passes on the approval-circulation result command to the approval-circulation-processing apparatus 2955 at the next step S2527.

Then, at the next step S2528, the approval-circulation-processing apparatus 2955 updates inspection approval circulation comment data stored in the storage unit 2946, being affiliated to the video content with a comment set in the approval-circulation result command in accordance with the approval-circulation result command received from the undisclosed WWW apparatus 2950.

In addition, at the next step S2529, the approval-circulation-processing apparatus 2955 requests the access-right-data management DB apparatus 2952 to update the access-right data in accordance with the approval-circulation result command received from the undisclosed WWW apparatus 2950 and, after confirming completion of the process to update the access-right data, the approval-circulation-processing apparatus 2955 transfers a completion notice indicating the completion of the processing to process the result of the approval circulation to the undisclosed WWW apparatus 2950.

After receiving the completion notice from the approval-circulation-processing apparatus 2955, the undisclosed WWW apparatus 2950 requests the terminal 2352n to display a completion-notice screen showing the completion of the processing to process the result of the approval circulation on the display unit employed in the terminal 2352n and transmits an approval-circulation result notice created on the basis of the completion notice to the notification apparatus 2945 at the next step S2531.

Receiving the approval-circulation result notice from the undisclosed WWW apparatus 2950 at the next step S2533, the notification apparatus 2945 forms information indicating the existence of the request for an approval circulation, and transmits a notification mail such as an e-mail containing the information to a terminal 2352g serving as the next target of the approval circulation. In addition, the notification apparatus 2945 forms information containing the approval-circulation result produced by the terminal 2352n, and transmits a notification mail such as an e-mail containing the information to the terminal 2352a serving as the originator of the approval circulation.

As described above, in the case of this embodiment, the receiver of a notification mail containing a result of the approval-circulation is the terminal 2352a serving as the originator of the approval circulation. It is to be noted, however, that the scope of the present invention is not limited to the particulars of this embodiment. For example, the notification mail containing a result of the approval circulation can be transmitted to all terminals 2352 on the circulation route, which precede the terminal 2352 producing the result of the approval circulation.

4-4: Cut-List Creation Processing

The following description explains a process to create a cut list, which is also referred to as a video-content-scene list. That is to say, a cut list is a list of scenes of a video content.

4-4-1: Processing to Create a Template of a Cut List

Figure 75:
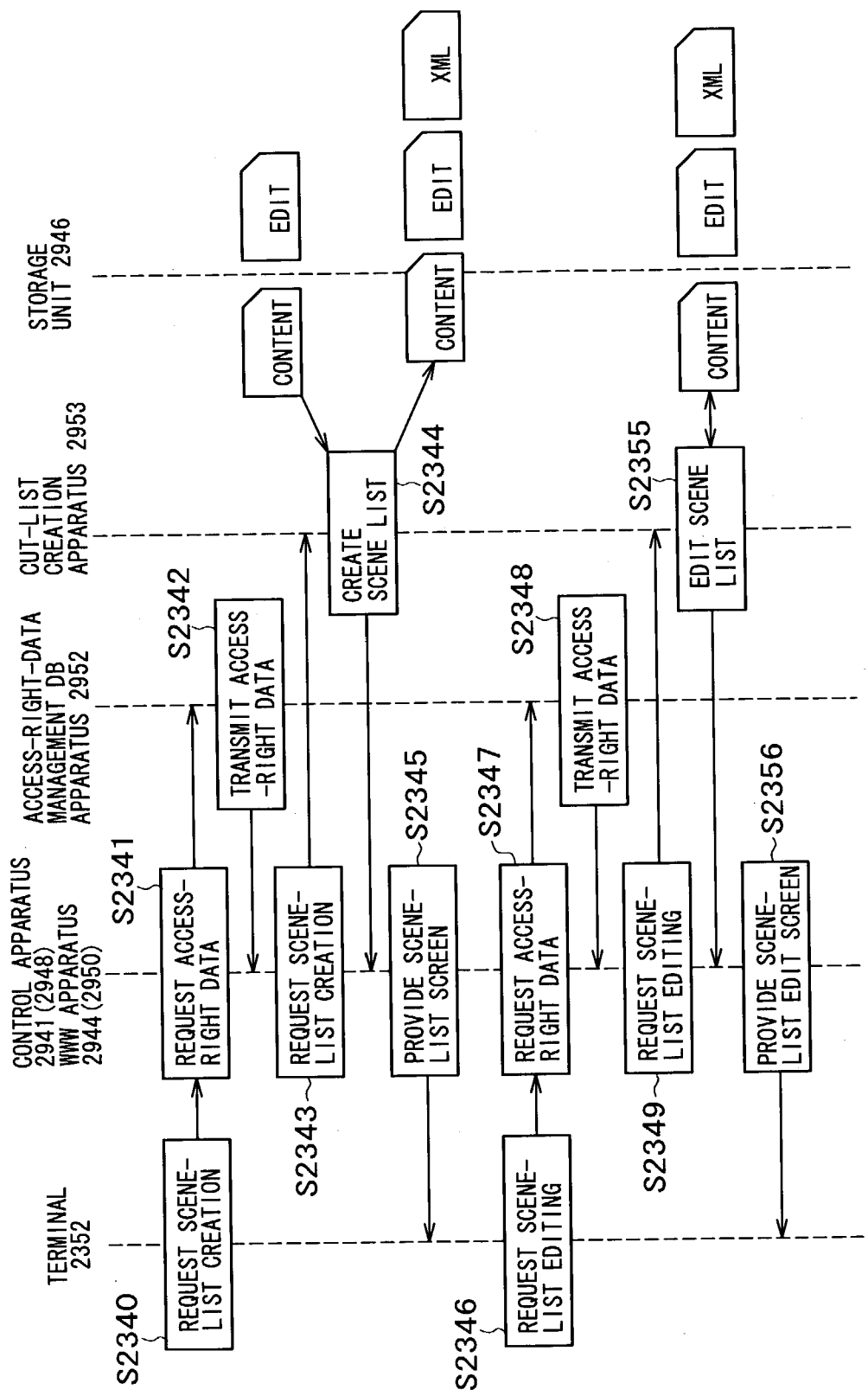
FIG. 75 shows a flowchart representing an outline of a process to create template data of a cut list in the cut-list creation system implemented by the embodiment of the present invention.

First of all, a process to create a template of a cut list is explained by referring to FIG. 75. It is to be noted that FIG. 75 shows a flowchart representing an outline of the process to create a template of a cut list. On the other hand, FIG. 42 is a diagram showing a typical configuration of a screen appearing on the display unit of the terminal 2352 during execution of the process to create template data of a cut list.

As described before, in order to create template data of a cut list from a specified video content by operating the terminal 2352, the user needs to use the screen shown in FIG. 42 for selecting the name of a file data for storing a cut list, template data of which is to be newly created, the name of a directory for accommodating the file data to be used for storing the template data of the cut list, the name of a file data containing a video content to be used as a source for creating the template data and the name of an EDL file data to be created in a process to edit the video content to be used as a source for creating the template data. Then, the user typically clicks the mouse to select an Execute button to start the process to create the template data.

The EDL file data is created in a process to edit the video content to be used as a source for creating the template data. The EDL file data contains edit information including scenes of the video content, edit locations (or existence locations) expressed in terms of frames or the like and an editing time of each scene.

As the Execute button is selected, the terminal 2352 transmits a template-data creation command to the undisclosed WWW apparatus 2950 at a first step S2340 of the flowchart shown in FIG. 75. The template-data creation command includes the name of the file for storing a cut list, template data of which is to be newly created, the name of a directory for accommodating the file data to be used for storing the template data of the cut list, the name of a file data containing a video content to be used as a source for creating the template data and the name of the EDL file data.

When receiving the template-data creation command from the terminal 2352, under control executed by the nondisclosure-access control apparatus 2948, the undisclosed WWW apparatus 2950 examines the template-data creation command in order to verify validity of the template-data creation command on the basis of the user ID and access rights. After the validity of the template-data creation command is verified, the undisclosed WWW apparatus 2950 transmits an access-right change command created on the basis of the template-data creation command to the access-right-data management DB apparatus 2952 at the next step S2341.

Then, at the next step S2342, the access-right-data-management DB apparatus 2952 updates the access-right data in accordance with the access-right-change command received from the undisclosed WWW apparatus 2950, and sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 outputs a template-data creation command to the cut-list-creation apparatus 2953 at the next step S2343, commanding the cut-list-creation apparatus 2953 to create template data.

Then, receiving the template-data creation command from the undisclosed WWW apparatus 2950, at the next step S2344, the cut-list-creation apparatus 2953 acquires a video content stored in a file data and edit information stored in an EDL file from the storage unit 2946. The name of the file data and the name of the EDL file are included in the template-data creation command. Then, the cut-list-creation apparatus 2953 creates template data of a cut list showing extracted cuts (or scenes) each representing pictures and creates XML (extensible markup language) data for editing the template data. Subsequently, the cut-list-creation apparatus 2953 stores the template data of the cut list and the XML data in file data accommodated in the directory selected as described above. Finally, after completion of the data-storing process, the cut-list-creation apparatus 2953 transfers template display data including the template data and indicating completion of the process to create the template data to the undisclosed WWW apparatus 2950.

Receiving the template display data from the cut-list-creation apparatus 2953, at the next step S2345, the undisclosed WWW apparatus 2950 requests the terminal 2352 to display the cut-list template-data screen shown in FIG. 44 on the display unit employed in the terminal 2352. The cut-list template-data screen shows the created template data.

4-4-2: Cut-List Template-Data Edit Processing

By referring to FIG. 75, the following description explains various kinds of edit processing such as integration of created pieces of template data, division of template data and changing of a cut representative picture.

4-4-2-1: Template-Data Integration Processing

As described before, already existing template data or newly created template data is shown on a template-data edit screen appearing on the display unit of the terminal 2352 as shown in FIG. 44. On a cut-scale column of the template-data edit screen, a Change button is provided for each scene. If the Change button provided for one of two scenes to be integrated into one scene is selected, a cut-list template-data edit select screen shown in FIG. 45 is displayed.

At a step S2346 of the flowchart shown in FIG. 75, the terminal 2352 transmits a template-data integration command to the undisclosed WWW apparatus 2950 when an 'Integrate cuts' item is selected from the cut-list template-data edit select screen shown in FIG. 45. The template-data integration command includes information such as the name of a file data containing template data to be edited, the number of a scene to be integrated and the name of the integration processing.

When receiving the template-data integration command from the terminal 2352, under control executed by the nondisclosure-access control apparatus 2948, the undisclosed WWW apparatus 2950 examines the template-data integration command in order to verify validity of the template-data integration command on the basis of the user ID and access rights. After the validity of the template-data integration command is verified, the undisclosed WWW apparatus 2950 transmits an access-right change command created on the basis of the template-data integration command to the access-right-data management DB apparatus 2952 at the next step S2347.

Then, at the next step S2348, the access-right-data-management DB apparatus 2952 updates the access-right data in accordance with the access-right-change command received from the undisclosed WWW apparatus 2950, and sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 outputs a template-data integration command to the cut-list-creation apparatus 2953 at the next step S2349, requesting the cut-list-creation apparatus 2953 to integrate template data.

Then, receiving the template-data integration command from the undisclosed WWW apparatus 2950, at the next step S2355, the cut-list-creation apparatus 2953 acquires a video content stored in a file data and edit information stored in an XML file from the storage unit 2946. The name of the file data and the name of the XML file are included in the template-data integration command. Then, the cut-list-creation apparatus 2953 carries out an integration process including integration of two screens of representative pictures into a single screen and editing of affiliated information such as a cut scale on the basis of numbers of scenes set as scenes to be integrated as well as information such as scene edit positions and scene edit times specified in XML data stored in the XML file data. Finally, after completion of the integration processing, the cut-list-creation apparatus 2953 transfers template edit display data including the template data obtained as a result of the integration processing and indicating completion of the process to integrate the template data to the undisclosed WWW apparatus 2950.

Receiving the template edit display data from the cut-list-creation apparatus 2953, at the next step S2356, the undisclosed WWW apparatus 2950 requests the terminal 2352 to display the cut-list template-data screen shown in FIG. 44 on the display unit employed in the terminal 2352. The cut-list template-data screen shows the template data reflecting the result of the cut integration.

4-4-2-2: Template-Data Division Processing

As described before, already existing template data or newly created template data is shown on a template-data edit screen appearing on the display unit of the terminal 2352 as shown in FIG. 44. On a cut-scale column of the template-data edit screen, a Change button is provided for each scene. If the Change button provided for a scene to be divided into two scenes is selected, a cut-list template-data edit select screen shown in FIG. 45 is displayed.

When a 'Divide a cut' item on the cut-list template-data edit select screen shown in FIG. 45 is selected and, then, an Execute button of the same screen is selected, a cut-list template-data division edit screen shown in FIG. 48 is displayed. Subsequently, when a new in-point representing a division start frame at which a cut is to be divided into two scenes is selected from the division select portion 2160 or 2161 and, then, a 'Divide cut and close' button is selected, at a step S2346 of the flowchart shown in FIG. 75, the terminal 2352 transmits a template-data division command to the undisclosed WWW apparatus 2950. The template-data division command includes information such as the name of a file data containing template data to be edited, the division position of the new in-point representing a division start frame as mentioned above and the name of the division processing.

When receiving the template-data division command from the terminal 2352, under control executed by the nondisclosure-access control apparatus 2948, the undisclosed WWW apparatus 2950 examines the template-data division command in order to verify validity of the template-data division command on the basis of the user ID and access rights. After the validity of the template-data division command is verified, the undisclosed WWW apparatus 2950 transmits an access-right change command created on the basis of the template-data division command to the access-right-data management DB apparatus 2952 at the next step S2347.

Then, at the next step S2348, the access-right-data-management DB apparatus 2952 updates the access-right data in accordance with the access-right-change command received from the undisclosed WWW apparatus 2950, and sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 outputs a template-data division command to the cut-list-creation apparatus 2953 at the next step S2349, commanding the cut-list-creation apparatus 2953 to divide template data.

Then, receiving the template-data division command from the undisclosed WWW apparatus 2950, at the next step S2355, the cut-list-creation apparatus 2953 acquires a video content stored in a file data and information stored in an XML file from the storage unit 2946. The name of the file data and the name of the XML file are included in the template-data division command. Then, the cut-list-creation apparatus 2953 carries out a division process including extraction of representative pictures of post-division screens separated by the specified division position and editing of affiliated information such as a cut scale on the basis of the edit position of a frame of a scene set as a cut to be divided as well as information such as edit positions and edit times of frames of scenes specified in the XML data stored in the XML file data. Finally, after completion of the division processing, the cut-list-creation apparatus 2953 transfers template edit display data including the template data obtained as a result of the division processing and indicating completion of the process to divide the template data to the undisclosed WWW apparatus 2950.

Receiving the template edit display data from the cut-list-creation apparatus 2953, at the next step S2356, the undisclosed WWW apparatus 2950 requests the terminal 2352 to display the cut-list template-data screen shown in FIG. 44 on the display unit employed in the terminal 2352. The cut-list template-data screen shows the template data reflecting the result of the cut division.

4-4-2-3: Template-Data Representative-Picture Change Processing

As described before, already existing template data or newly created template data is shown on a template-data edit screen appearing on the display unit of the terminal 2352 as shown in FIG. 44. On a cut-scale column of the template-data edit screen, a Change button is provided for each scene. If the Change button provided for a scene to be divided into two scenes is selected, a cut-list template-data edit select screen shown in FIG. 45 is displayed.

When a 'Change a representative picture' item shown on the cut-list template-data edit select screen is selected and, then, an Execute button of the same screen is selected, a cut-list representative-picture change screen shown in FIG. 47 is displayed.

When the image of a representative picture of frames of a scene is changed, an image displayed as a new representative picture on the screen shown in FIG. 47 is the post-change representative picture. The new representative picture is selected from the representative-picture select portion 2150 or 2151.

When a 'Change representative picture and close' button is selected after selection of the image of a new representative picture, at a step S2346 of the flowchart shown in FIG. 75, the terminal 2352 transmits a template-data change command to the undisclosed WWW apparatus 2950. The template-data change command includes information such as the name of a file data containing template data to be edited, the edit position of a picture to be used as the new representative picture and the name of the processing to change the representative picture.

When receiving the template-data change command from the terminal 2352, under control executed by the nondisclosure-access control apparatus 2948, the undisclosed WWW apparatus 2950 examines the template-data change command in order to verify validity of the template-data change command on the basis of the user ID and access rights. After the validity of the template-data change command is verified, the undisclosed WWW apparatus 2950 transmits an access-right change command created on the basis of the template-data change command to the access-right-data management DB apparatus 2952 at the next step S2347.

Then, at the next step S2348, the access-right-data-management DB apparatus 2952 updates the access-right data in accordance with the access-right-change command received from the undisclosed WWW apparatus 2950, and sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 outputs a template-data change command to the cut-list-creation apparatus 2953 at the next step S2349, requesting the cut-list-creation apparatus 2953 to change template data.

Then, receiving the template-data change command from the undisclosed WWW apparatus 2950, at the next step S2355, the cut-list-creation apparatus 2953 acquires a video content stored in a file data and information stored in an XML file from the storage unit 2946. The name of the file data and the name of the XML file are included in the template-data change command. Then, the cut-list-creation apparatus 2953 carries out a change process including extraction of a representative picture of the post-change screen on the basis of the edit position of a frame of the post-change representative picture as well as information such as edit positions and edit times of frames of scenes specified in the XML data stored in the XML file data. Finally, after completion of the change processing, the cut-list-creation apparatus 2953 transfers template edit display data including the template data obtained as a result of the processing to change the representative picture and indicating completion of the process to change the representative picture to the undisclosed WWW apparatus 2950.

Receiving the template edit display data from the cut-list-creation apparatus 2953, at the next step S2356, the undisclosed WWW apparatus 2950 requests the terminal 2352 to display the cut-list template-data screen shown in FIG. 44 on the display unit employed in the terminal 2352. The cut-list template-data screen shows the template data reflecting the result of the processing to change the representative picture.

As described above, in the case of this embodiment, data stored in an XML file is used in a process to edit template data. It is to be noted, however, that the scope of the present invention is not limited to the particulars of the embodiment. For example, data stored in an EDL file can also be used in a process to edit template data.

4-4-2-4: Video-Content Inspection-Data Change Processing

As described before, already existing template data or newly created template data can be converted into video-content inspection data that can be output to typically printing media with a format like the one displayed on a cut-list preview screen shown in FIG. 50.

First of all, in order to convert already existing template data or newly created template data into video-content inspection data, the user needs to select a 'Select output format' button on the screen shown in FIG. 44 in order to display the cut-list output format screen shown in FIG. 49.

As the user selects the 'Preview in PDF' button of the cut-list output format screen shown in FIG. 49 after selecting one of layouts of PDF data, which are shown in the same screen, the terminal 2352 transmits a template-data change command to the undisclosed WWW apparatus 2950 at the step S2436 of the flowchart shown in FIG. 75. The selected layout will be used as a layout of video-content inspection data to be output. The template-data change command includes information such as the name of a file data containing template data to undergo the conversion processing and the selected layout.

When receiving the template-data change command from the terminal 2352, under control executed by the nondisclosure-access control apparatus 2948, the undisclosed WWW apparatus 2950 examines the template-data change command in order to verify validity of the template-data change command on the basis of the user ID and access rights. After the validity of the template-data change command is verified, the undisclosed WWW apparatus 2950 transmits an access-right change command created on the basis of the template-data change command to the access-right-data management DB apparatus 2952 at the next step S2347.

Then, at the next step S2348, the access-right-data-management DB apparatus 2952 updates the access-right data in accordance with the access-right-change command received from the undisclosed WWW apparatus 2950, and sends a notice indicating completion of the operation to change the access-right data to the undisclosed WWW apparatus 2950.

Receiving the notice indicating completion of the operation to change the access-right data from the access-right-data-management DB apparatus 2952, the undisclosed WWW apparatus 2950 outputs a template-data change command to the cut-list-creation apparatus 2953 at the next step S2349, requesting the cut-list-creation apparatus 2953 to convert the template data.

Then, receiving the template-data change command from the undisclosed WWW apparatus 2950, at the next step S2355, the cut-list-creation apparatus 2953 acquires a video content stored in a file data from the storage unit 2946. The name of the file data is included in the template-data change command. Then, the cut-list-creation apparatus 2953 carries out a PDF data conversion process based on the selected layout. Finally, after completion of the conversion processing, the cut-list-creation apparatus 2953 transfers edit display data including PDF data obtained as a result of the PDF conversion processing and indicating completion of the PDF conversion processing to the undisclosed WWW apparatus 2950.

Receiving the edit display data from the cut-list-creation apparatus 2953, at the next step S2356, the undisclosed WWW apparatus 2950 requests the terminal 2352 to display the cut-list preview screen shown in FIG. 50 on the display unit employed in the terminal 2352. The cut-list preview screen shows the PDF data.

As described above, in the case of this embodiment, the video-content inspection data obtained as a result of conversion of template data is PDF data. It is to be noted, however, that the scope of the present invention is not limited to the particulars of the embodiment. For example, the video-content inspection data obtained as a result of conversion of template data can be data having another format such as HTML data.

4-5: Encoding Process

The following description explains an encoding process to convert the format of a video content such as moving-picture and sound data stored in the center server 2350 into another format.

4-5-1: New-Encoding-Order-Cataloging Process

Figure 76:
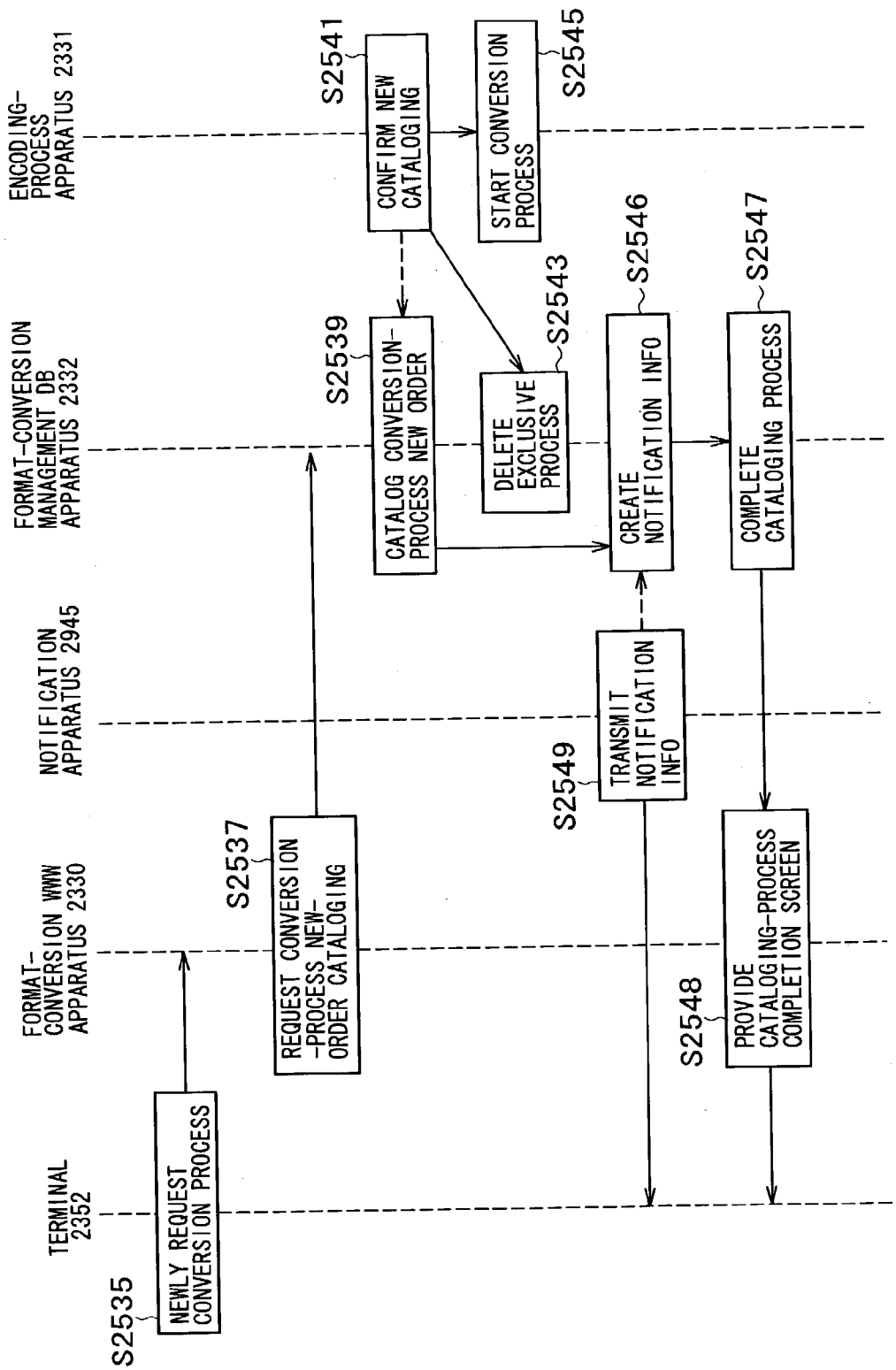
FIG. 76 shows a flowchart representing an outline of a process to catalog a new order for a format-conversion encoding process in the cut-list creation system implemented by the embodiment of the present invention.

First of all, a new-encoding-order-cataloging process is explained by referring to FIG. 76. It is to be noted that FIG. 76 shows a flowchart representing an outline of the new-encoding-order-cataloging process. On the other hand, FIG. 53 is a diagram showing a typical configuration of a screen appearing on the display unit employed in the terminal 2352 during execution of the new-encoding-order-cataloging process.

As described earlier, in order to convert the format of a video content such as moving-picture and sound data stored in the center server 2350 into another format, the user needs to enter information to the screen shown in FIG. 53. The entered information includes the name of a file data containing a video content, the format of which is to be converted into another format, the name of a file data for storing a video content having the other format obtained as a result of the format-conversion encoding process, the name of a directory for accommodating the file data for storing the video content having the other format and the name of the new format. As the user selects an Execute button for starting the encoding process after entering the information described above, the terminal 2352 transmits a new-encoding-order-cataloging command to the format-conversion WWW apparatus 2330 at a first step S2535 of the flowchart shown in FIG. 76. The new-encoding-order-cataloging command includes the information including the name of a file data containing a video content, the format of which is to be converted into another format, the name of a file data for storing a video content having the other format obtained as a result of the format-conversion encoding process, the name of a directory for accommodating the file data for storing the video content having the other format and the name of the new format.

Receiving the new-encoding-order-cataloging command from the terminal 2352, the format-conversion WWW apparatus 2330 verifies validity of the new-encoding-order-cataloging command on the basis of the user ID and access rights. After the validity of the new-encoding-order-cataloging command is verified, the information included in the new-encoding-order-cataloging command is passed on to the format-conversion management DB apparatus 2332 at the next step S2537.

Receiving the information included in the encoding-anew command from the format-conversion WWW apparatus 2330, the format-conversion management DB apparatus 2332 creates information 231 like one shown in FIG. 7 on the basis of the information included in the new-encoding-order-cataloging command and catalogs the information 231 in an order-table storage area 2322 as a new order at the next step S2539.

It is to be noted that the information 231 includes an expected completion time at which completion of the format-conversion encoding process is expected. The expected completion time is estimated by the format-conversion management DB apparatus 2332 on the basis of attributes of the video content selected to undergo the format-conversion encoding process and the processing power of the encoding-process apparatus 2331. The attributes include the size of the video content and the duration (the reproduction time) of the video content.

Subsequently, at the next step S2543, the format-conversion management DB apparatus 2332 creates information 230 on the basis of the information 231 and catalogs the information 230 in the exclusion-table storage area 2323 shown in FIG. 6 for an exclusion purpose.

When the encoding-process apparatus 2331 detects the operation to catalog the information 231 as a new order, the encoding-process apparatus 2331 finds the information 230 at the next step S2541.

Then, the encoding-process apparatus 2331 acquires a video content, the format of which is to be converted into another format, from the storage unit 2946 and exclusively starts the format-conversion processing at the next step S2545.

A job number shown in FIGS. 5, 6 and 7 is a number used as a key for a format-conversion encoding process. Thus, since the exclusion-table storage area 2323 does not include a plurality of same job numbers, the process to convert the format of a video content identified by a piece of information 231 into another format is carried out by the encoding-process apparatus 2331 exclusively.

As an example, assume that the format-conversion management DB apparatus 2332 newly catalogs information 231-2 in the order-table storage area 2322 as shown in FIG. 7. In this case, if a plurality of encoding-process apparatus 2331 detects the operation to catalog the information 231-1 with the same timing, only the encoding-process apparatus 2331 first finding the cataloged information 230-1 in the exclusion-table storage area 2323 shown in FIG. 6 is capable of exclusively starting a format-conversion encoding process. The remaining encoding-process apparatus 2331 are not capable of finding the cataloged information 230-1 and starting a format-conversion encoding process. As a result, the remaining encoding-process apparatus 2331 search the order-table storage area 2322 shown in FIG. 7 for a piece of information 231, which has been cataloged next.

Then, after the format-conversion management DB apparatus 2332 catalogs the information 231 in the order-table storage area 2322, the notification apparatus 2945 creates information 229 based on the cataloged information 231 and catalogs the information 229 in a notification storage area 2321 at the next step S2546. The information 229 is information to be reported to the terminal 2352 making the request for cataloging of the new order for a format-conversion encoding process.

In addition, the information 231 also includes an expected completion time and exclusive information including the ID of the encoding-process apparatus 2331 or the number of pieces of information 230 cataloged in the exclusion-table storage area 2323. Thus, the terminal 2352 is capable of grasping the state of the format-conversion encoding process from the expected completion time or the exclusion information.

After the process to catalog the information 229 in the notification storage area 2321 is completed, the format-conversion management DB apparatus 2332 transmits a completion notice showing completion of the new-encoding-order-cataloging process to the format-conversion WWW apparatus 2330 at the next step S2547.

Receiving the completion notice from the format-conversion management DB apparatus 2332, the format-conversion WWW apparatus 2330 requests the terminal 2352 making the request for cataloging of the new order for a format-conversion encoding process to display a completion-notice screen based on the completion notice on the display unit of the terminal 2352 at the next step S2548. The completion-notice screen is shown in FIG. 56.

When the notification apparatus 2945 detects the operation to catalog the information 229 in the notification storage area 2321, the notification apparatus 2945 transmits a notification e-mail such as an e-mail containing information indicating, among others, completion of the process to catalog the order for a format-conversion encoding process to the terminal 2352 making the request for cataloging of the new order for a format-conversion encoding process at the next step S2549. The information described in the e-mail is created on the basis of the information 229.

4-5-2: Cataloged-Encoding-Order-Deleting Processing

Figure 77:
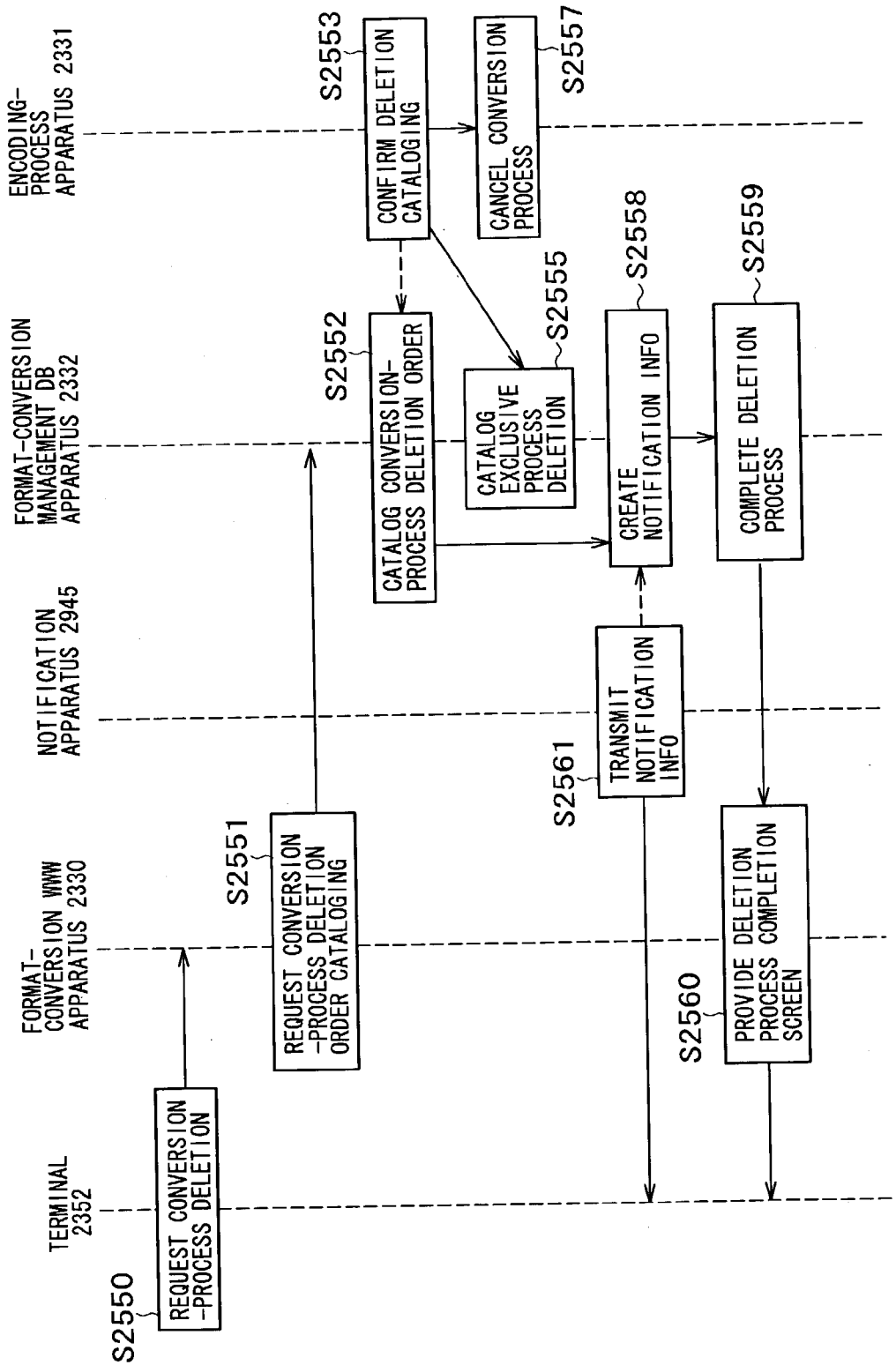
FIG. 77 shows a flowchart representing an outline of a process to delete an already cataloged order for a format-conversion-encoding process in the cut-list creation system implemented by the embodiment of the present invention.

Next, a cataloged-encoding-order-deleting (canceling) process is explained by referring to FIG. 77. It is to be noted that FIG. 77 shows a flowchart representing an outline of the cataloged-encoding-order-deleting process. On the other hand, FIG. 57 is a diagram showing a typical configuration of a screen appearing on the display unit employed in the terminal 2352 during execution of the cataloged-encoding-order-deleting process.

As described earlier, in order to cancel (delete) an already cataloged order for a format-conversion encoding process by using the terminal 2352 in the course of a process to convert a format into another format after a new encoding order has been cataloged, an encoding change screen displaying each item of an already cataloged encoding order as shown in FIG. 57 is required.

In order to cancel (delete) an already cataloged order displayed on the encoding change screen, the user needs to select a 'Cancel setting' button of the screen typically by clicking the mouse of the terminal 2352. When the user selects the 'Cancel setting' button, the terminal 2352 transmits an encoding-order delete command to the format-conversion WWW apparatus 2330 at a first step S2550 of the flowchart shown in FIG. 77. The encoding-order delete command includes the name of a file data containing a video content undergoing a format-conversion encoding process to be canceled and a management number.

When receiving the encoding-order delete command from the terminal 2352, the format-conversion WWW apparatus 2330 verifies validity of the encoding-order delete command on the basis of the user ID and access rights. After the validity of the encoding-order delete command is verified, the information included in the encoding-order delete command is passed on to the format-conversion management DB apparatus 2332 at the next step S2551.

Receiving the information included in the encoding-order delete command from the format-conversion WWW apparatus 2330, the format-conversion management DB apparatus 2332 sets 'Cancel' on the 'Other' column 2315 of the order-table storage area 2322 shown in FIG. 7 for particular information 231 associated with the format-conversion encoding process to be canceled on the basis of the encoding-order delete command, creates another piece of information 231 and catalogs the created piece of information 231 in the order-table storage area 2322 as a deletion order at the next step S2552. In the order-table storage area 2322 shown in FIG. 7, the particular information 231 is a piece of information 231-3.

Then, at the next step S2553, the encoding-process apparatus 2331 confirms the fact that the particular information 231-3, the encoding order of which is to be canceled, has been cataloged in the order-table storage area 2322 before in the cataloging process described above and detects the 'Cancel' status 2315 of the particular information 231-3 associated with a video content, the format of which is being converted into another format. Subsequently, the encoding-process apparatus 2331 searches the order-table storage area 2322 for data associated with the particular information 231-3. The data associated with the particular information 231-3 includes a job number 2311, a management number 2312, a requester 2314 for the video content, and the format of which is being converted into another format. By using the job number 2311 received from the encoding-process apparatus 2331 as a key, the format-conversion management DB apparatus 2332 searches the exclusion-table storage area 2323 shown in FIG. 6 for a specific piece of information 230 corresponding to the key, and deletes the specific piece of information 230 at the next step S2555. To put in details, the specific piece of information 230 is selected among the pieces of information 230-1, 230-2, . . . and 230-n stored in exclusion-table storage area 2323.

After the specific piece of information 230 has been deleted, the encoding-process apparatus 2331 cancels the format-conversion encoding process, which is going on, at the next step S2557 in accordance with the deletion order cataloged at the step S2552 as described above.

In the mean time, after cataloging the other piece of information 231 in the order-table storage area 2322 at the step S2552 as a deletion order as described above, the format-conversion management DB apparatus 2332 creates information 229 based on the cataloged other piece of information 231 and catalogs the information 229 in the notification storage area 2321 at the next step S2558. As will be described later, the notification apparatus 2945 transmits the information 229 to the terminal 2352 making the request for the cancellation of the order for a format-conversion encoding process at a step S2561.

After cataloging the information 229 in the notification storage area 2321 at the step S2558 as described above, the format-conversion management DB apparatus 2332 transmits a completion notice indicating completion of the process to cancel the order for a format-conversion encoding process to the format-conversion WWW apparatus 2330 at the next step S2559.

After receiving the completion notice from the format-conversion management DB apparatus 2332, at the next step S2560, the format-conversion WWW apparatus 2330 requests the terminal 2352 making the request for the cancellation of the order for a format-conversion encoding process to display a completion-notice screen based on the completion notice as shown in FIG. 59 on the display unit employed in the terminal 2352.

When the notification apparatus 2945 detects the operation to catalog the information 229 in the notification storage area 2321 at the step S2558, the notification apparatus 2945 transmits a notice mail such as an e-mail including an encoding-order-cancellation process completion notice created on the basis of the information 229 to the terminal 2352 making the request for the cancellation of the order for a format-conversion encoding process at a next step S2561.

4-5-3: Cataloged-Encoding-Order-Changing Processing

Figure 78:
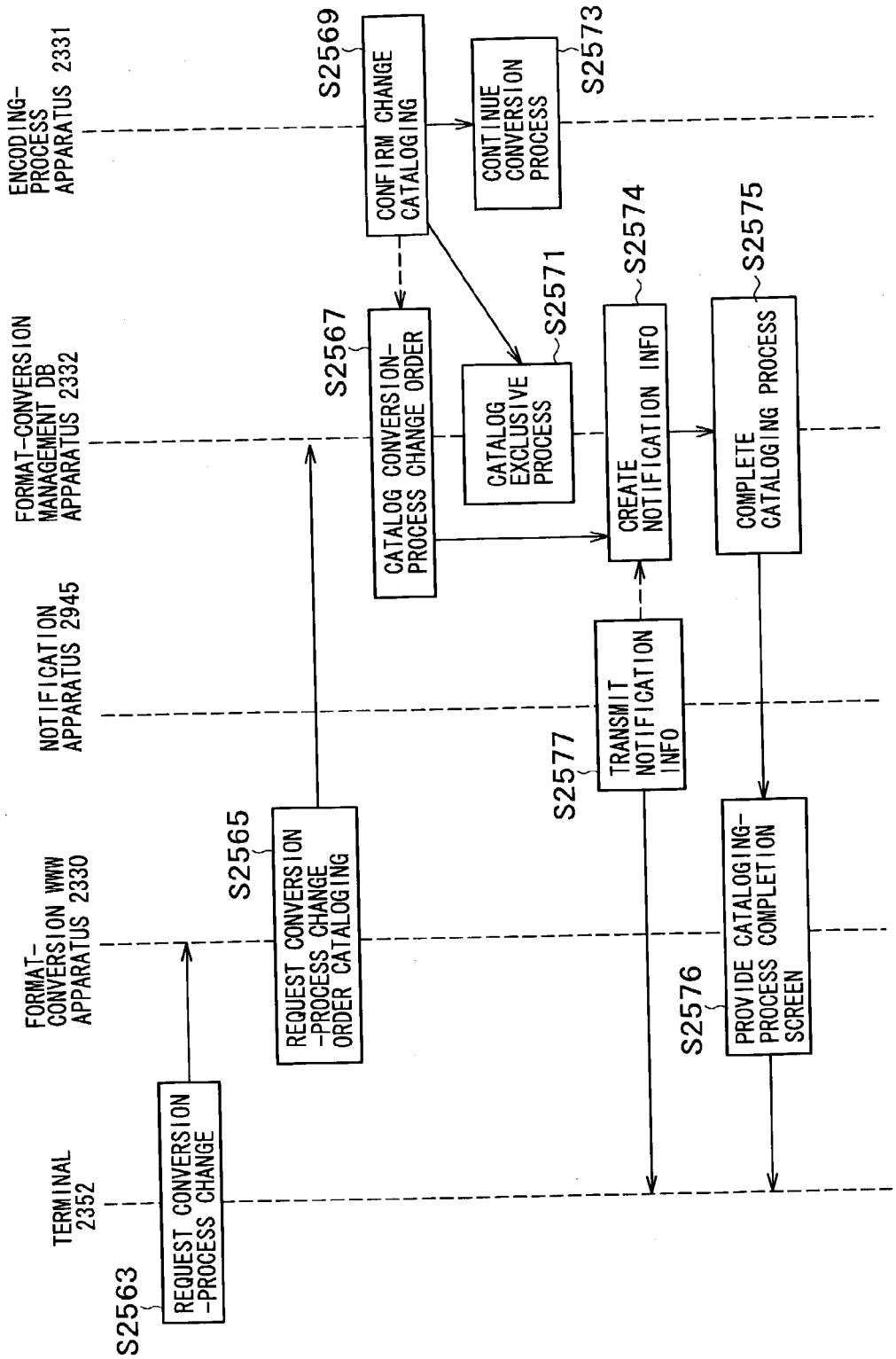
FIG. 78 shows a flowchart representing an outline of a process to change data of an already cataloged order for a format-conversion encoding process in the cut-list creation system implemented by the embodiment of the present invention.

Next, a cataloged-encoding-order-changing process is explained by referring to FIG. 78. It is to be noted that FIG. 78 shows a flowchart representing an outline of the cataloged-encoding-order-changing process. On the other hand, FIG. 57 is a diagram showing a typical configuration of a screen appearing on the display unit employed in the terminal 2352 during execution of the cataloged-encoding-order-changing process.

As described earlier, in order to change information items of an already cataloged order for a format-conversion encoding process by using the terminal 2352 in the course of a process to convert a format into another format after a new order for a format-conversion encoding process has been cataloged, an encoding-order change screen displaying each information item of an already cataloged order for a format-conversion encoding process as shown in FIG. 57 is required. A cataloged encoding order's information items that can be changed are the name of a file data for storing a video content obtained as a result of the format-conversion encoding process and the name of a directory for accommodating the file data for storing a video content obtained as a result of the format-conversion encoding process.

In order to change the name of a file data and/or the name of a directory obtained as a result of the format-conversion encoding process, the user needs to select a 'Change' button of the screen typically by clicking the mouse of the terminal 2352. When the user selects the 'Change' button, the terminal 2352 transmits an encoding-order change command to the format-conversion WWW apparatus 2330 at a first step S2563 of the flowchart shown in FIG. 78. The encoding-order change command includes the name of a file data containing a video content undergoing a format-conversion encoding process, the name of a file data for storing a video content obtained as a result of the format-conversion encoding process, the name of a directory for accommodating the file data for storing the video content obtained as a result of the format-conversion encoding process and a management number.

When receiving the encoding-order change command from the terminal 2352, the format-conversion WWW apparatus 2330 verifies validity of the encoding-order change command on the basis of the user ID and access rights. After the validity of the encoding-order change command is verified, the information included in the encoding-order change command is passed on to the format-conversion management DB apparatus 2332 at the next step S2565.

Receiving the information included in the encoding-order change command from the format-conversion WWW apparatus 2330, the format-conversion management DB apparatus 2332 sets 'Change' on the 'Other' column 2315 of the order-table storage area 2322 shown in FIG. 7 for particular information 231 associated with the format-conversion encoding process, order information of which is to be changed, on the basis of the encoding-order change command, creates another piece of information 231 and catalogs the created piece of information 231 in the order-table storage area 2322 as a change order at the next step S2567. In the example shown in FIG. 7, the particular information 231 in the order-table storage area 2322 is information 231-1.

Then, at the next step S2569, the encoding-process apparatus 2331 confirms the fact that the particular information 231-1, order items of which are to be changed, has been cataloged in the order-table storage area 2322 before in the cataloging process described above and detects the 'Change' status 2315 of the particular information 231-1 associated with a video content, the format of which is being converted into another format. Subsequently, the encoding-process apparatus 233-1 searches the order-table storage area 2322 for data associated with the particular information 231-1. The data associated with the particular information 231-1 includes a job number 2311, a management number 2312, a requester 2314 for the video content, and the format of which is being converted into another format. Then, at the next step S2571, by using the job number 2311 received from the encoding-process apparatus 2331 as a key, the format-conversion management DB apparatus 2332 searches the exclusion-table storage area 2323 shown in FIG. 6 for a specific piece of information 230 corresponding to the key, and changes the information items of the order for a format-conversion encoding process associated with the specific piece of information 230. To put it in details, the specific piece of information 230 is selected among the pieces of information 230-1, 230-2, . . . and 230-n stored in exclusion-table storage area 2323.

After the information items of the encoding order cataloged in the exclusion-table storage area 2323 as the specific piece of information 230 have been changed, the encoding-process apparatus 2331 continues the format-conversion encoding process at the next step S2573 in accordance with the change order cataloged at the step S2567 as described above.

In the mean time, after cataloging the other piece of information 231 in the order-table storage area 2322 at the step S2567 as a change order as described above, the format-conversion management DB apparatus 2332 creates information 229 based on the cataloged other piece of information 231 and catalogs the information 229 in the notification storage area 2321 at the next step S2574. As will be described later, the notification apparatus 2945 transmits the information 229 to the terminal 2352 making the request for the change of the order information at a step S2577.

After cataloging the information 229 in the notification storage area 2321 at the step S2574 as described above, the format-conversion management DB apparatus 2332 transmits a completion notice indicating completion of the process to change the information of the order for a format-conversion encoding process to the format-conversion WWW apparatus 2330 at the next step S2575.

After receiving the completion notice from the format-conversion management DB apparatus 2332, the format-conversion WWW apparatus 2330 requests the terminal 2352 making the request for the change of the encoding order information to display a completion-notice screen based on the completion notice as shown in FIG. 58 on the display unit employed in the terminal 2352 at the next step S2576.

When the notification apparatus 2945 detects the operation to catalog the information 229 in the notification storage area 2321 at the step S2574, the notification apparatus 2945 transmits a notice mail such as an e-mail including an encoding order-change process completion notice created on the basis of the information 229 to the terminal 2352 making the request for the change of the encoding order information at a next step S2577.

As described above, in the case of this embodiment, the format-conversion management DB apparatus 2332 creates information 229 based on the information 231 cataloged in the order-table storage area 2322. It is to be noted, however, that the scope of the present invention is not limited to the particulars of this embodiment. For example, the format-conversion management DB apparatus 2332 can also create information 229 based on the information 230 cataloged in the exclusion-table storage area 2323.

Preferred embodiments of the present invention have been described so far by referring to diagrams. As explained above, however, the scope of the present invention is not limited to the particulars of the embodiments. It is obvious that a person skilled in the art is capable of conceiving a variety of changes and modifications within the domain of technological concepts described in the range of claims. It is needless to say that such changes and modifications are included in the domain of technological concepts provided by the present invention.

Also as described above, in the case of the embodiments, the terminal 2352 make accesses to the center server 2350 through the Internet 2933 and the dedicated line 2936. It is to be noted, however, that the scope of the present invention is not limited to the particulars of this embodiment. For example, the terminal 2352 is also capable of making accesses to the center server 2350 through the Internet 2933 only or the dedicated line 2936 only.

In addition, as described above, in the case of the embodiments, the approval-circulation-processing apparatus 2955 and the access-right-data management DB apparatus 2952 are different apparatus separated from each other. It is to be noted, however, that the scope of the present invention is not limited to the particulars of this embodiment. For example, the functions of the approval-circulation-processing apparatus 2955 and the access-right-data management DB apparatus 2952 can be carried out by a single apparatus.

As described above, in accordance with the present invention, a terminal makes accesses to a center server through a network in order to automatically create a cut list that can be updated at any time.

What is claimed is:

1. A cut-list creation system comprising an advertisement design terminal, a center server and a network for connecting said advertisement design terminal and said server to each other wherein said center server comprises:
   a storage unit for storing a video content created by using said advertisement design terminal;
   a cut-list creation apparatus for creating template data of a video-content-scene list by extraction of selected scenes from said video content stored in said storage unit in a time-division process carried out for each of said selected scenes in accesses made by said advertisement design terminal to said video content; and an access-light management apparatus for executing management of rights of accesses made by said advertisement design terminal to a directory stored in a storage area of said storage unit and rights of accesses made by said advertisement design terminal to a file data accommodated in said directory with an access maker used as a management unit where said access maker is said advertisement design terminal or a group to which said advertisement design terminal pertains.

2. The cut-list creation system according to claim 1 wherein said center server further comprises:

an access control apparatus for executing control of accesses made by said advertisement design terminal to said storage unit by referring to access-right data, which is transmitted from said access-right management apparatus as a result of inquiring of said access-right management apparatus about said access-right data in accordance with each of said accesses made by said advertisement design terminal, with said access maker used as a control unit where said access maker is said advertisement design terminal or a group including said advertisement design terminal.

3. The cut-list creation system according to claim 1 wherein said cut-list creation apparatus creates template data of a cut list of a video content on the basis of edit information created in a process to edit said video content.

4. The cut-list creation system according to claim 3 wherein said template data of said list of scenes of a video content comprises pictures, which are frame units each representing a selected scene of said video content, and additional information affiliated with said selected scene and is displayed as a list of representative pictures each representing a selected scene and appearing along a time axis.

5. The cut-list creation system according to claim 1 wherein said selected scene and said additional information affiliated with said selected scene can be subjected to edit processing at a later time.

6. The cut-list creation system according to claim 5 wherein said edit processing includes one of a modification process, a deletion process, an integration process and a division process.

7. The cut-list creation system according to claim 1 wherein said cut-list creation apparatus converts the format of template data of said video-data-scene list into a format of video-content inspection data that can be output to printing media or viewed on a display screen.

8. The cut-list creation system according to claim 7 wherein the layout of said video-content inspection data can be changed.

9. A center server connected via a network to an advertisement design terminal, said center server comprising:

a storage unit for storing a video content created by using said advertisement design terminal;

a cut-list creation apparatus for creating template data of a video-content-scene list by extraction of selected scenes from said video content stored in said storage unit in a time-division process carried out for each of said selected scenes in accesses made by said advertisement design terminal to the video content; and an access-right management apparatus for executing management of rights of accesses made by said advertisement design terminal to a directory stored in a storage area of said storage unit and rights of accesses made by said advertisement design terminal to a file data accommodated in said directory with an access maker used as a management unit where said access maker is said advertisement design terminal or a group to which said advertisement design terminal pertains.

10. The center server according to claim 9, said center server further comprising:

an access control apparatus for executing control of accesses made by said advertisement design terminal to said storage unit by referring to access-right data, which is transmitted from said access-right management apparatus as a result of inquiring of said access-right management apparatus about said access-right data in accordance with each of said accesses made by said advertisement design terminal, with said access maker used as a control unit where said access maker is said advertisement design terminal or a group including said advertisement design terminal.

11. The center server according to claim 9 wherein said cut-list creation apparatus creates template data of a cut list of a video content on the basis of edit information created in a process to edit said video content.

12. The center server according to claim 11 wherein said template data of said list of scenes of a video content comprises pictures, which are frame units each representing a selected scene of said video content and additional information affiliated with said selected scene and is displayed as a list of representative pictures each representing a selected scene and appearing along a time axis.

13. The center server according to claim 9 wherein said selected scene and said additional information affiliated wit said selected scene can be subjected to edit processing at a later time.

14. The center server according to claim 13 wherein said edit processing includes one of a modification process, a deletion process, an integration process and a division process.

15. The center server according to claim 9 wherein said cut-list creation apparatus converts the format of template data of said video-data-scene list into a format of video-content inspection data that can be output to printing media or viewed on a display screen.

16. The center server according to claim 15 wherein the layout of said video-content inspection data can be changed.

17. An advertisement design terminal connected via a network to a center server, said advertisement design terminal receiving template data of a video-content-scene list of a video content from said center server where said template data is template data created by extraction of selected scenes from said video content in a time-division process carried out in accesses made by said center server to said advertisement design terminal, wherein said center server comprises:

an access-right management apparatus for executing management of rights of accesses made by said advertisement design terminal to a directory stored in a storage area of a storage unit and rights of accesses made by said advertisement design terminal to a file data accommodated in said directory with an access maker used as a management unit where said access maker is said advertisement design terminal or a group to which paid advertisement design terminal pertains.

18. A program stored on a computer readable medium to be executed by a computer for carrying out functions of an advertisement design terminal, which is connected via a network to a center server, to receive template data of a video-content-scene list of a video content from said center server where said template data is template data created by extraction of selected scenes from said video content in a time-division process carried out in accesses made by said center server to said advertisement design terminal, wherein said center server comprises:

an access-right management apparatus for executing management of rights of accesses made by said advertisement design terminal to a directory stored in a storage area of a storage unit and rights of accesses made by said advertisement design terminal to a file data accommodated in said directory with an access maker used as a management unit where said access maker is said advertisement design terminal or a group to which said advertisement design terminal pertains.

19. A cut-list creation method adopted by a center server connected via a network to an advertisement design terminal, said cut-list creation method comprising the steps of:

storing a video content created by using said advertisement design terminal in a storage unit;

receiving accesses made by said advertisement design terminal to said video content stored in said storage unit;

carrying out a time-division process on said video content stored in said storage unit for each of selected scenes in said accesses made by said advertisement design terminal;

creating template data of a video-content-scene list by extraction of said selected scenes from said video content stored in said storage unit; and managing rights of accesses made by said advertisement design terminal to a directory stored in a storage area of said storage unit and rights of accesses made by said advertisement design terminal to a file data accommodated in said directory with an access maker used as a management unit where said access maker is said advertisement design terminal or a group to which said advertisement design terminal pertains.

20. The cut-list creation method according to claim 19, said cut-list creation method further comprising the steps of:

inquiring of said access-right management apparatus about access-right data in accordance with each of accesses made by said advertisement design terminal;

referring to said access-right data received from said access-right management apparatus; and controlling accesses made by said advertisement design terminal to said storage unit with said access maker used as a control unit where said access maker is said advertisement design terminal or a group including said advertisement design terminal.

21. The cut-list creation method according to claim 19, wherein said center server creates template data of a cut list of a video content on the basis of edit information created in a process to edit said video content.

22. The cut-list creation method according to claim 21, wherein said center server displays said template data of said list of scenes of a video content, which is a list comprising pictures and additional information affiliated with said selected scene, as a list of representative images each representing a selected scene and appearing along a time axis where said pictures are frame units each representing a selected scene of said video content.

23. The cut-list creation method according to claim 19, wherein said center server carries out edit processing on said selected scene and said additional information affiliated with said selected scene at a later time.

24. The cut-list creation method according to claim 23, wherein said edit processing includes one of a modification process, a deletion process, an integration process and a division process.

25. The cut-list creation method according to claim 19, wherein said center server converts the format of template data of said video-data-scene list into a format of video-content inspection data that can be output to printing media or viewed on a display screen.

26. The cut-list creation method according to claim 25, wherein said center server can change the layout of said video-content inspection data.

* * * * *